(12) United States Patent
Okazawa et al.

(10) Patent No.: US 7,673,311 B2
(45) Date of Patent: Mar. 2, 2010

(54) DISC CARTRIDGE FOR STORAGE OF A DISC

(75) Inventors: Hironori Okazawa, Katano (JP); Teruyuki Takizawa, Neyagawa (JP); Yoshito Saji, Ashiya (JP); Kuniko Nakata, Neyagawa (JP)

(73) Assignee: Panasonic Corporation, Osaka (JP)

( * ) Notice: Subject to any disclaimer, the term of this patent is extended or adjusted under 35 U.S.C. 154(b) by 1380 days.

(21) Appl. No.: 10/528,952

(22) PCT Filed: Oct. 8, 2003

(86) PCT No.: PCT/JP03/12924

§ 371 (c)(1),
(2), (4) Date: Mar. 22, 2005

(87) PCT Pub. No.: WO2004/034397

PCT Pub. Date: Apr. 22, 2004

(65) Prior Publication Data

US 2006/0112405 A1 May 25, 2006

(30) Foreign Application Priority Data

Oct. 10, 2002 (JP) ............................ 2002-297843
Feb. 20, 2003 (JP) ............................ 2003-043051
Sep. 16, 2003 (JP) ............................ 2003-323679

(51) Int. Cl.
*G11B 23/03* (2006.01)
(52) U.S. Cl. .................................................... 720/738
(58) Field of Classification Search ................ 720/738, 720/741, 721; 360/133
See application file for complete search history.

(56) References Cited

U.S. PATENT DOCUMENTS

| 5,499,233 | A | 3/1996 | Childers et al. |
| 6,590,858 | B2 | 7/2003 | Inoue |
| 6,728,201 | B2 * | 4/2004 | Takizawa et al. ............ 720/738 |
| 6,910,219 | B2 * | 6/2005 | Okazawa et al. ............ 720/741 |
| 6,971,117 | B2 * | 11/2005 | Okazawa et al. ............ 720/738 |
| 7,028,322 | B2 * | 4/2006 | Okazawa et al. ............ 720/725 |
| 7,249,364 | B2 * | 7/2007 | Okazawa et al. ............ 720/741 |
| 7,448,056 | B2 * | 11/2008 | Okazawa et al. ............ 720/741 |
| 2001/0021084 | A1 | 9/2001 | Kikuchi et al. |
| 2004/0205809 | A1 | 10/2004 | Saji et al. |

FOREIGN PATENT DOCUMENTS

| EP | 1 156 488 A2 | 11/2001 |
| EP | 1 363 288 A1 | 11/2003 |

(Continued)

*Primary Examiner*—Angel A. Castro
(74) *Attorney, Agent, or Firm*—Panitch Schwarze Belisario & Nadell LLP

(57) ABSTRACT

A disc cartridge comprises a rotary member (25) that is held on first and second shutters in a disc storage unit in which a disc is stored with a first surface externally exposed from a disc opening and that is engaged with the first and second shutters so that the first and second shutters are opened and closed as the disc rotates within the disk storage unit, wherein the rotary member has a disc receiving portion comprising a contact area (25*n*) that comes into contact with the periphery of a second surface of the disc and receives the disc when the first and second shutters are closed state and a groove (25*p*) provided outside the contact area.

9 Claims, 103 Drawing Sheets

FOREIGN PATENT DOCUMENTS

| | | |
|---|---|---|
| JP | 61-170172 | 10/1986 |
| JP | 63-164863 | 10/1988 |
| JP | 64-019572 | 1/1989 |
| JP | 3-71465 | 7/1991 |
| JP | 04-067486 A | 3/1992 |
| JP | 06-150603 | 5/1994 |
| JP | 7-10860 | 2/1995 |
| JP | 08-287638 A | 11/1996 |
| JP | 09-153264 A | 6/1997 |
| JP | 11-339424 | 12/1999 |
| JP | 2000-030339 A | 1/2000 |
| JP | 2001-283555 | 10/2001 |
| WO | 03/041076 A1 | 5/2003 |

\* cited by examiner

FIG. 168
FIG. 169
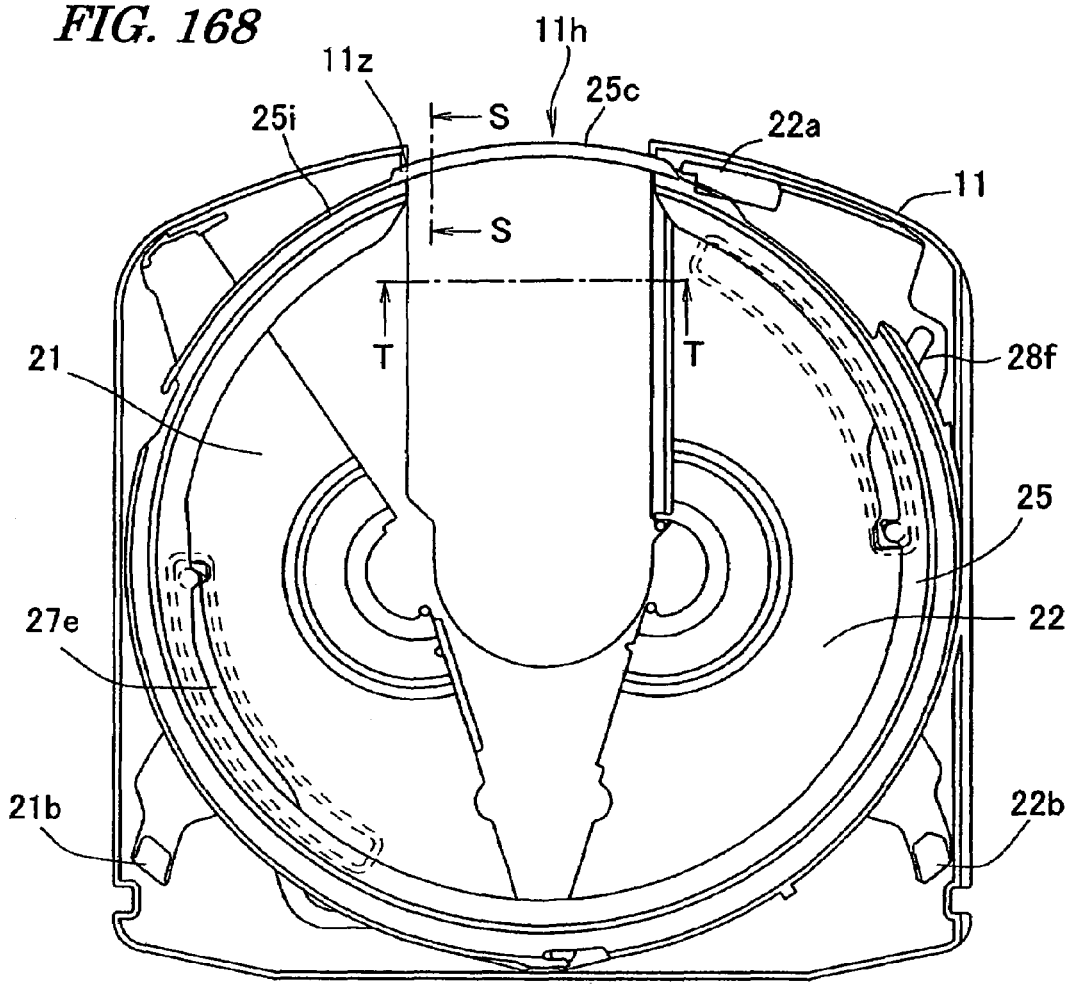
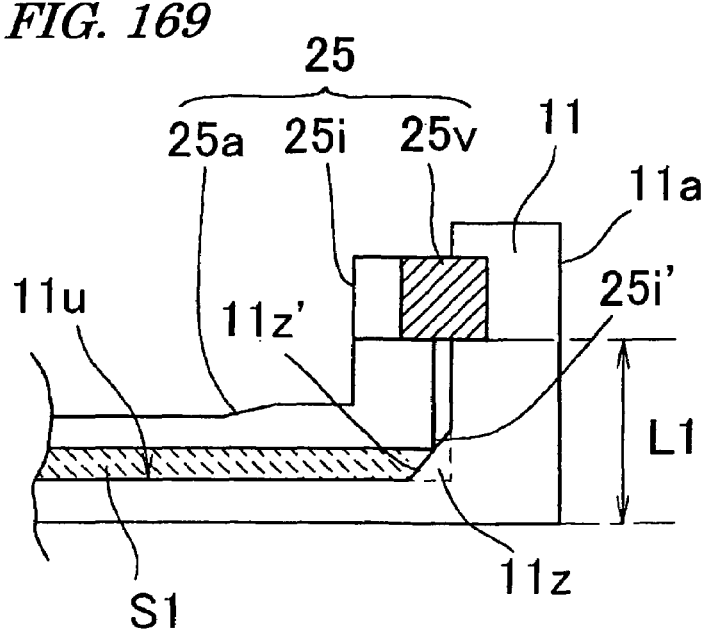

DISC CARTRIDGE FOR STORAGE OF A DISC

CROSS-REFERENCE TO RELATED APPLICATION

This application is a Section 371 of International Application No. PCT/JP2003/012924, filed Oct. 8, 2003, which was published in the Japanese language on Apr. 22, 2004, under International Publication No. WO 2004/034397 A1, the disclosure of which is incorporated herein by reference.

TECHNICAL FIELD

The present invention relates to a disc cartridge for use to store a disk-shaped signal storage medium such as an optical disc or a magnetic disk therein in a rotatable state.

BACKGROUND ART

Various disc cartridges have been proposed as protective cases for disk-shaped signal storage media.

For example, Japanese Laid-Open Publication No. 9-153264 discloses a disc cartridge in which a disk-shaped storage medium having a single or double signal recording sides (which will be herein referred to as a "disc" simply) is completely enclosed in a disc storage portion. The disc storage portion is defined inside a cartridge body that is made up of upper and lower halves. The cartridge body includes chucking openings and a head opening. The chucking openings allow the turntable of a spindle motor and a clamper to chuck a disc inserted, while the head opening allows a head to read and/or write a signal from/on the disc. The lower one of the chucking openings is continuous with the head opening. Accordingly, while the operator carries such a cartridge, dust easily enters the inside of the cartridge through these openings and the disc is also easily soiled with finger marks. For that reason, the disc cartridge further includes a shutter for closing these openings up.

A disc cartridge having such a structure, however, has the following drawbacks. Firstly, such a disc cartridge cannot be so thin. This is because the disc storage space, defined between the upper and lower halves, should be thick enough to allow a disc drive to accurately read or write a signal (or information) from/onto the disc stored in such a disc cartridge. The reasons why the disc storage space should be relatively thick include the expected flutter or warp of the disc being rotated and an error that may occur in disposing the disc cartridge at a predetermined position inside the disc drive.

Secondly, the shutter for closing up these chucking and head openings at the same time cannot be formed at a low cost, thus increasing the overall manufacturing cost of such a disc cartridge. The reason is as follows. Specifically, the lower half of the disc cartridge is provided with an opening for the turntable of the spindle motor and a head opening, while the upper half thereof is provided with another opening for the clamper. Thus, to close these three openings up at a time, the shutter needs to be formed in a U-shape, which is not so cheap to make.

Thirdly, the disc stored inside such a disc cartridge is not fixed in many cases, thus possibly causing dust or fine particle deposition and scratching problems. Specifically, although a disc with a metal hub can be attracted and fixed in position via a magnetic force so as not to move inconstantly, an optical disc with no hub, e.g., a CD or a DVD, is normally not fixed, and movable freely, inside the disc cartridge. Accordingly, when the shutter of the disc cartridge is opened inside the disc drive, dust may enter the cartridge through its openings and be deposited on the disc easily. Also, if the disc is shaken so much as to contact with the inner walls of the disc cartridge, the signal recording side of the disc may get scratched or fine particles may be stirred up and deposited on the disc.

DISCLOSURE OF INVENTION

In order to overcome the problems described above, an object of the present invention is to provide a disc cartridge that has a reduced thickness and a simplified, much less expensive shutter for a single-sided disc, in particular. Another object of the present invention is to provide a disc cartridge that can drastically reduce the dust to be deposited on the disc stored therein by getting the disc firmly held inside the disc cartridge and eliminating the inconstant movement of the disc. A third object of the present invention is to provide a disc cartridge of a good design by displaying the label side of the disc stored therein.

A disc cartridge according to the present invention includes: a cartridge body including a disc storage portion having a disc window and a bottom and storing a disc with first and second sides in a rotatable state so that the first side is exposed through the disc window, a chucking opening provided on the bottom of the disc storage portion so as to get the disc chucked externally and a head opening provided on the bottom of the disc storage portion so as to allow a signal read/write head to access the second side of the disc; a first shutter and a second shutter, which are provided on the bottom of the disc storage portion so as to expose or cover the head opening; and a rotational member supported over, and engaging with, the first and second shutters in the disc storage portion so as to open or close the first and second shutters when rotating in the disc storage portion. The rotational member includes a disc receiving portion with a contact region that contacts with, and receives, the outer edge of the second side of the disc while the first and second shutters are closed and a groove provided outside of the contact region.

In one preferred embodiment, the rotational member has a notch, which is provided for the disc receiving portion so as to be located within the head opening while the first and second shutters are opened. The disc storage portion includes a sidewall along an outer periphery of the bottom. And each of the first and second shutters includes a disc holding portion for holding the disc thereon with the center of the disc offset from the center of the disc storage portion such that an outer side surface of the disc contacts with the sidewall of the disc storage portion at a position where the notch of the rotational member is located while the first and second shutters are closed.

In another preferred embodiment, the groove of the disc receiving portion is exposed in the disc storage portion while the first and second shutters are closed.

In another preferred embodiment, the rotational member includes a plurality of filling portions, which are provided so as to fill in parts of the groove.

In another preferred embodiment, each said filling portion has a circumferential length of at least 1 mm.

In another preferred embodiment, the upper surface of each said filling portion is tilted toward the center of the disc window.

Another disc cartridge according to the present invention includes: a cartridge body including a disc storage portion having a disc window and a bottom and storing a disc with first and second sides in a rotatable state so that the first side is exposed through the disc window, a chucking opening provided on the bottom of the disc storage portion so as to get the disc chucked externally and a head opening provided on the bottom of the disc storage portion so as to allow a signal read/write head to access the second side of the disc; a first shutter and a second shutter, which are provided on the bottom of the disc storage portion so as to expose or cover the head opening; a rotational member supported over, and engaging with, the first and second shutters in the disc storage portion so as to open or close the first and second shutters when rotating in the disc storage portion; a first disc holding portion and a second disc holding portion, which are provided as portions of the first and second shutters, respectively, so as to fix the disc onto either the first and second shutters or the cartridge body as the first and second shutters are going to be opened or closed and while the shutters cover the chucking and head openings; and a stopper member, which protrudes toward the disc window. While the first and second shutters are closed, the first disc holding portion contacts with the disc in the vicinity of the stopper member before the second disc holding portion contacts with the disc.

In one preferred embodiment, while the first and second shutters are closed, at least part of the first disc holding portion is located under the stopper member so as to contact with the disc.

In another preferred embodiment, each of the first and second disc holding portions has a downwardly tapered slope, grips and fixes the disc thereon by bringing the slope into contact with an outer edge of the disc, and holds the disc thereon by pressing the disc against the bottom of the disc storage portion.

In another preferred embodiment, the first disc holding portion has a structure for changing the tilt and position of the disc in the disc storage portion so as to contact with the disc in the vicinity of the stopper member and then allow the second disc holding portion to contact with, and grip, the disc.

In another preferred embodiment, the tilt and position changing structure of the first disc holding portion has a first regulating surface, which is provided so as to define a downwardly tapered slope that is not parallel to the direction in which the first disc holding portion moves as the first and second shutters are going to be closed, and a second regulating surface, which is provided parallel to the first or second shutter.

Another disc cartridge according to the present invention includes: a cartridge body including a disc storage portion having a disc window and a bottom and storing a disc with first and second sides in a rotatable state so that the first side is exposed through the disc window, a chucking opening provided on the bottom of the disc storage portion so as to get the disc chucked externally and a head opening provided on the bottom of the disc storage portion so as to allow a signal read/write head to access the second side of the disc; a first shutter and a second shutter, which are provided on the bottom of the disc storage portion so as to expose or cover the head opening; and a rotational member supported over, and engaging with, the first and second shutters in the disc storage portion so as to open or close the first and second shutters when rotating in the disc storage portion. The cartridge body includes a rotational member receiving portion for holding the rotational member by contacting with a portion of the bottom of the rotational member while the first and second shutters are opened.

In one preferred embodiment, the rotational member receiving portion has a slope, which is provided near the head opening so as to face the disc window. While the first and second shutters are opened, the outer edge of the bottom of the rotational member partially contacts with the slope.

In another preferred embodiment, the rotational member includes a first protrusion and a second protrusion, which protrude toward the bottom of the disc storage portion. The first and second shutters include a first guide groove and a second guide groove, which respectively engage with the first and second protrusions of the rotational member. And at least one of the first and second protrusions has a claw portion at the top so as not to disengage itself from its associated guide groove.

In another preferred embodiment, the first and second shutters include: notches, which are provided so as to define a hole under the center hole of the disc while the first and second shutters are closed; a first convex portion and a second convex portion, which are provided around the notches; and a first protrusion, a second protrusion and a third protrusion, which are provided on the first and second convex portions so as to protrude into the center hole of the disc while the first and second shutters are closed.

In another preferred embodiment, in the disc cartridge of claim 9, the rotational member includes: a disc receiving portion, which is provided so as to receive the outer edge of the second side of the disc; and a notch, which is provided for the disc receiving portion so as to be located within the head opening while the first and second shutters are opened. The cartridge body includes a concave portion on the bottom of the disc storage portion in a region where the notch of the rotational member passes and the disc receiving portion overlaps with the first or second shutter as the first and second shutters are going to be opened.

In another preferred embodiment, the cartridge body includes a first convex portion and a second convex portion in the vicinity of the head opening. One of the first and second shutters and the rotational member include a first convex portion and a second convex portion, which respectively contact with the first and second convex portions of the cartridge body while the first and second shutters are closed.

Another disc cartridge according to the present invention includes: a cartridge body including a disc storage portion having a disc window and a bottom and storing a disc with first and second sides in a rotatable state so that the first side is exposed through the disc window, a chucking opening provided on the bottom of the disc storage portion so as to get the disc chucked externally and a head opening provided on the bottom of the disc storage portion so as to allow a signal read/write head to access the second side of the disc; a shutter, which is provided on the bottom of the disc storage portion so as to expose or cover the head opening; and a stopper member, which is fixed on the upper surface of the cartridge body so as to partially protrude into the disc window. The stopper member includes at least one positioning pin and at least one engaging pin with a first engaging portion. The cartridge body has: at least one positioning hole, which extends in a first direction from the cartridge upper shell toward the lower shell and which holds the positioning pin so as to prevent the positioning pin from moving perpendicularly to the first direction; and at least one engaging hole, which also extends in the first direction and which includes a second engaging portion that engages with the first engaging portion so as to prevent the first engaging portion from moving in the first direction.

In one preferred embodiment, the at least one positioning pin and the at least one engaging pin of the cartridge body include two positioning pins and two engaging pins, respectively, and the at least one positioning hole and the at least one engaging hole of the cartridge body include two positioning holes and two engaging holes, respectively.

Another disc cartridge according to the present invention includes: a cartridge body including a disc storage portion having a disc window and a bottom and storing a disc with first and second sides in a rotatable state so that the first side is exposed through the disc window, a chucking opening provided on the bottom of the disc storage portion so as to get the disc chucked externally and a head opening provided on the bottom of the disc storage portion so as to allow a signal read/write head to access the second side of the disc; a first shutter and a second shutter, which are provided on the bottom of the disc storage portion so as to expose or cover the head opening; and a rotational member supported over, and engaging with, the first and second shutters in the disc storage portion so as to open or close the first and second shutters when rotating in the disc storage portion. The rotational member includes: a disc receiving portion that contacts with, and receives, the outer edge of the second side of the disc while the first and second shutters are closed; and a notch, which is provided for the disc receiving portion so as to be located within the head opening while the first and second shutters are opened. The disc storage portion includes a sidewall along an outer periphery of the bottom. Each of the first and second shutters includes a disc holding portion for holding the disc thereon with the center of the disc offset from the center of the disc storage portion such that an outer side surface of the disc contacts with the sidewall of the disc storage portion at a position where the notch of the rotational member is located while the first and second shutters are closed. Each of the first and second disc holding portions includes: a first slope and a second slope, which are arranged perpendicularly to the bottom of the disc storage portion and are tilted so as to face the bottom; and a horizontal plane, which extends substantially parallel to the bottom between the first and second slopes.

Another disc cartridge according to the present invention includes: a cartridge body including a disc storage portion having a disc window and a bottom and storing a disc with first and second sides in a rotatable state so that the first side is exposed through the disc window, a chucking opening provided on the bottom of the disc storage portion so as to get the disc chucked externally and a head opening provided on the bottom of the disc storage portion so as to allow a signal read/write head to access the second side of the disc; a first shutter and a second shutter, which are provided on the bottom of the disc storage portion so as to expose or cover the head opening; and a rotational member supported over, and engaging with, the first and second shutters in the disc storage portion so as to open or close the first and second shutters when rotating in the disc storage portion. The rotational member includes: a disc receiving portion that contacts with, and receives, the outer edge of the second side of the disc while the first and second shutters are closed; a sidewall, which surrounds the outer edge of the disc receiving portion; and a notch, which is provided for the disc receiving portion and a portion of the sidewall so as to be located within the head opening while the first and second shutters are opened. The sidewall portion with the notch expands outward from the other portions. The cartridge body includes a supporting portion, which supports the sidewall portion with the notch while the shutters are opened, in the vicinity of the head opening.

Another disc cartridge according to the present invention includes: a cartridge body including a disc storage portion having a disc window and a bottom and storing a disc with first and second sides in a rotatable state so that the first side is exposed through the disc window, a chucking opening provided on the bottom of the disc storage portion so as to get the disc chucked externally and a head opening provided on the bottom of the disc storage portion so as to allow a signal read/write head to access the second side of the disc; a first shutter and a second shutter, which are provided on the bottom of the disc storage portion so as to expose or cover the head opening; and a rotational member supported over, and engaging with, the first and second shutters in the disc storage portion so as to open or close the first and second shutters when rotating in the disc storage portion. The rotational member includes a disc receiving portion with a contact region, which contacts with, and receives, the outer edge of the second side of the disc while the first and second shutters are closed and which is parallel to the bottom of the disc storage portion, and a non-contact region, which is provided inside of the contact region so as not to contact with the disc. The non-contact region of the rotational member and surfaces of the first and second shutters that are opposed to the disc are textured.

Another disc cartridge according to the present invention includes: a cartridge body including a disc storage portion having a disc window and a bottom and storing a disc with first and second sides in a rotatable state so that the first side is exposed through the disc window, a chucking opening provided on the bottom of the disc storage portion so as to get the disc chucked externally and a head opening provided on the bottom of the disc storage portion so as to allow a signal read/write head to access the second side of the disc; a first shutter and a second shutter, which are provided on the bottom of the disc storage portion so as to expose or cover the head opening; and a rotational member supported over, and engaging with, the first and second shutters in the disc storage portion so as to open or close the first and second shutters when rotating in the disc storage portion. The cartridge body includes a convex portion around the chucking and head openings on the bottom. The first and second shutters include a first convex portion and a second convex portion, which sandwich the convex portion of the cartridge body while the shutters are closed, on the surface opposed to the bottom.

In one preferred embodiment, the first and second shutters rotate around a rotation axis that is defined somewhere but the center of rotation of the rotational member. The first and second shutters further include a third convex portion, which is as high as the first and second convex portions and which extends in an arc of which the center is defined by the rotation axis, on the surface opposed to the bottom.

A disc drive according to the present invention is loaded with any of the disc cartridges described above so as to read and/or write information from/on a disc stored in the disc cartridge.

Another disc drive according to the present invention includes: driving means for rotating a disc; a head for reading and/or writing information from/on the disc; a supporting structure for supporting the disc cartridge of claim 2, in which the disc is stored, at a predetermined position with respect to the driving means; and a shutter opening/closing mechanism for opening the shutters of the disc cartridge and making the disc holding portions of the disc cartridge release the disc so as to allow the disc to rotate in the disc storage portion of the disc cartridge.

In one preferred embodiment, the disc drive further includes a clamper for fixing the disc onto the driving means.

In another preferred embodiment, the supporting structure includes a positioning pin that determines the position of the disc cartridge.

In a disc cartridge fabricating method according to the present invention, the disc cartridge includes a cartridge body. The cartridge body includes a disc storage portion having a disc window and a bottom and storing a disc with first and second sides in a rotatable state so that the first side is exposed through the disc window. The method includes the steps of: arranging first and second shutters for exposing or covering a head opening on a cartridge lower shell that includes a chucking opening and the head opening on the bottom thereof so as to get the disc chucked externally and to allow a signal read/write head to access the disc, respectively, and providing a rotational member for driving the first and second shutters on the first and second shutters; bonding a cartridge upper shell, including the disc window, with the cartridge lower shell, thereby making up the cartridge body; inserting the disc through the disc window into the cartridge body; and fixing a stopper member onto the upper surface of the cartridge body such that the stopper member partially protrudes into the disc window.

In one preferred embodiment, the step of bonding the cartridge upper shell with the cartridge lower shell includes the step of performing an ultrasonic welding process.

In another preferred embodiment, the cartridge upper and lower shells are made of an ABS resin and the rotational member and first and second shutters are made of a polyacetal resin.

BRIEF DESCRIPTION OF DRAWINGS

FIG. 120 is a perspective view illustrating a removal history hole and its surrounding members in the disc cartridge shown in FIG. 119 to a larger scale.

FIG. 121 is a plan view of the disc cartridge shown in FIG. 119.

FIG. 122 is a cross-sectional view illustrating portions of the disc cartridge around the rotation shaft as viewed along the line J-J shown in FIG. 119.

FIG. 123 is a cross-sectional view illustrating portions of the disc cartridge around a latching portion as viewed along the line J-J shown in FIG. 119.

FIG. 124 is a cross-sectional view illustrating portions of the disc cartridge as viewed along the line K-K shown in FIG. 119.

FIG. 125 is a plan view illustrating a state of the disc cartridge shown in FIG. 119 in which the stopper member has been disengaged.

FIG. 126 is a cross-sectional view illustrating respective portions of the disc cartridge around the rotation shaft as viewed along the line J-J shown in FIG. 125.

FIG. 127 is a cross-sectional view illustrating respective portions of the disc cartridge around a latching portion as viewed along the line J-J shown in FIG. 125.

FIG. 128 is a plan view schematically illustrating a modified example of the disc cartridge shown in FIG. 119.

FIG. 129 is a plan view schematically illustrating a modified example of the disc cartridge shown in FIG. 119.

FIG. 130 is a plan view schematically illustrating another modified example of the disc cartridge shown in FIG. 119.

FIG. 131 is a plan view schematically illustrating another modified example of the disc cartridge shown in FIG. 119.

Figure 132:
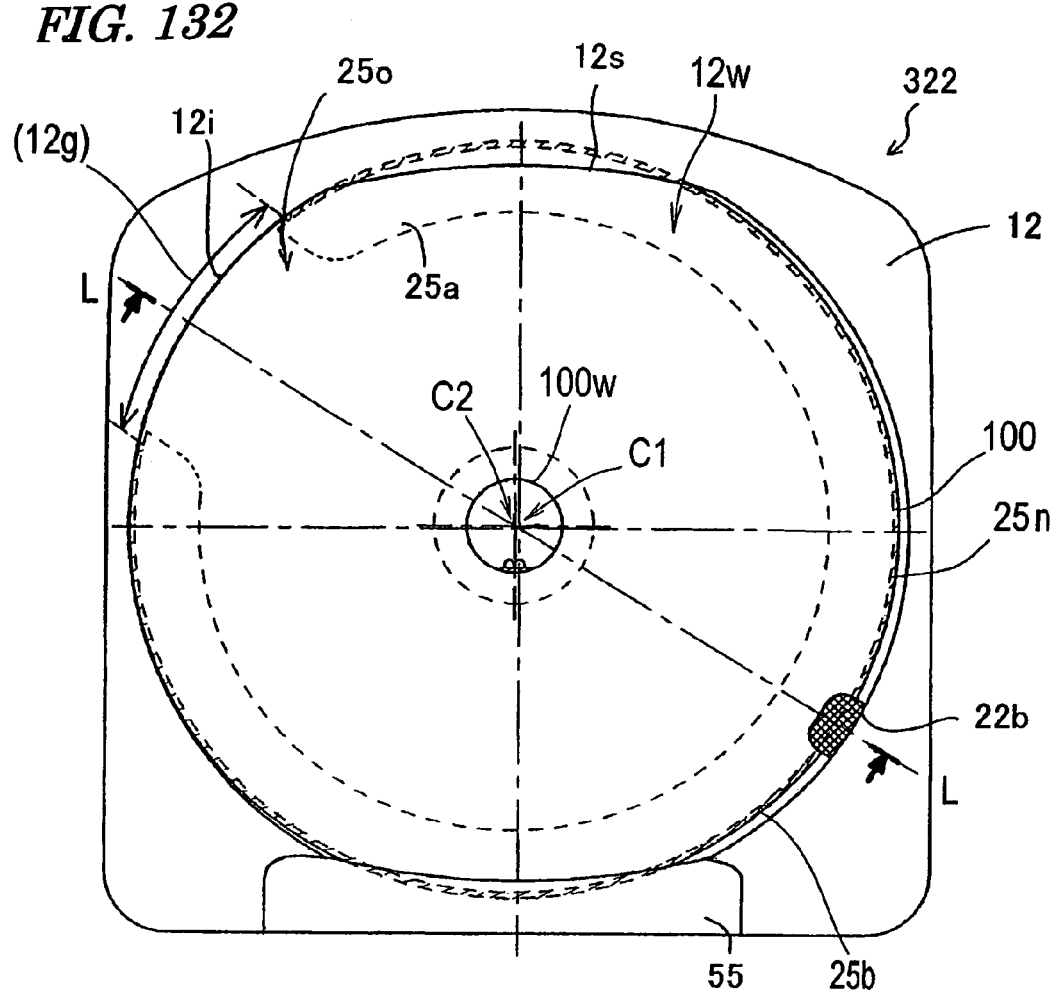

FIG. 132 is a plan view illustrating a disc cartridge according to a twenty-second embodiment of the present invention.

Figure 133:
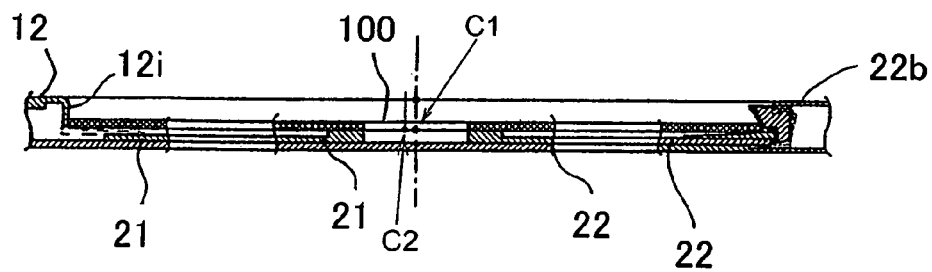

FIG. 133 is a cross-sectional view of the disc cartridge as viewed along the line. L-L shown in FIG. 132.

Figure 134:
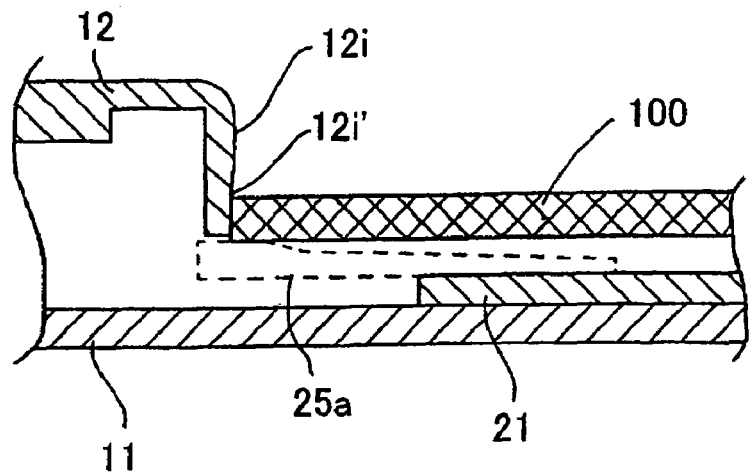

FIG. 134 is a cross-sectional view illustrating a portion of the disc cartridge, as viewed along the line L-L shown in FIG. 132, to a larger scale.

Figure 135:
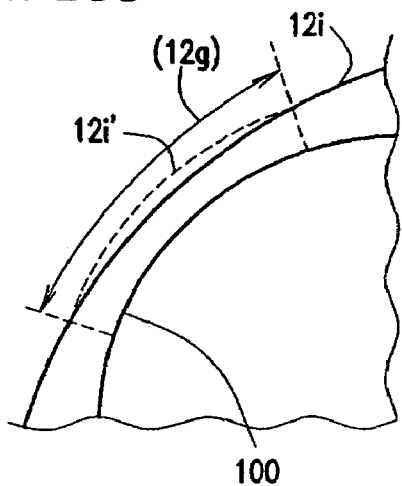

FIG. 135 is a plan view schematically illustrating a portion of the disc cartridge shown in FIG. 132 to a larger scale.

Figure 136:
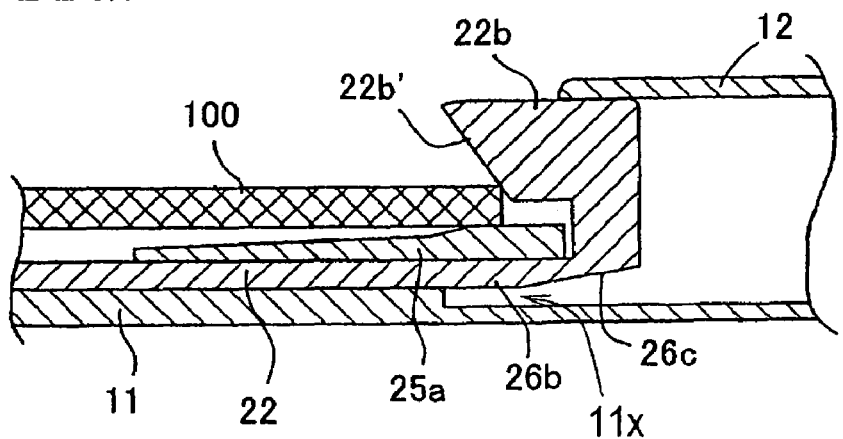

FIG. 136 is a cross-sectional view illustrating another portion of the disc cartridge, as viewed along the line L-L shown in FIG. 132, to a larger scale.

Figure 137:
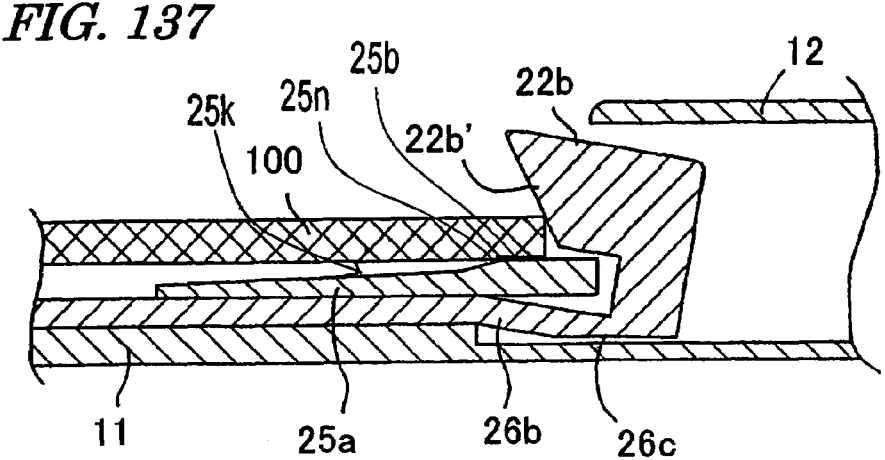

FIG. 137 is a cross-sectional view illustrating another portion of the disc cartridge, as viewed along the line L-L shown in FIG. 132, to a larger scale.

Figure 138:
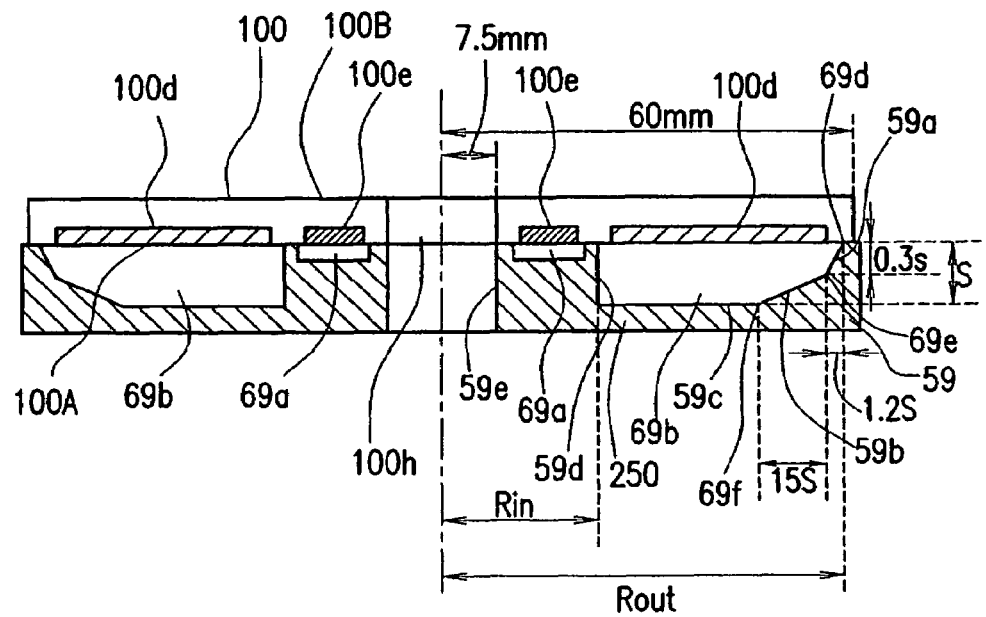

FIG. 138 is a cross-sectional view illustrating a space to be provided under the disc for a disc cartridge according to a twenty-third embodiment of the present invention.

Figure 139:
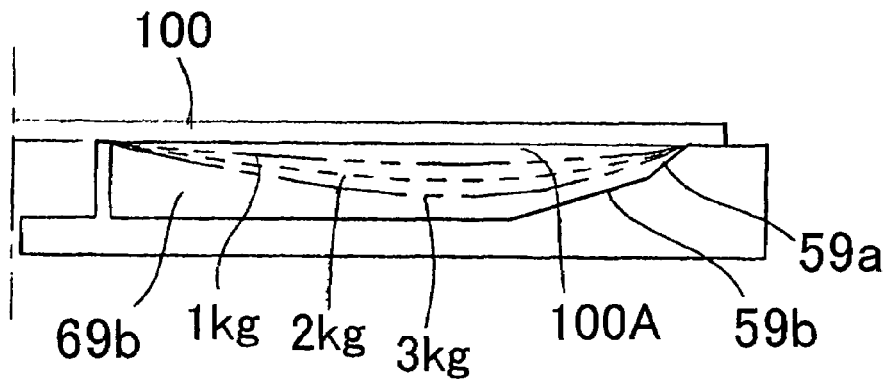

FIG. 139 is a view illustrating the flexure of the disc.

Figure 140:
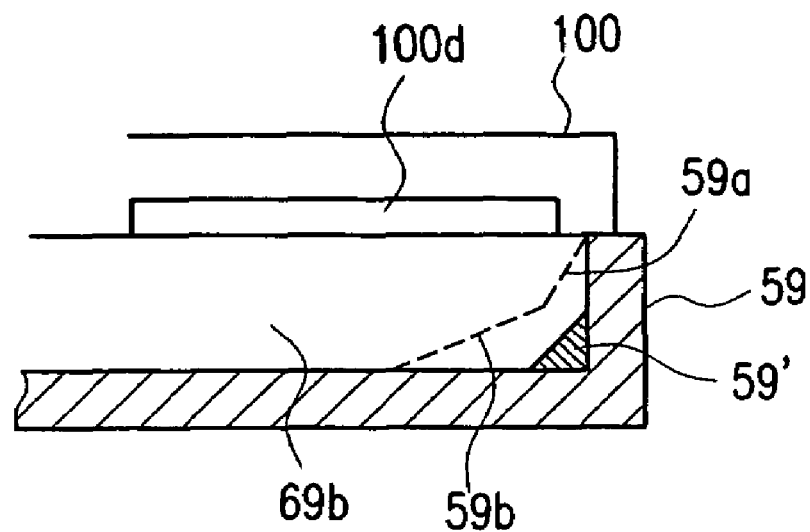

FIG. 140 is a view illustrating another exemplary space to be provided under the disc.

Figure 141:
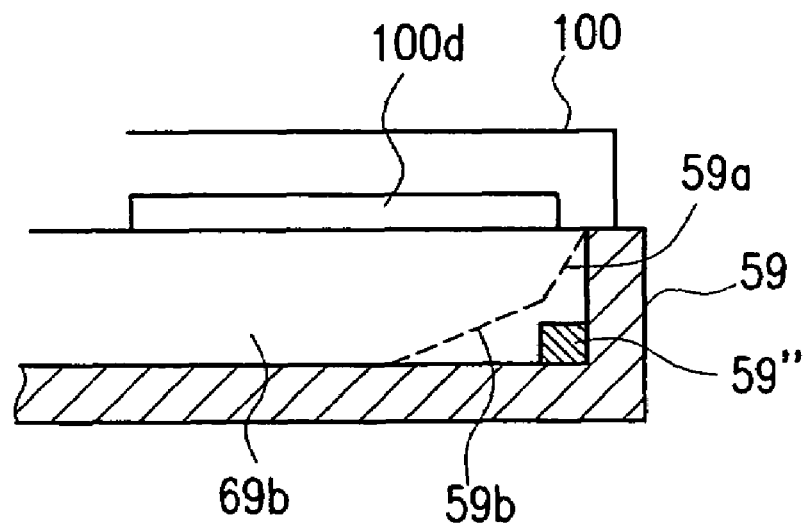

FIG. 141 is a view illustrating yet another exemplary space to be provided under the disc.

Figure 142:
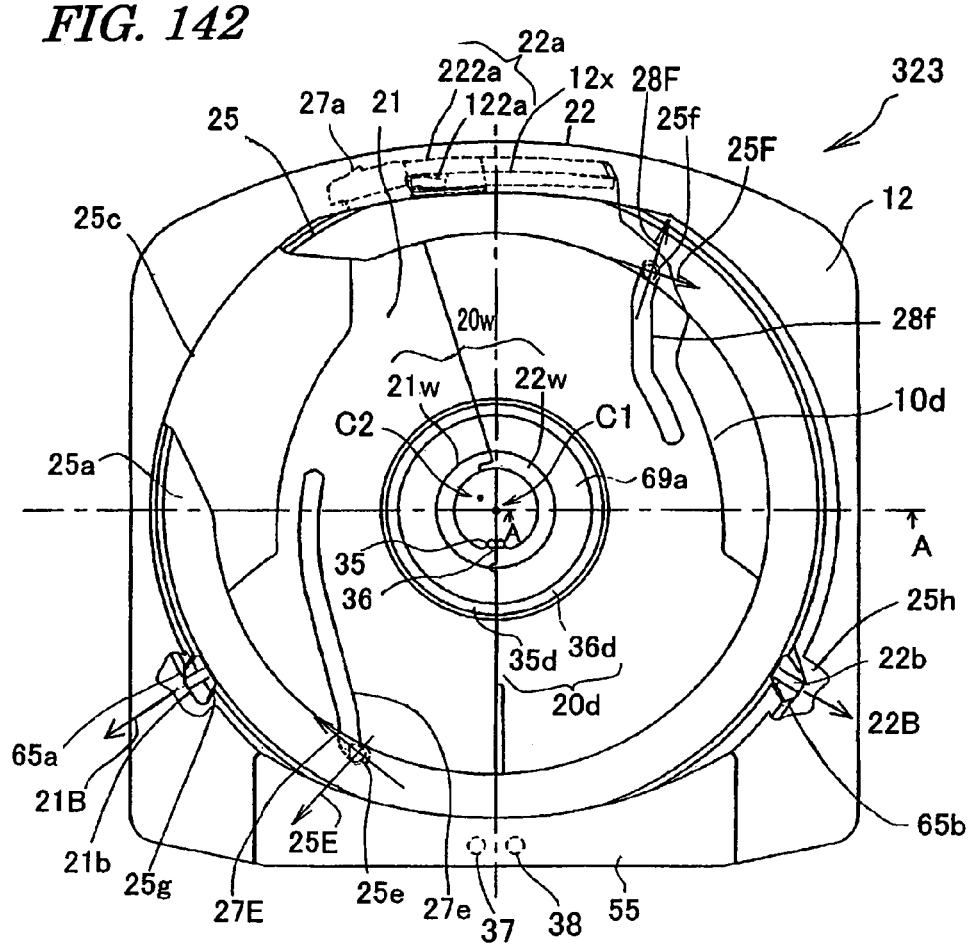

FIG. 142 is a plan view illustrating the disc cartridge of the twenty-third embodiment of the present invention.

Figure 143:
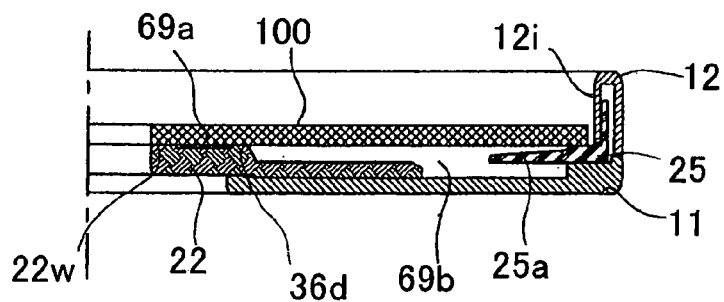

FIG. 143 is a cross-sectional view of the disc cartridge as viewed along the line A-A shown in FIG. 142.

Figure 144:
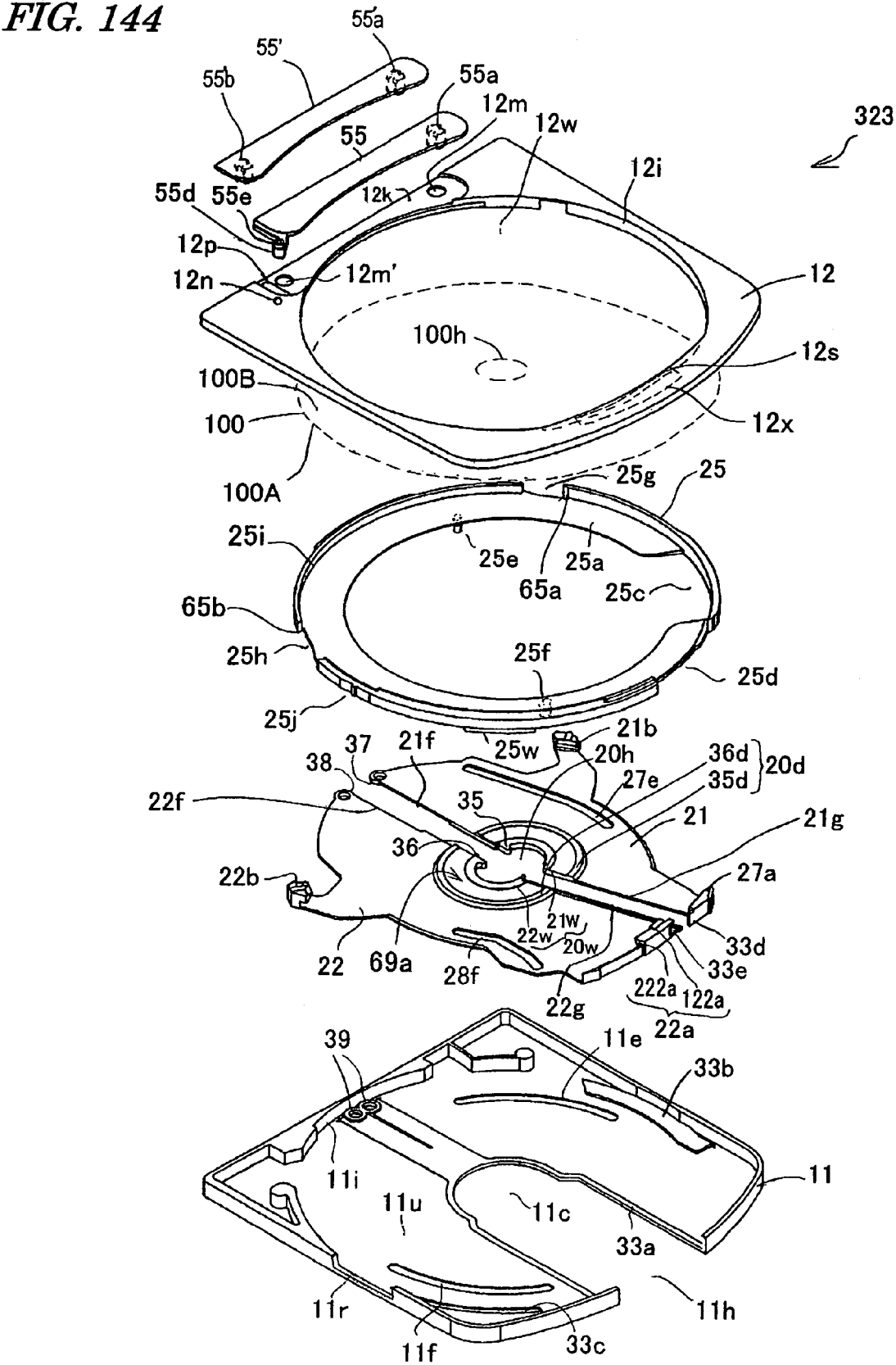

FIG. 144 is an exploded perspective view illustrating an exploded state of the disc cartridge shown in FIG. 142.

Figure 145:
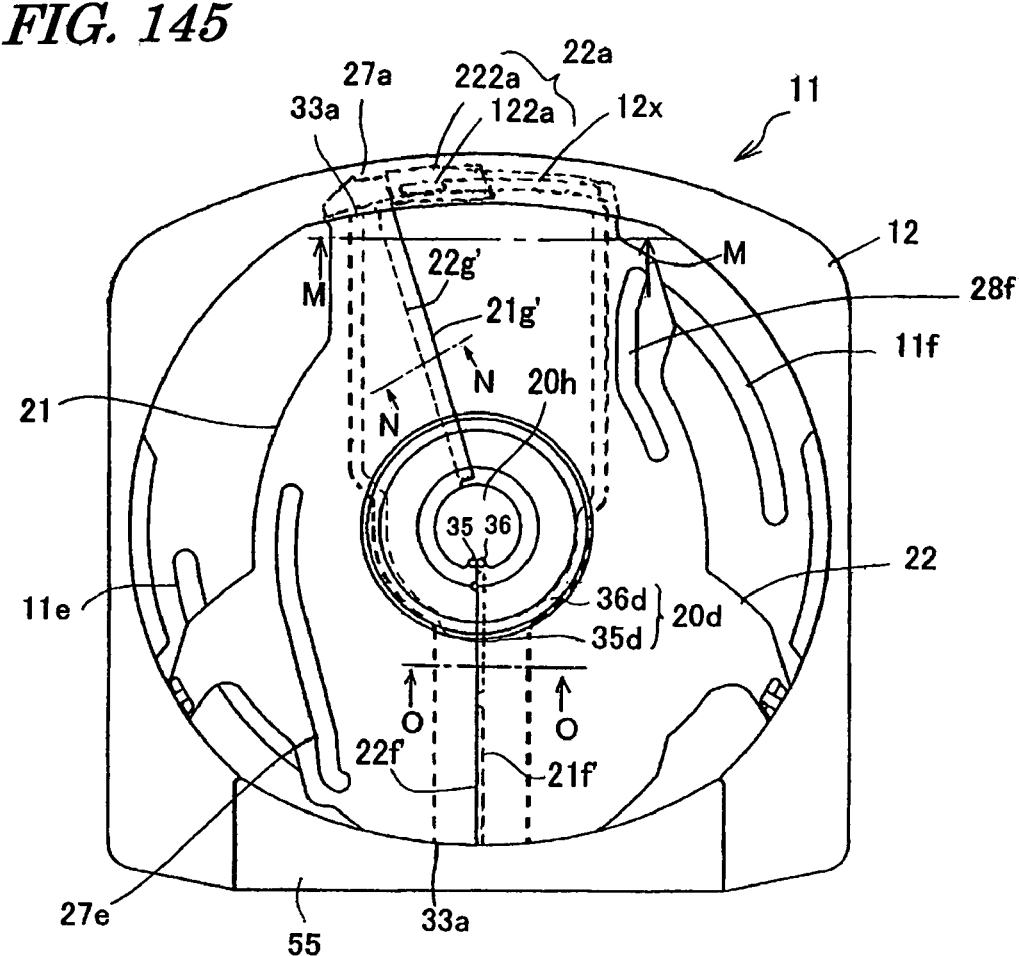

FIG. 145 is a plan view of the disc cartridge shown in FIG. 142.

Figure 146:
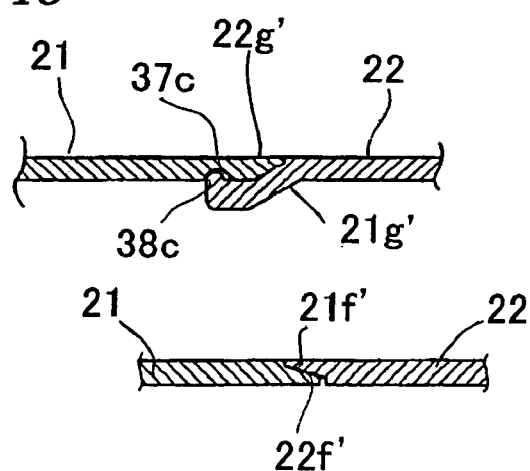

FIG. 146 is cross-sectional views of the first and second shutters of the disc cartridge shown in FIG. 145 as viewed along the lines N-N and O-O, respectively.

Figure 147:
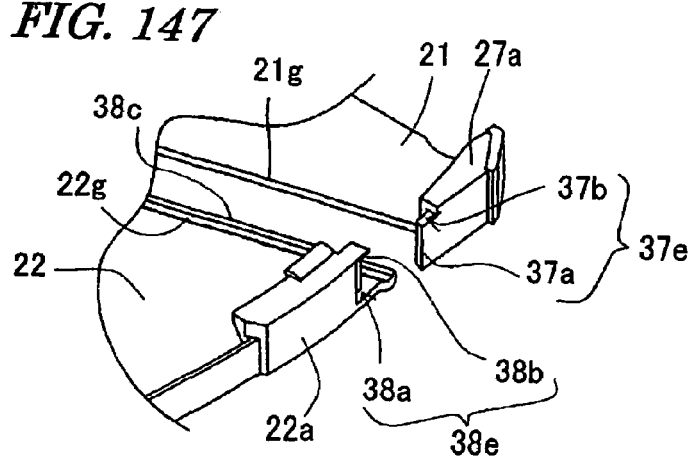

FIG. 147 is a perspective view illustrating respective portions of the first and second shutters of the disc cartridge shown in FIG. 142 to a larger scale.

Figure 148:
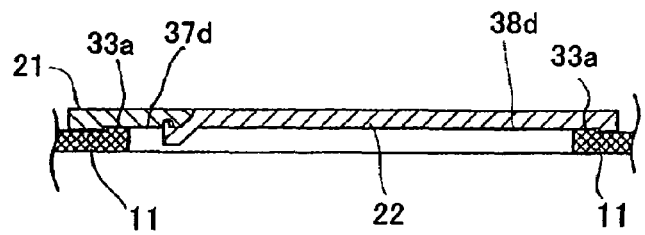

FIG. 148 is a cross-sectional view of the disc cartridge as viewed along the line M-M shown in FIG. 145.

Figure 149:
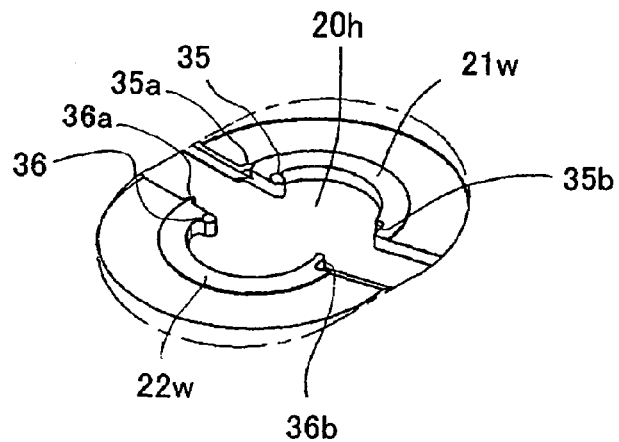

FIG. 149 is a perspective view illustrating respective portions of the first and second shutters of the disc cartridge shown in FIG. 142 to a larger scale.

Figure 150:
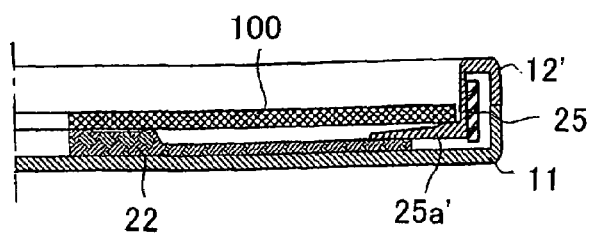

FIG. 150 is a cross-sectional view illustrating another modified example of the disc cartridge shown in FIG. 145.

Figure 151:
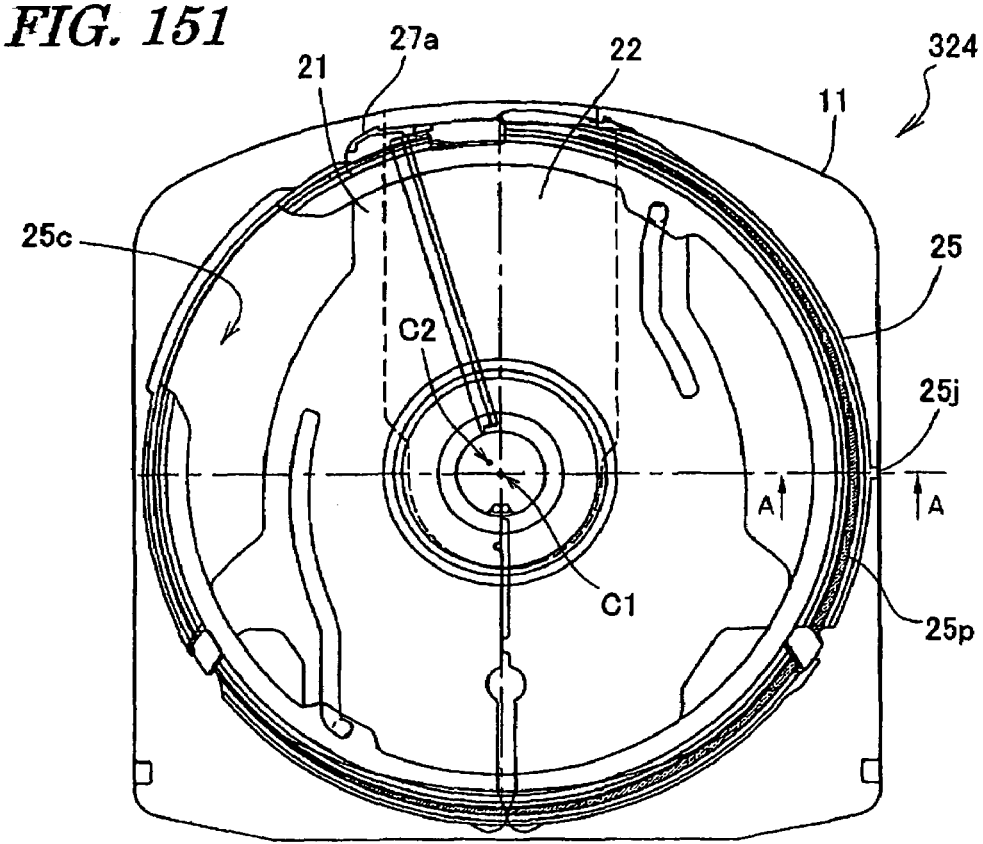

FIG. 151 is a plan view illustrating a disc cartridge according to a twenty-fourth embodiment of the present invention with the cartridge upper shell thereof removed.

Figure 152:
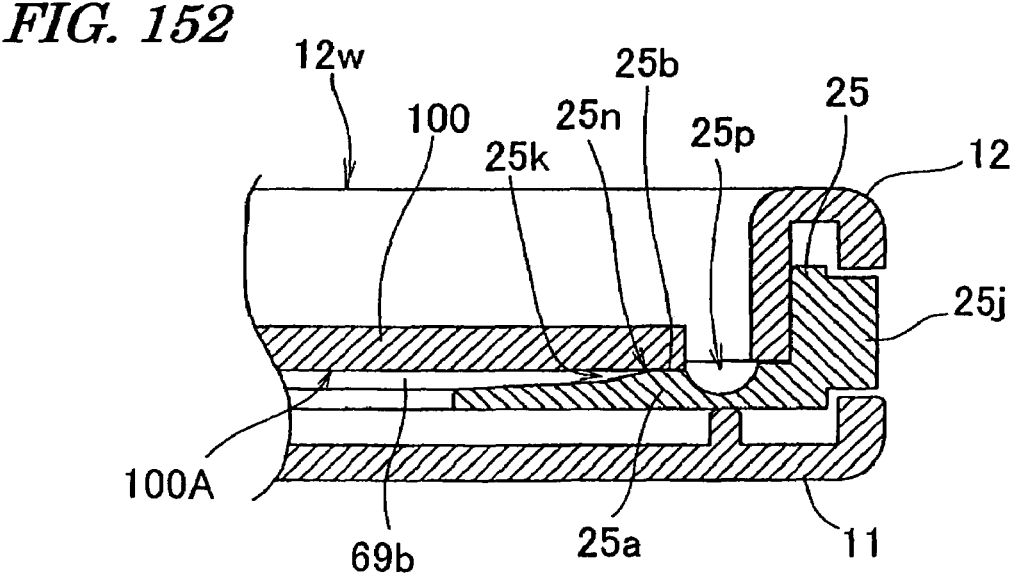

FIG. 152 is a cross-sectional view thereof as taken along the line A-A shown in FIG. 151.

Figure 153:
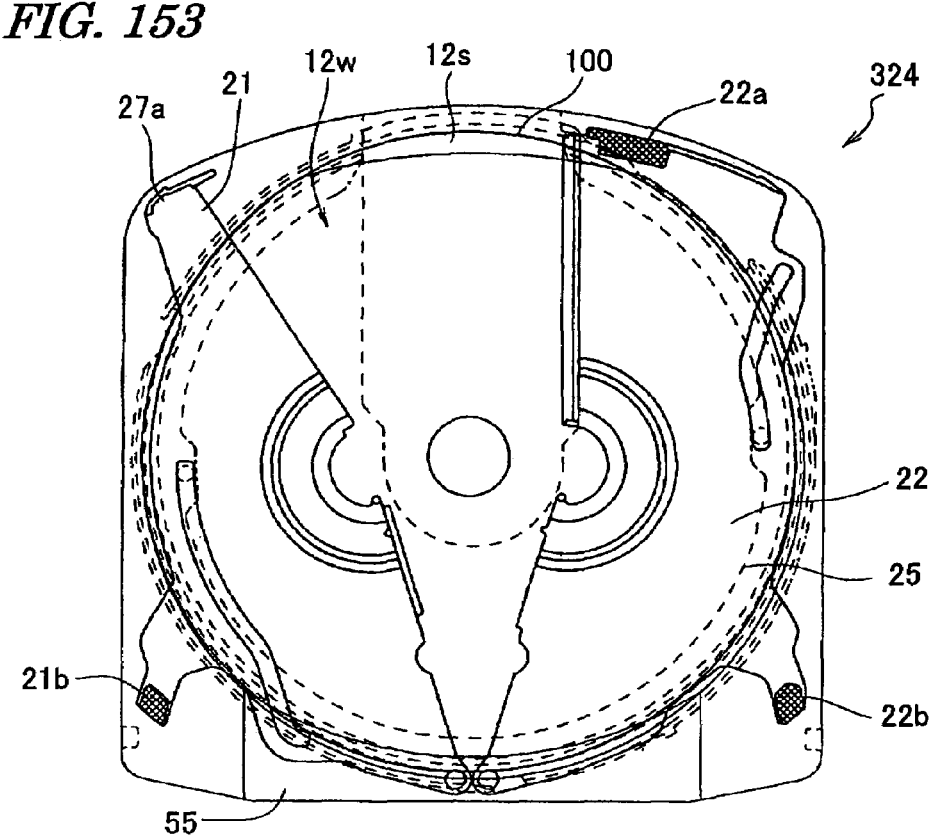

FIG. 153 is a plan view illustrating a state where the shutters of the disc cartridge shown in FIG. 151 are opened.

Figure 154:
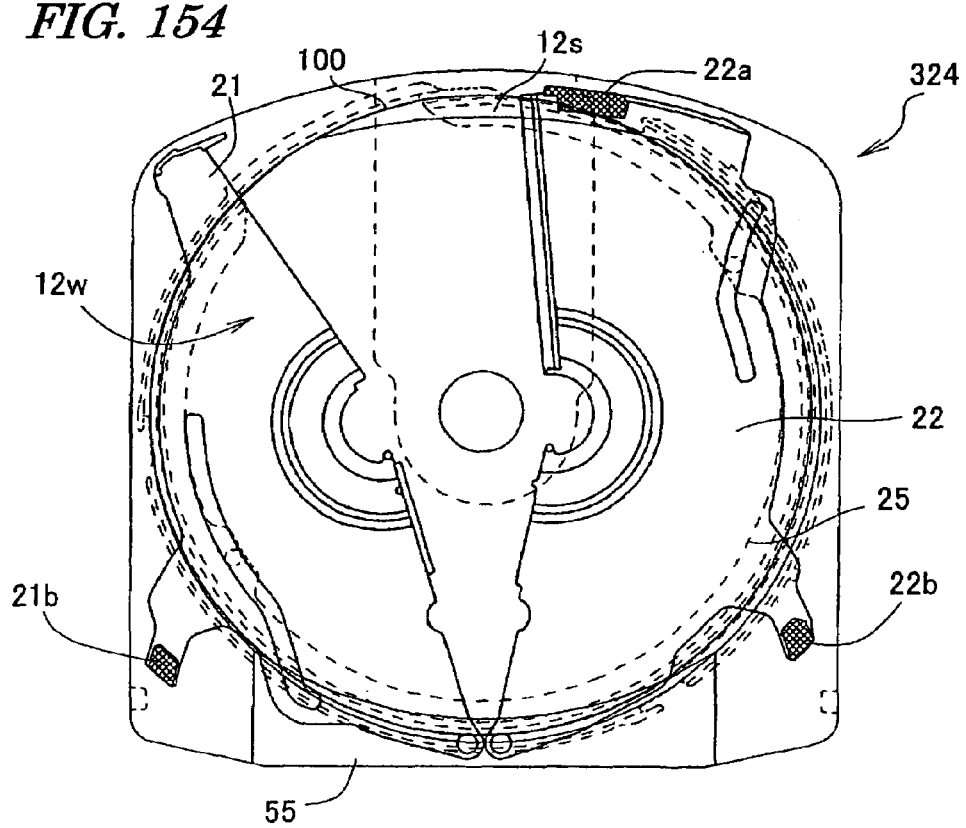

FIG. 154 is a plan view illustrating a state where the shutters of the disc cartridge shown in FIG. 151 have just started closing.

Figure 155:
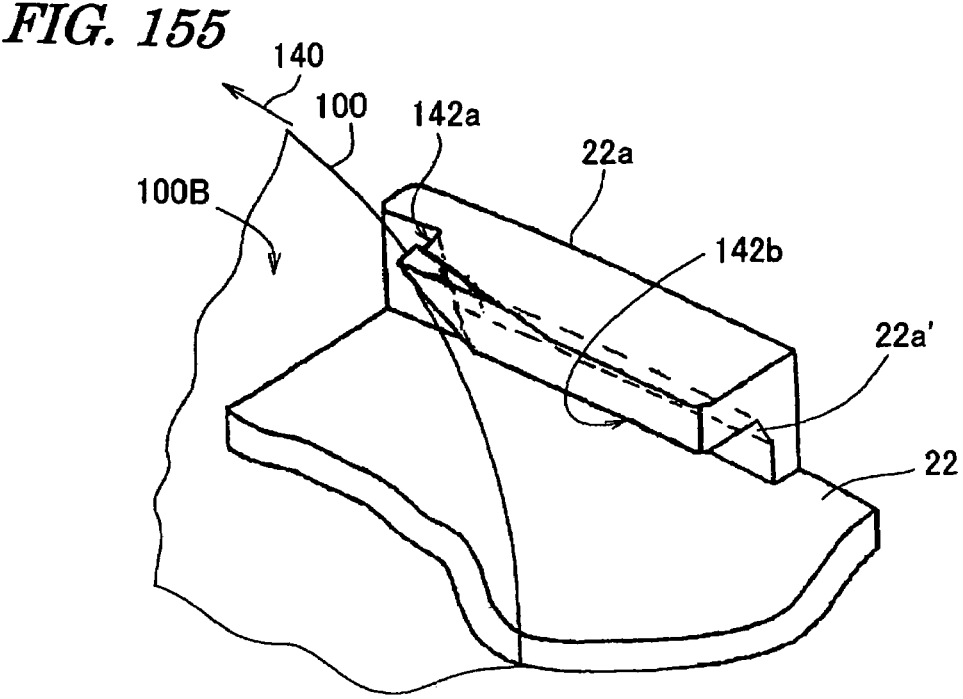

FIG. 155 is a perspective view illustrating how a disc holding portion may contact with the disc in a state.

Figure 156:
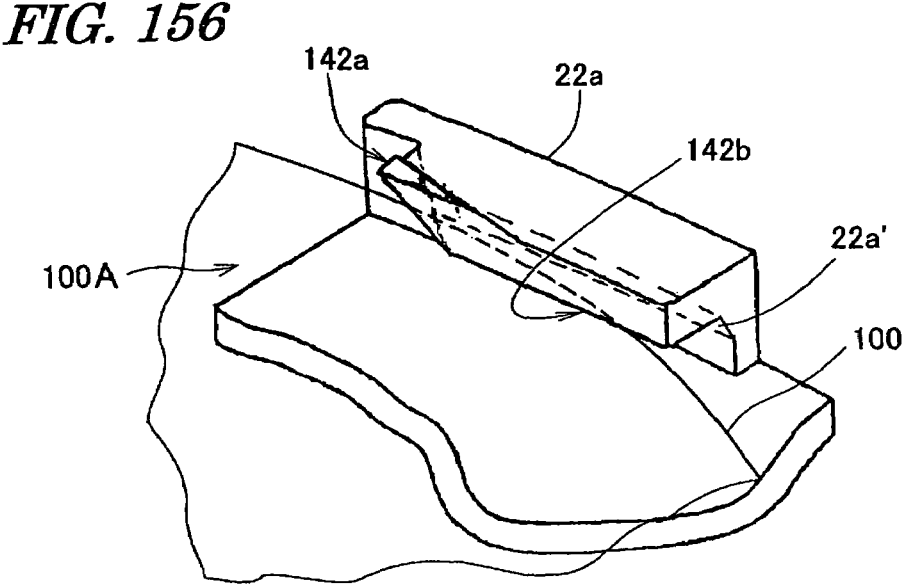

FIG. 156 is a perspective view illustrating how the disc holding portion may contact with the disc in another state.

Figure 157:
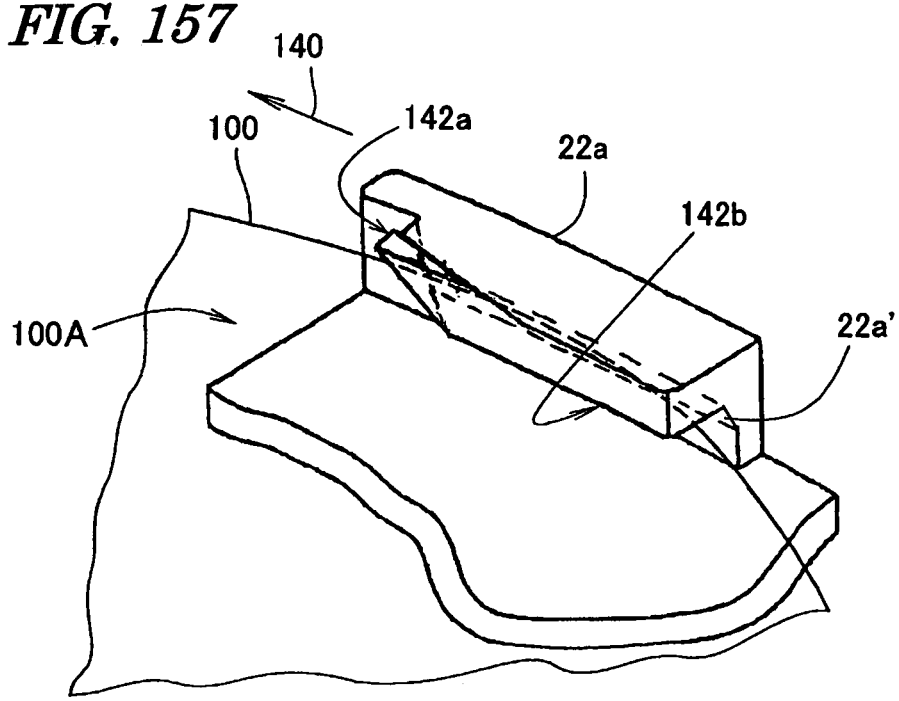

FIG. 157 is a perspective view illustrating how the disc holding portion may contact with the disc in still another state.

Figure 158:
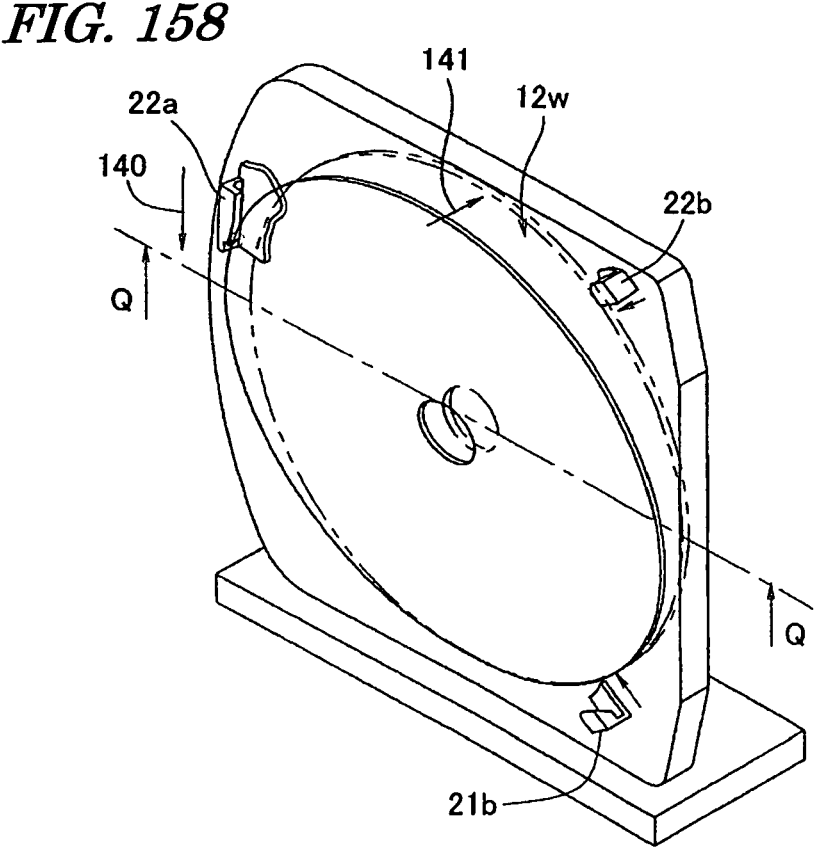

FIG. 158 is a perspective view illustrating how disc holding portions get hold of a given disc in a vertically mounted disc cartridge.

Figure 159:
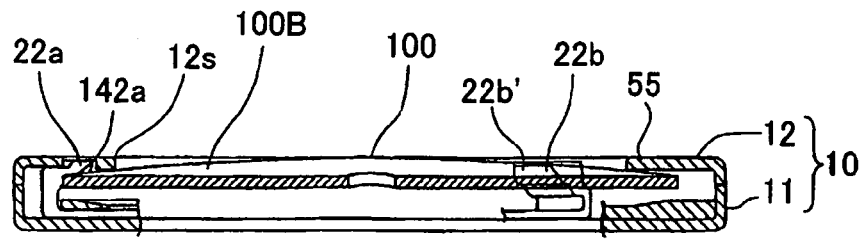

FIG. 159 is a cross-sectional view thereof as viewed on the plane Q-Q shown in FIG. 158.

Figure 160:
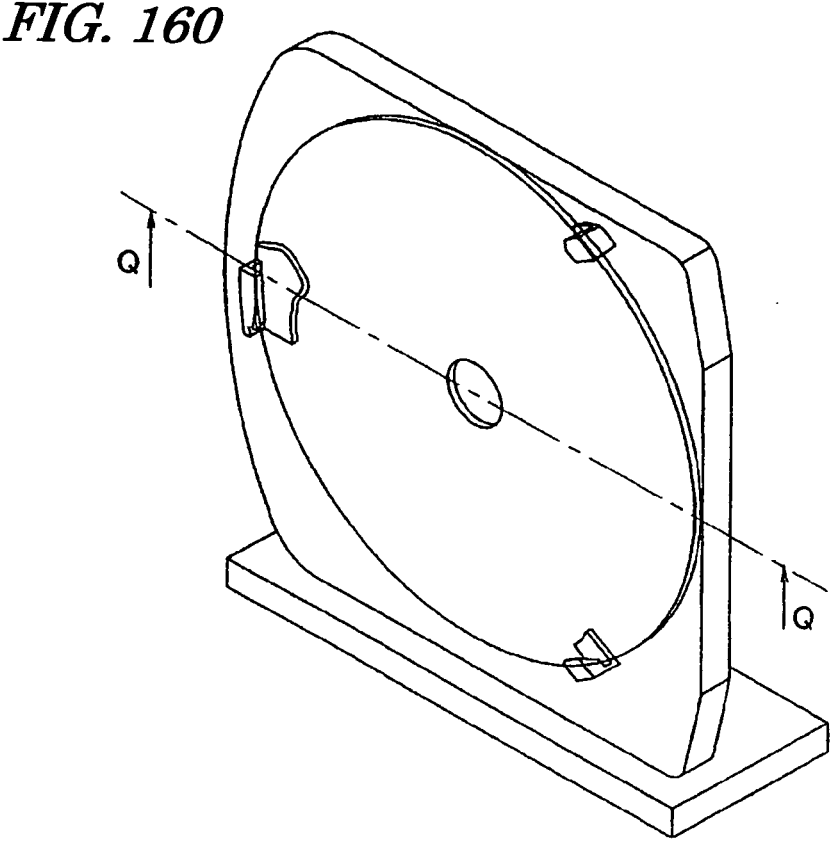

FIG. 160 is a perspective view illustrating how the disc holding portions get hold of the disc in the vertically mounted disc cartridge.

Figure 161:
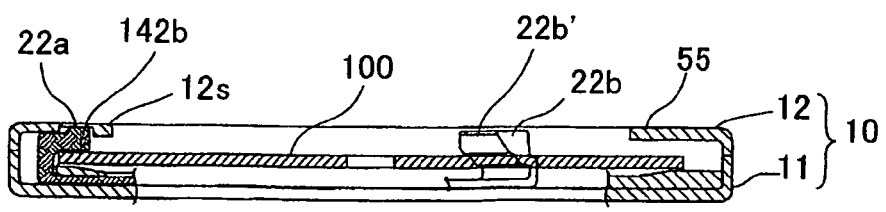

FIG. 161 is a cross-sectional view thereof as viewed on the plane Q-Q shown in FIG. 160.

Figure 162:
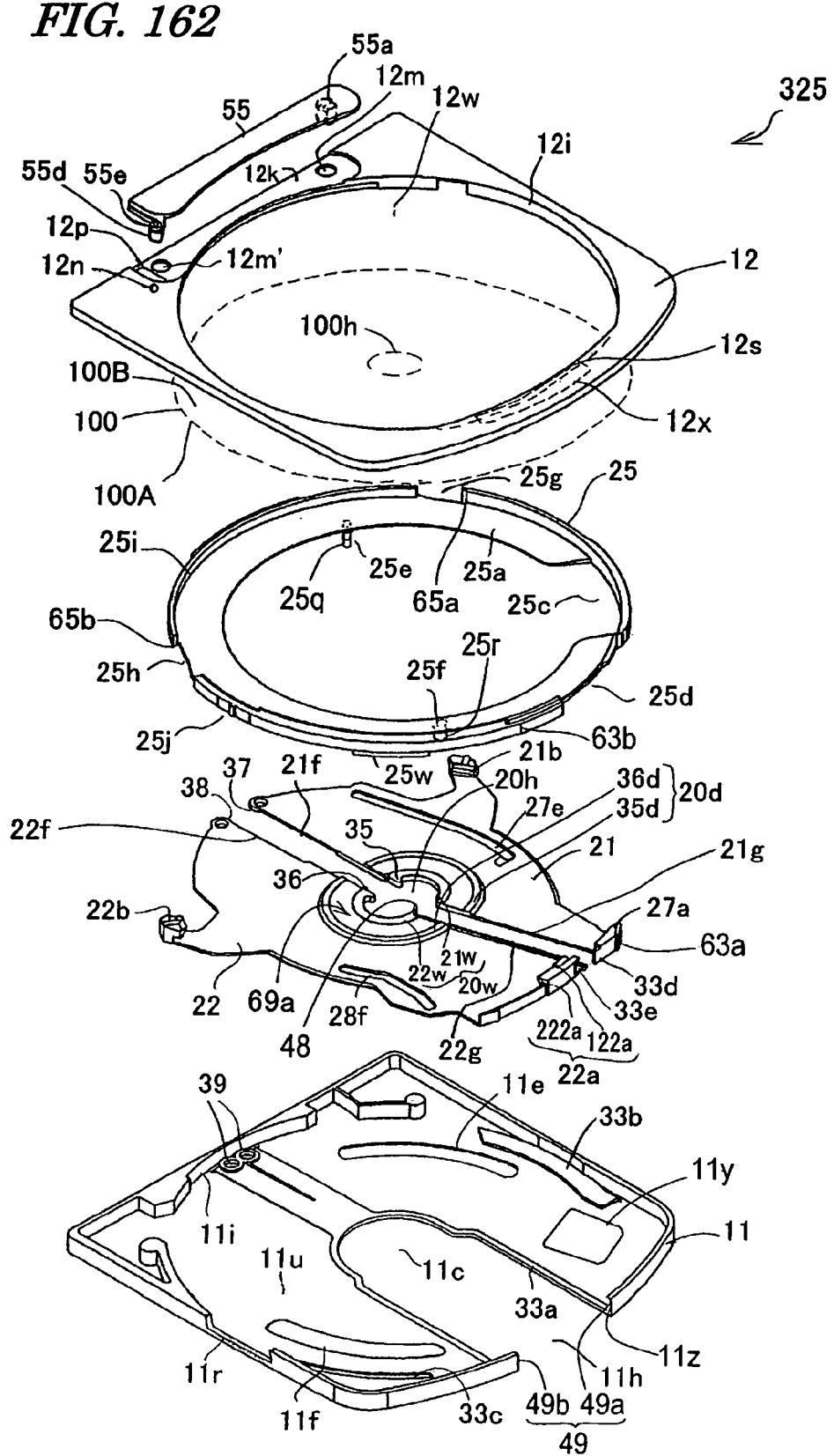

FIG. 162 is an exploded perspective view illustrating an exploded state of a disc cartridge according to a twenty-fifth embodiment of the present invention.

Figure 163:
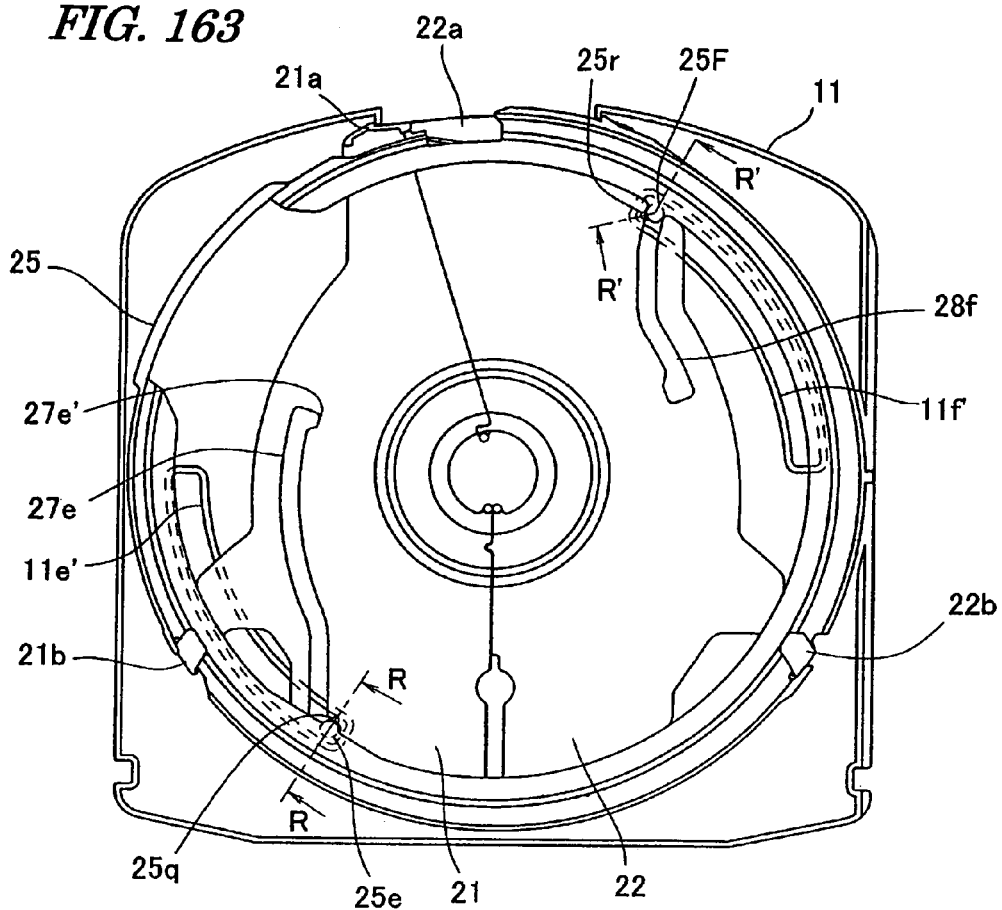

FIG. 163 is a plan view illustrating a state of the disc cartridge shown in FIG. 162 with the cartridge upper shell thereof removed.

Figure 164:
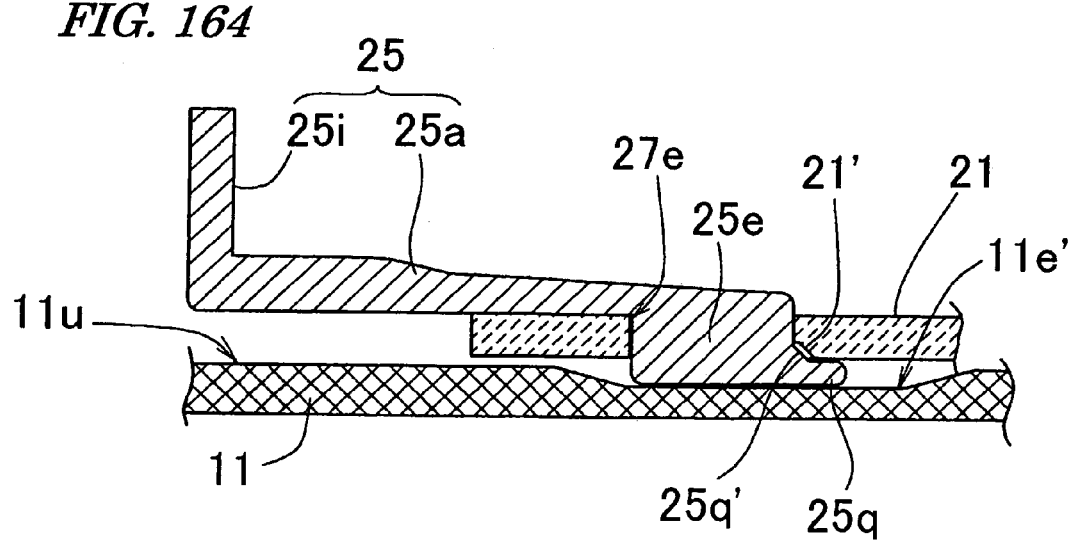

FIG. 164 is a cross-sectional view thereof as taken along the line R-R shown in FIG. 163.

Figure 165:
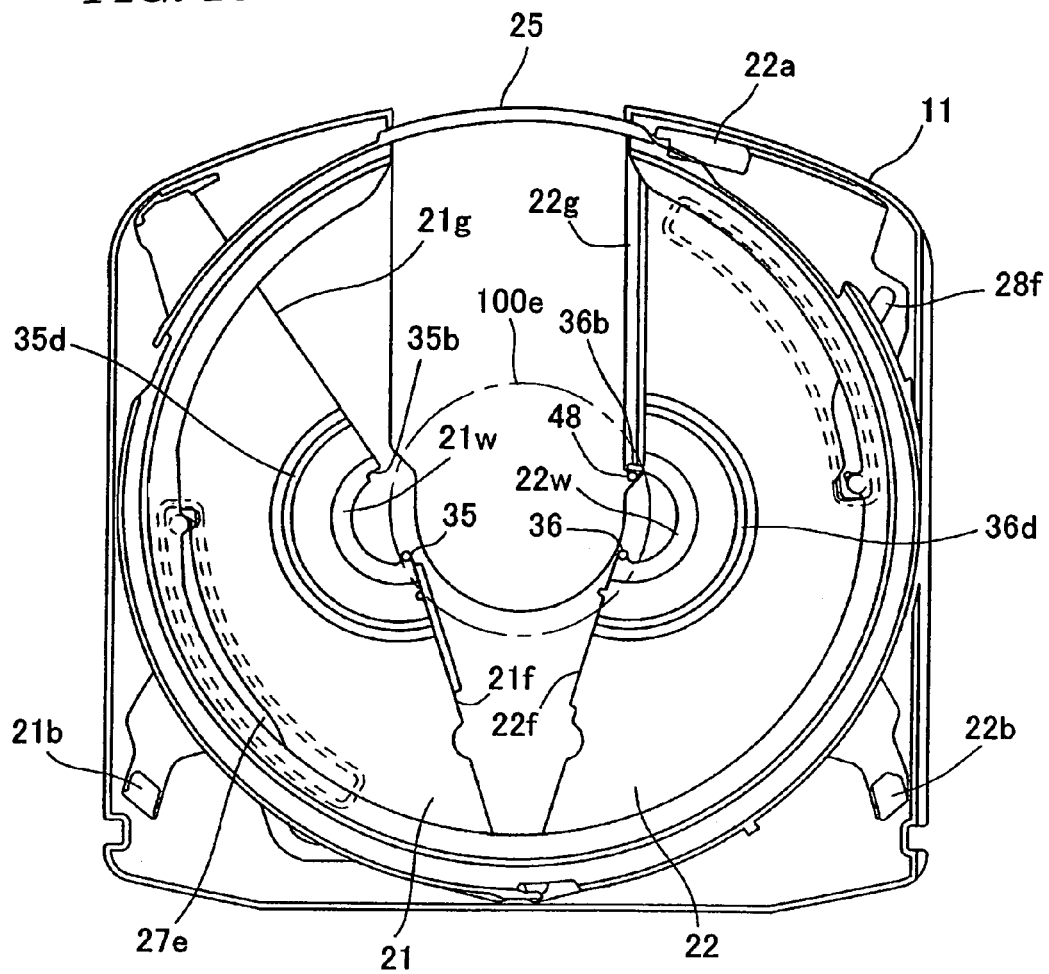

FIG. 165 is a plan view illustrating another state of the disc cartridge shown in FIG. 162 with the cartridge upper shell thereof removed.

Figure 166:
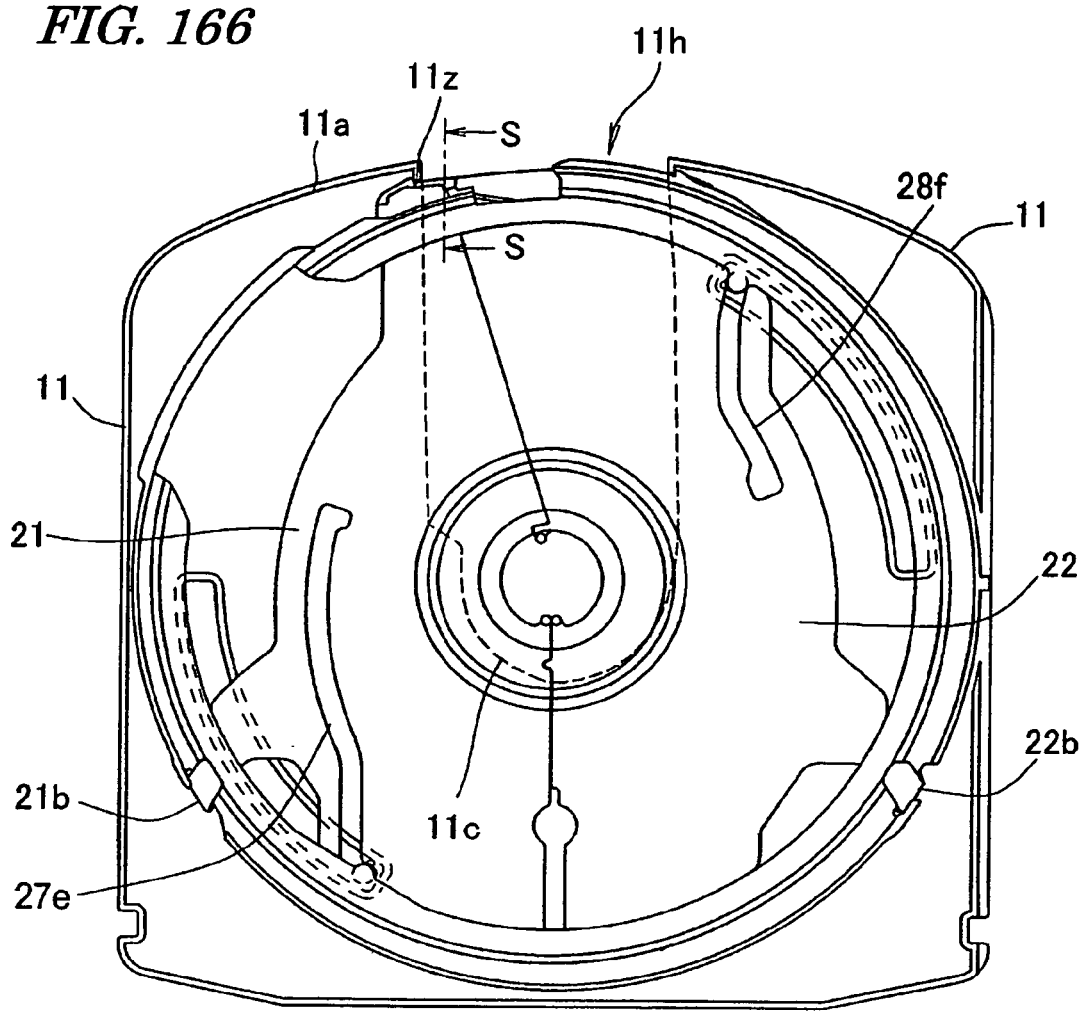

FIG. 166 is a plan view illustrating still another state of the disc cartridge shown in FIG. 162 with the cartridge upper shell thereof removed.

Figure 167:
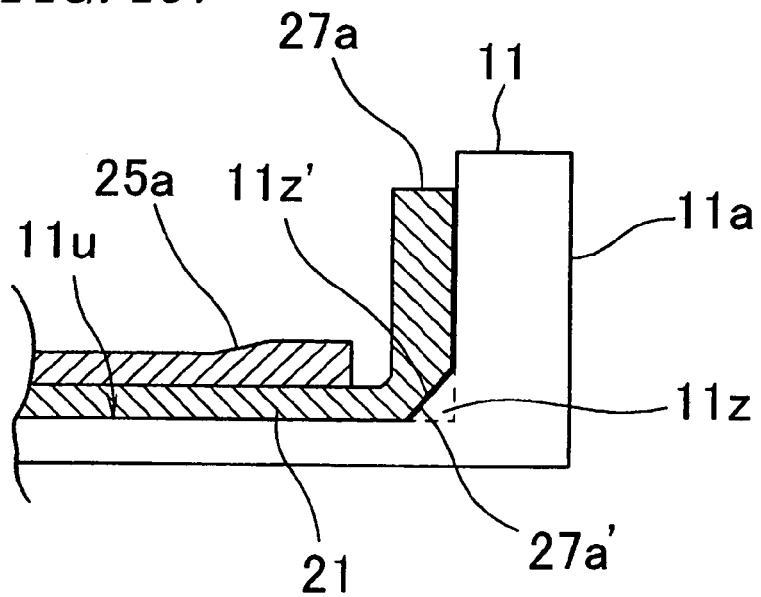

FIG. 167 is a cross-sectional view thereof as taken along the line S-S shown in FIG. 166.

FIG. 168 is a plan view illustrating yet another state of the disc cartridge shown in FIG. 162 with the cartridge upper shell thereof removed.

FIG. 169 is a cross-sectional view thereof as taken along the line S-S shown in FIG. 168.

Figure 170:
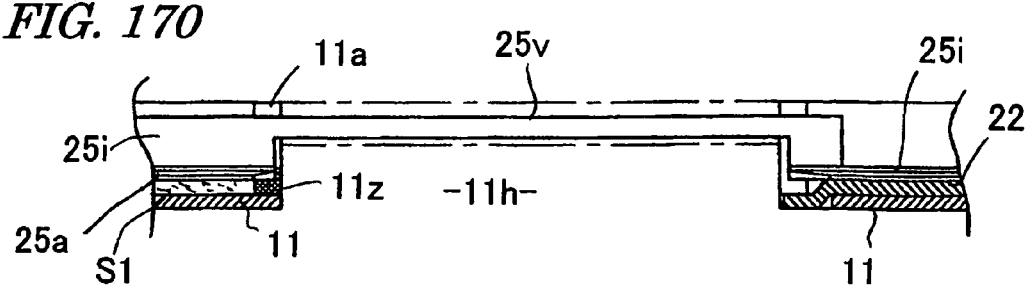

FIG. 170 is a cross-sectional view thereof as taken along the line T-T shown in FIG. 168.

Figure 171:
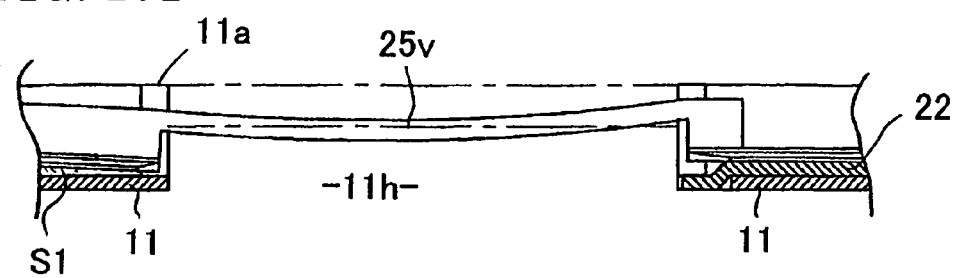

FIG. 171 is a cross-sectional view of a disc cartridge with no rotational member receiving portion as taken along the line T-T shown in FIG. 168.

Figure 172:
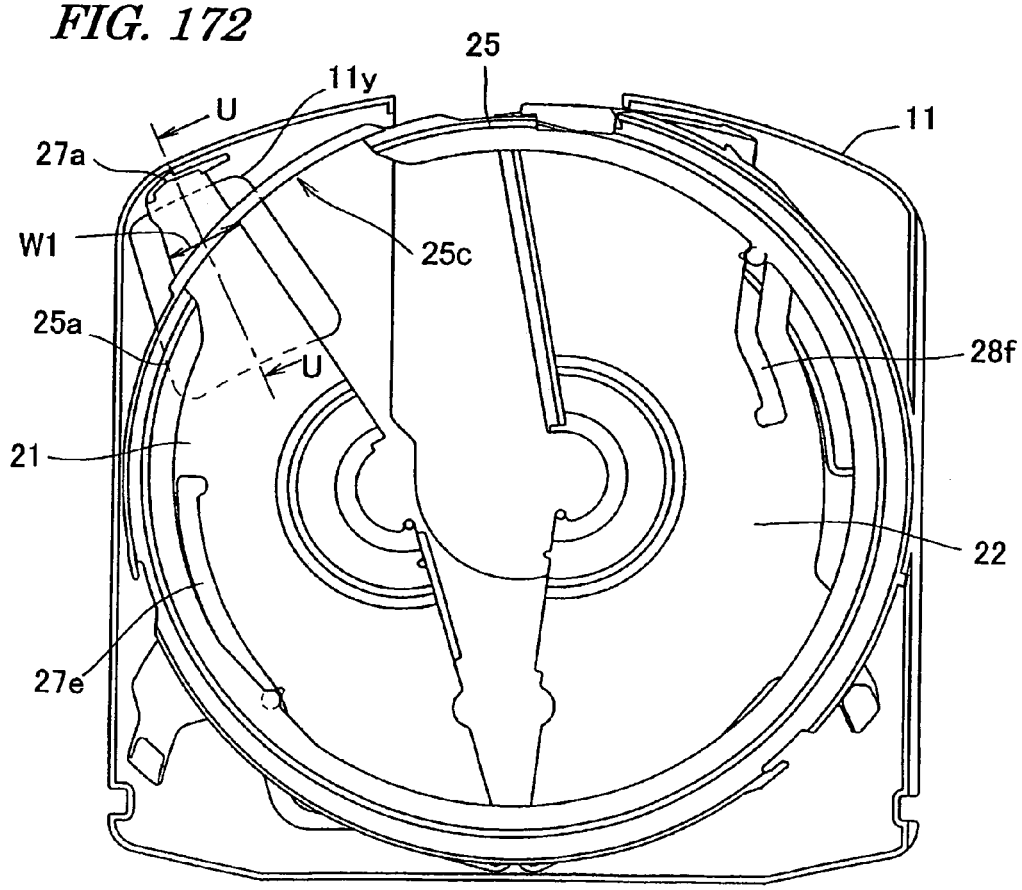

FIG. 172 is a plan view illustrating yet another state of the disc cartridge shown in FIG. 162 with the cartridge upper shell thereof removed.

Figure 173:
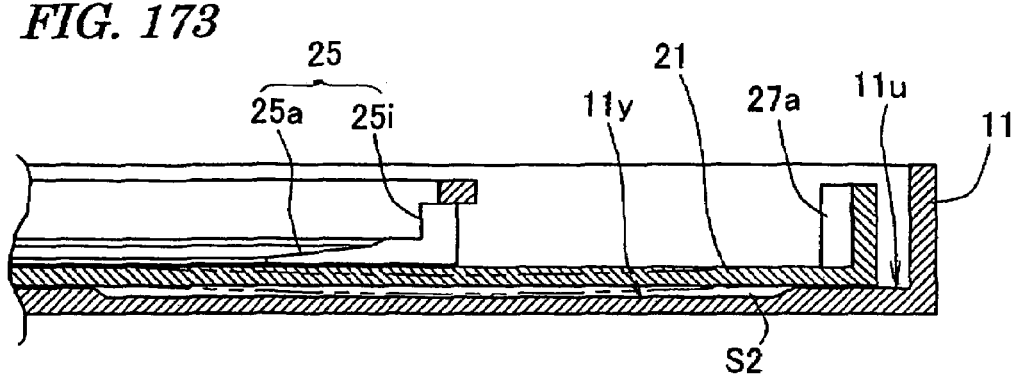

FIG. 173 is a cross-sectional view thereof as taken along the line U-U shown in FIG. 172.

Figure 174:
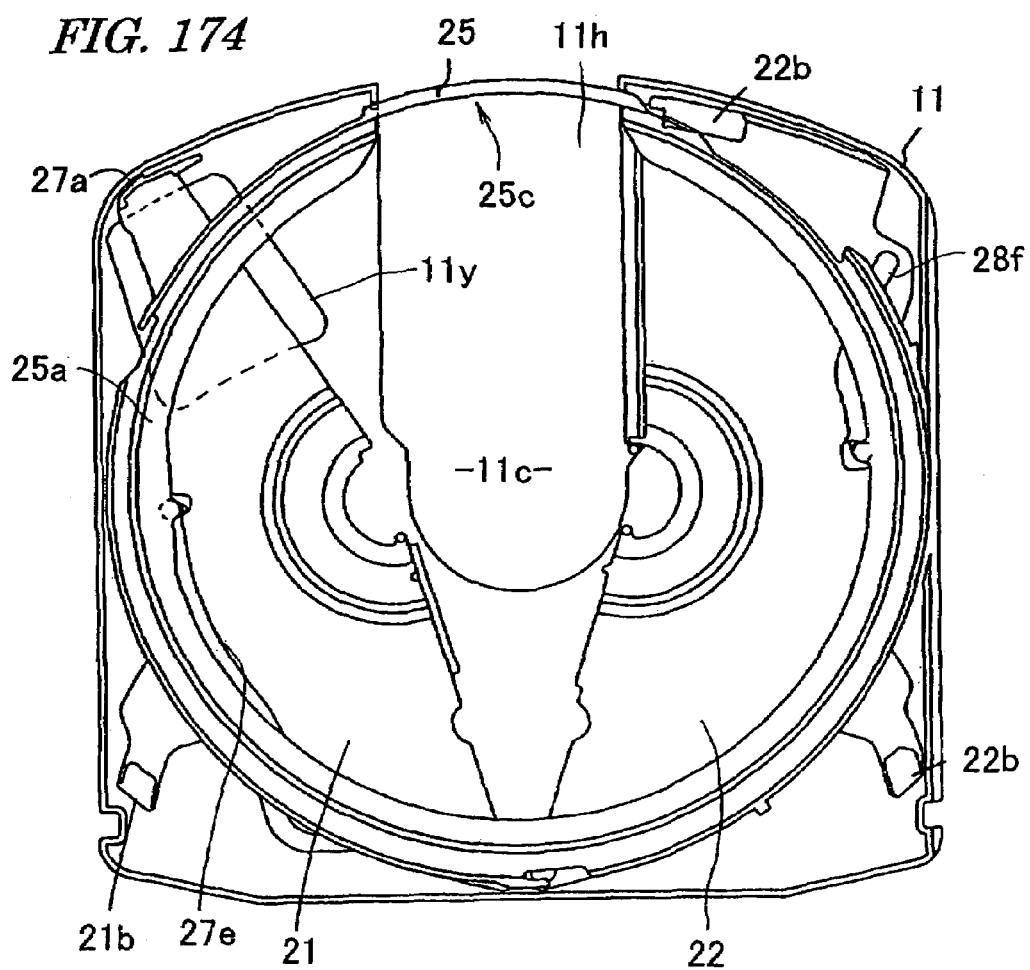

FIG. 174 is a plan view illustrating yet another state of the disc cartridge shown in FIG. 162 with the cartridge upper shell thereof removed.

Figure 175:
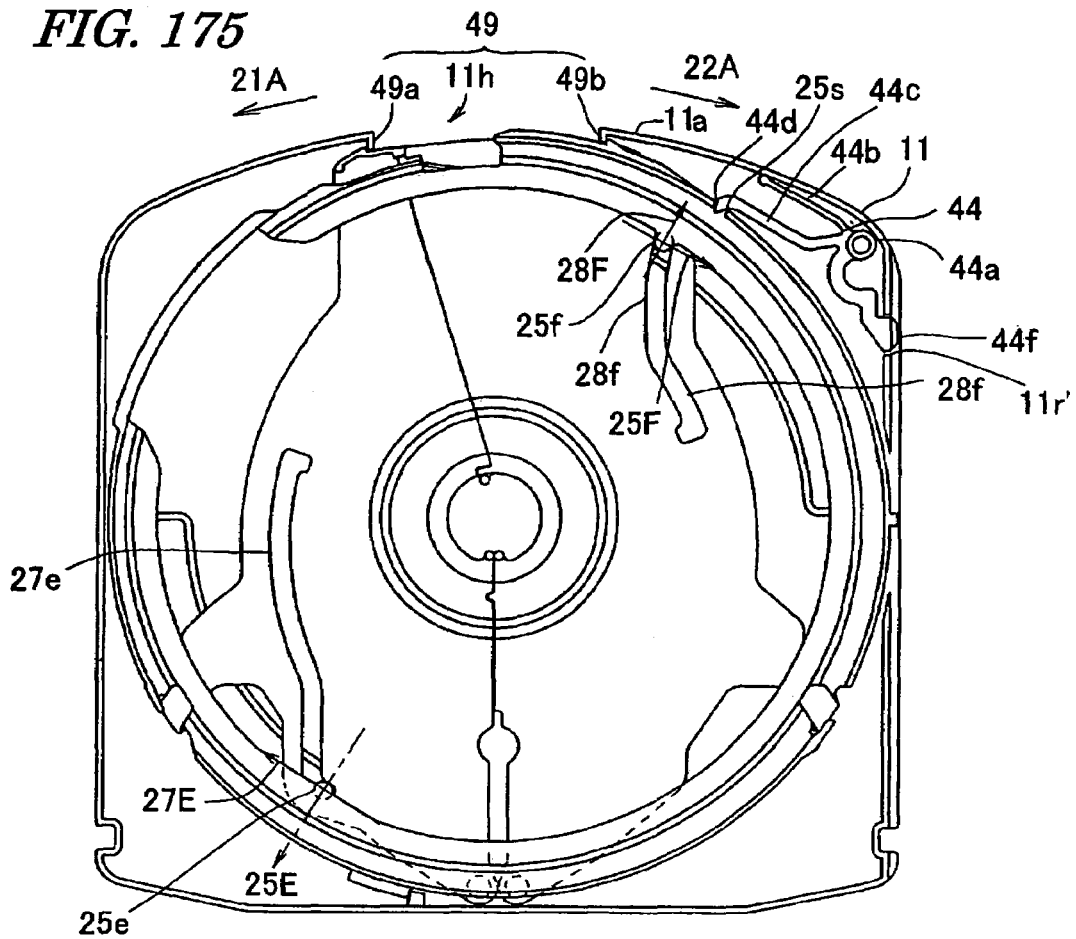

FIG. 175 is a plan view illustrating yet another state of the disc cartridge shown in FIG. 162 with the cartridge upper shell thereof removed.

Figure 176:
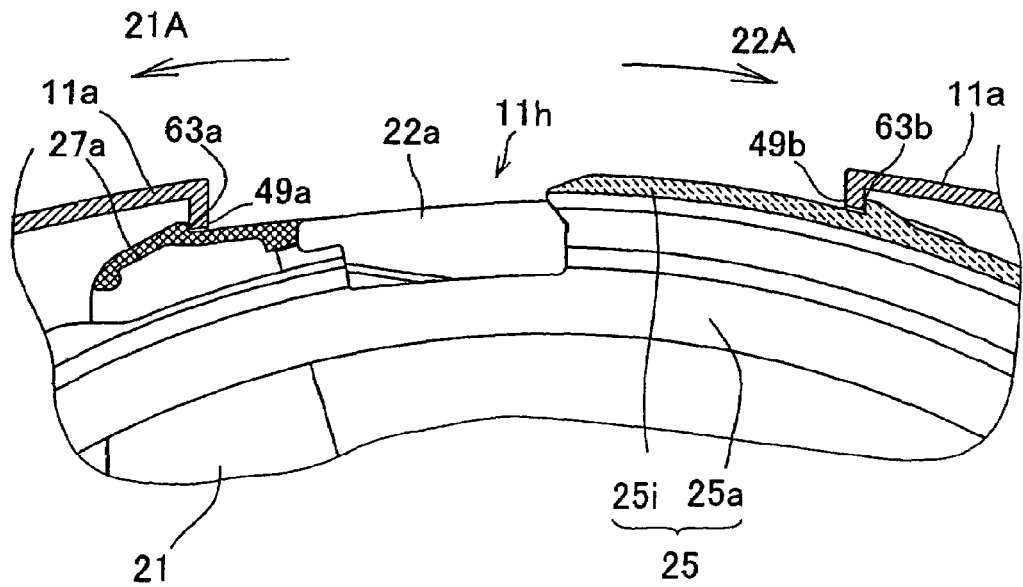

FIG. 176 is an enlarged view illustrating a portion of the disc cartridge shown in FIG. 176.

Figure 177:
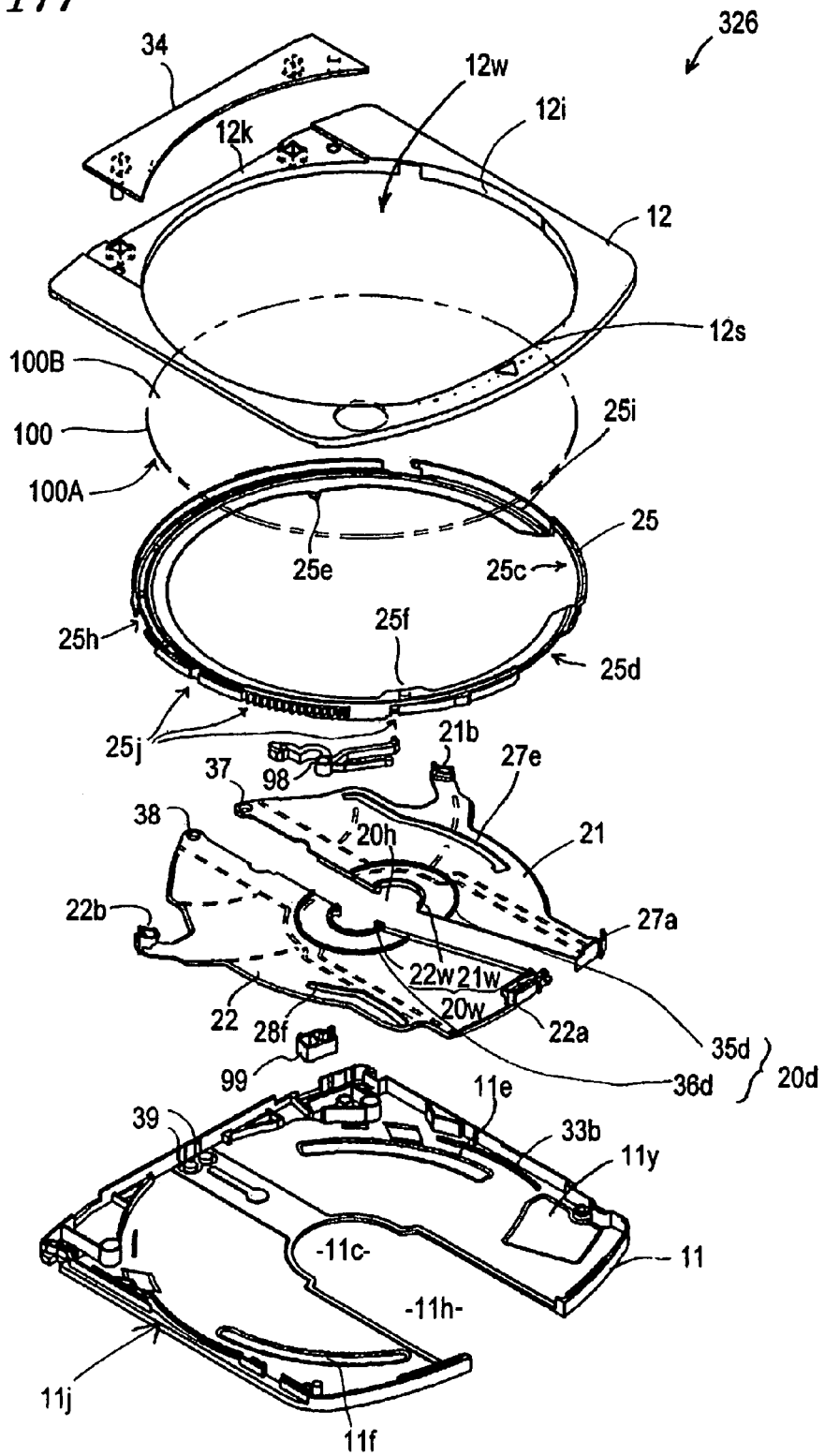

FIG. 177 is an exploded perspective view illustrating an exploded state of a disc cartridge according to a twenty-sixth embodiment of the present invention.

Figure 178:
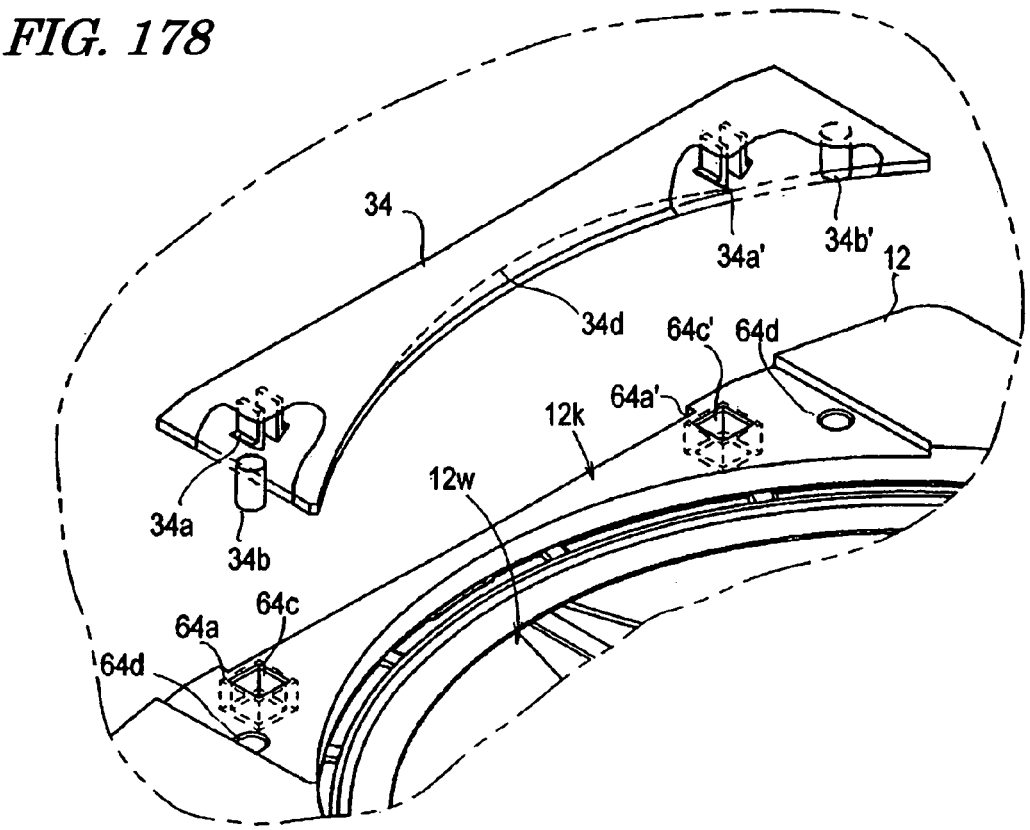

FIG. 178 is a perspective view illustrating a stopper member, a portion of the cartridge upper shell to which the stopper member is attached, and its surrounding region with the stopper member removed from the disc cartridge shown in FIG. 177.

Figure 179:
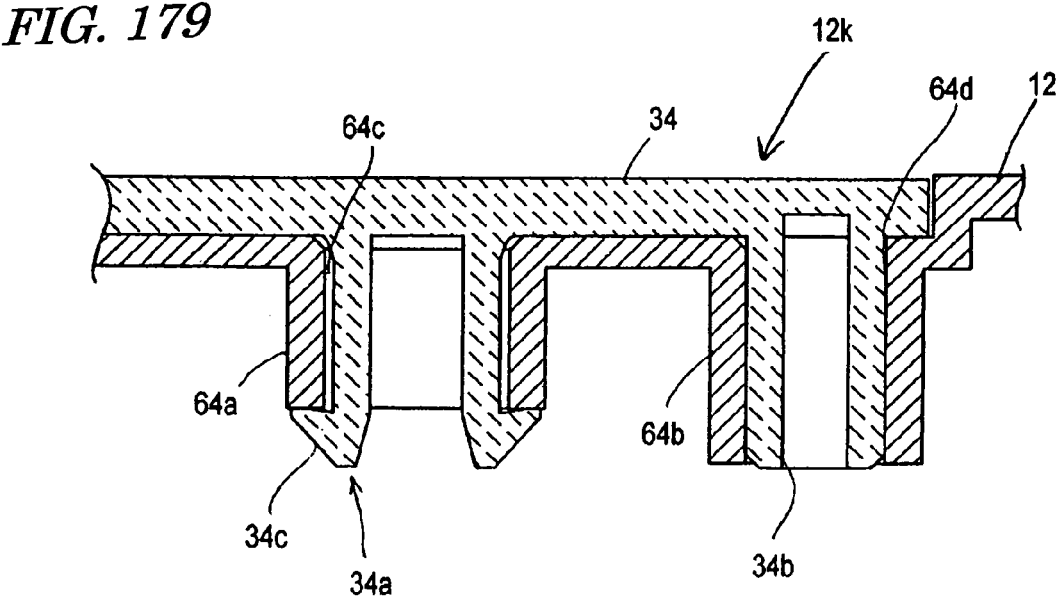

FIG. 179 illustrates a cross section of the disc cartridge shown in FIG. 177 as viewed on a plane that crosses the positioning hole and engaging hole of the cartridge upper shell thereof.

Figure 180:
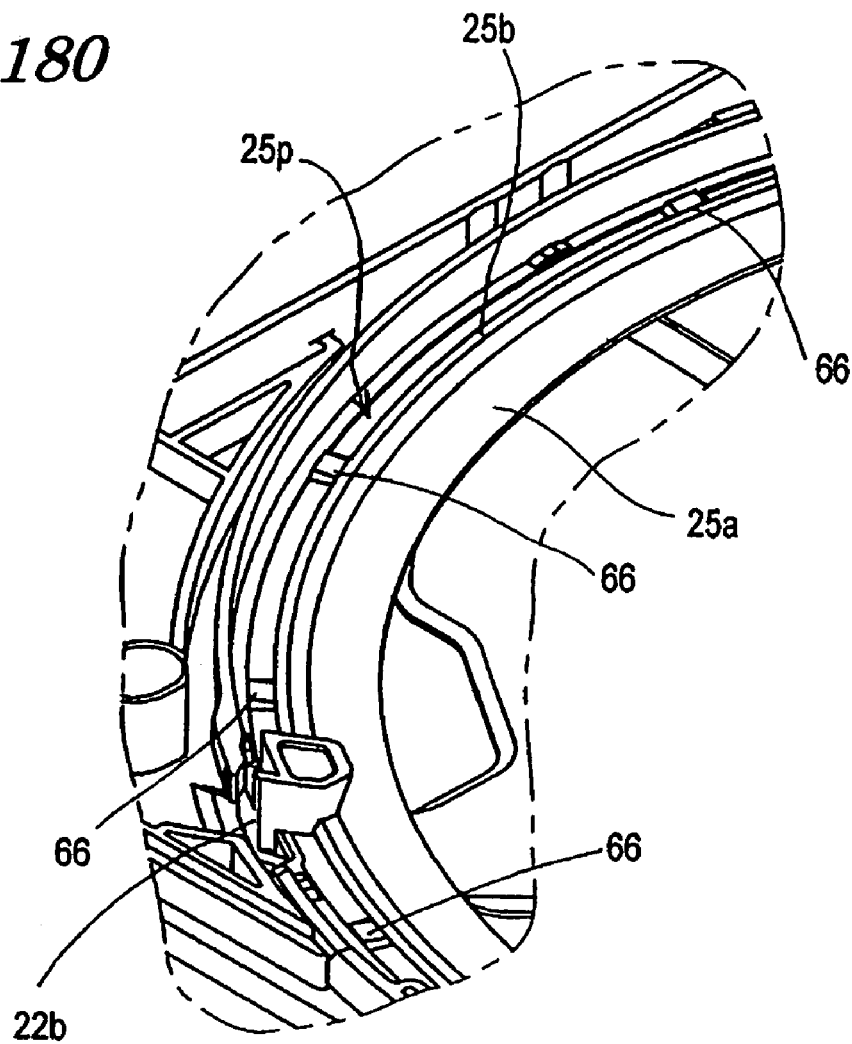

FIG. 180 illustrates the structure of a portion of the disc cartridge shown in FIG. 177 around its disc holding portion in a situation where its shutters are closed.

Figure 181:
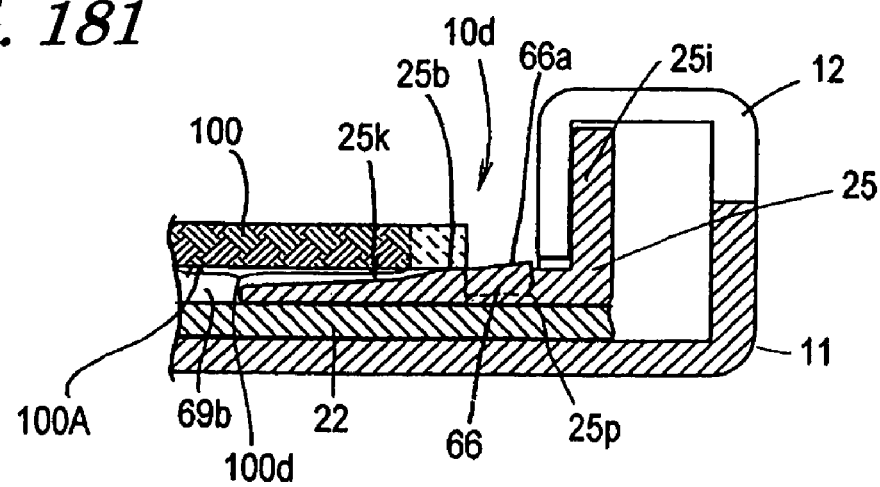

FIG. 181 illustrates a cross section as viewed on a plane that crosses one of the filling portions shown in FIG. 180.

Figure 182:
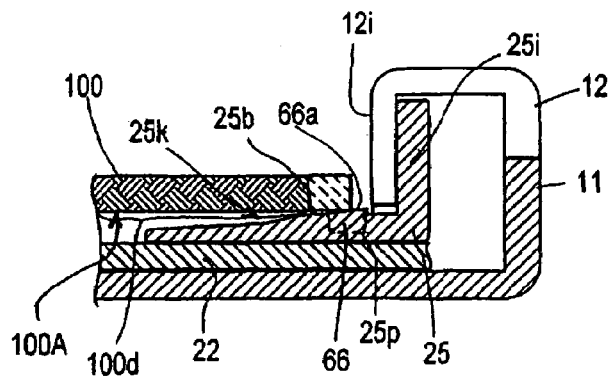

FIG. 182 illustrates a cross section as viewed on a plane that crosses one of the filling portions shown in FIG. 180.

Figure 183:
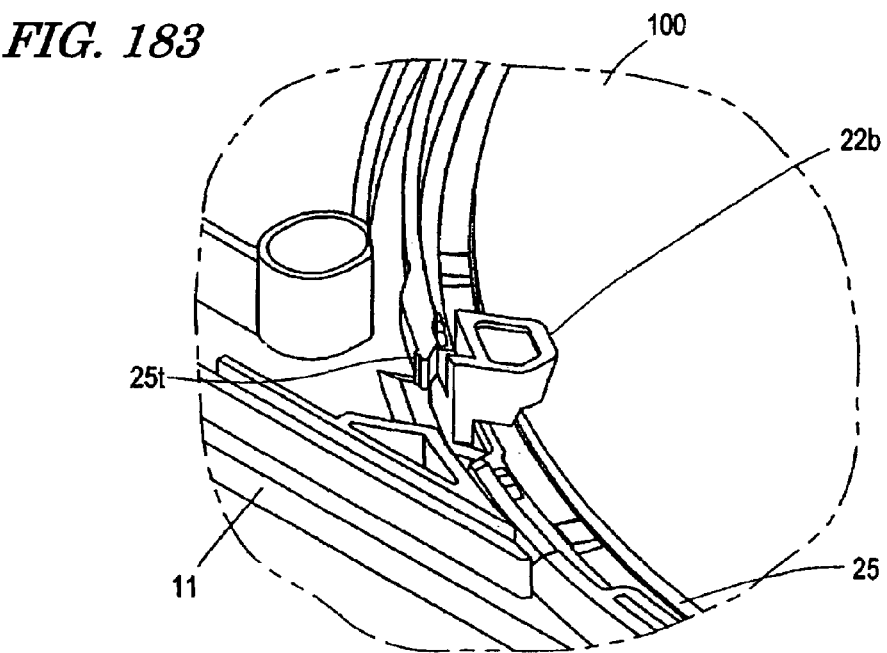

FIG. 183 is a perspective view illustrating a portion of the disc cartridge shown in FIG. 177 around a disc holding portion thereof in a situation where its shutters are closed and the disc holding portion is holding the disc.

Figure 184:
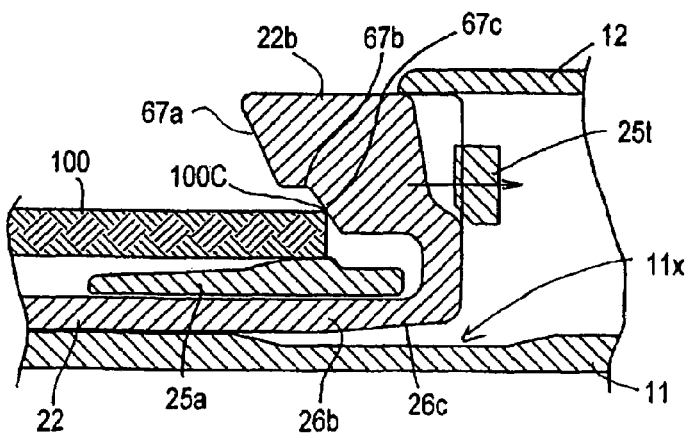

FIG. 184 illustrates a cross section of the disc cartridge shown in FIG. 177 as viewed on a plane including a disc holding portion thereof.

Figure 185:
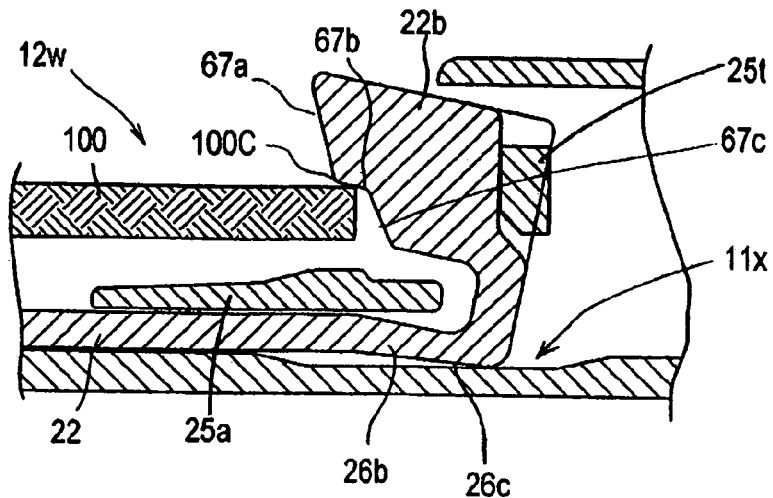

FIG. 185 illustrates a cross section of the disc cartridge shown in FIG. 177 as viewed on a plane including a disc holding portion thereof.

Figure 186:
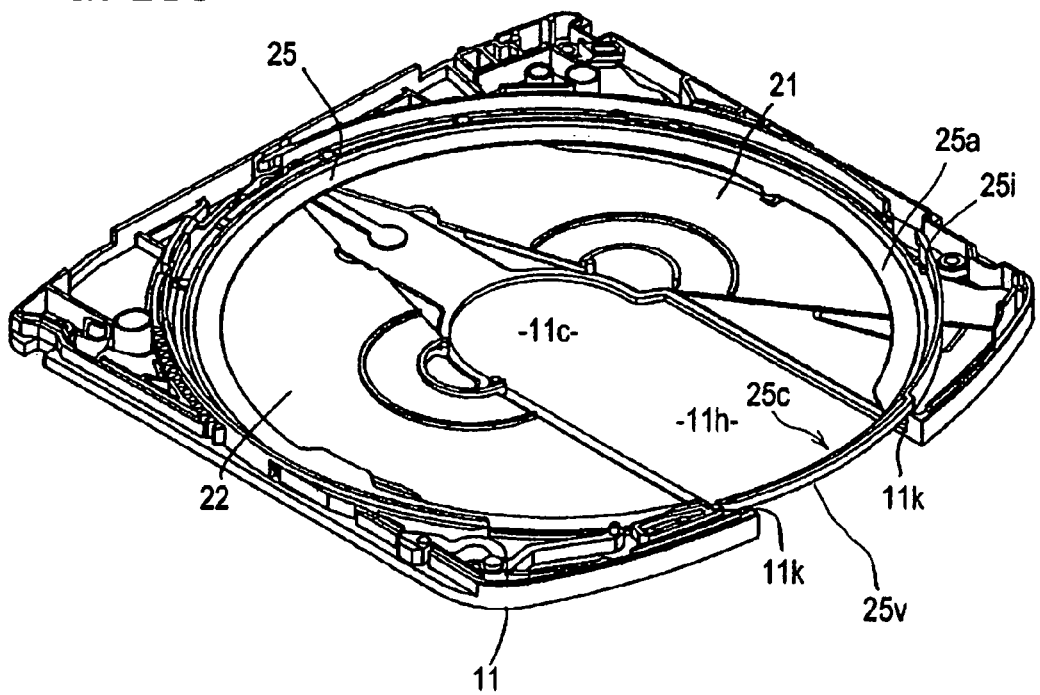

FIG. 186 is a perspective view illustrating the disc cartridge shown in FIG. 177 with its cartridge upper shell removed to show a state where its shutters are opened.

Figure 187:
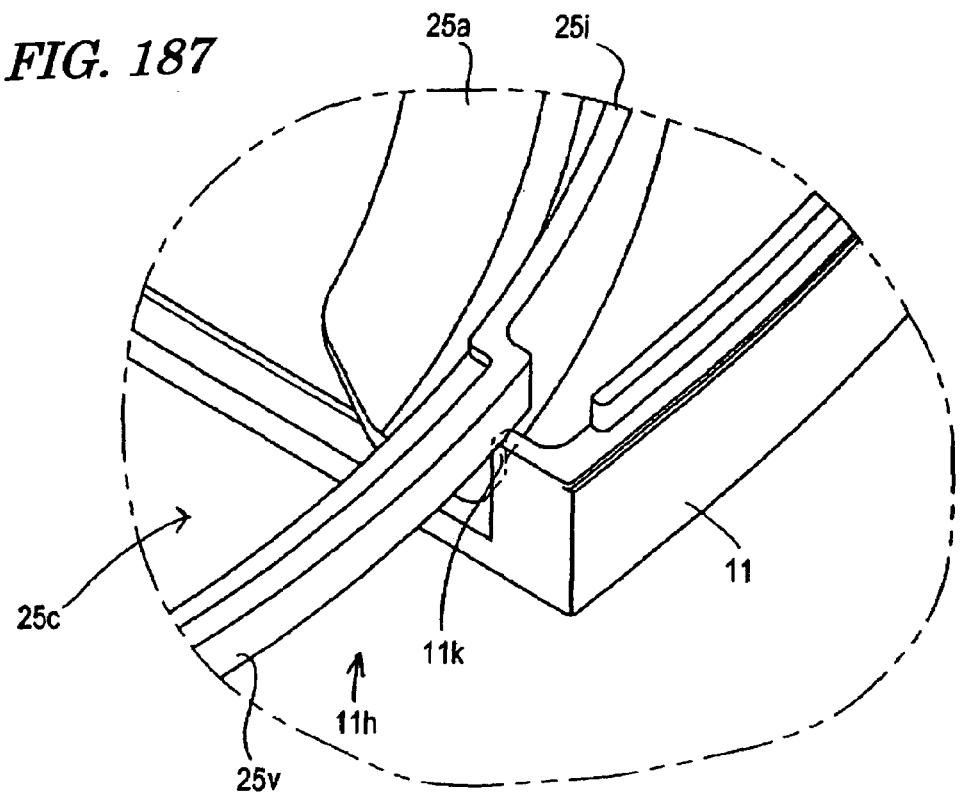

FIG. 187 is a perspective view illustrating a portion of the disc cartridge shown in FIG. 177 around the end of the head opening 11*h* thereof on a larger scale.

Figure 188:
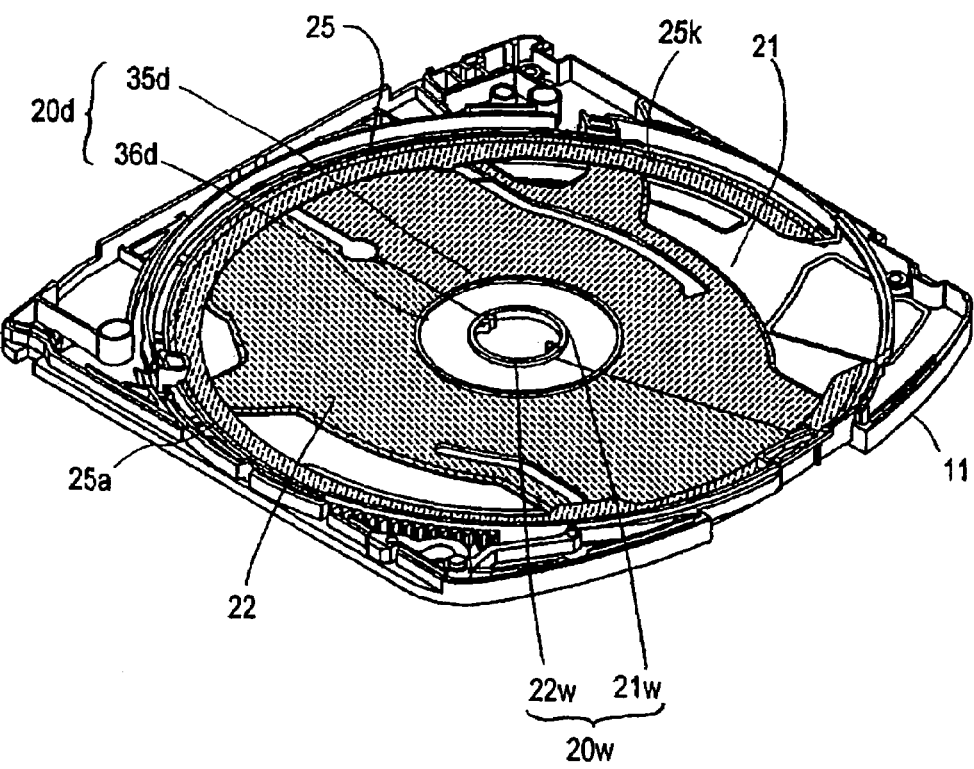

FIG. 188 is a perspective view illustrating the disc cartridge shown in FIG. 177 with its cartridge upper shell removed to show a state where its shutters are opened.

Figure 189:
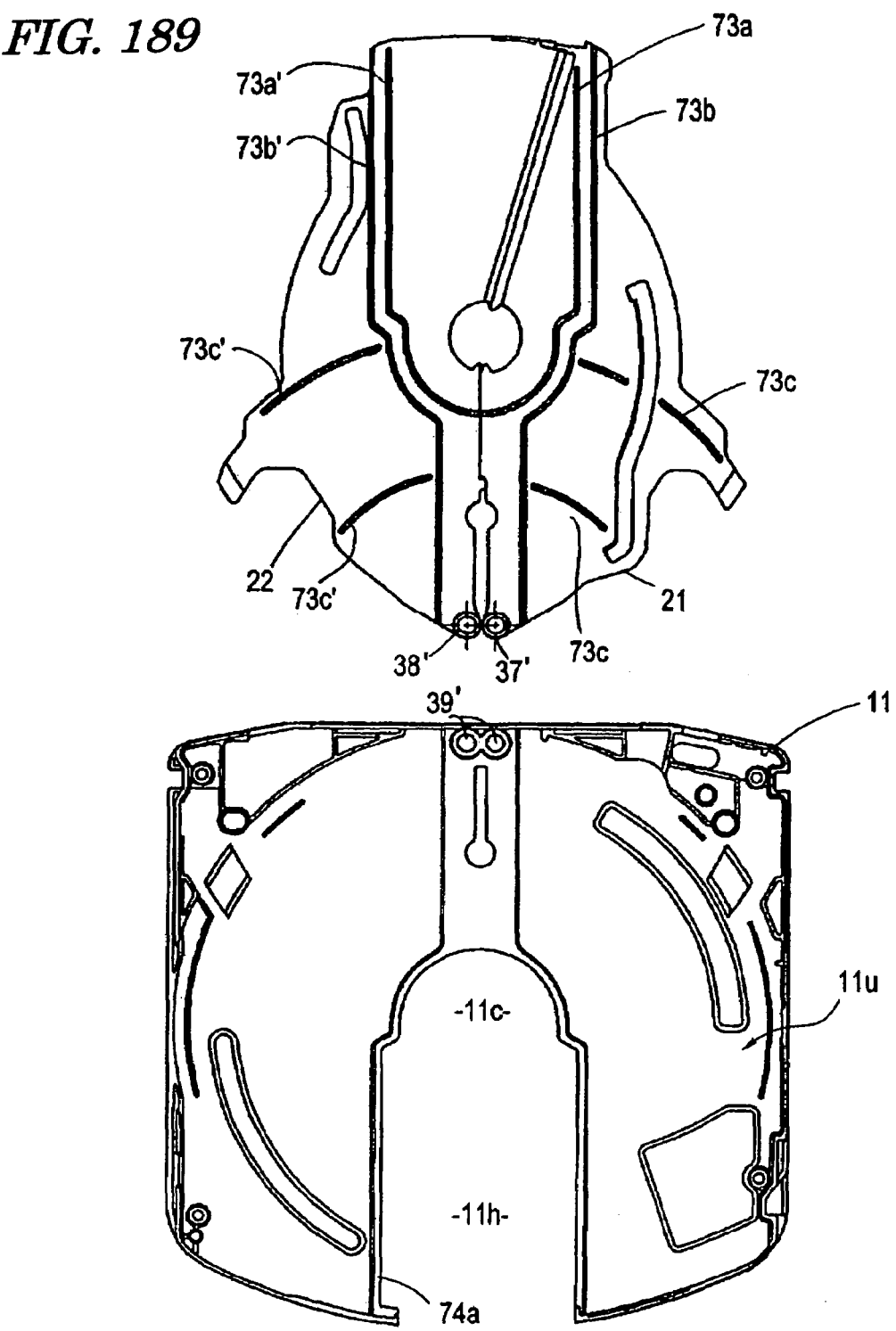

FIG. 189 is a plan view illustrating the shutters and cartridge lower shell.

Figure 190:
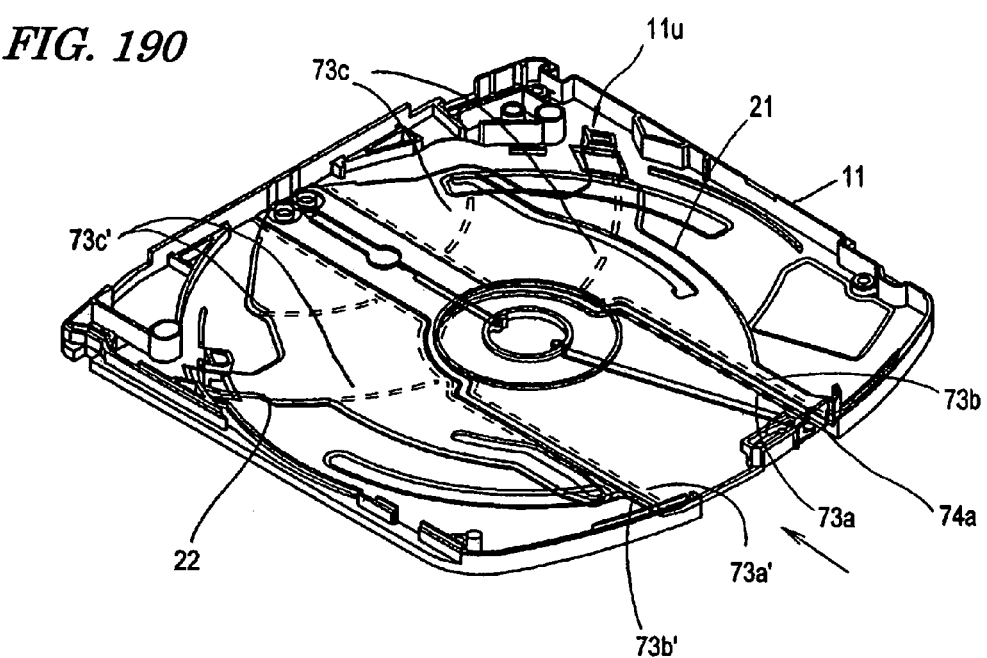

FIG. 190 is a perspective view illustrating the disc cartridge shown in FIG. 177 with its cartridge upper shell and rotational member removed to show a state where its shutters are closed.

Figure 191:
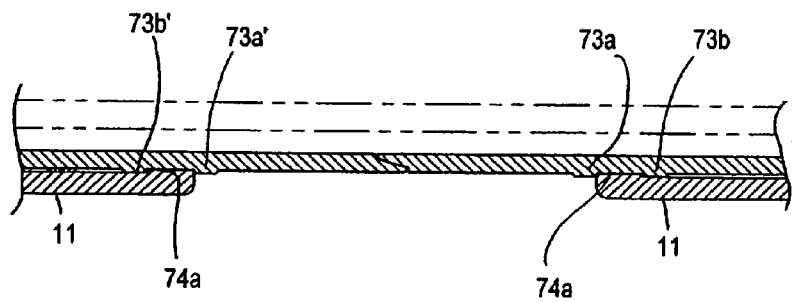

FIG. 191 is a cross-sectional view of the structure shown in FIG. 190 as viewed on a plane that crosses the head opening thereof.

Figure 192:
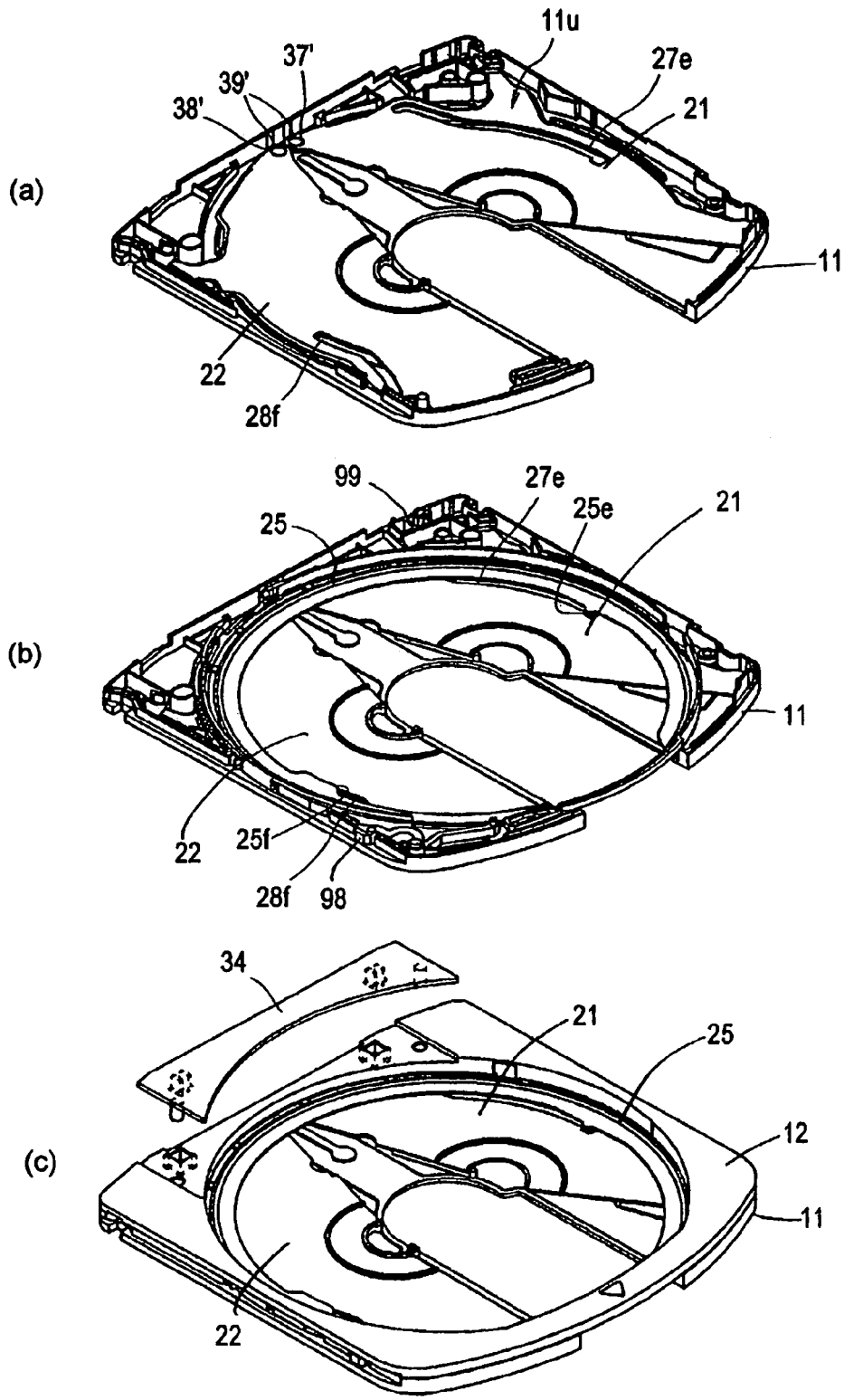

FIGS. 192(a), 192(b) and 192(c) are perspective views showing a method of making the disc cartridge shown in FIG. 177.

Figure 193:
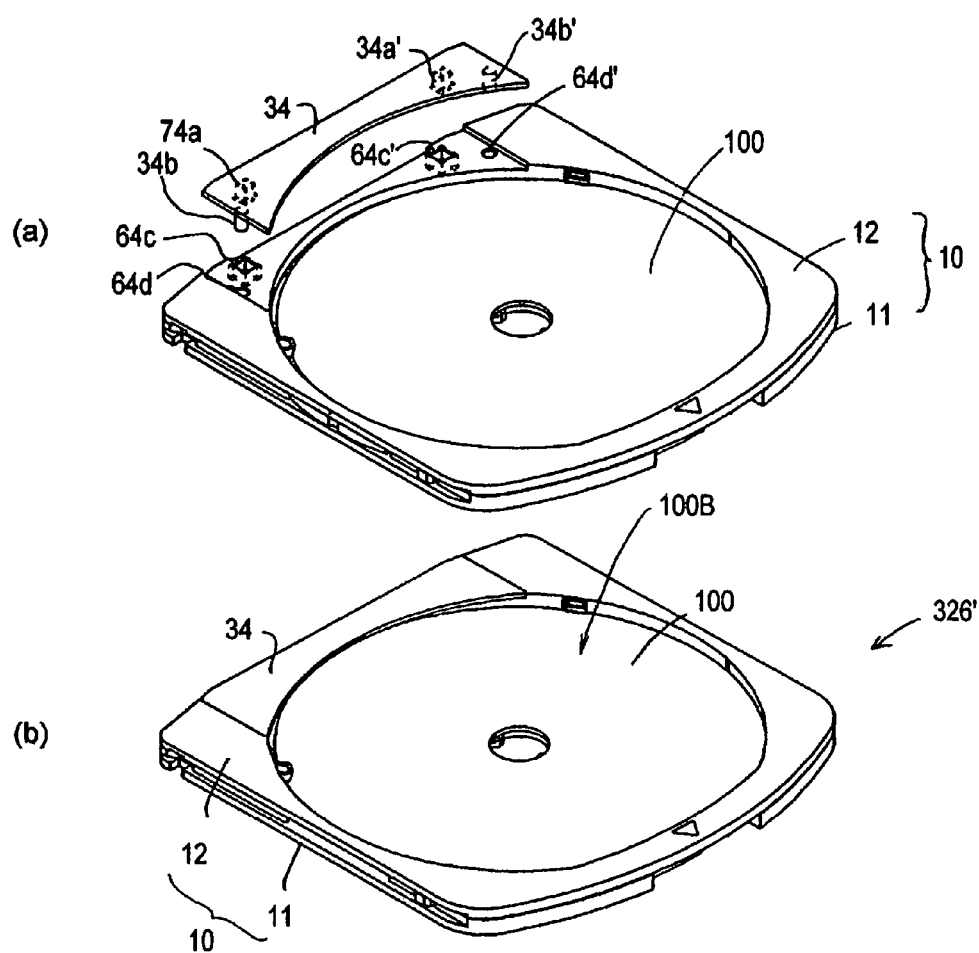

FIGS. 193(a) and 193(b) are perspective views showing the rest of the method of making the disc cartridge shown in FIG. 177.

Figure 194:
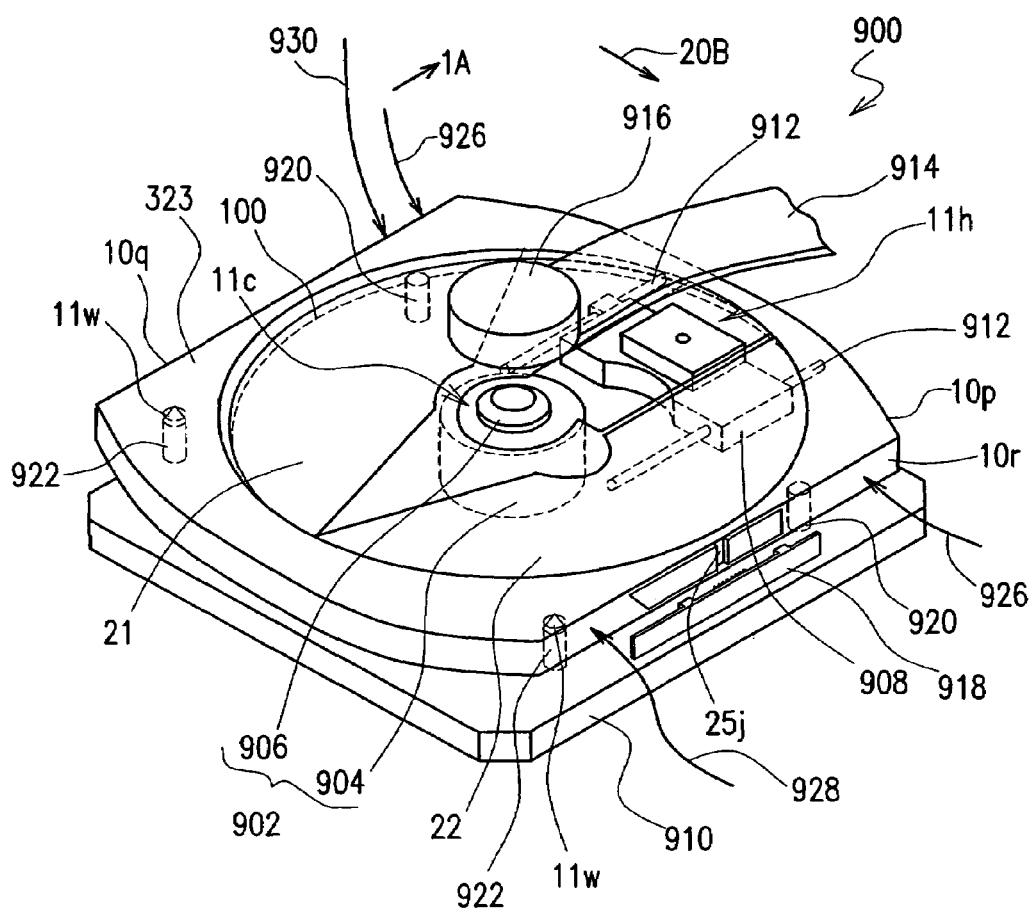

FIG. 194 is a perspective view illustrating main parts of a disc drive according to the present invention.

BEST MODE FOR CARRYING OUT THE INVENTION

Embodiment 1

Figure 1:
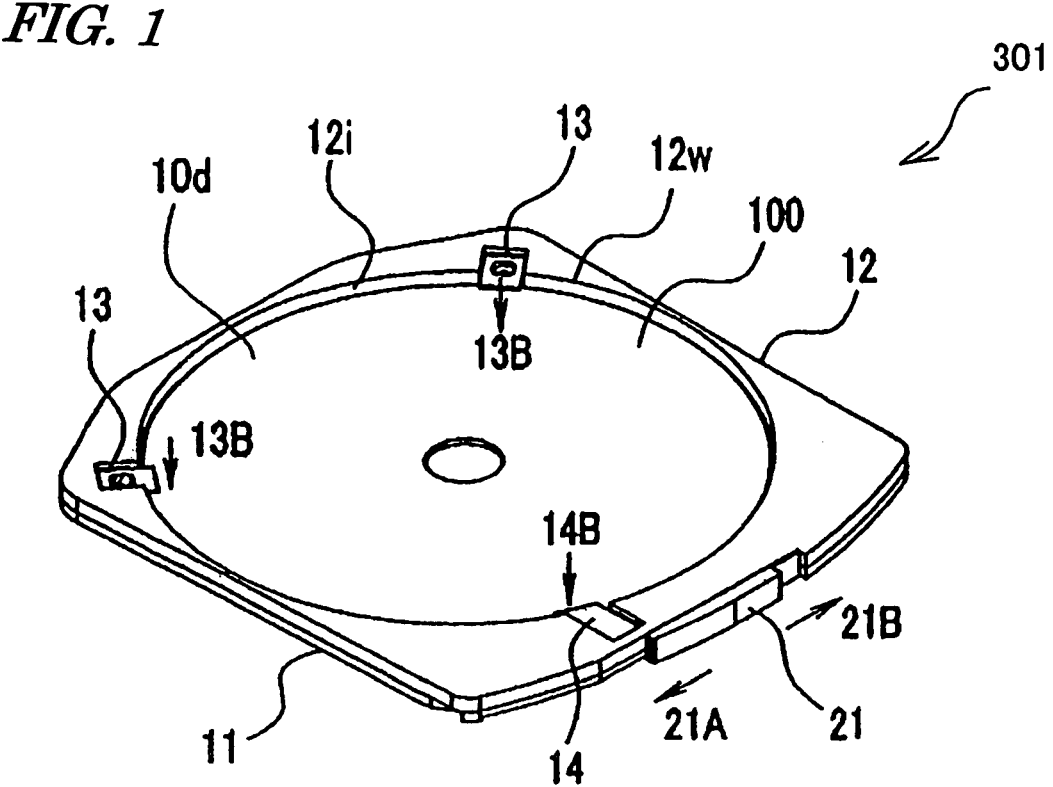
FIG. 1 is a perspective view illustrating an overall configuration for a disc cartridge according to a first embodiment of the present invention.
Figure 2:
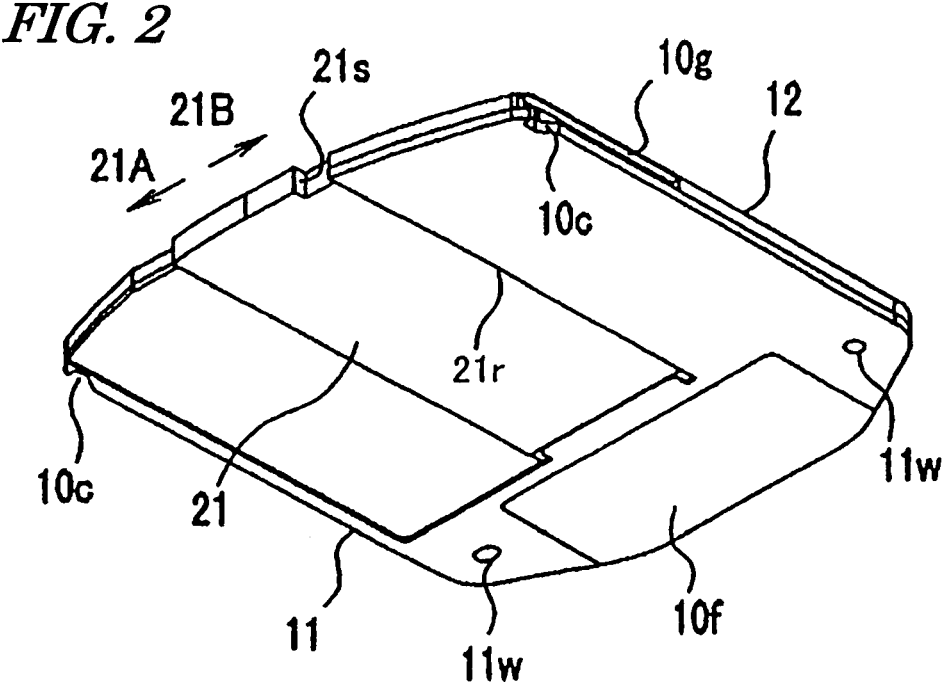
FIG. 2 is a perspective view of the disc cartridge shown in FIG. 1 as viewed from below it.
Figure 3:
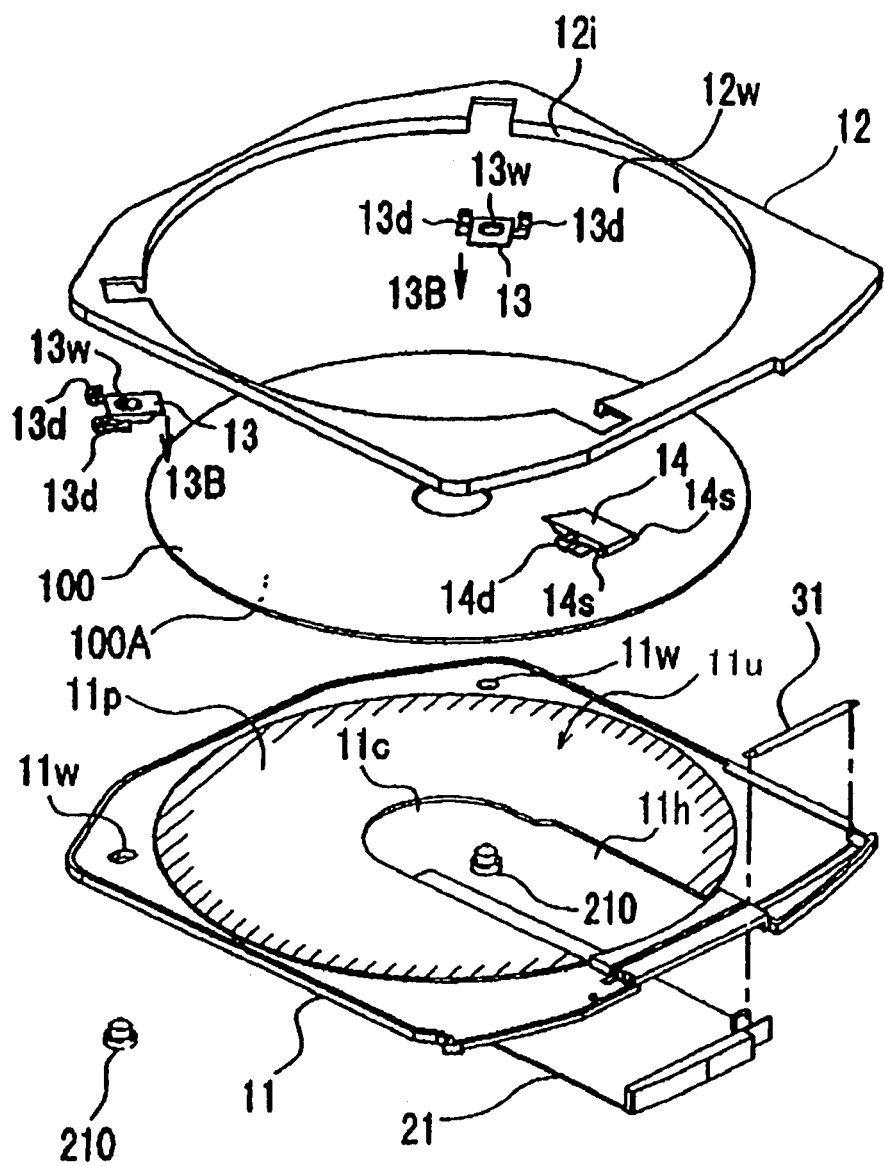
FIG. 3 is an exploded perspective view illustrating an exploded state of the disc cartridge shown in FIG. 1.

Hereinafter, a disc cartridge 301 according to a first embodiment of the present invention will be described with reference to FIGS. 1, 2 and 3. FIG. 1 is a perspective view illustrating an overall configuration of the disc cartridge 301, including a disc 100 stored, as viewed from above the cartridge 301. FIG. 2 is a perspective view of the disc cartridge 301 as viewed from below the cartridge 301. FIG. 3 is an exploded perspective view illustrating respective parts of the disc cartridge 301.

The disc 100 includes first and second sides. The first side of the disc 100, on which its label, for example, is normally printed, is illustrated in FIG. 1, while the second side of the disc 100, i.e., the signal recording side 100A, is illustrated as the back surface in FIG. 3.

As shown in FIG. 1, the disc cartridge 301 includes a cartridge lower shell 11, a cartridge upper shell 12, disc holding members 13, 14 and a shutter 21.

As shown in FIG. 3, the cartridge lower shell 11 includes a chucking opening 11c and a head opening 11h. The chucking opening 11c is provided to allow a chucking member (e.g., a spindle motor for rotating the disc 100) to enter the disc cartridge 301 externally. The head opening 11h is provided to allow a head, which reads and/or writes a signal from/on the signal recording side 100A of the disc 100, to enter the disc cartridge 301 and access the signal recording side 100A. The cartridge lower shell 11 also includes two positioning holes 11w, which engage with cartridge positioning pins 210 of a disc drive, thereby defining the position of the disc cartridge 301 with respect to the disc drive. The cartridge lower shell 11 faces the signal recording side 100A of the disc 100.

The cartridge upper shell 12 includes a circular disc window 12w, through which the disc 100 can be introduced and removed into/from the disc cartridge 301 and which expands over the entire projection area of the disc 100 to expose the upper surface of the disc 100. The cartridge upper and lower shells 12 and 11 are adhered or welded together at their outer periphery, thereby forming a cartridge body 10.

A disc storage portion 10d for storing the disc 100 therein (see FIG. 1) is defined by a first inner surface 11u of the cartridge lower shell 11 and a second inner surface 12i of the cartridge upper shell 12. The first inner surface 11u is opposed to the signal recording side 100A of the disc 100, while the second inner surface 12i has a substantially cylindrical shape and defines the disc window 12w inside. That is to say, the first inner surface 11u becomes the bottom of the disc storage portion 10d. The first inner surface 11u of the cartridge lower shell 11 is provided with a protective layer 11p for the purpose of preventing the disc 100 from getting scratched or any dust from reaching the signal recording side 100A.

The protective layer 11p may be appropriately selected from the group consisting of an anti-scratching nonwoven fabric, a dustproof nonwoven fabric, an anti-scratching coating layer and a dustproof coating layer. In this embodiment, a sheet of a dustproof nonwoven fabric is adhered or ultrasonic welded as the protective layer 11p.

In the disc storage portion 10d, a gap, which is wide enough to allow the disc 100 to rotate freely, is provided between the second inner surface 12i and the disc 100. Also, the top of the disc storage portion 10d is the disc window 12w so that the disc 100 stored in the disc storage portion 10d has one side thereof exposed through the disc window 12w.

As shown in FIG. 3, the disc cartridge 301 includes two disc holding members 13 of the same shape. Each of the disc holding members 13 includes a pair of elastic portions 13d and a hole portion 13w that runs obliquely through the disc holding member 13. When the elastic portions 13d of the disc holding members 13 are sandwiched between the cartridge upper and lower shells 12 and 11, an elastic force is applied to the respective ends of the disc holding members 13 in the direction indicated by the arrows 13B in FIG. 3. As a result, the disc 100 is pressed against the first inner surface 11u. Also, these two disc holding members 13 are disposed so that the hole portions 13w thereof are located substantially over the positioning holes 11w.

The disc holding member 14 includes a rotation shaft 14s and two elastic portions 14d. The disc holding member 14 is secured to the cartridge body 10 so as to rotate on the rotation shaft 14s. When the elastic portions 14d are sandwiched between the cartridge upper and lower shells 12 and 11, an elastic force is applied to the respective ends of the disc holding member 14 in the direction indicated by the arrow 14B. As a result, the disc 100 is pressed against the first inner surface 11u.

The shutter 21 is externally fitted with the cartridge lower shell 11 so as to face the signal recording side 100A of the disc 100. As shown in FIGS. 1 and 2, when the shutter is moved in the direction indicated by the arrow 21A or 21B, the chucking opening 11c and the head opening 11h are exposed or covered. A shutter spring 31 is extended between the shutter 21 and the cartridge body 10 to apply an elastic force to the shutter 21 in such a direction as to close the shutter 21.

As shown in FIG. 2, a label plane or concave portion 10f, on which the contents that have been written on the disc 100 being stored can be noted down, is provided on the surface of the cartridge body 10 (i.e., the cartridge lower shell 11). Also, a pair of concave portions 10c, provided on the right- and left-hand sides of the cartridge body 10, may be used as either pull-in notches or positioning recesses when the disc cartridge 301 is pulled in and loaded into a disc drive or when the disc cartridge 301 is stored in a changer. Another concave portion 10g, provided on just one side, has such a shape as to prevent erroneous insertion of the disc cartridge 1. That is to say, this concave portion 10g is just fitted with a convex portion provided for the disc drive only when the disc cartridge 1 is inserted in the correct direction. Suppose the disc cartridge 301 is being inserted into the disc drive upside down or the wrong way round by mistake. In that case, these concave and convex portions are never fitted with each other and the disc cartridge 301 cannot be inserted thereto correctly. In this manner, the erroneous insertion can be prevented.

Figure 4:
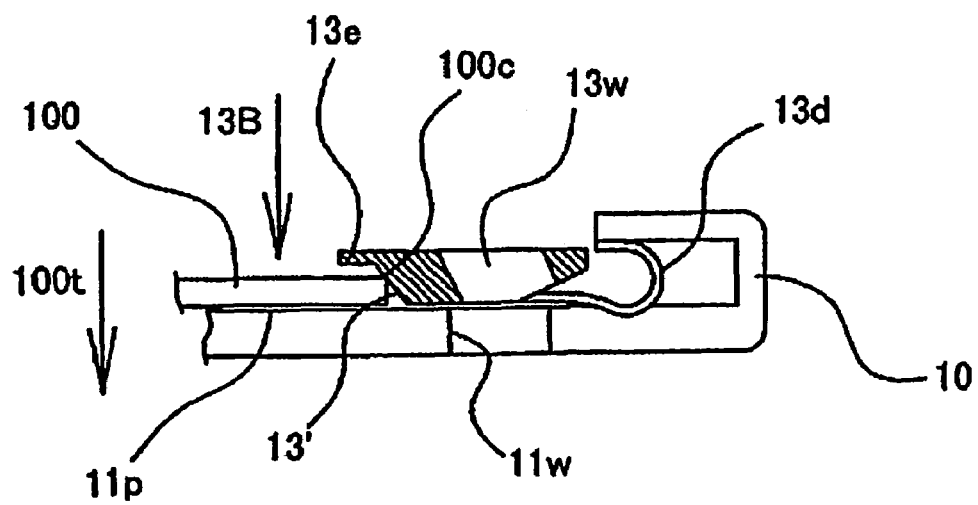
FIG. 4 is a cross-sectional view illustrating a disc holding member and a surrounding portion of the disc cartridge shown in FIG. 1.
Figure 5:
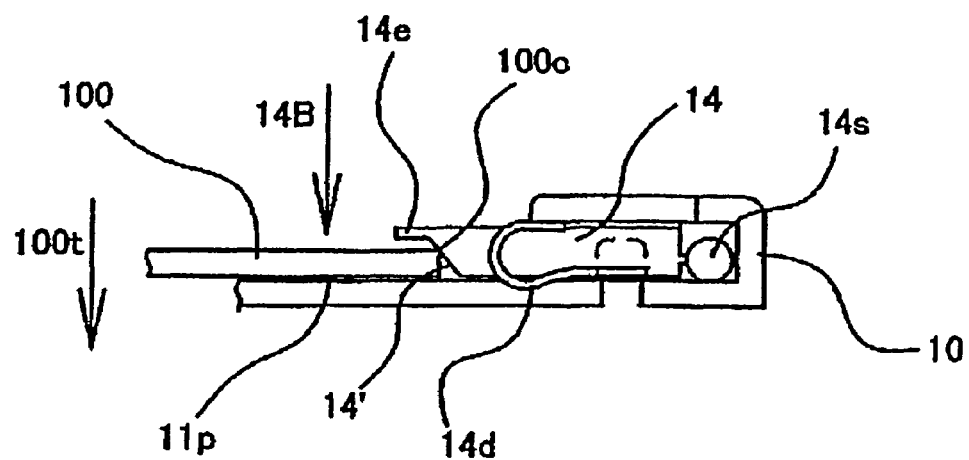
FIG. 5 is a cross-sectional view illustrating another disc holding member and a surrounding portion of the disc cartridge shown in FIG. 1.

Next, it will be described in further detail with reference to FIGS. 4 and 5 how the disc holding members 13 and 14 hold the disc 100 thereon. FIG. 4 is a cross-sectional view of the disc holding member 13 in a state where the disc 100 has been mounted thereon as shown in FIGS. 1 through 3, while FIG. 5 is a cross-sectional view of the disc holding member 14 in the state where the disc 100 has been mounted thereon. FIGS. 4 and 5 are both taken in a disc radial direction.

As shown in FIGS. 4 and 5, the disc holding members 13 and 14 include slopes 13' and 14', which overhang a portion of the projection area of the disc 100 (i.e., over the outer periphery of the disc 100), at the respective ends thereof. An elastic force is applied from the elastic portions 13*d* or 14*d* to the disc holding member 13 or 14 in the direction indicated by the arrow 13B or 14B. In that situation, the slope 13' or 14' contacts with the outer edge 100*c* of the disc 100, thereby gripping the disc 100 thereon and pressing the disc 100 in a thickness direction 100*t* thereof. As a result, the signal recording side 100A is brought into plane contact with the sheet 11*p*. In this manner, the disc 100 is held and fixed inside the cartridge body 10. In this state, the outer periphery of the signal recording side 100A of the disc 100 keeps a close contact with the sheet 11*p*. Thus, no dust will be deposited on the signal recording side 100A.

Next, it will be described in detail with reference to FIGS. 6, 7 and 8 how the disc 100 is released from the disc holding members 13 and 14.

Figure 6:
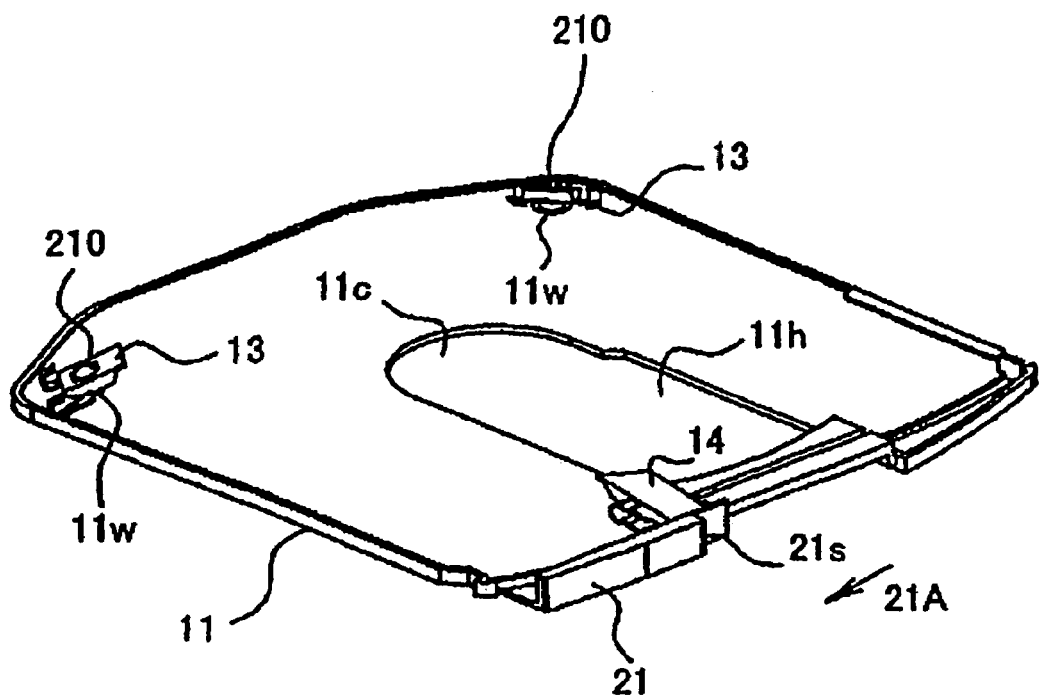
FIG. 6 is a perspective view illustrating a state of the disc cartridge shown in FIG. 1 in which its shutter is opened and positioning pins have been inserted.

FIG. 6 is a perspective view illustrating the disc cartridge with the cartridge upper shell 12 and the disc 100 removed therefrom. As shown in FIG. 6, the shutter 21 has its L-shaped portion 21*s* pressed by a shutter opening mechanism (not shown) of the disc drive in the direction indicated by the arrow 21A. As a result, the chucking opening 11*c* and the head opening 11*h* are now exposed. Also, the pair of cartridge positioning pins 210 of the disc drive is engaged with the positioning holes 11*w* of the cartridge body 10.

Figure 7:
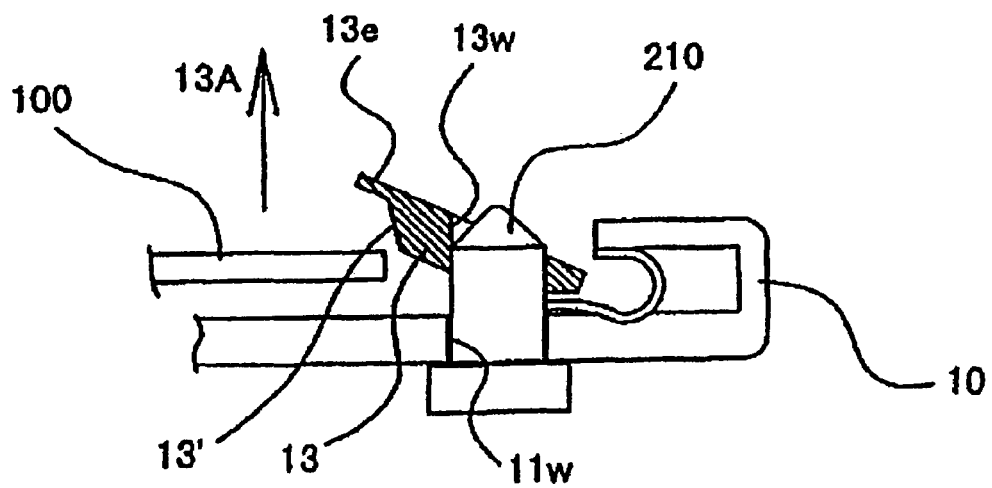
FIG. 7 is a cross-sectional view illustrating the disc holding member and its surrounding portion shown in FIG. 6.

FIG. 7 is a cross-sectional view of the disc holding member 13 in the state shown in FIG. 6 and is taken in a disc radial direction. FIG. 8 is an enlarged view illustrating the main parts, or the disc holding member 14 and the shutter 21 in the state shown in FIG. 6.

As shown in FIG. 7, when the cartridge positioning pin 210 of the disc drive is inserted into the positioning hole 11*w*, the cartridge positioning pin 210 engages with the obliquely running hole portion 13*w* of the disc holding member 13. As a result, the disc holding member 13 is lifted in the direction 13A, and the disc 100 is released from the grip of the slope 13' and is now freely rotatable. At this point in time, the rim 13*e* at the end of the disc holding member 13 still overhangs a portion of the projection area of the disc (i.e., the outer periphery thereof). Accordingly, even if the disc 100 is released in a disc drive that is so constructed as to mount the disc 100 vertically, the disc 100 will not drop down from the disc cartridge 301.

Figure 8:
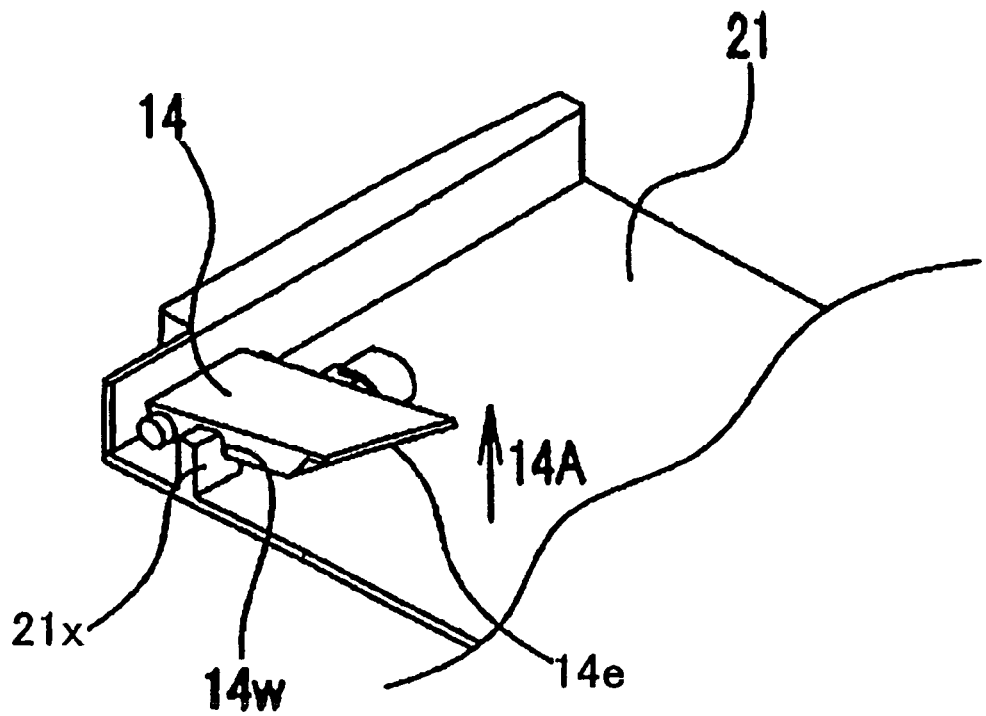
FIG. 8 is a perspective view illustrating the disc holding member and its surrounding portion shown in FIG. 6.

On the other hand, when the shutter 21 is opened, a guide rib 21*x* provided on the shutter 21 enters a concave portion 14*w* of the disc holding member 14, thereby lifting the ceiling of the concave portion 14*w* as shown in FIG. 8. As a result, the disc holding member 14 is lifted to the direction 14A and the disc 100 is released from the grip of the slope 14' and becomes freely rotatable. At this point in time, the rim 14*e* at the end of the disc holding member 14 still overhangs a portion of the projection area of the disc (i.e., the outer periphery thereof). Accordingly, even if the disc is released in a disc drive that is so constructed as to mount the disc 100 vertically, the disc 100 will not drop down from the disc cartridge 301.

Also, to remove the disc intentionally, the operator must release the disc from the three disc holding members 13 and 14 at the same time. Accordingly, it is possible to prevent the operator from removing the disc accidentally.

In this embodiment, the end 21*r* of the shutter 21, which is opposed to the disc 100, may be provided with a brush or a dust cleaning member as shown in FIG. 2 so that dust is removed from the signal recording side 100A of the disc 100 every time the shutter 21 is opened and closed. Optionally, the disc cartridge 301 may further include a locking mechanism for fixing and supporting the disc holding members onto the cartridge body 10 when the disc is held.

Embodiment 2

Figure 9:
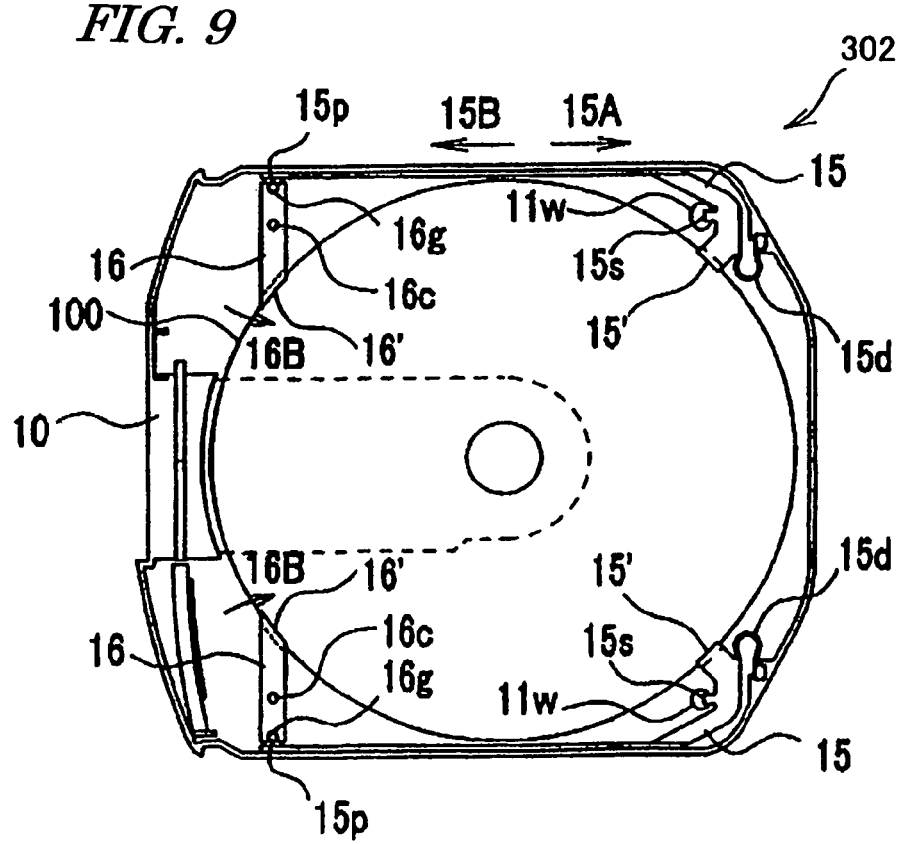
FIG. 9 is a plan view illustrating an overall configuration for a disc cartridge according to a second embodiment of the present invention.
Figure 10:
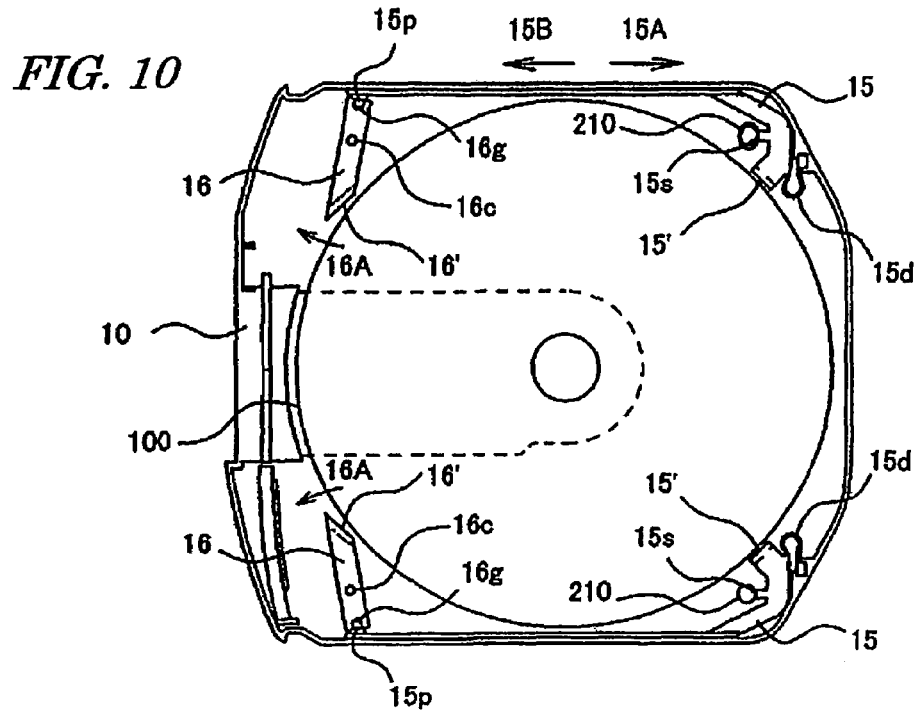
FIG. 10 is a plan view illustrating a state of the disc cartridge shown in FIG. 9 in which the disc has been released.

Hereinafter, a disc cartridge 302 according to a second embodiment of the present invention will be described with reference to FIGS. 9 and 10. Specifically, FIG. 9 is plan view illustrating an overall configuration for the disc cartridge 302 in which the disc 100 is held. FIG. 10 is a plan view illustrating an overall configuration for the disc cartridge 302 in which the disc 100 has been released. In FIGS. 9 and 10, each member equivalent to the counterpart of the first embodiment described above is identified by the same reference numeral and the description thereof will be omitted herein.

The disc cartridge 302 is different from the disc cartridge 301 of the first embodiment in the disc holding members. Specifically, the disc cartridge 302 includes two pairs of disc holding members 15 and 16, which slide in the direction indicated by the arrow 15A or 15B, as shown in FIG. 9.

Each of the disc holding members 15 includes an elastic portion 15*d*, which applies an elastic force to the disc holding member 15 in the direction indicated by the arrow 15B. Just like the disc holding members 13 and 14 of the first embodiment, a slope 15' provided at the end thereof holds and fixes the disc 100 onto the cartridge body 10.

Each of the disc holding members 16 includes a rotation shaft 16*c*. That is to say, the disc holding member 16 is provided for the cartridge body 10 so as to rotate on its rotation shaft 16*c*. Just like the disc holding members 13 and 14 of the first embodiment, a slope 16' provided at the end of each disc holding member 16 holds and fixes the disc 100 onto the cartridge body 10. Each of the disc holding members 15 further includes a coupling pin 15*p*, which is engaged and interlocked with a groove 16*g* provided for its associated disc holding member 16.

When the two cartridge positioning pins 210 of the disc drive are engaged with the positioning holes 11*w* of the cartridge body 10, respective protrusions 15*s* of the disc holding members 15 are pushed by the positioning pins 210 as shown in FIG. 10. As a result, the disc holding members 15 are moved in the direction indicated by the arrow 15A and the disc 100 is released from the grip of the slopes 15'. In the meantime, as the disc holding members 15 are moved, the disc holding members 16 are rotated to the direction indicated by the arrow 16A. Consequently, the disc 100 is also released from the grip of the slopes 16'.

Embodiment 3

Figure 11:
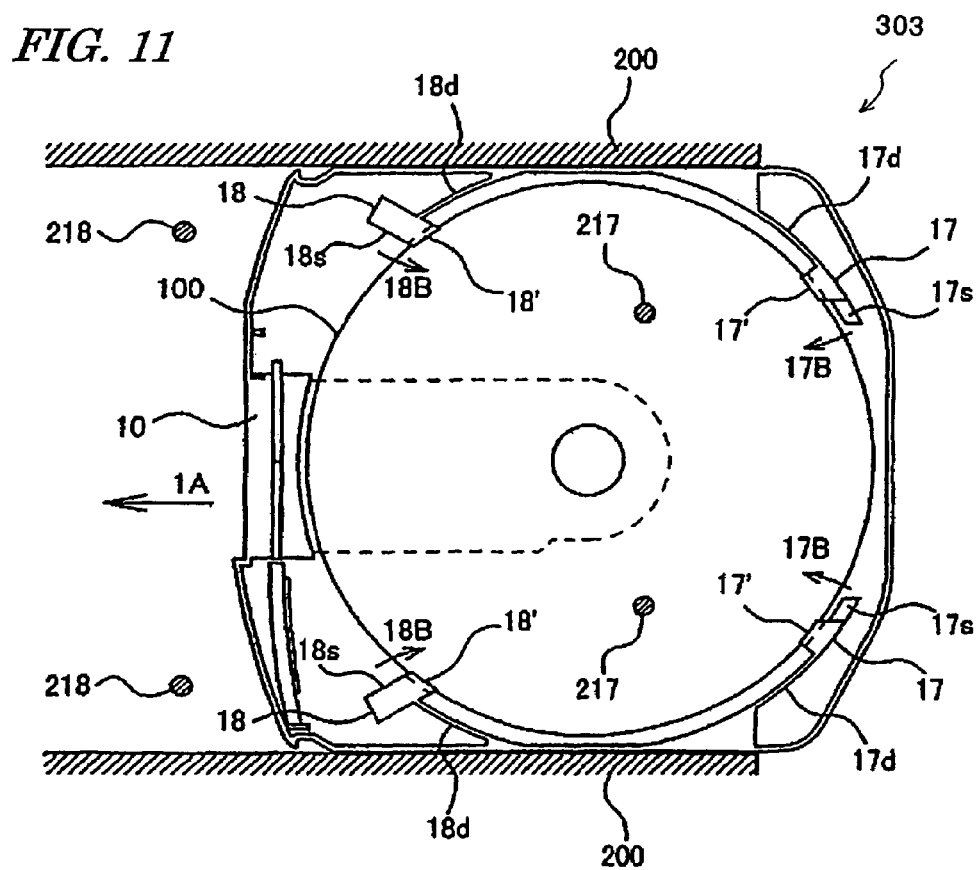
FIG. 11 is a plan view illustrating an overall configuration for a disc cartridge according to a third embodiment of the present invention.
Figure 12:
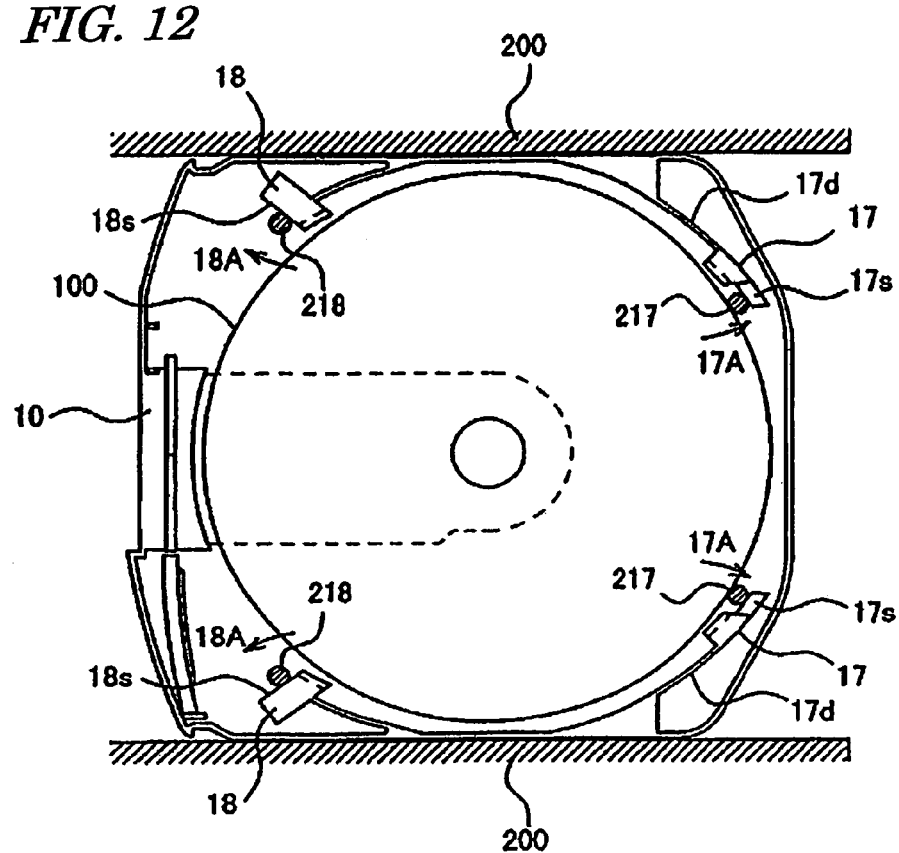
FIG. 12 is a plan view illustrating a state of the disc cartridge shown in FIG. 11 in which the disc has been released.

Hereinafter, a disc cartridge 303 according to a third embodiment of the present invention will be described with reference to FIGS. 11 and 12. Specifically, FIG. 11 is plan view illustrating an overall configuration for the disc cartridge 303 in which the disc 100 is held. FIG. 12 is a plan view illustrating an overall configuration for the disc cartridge 303 in which the disc 100 has been released. In FIGS. 11 and 12, each member equivalent to the counterpart of the first embodiment is identified by the same reference numeral and the description thereof will be omitted herein.

The disc cartridge 303 is different from the disc cartridge 301 of the first embodiment in the disc holding members. Specifically, the disc cartridge 303 includes two pairs of disc holding members 17 and 18, to which an elastic force is applied in the directions indicated by the arrows 17B and 18B, respectively, as shown in FIG. 11. These disc holding members 17 and 18 have been molded together with the cartridge body 10 so as to form integral parts of the cartridge body 10.

Each of the disc holding members 17 includes an elastic portion 17d, which applies an elastic force to the disc holding member 17 in the direction indicated by the arrow 17B. Just like the disc holding members 13 and 14 of the first embodiment, a slope 17' provided at the end of each disc holding member 17 holds and fixes the disc 100 onto the cartridge body 10.

Each of the disc holding members 18 also includes an elastic portion 18d, which applies an elastic force to the disc holding member 18 in the direction indicated by the arrow 18B. A slope 18' provided at the end of each disc holding member 18 also holds and fixes the disc 100 onto the cartridge body 10.

When this disc cartridge 303 is inserted into a disc drive 200, a pair of disc releasing pins 217, provided for the disc drive 200, presses protrusions 17s of the disc holding members 17. As a result, the disc 100 is released from the disc holding members 17 as shown in FIG. 12. At the same time, another pair of disc releasing pins 218, also provided for the disc drive 200, contacts with the side surfaces 18s of the disc holding members 18. Consequently, the disc 100 is also released from the disc holding members 18.

Embodiment 4

Figure 13:
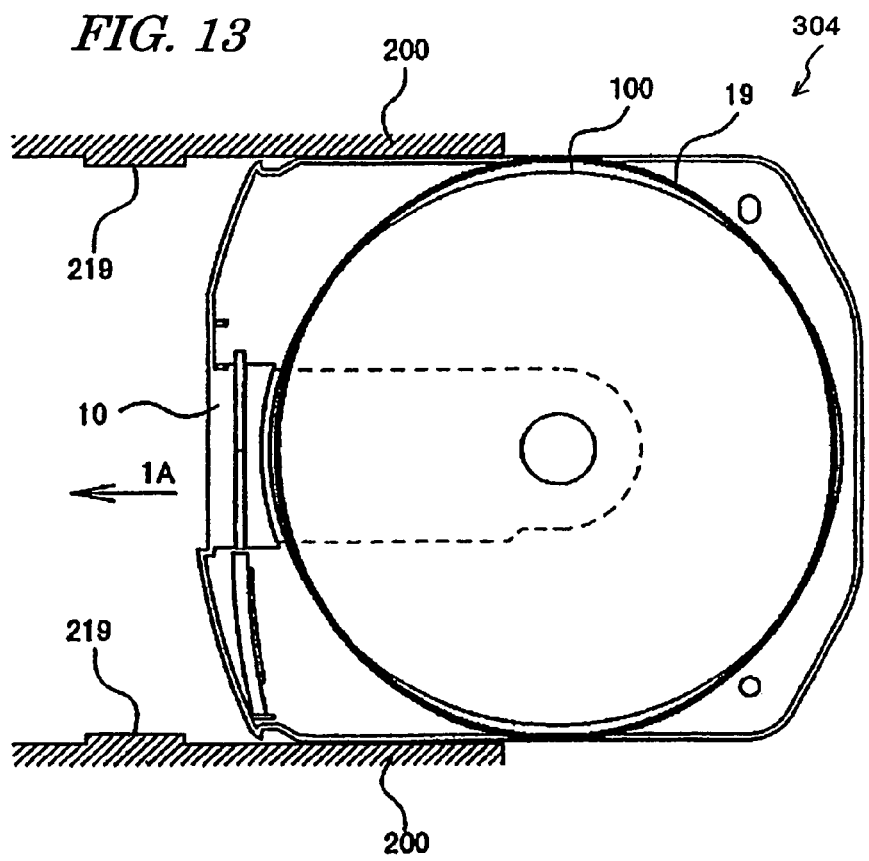
FIG. 13 is a plan view illustrating an overall configuration for a disc cartridge according to a fourth embodiment of the present invention.
Figure 14:
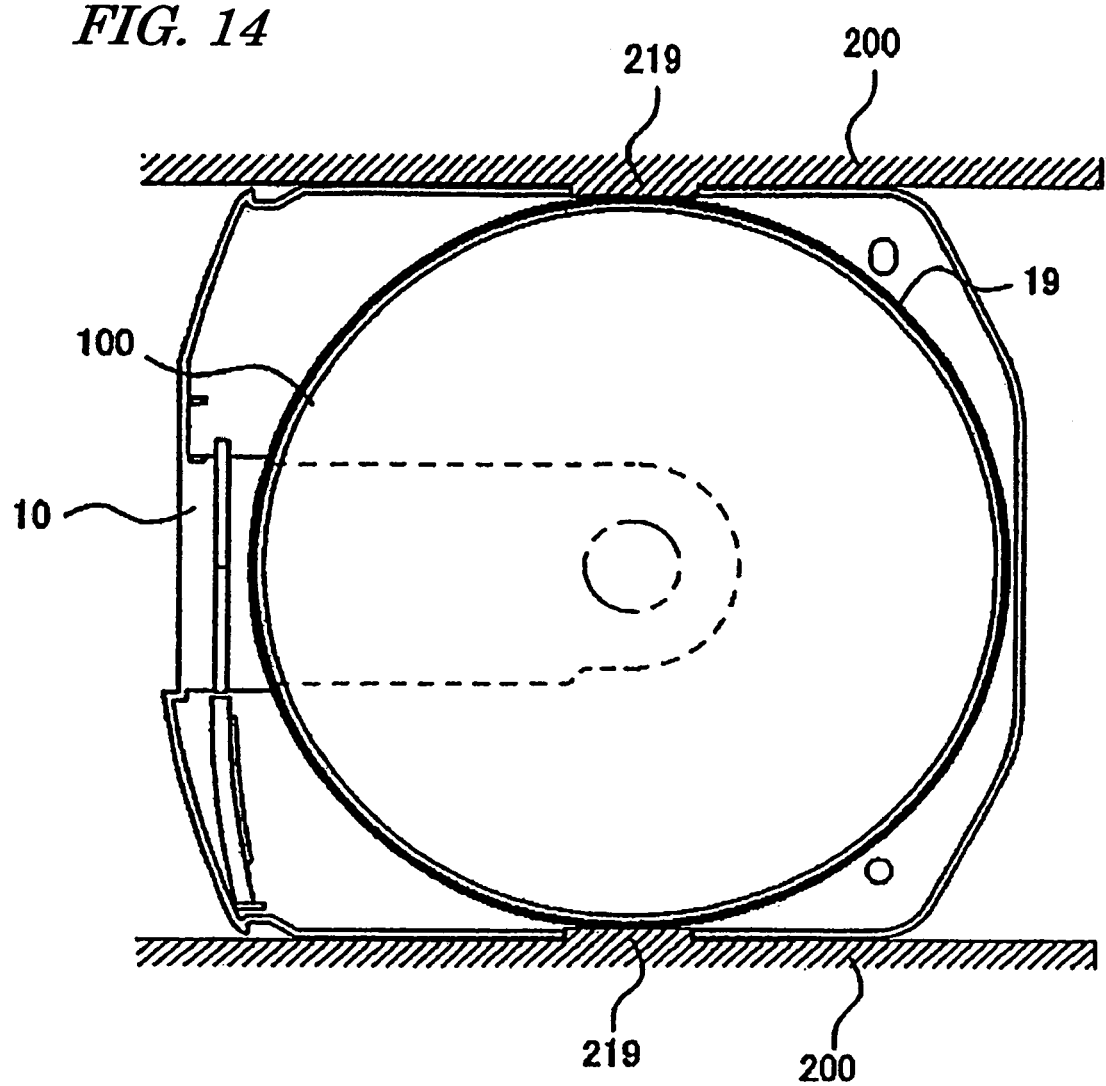
FIG. 14 is a plan view illustrating a state of the disc cartridge shown in FIG. 13 in which the disc has been released.

Hereinafter, a disc cartridge 304 according to a fourth embodiment of the present invention will be described with reference to FIGS. 13 and 14. Specifically, FIG. 13 is plan view illustrating an overall configuration for the disc cartridge 304 in which the disc 100 is held. FIG. 14 is a plan view illustrating an overall configuration for the disc cartridge 304 in which the disc 100 has been released. In FIGS. 13 and 14, each member equivalent to the counterpart of the first embodiment is identified by the same reference numeral and the description thereof will be omitted herein.

The disc cartridge 304 is different from the disc cartridge 301 of the first embodiment in the disc holding member. Specifically, the disc cartridge 304 includes a ringlike disc holding member 19.

As shown in FIG. 13, the disc holding member 19 is a ringlike elastic member, which is made of rubber, for example, and which can change its shape freely. When no force is externally applied thereto, the disc holding member 19 has an ellipsoidal shape. However, by applying an external force thereto, the disc holding member 19 may be deformed into a substantially completely round shape. When the disc holding member 19 is deformed into a substantially completely round shape, the inside diameter thereof is greater than the diameter of the disc 100.

As shown in FIG. 13, the ellipsoidal disc holding member 19 is in contact with the disc 100 at multiple points, thereby holding and fixing the disc 100 onto the cartridge body 10. However, when this disc cartridge 304 is inserted into a disc drive 200, a pair of convex portions 219, provided for the disc drive 200, presses the major axis portion of the ring-like disc holding member 19, thereby deforming the disc holding member 19 as shown in FIG. 14. As a result, the disc holding member 19 is deformed into an approximately completely round shape and is no longer in contact with the disc 100. That is to say, the disc 100 is released from the disc holding member 19.

To release the disc 100 from the disc holding member 19, the force that deforms the disc holding member 19 may also be applied from the convex portion of the disc drive, which engages with the concave portion 10g (see FIG. 2) provided for preventing the erroneous insertion, to the disc holding member 19. Alternatively, that force may also be applied from a pair of convex portions of the disc drive, which engages with the concave portions 10c (see FIG. 2) provided on the right- and left-hand sides of the disc cartridge 1 for pulling in the disc cartridge 1, to the disc holding member 19.

Embodiment 5

Figure 15:
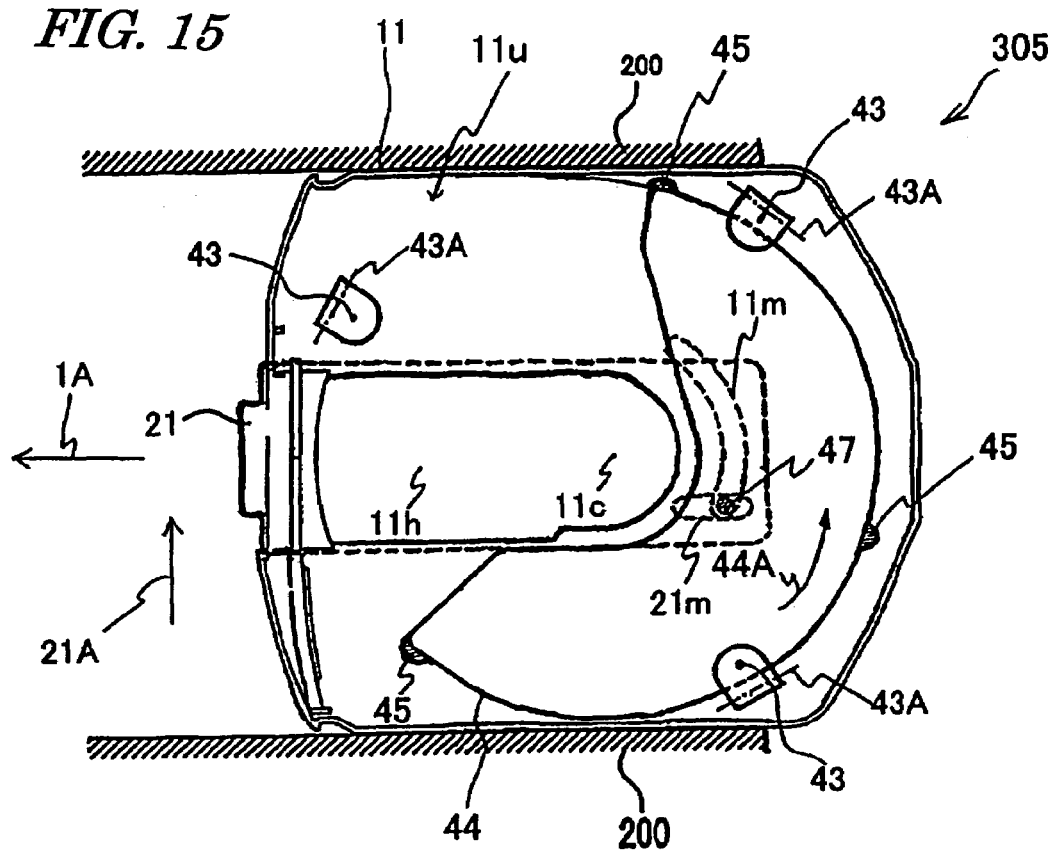
FIG. 15 is a plan view illustrating an overall configuration for a disc cartridge according to a fifth embodiment of the present invention in a state where its shutter is closed.
Figure 16:
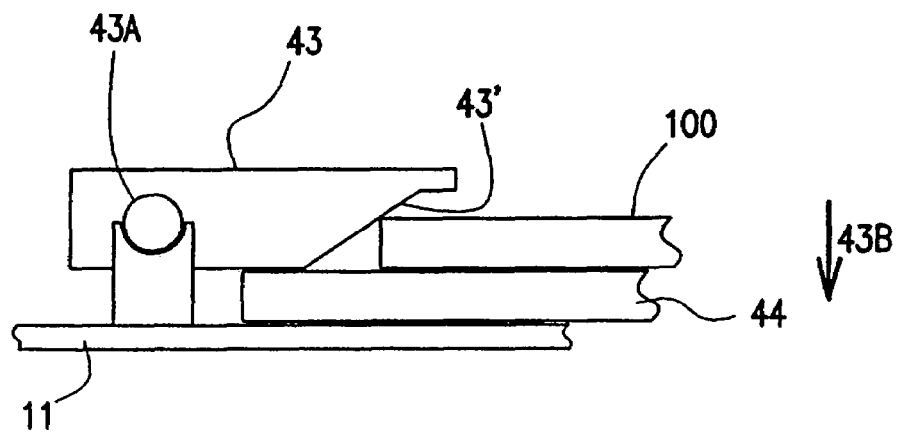
FIG. 16 is a cross-sectional view of a disc holding member of the disc cartridge shown in FIG. 15.
Figure 17:
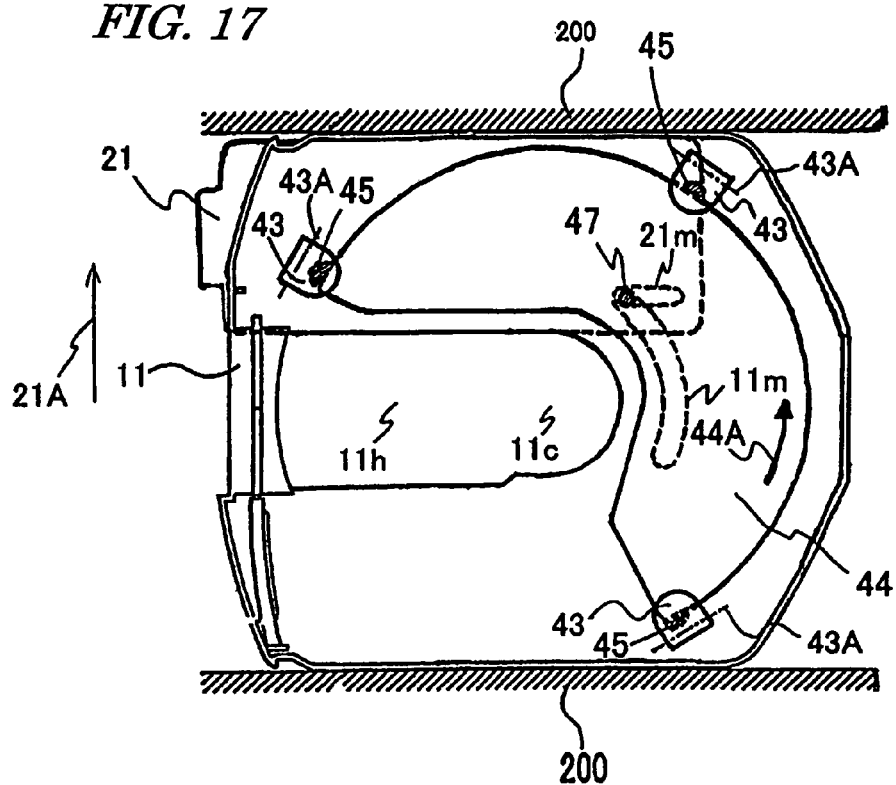
FIG. 17 is a plan view illustrating an overall configuration for the disc cartridge shown in FIG. 15 in a state where its shutter is opened.
Figure 18:
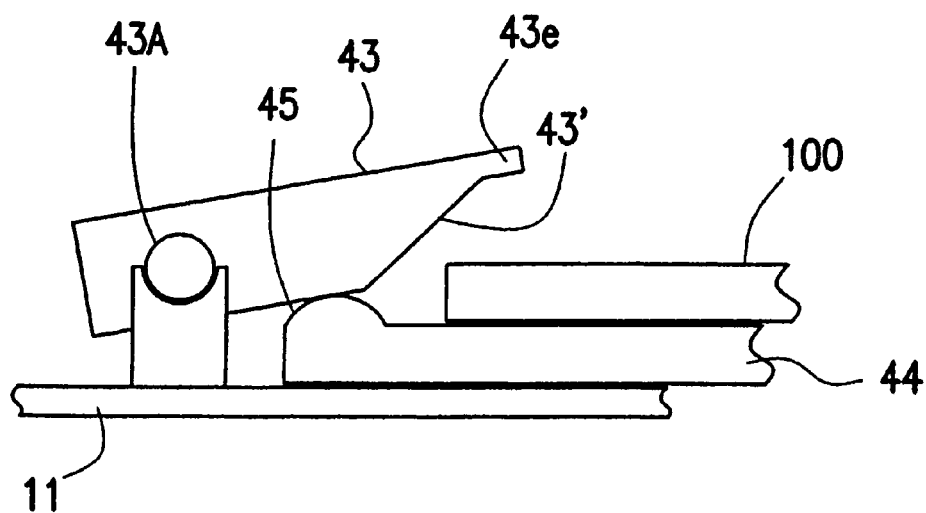
FIG. 18 is a cross-sectional view of the disc holding member of the disc cartridge shown in FIG. 17.

Hereinafter, a fifth embodiment of the present invention will be described with reference to FIGS. 15 through 18. FIGS. 15 and 17 are plan views illustrating the structure of a portion of a disc cartridge 305 according to this embodiment from which the cartridge upper shell has been removed. Specifically, FIG. 15 illustrates a state where the shutter 21 covers the openings 11h and 11c, while FIG. 17 illustrates a state where the shutter 21 exposes the openings 11h and 11c. FIGS. 16 and 18 illustrate states of a disc holding portion 43 when the shutter 21 is closed and when the shutter 21 is opened, respectively.

In this embodiment, each member equivalent to the counterpart of the disc cartridge of the first embodiment is identified by the same reference numeral.

The disc cartridge of this embodiment is characterized in that the disc holding and releasing operations by disc holding members 43 are synchronized with the opening and closing operations by the shutter 21 by way of a disc holding/interlocking member 44.

The disc holding/interlocking member 44 is provided over the first inner surface 11u of the cartridge lower shell 11 so as to rotate and slide around the chucking opening 11c of the cartridge lower shell 11 as indicated by the arrow 44A in FIGS. 15 and 17. The disc holding/interlocking member 44 has a fan shape, or in the shape of a partially notched ring that has an inside diameter equal to the diameter of the chucking opening 11c.

The disc holding/interlocking member 44 includes an engaging pin 47 that extends toward the cartridge lower shell 11 (i.e., in the direction going into the paper of FIGS. 15 and 17). The cartridge lower shell 11 and the shutter 21 are respectively provided with guide grooves 11m and 21m that both engage with this engaging pin 47. Also, multiple protrusions 45, which extend outward and toward the cartridge upper shell (i.e., in the direction coming out of the paper of FIGS. 15 and 17), are provided on the outer periphery of the disc holding/interlocking member 44. Furthermore, the upper surface of the disc holding/interlocking member 44 is covered with a nonwoven fabric or a coating to prevent the disc 100 from getting scratched or dust from being deposited on the signal recording side thereof.

A number of disc holding members 43 are disposed at predetermined intervals on respective regions of the cartridge lower shell 11 so as to hold the outer edge portion of the disc thereon when the disc is stored in the disc cartridge. In FIGS. 15 and 17, three disc holding members 43 are provided. Alternatively, two, four or more disc holding members 43 may also be provided. In any case, each of those disc holding members 43 is secured to the cartridge lower shell 11 so as to rotate on the rotation shaft 43A thereof.

As shown in FIG. 16, the disc holding member 43 is located at such a position as to partially overlap with the outer periphery and its surrounding portion of the disc holding/interlocking member 44. Also, a mechanism (not shown in FIG. 16) such as the elastic portion 14d shown in FIG. 5, for example, presses the disc holding member 43 in the direction 43B (i.e., toward the cartridge lower shell 11). Accordingly, while contacting with the edge of the disc 100, the slope 43' of the disc holding member 43 not only presses the disc 100 in the direction 43B so that the disc 100 is brought into contact with the disc holding/interlocking member 44 but also holds the disc 100 thereon.

As shown in FIG. 15, when the disc cartridge holding the disc (not shown) thereon is inserted into a disc drive 200 in the direction indicated by the arrow 1A, a shutter opening/closing lever (not shown), provided for the disc drive 200, moves the shutter 21 in the direction 21A, thereby opening the shutter 21. When the shutter 21 starts to move in the direction 21A, a force is also applied in the arrowed direction 21A to the engaging pin 47 of the disc holding/interlocking member 44 that is inserted into the guide groove 21*m* of the shutter 21. As a result, the engaging pin 47 is moved along the guide groove 11*m* of the cartridge lower shell 11, and the disc holding/interlocking member 44 starts to rotate around the chucking opening 11*c* as indicated by the arrow 44A. The guide groove 11*m* preferably extends approximately in the direction in which the shutter 21 is moved so that the disc holding/interlocking member 44 moves synchronously with the shutter 21.

When the shutter 21 is completely open, the protrusions 45 on the outer periphery of the disc holding/interlocking member 44 are located under the disc holding members 43 as shown in FIG. 17. Then, as shown in FIG. 18, the disc holding members 43 are pushed up by the protrusions 45 and the slopes 43' of the disc holding members 43 separate themselves from the outer edge of the disc 100. As a result, the force 43B that has pressed the disc 100 vertically to the disc plane is removed and the disc 100 is released to be freely rotatable. At this point in time, the rim 43*e* at the end of the disc holding member 43 still overhangs a portion of the projection area of the disc 100 (i.e., the outer periphery thereof). Accordingly, even if the disc 100 is released in a disc drive that is supposed to mount the disc thereon vertically, the disc will not drop down from the cartridge.

In the disc cartridge 305 of this embodiment, the disc can be released even if the disc cartridge is not inserted into the disc drive 200. For example, if the shutter 21 is opened manually, the disc holding members 43 will release the disc 100 synchronously with the movement of the shutter 21. Thus, the user can remove the existing disc from the cartridge and insert another disc thereto intentionally.

Embodiment 6

Figure 19:
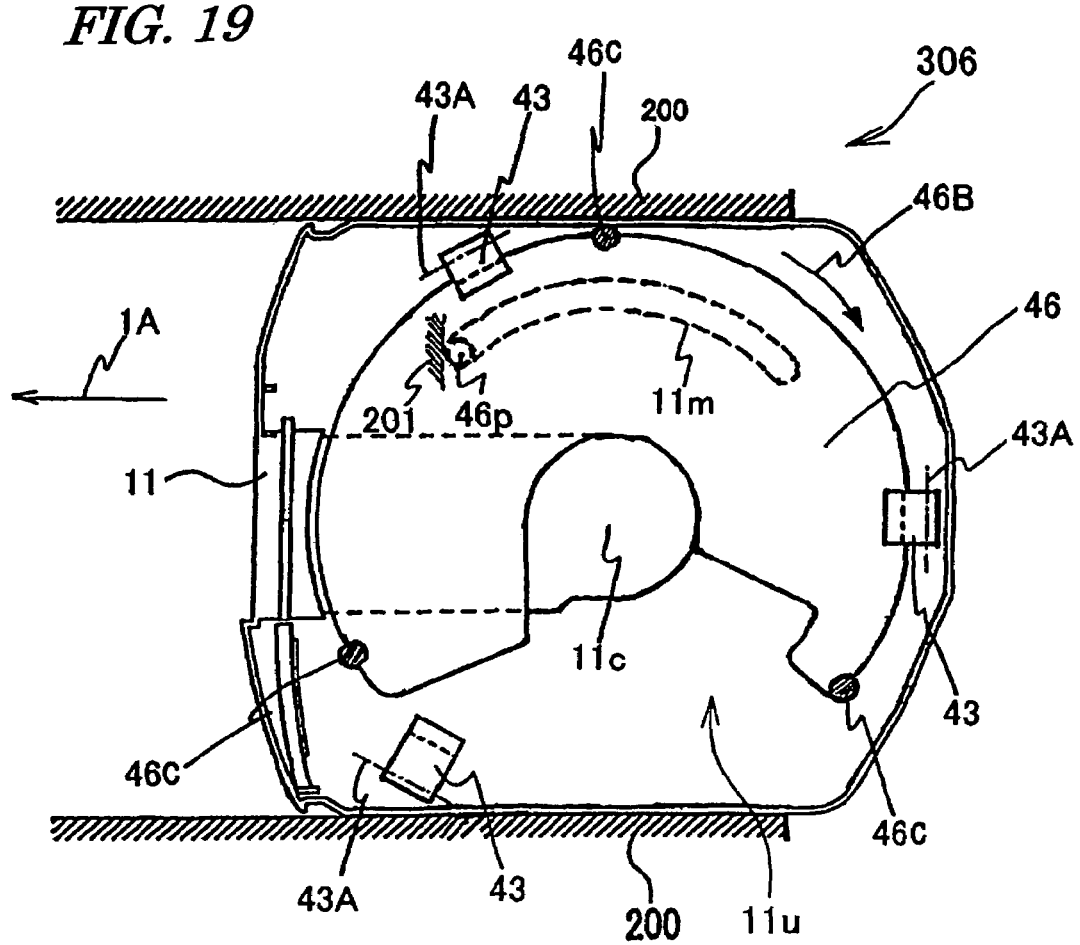
FIG. 19 is a plan view illustrating an overall configuration for a disc cartridge according to a sixth embodiment of the present invention in a state where its shutter is closed.
Figure 20:
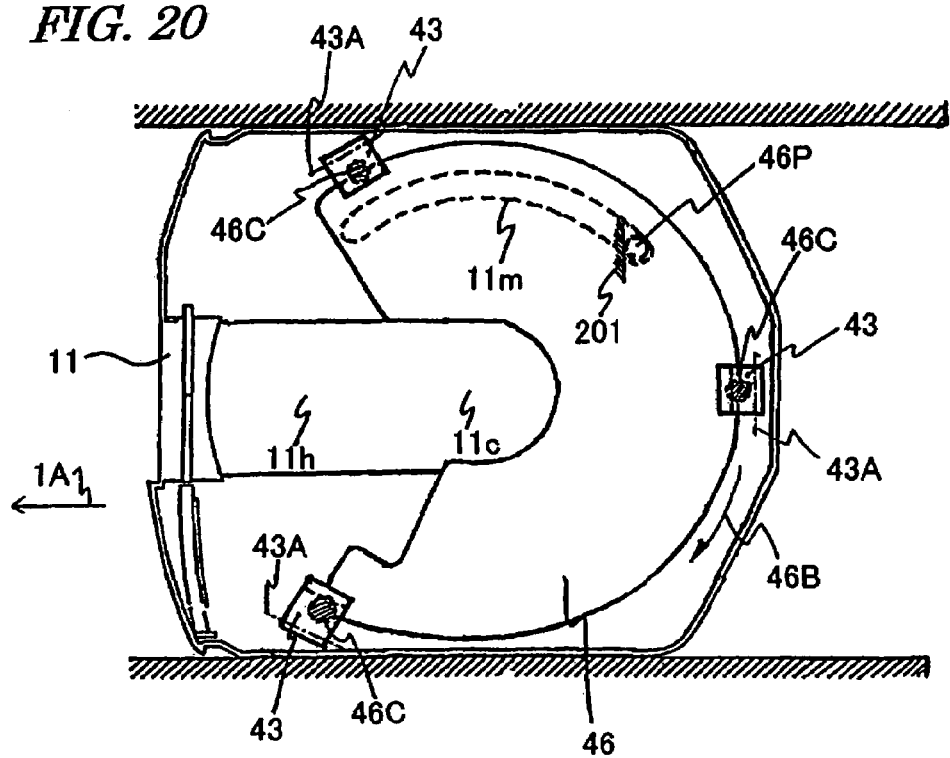
FIG. 20 is a plan view illustrating an overall configuration for the disc cartridge shown in FIG. 19 in a state where its shutter is opened.

Hereinafter, a sixth embodiment of the present invention will be described. FIGS. 19 and 20 are plan views illustrating the structure of a portion of a disc cartridge 306 according to this embodiment from which the cartridge upper shell has been removed. Specifically, FIG. 19 illustrates a state where the shutter covers the head opening, while FIG. 20 illustrates a state where the shutter exposes the head opening. In FIGS. 19 and 20, each member equivalent to the counterpart of the disc cartridge of the first or fifth embodiment is identified by the same reference numeral.

The disc cartridge of this embodiment is characterized in that the disc holding/interlocking member of the fifth embodiment described above also functions as a shutter. The shutter 46 is provided over the first inner surface 11*u* of the cartridge lower shell 11 so as to rotate and slide around the chucking opening 11*c* of the cartridge lower shell 11 as indicated by the arrow 46B in FIGS. 19 and 20. The shutter 46 has a fan shape, or in the shape of a partially notched ring that has an inside diameter equal to the diameter of the chucking opening 11*c*.

The shutter 46 includes an engaging pin 46*p* that extends toward the cartridge lower shell 11 (i.e., in the direction going into the paper of FIGS. 19 and 20). The cartridge lower shell 11 is provided with a guide groove 11*m* that engages with this engaging pin 46. When the engaging pin 46*p* is located at one end of the guide groove 11*m*, the head opening 11*h* is closed up by the shutter 46. And when the engaging pin 46 is located at the other end of the guide groove 11*m*, the head opening 11*h* is exposed. The guide groove 11*m* is provided along a portion of an arc that is concentric with the chuck opening 11*c*. The guide groove 11*m* preferably extends approximately in the direction 1A in which the disc is inserted so that the shutter 46 is opened as the disc cartridge is inserted into the disc drive.

Multiple protrusions 46*c*, which extend outward and toward the cartridge upper shell 12 (i.e., in the direction coming out of the paper of FIGS. 19 and 20), are provided on the outer periphery of the shutter 46. Furthermore, the upper surface of the shutter 46 is covered with a nonwoven fabric or a coating material to prevent the disc 100 from getting scratched or any dust from being deposited on the signal recording side thereof.

A number of disc holding members 43, having a structure similar to that of the disc holding members of the fifth embodiment, are disposed at predetermined intervals on respective regions of the cartridge lower shell 11. The disc holding members 43 and the protrusions 46*c* of the shutter 46 together hold or release the disc synchronously with the movement of the shutter 46 as already described for the fifth embodiment.

When the disc cartridge of this embodiment is inserted into the disc drive 200 as indicated by the arrow 1A in FIG. 19, the engaging pin 46*p* of the shutter 46 will soon contact with a contact member 201 provided for the disc drive 200. And when the disc cartridge is inserted deeper into the disc drive 200, the engaging pin 46*p* is pressed by the contact member 201 to start to move along the guide groove 11*m*. Then, the shutter 46 starts to rotate around the chucking opening 11*c* of the cartridge lower shell 11 as indicated by the arrow 46B. As the shutter 46 rotates, the head opening 11*h* is opened little by little.

As shown in FIG. 20, when the disc cartridge has been fully inserted into the disc drive 200, the engaging pin 46*p* will reach the other end of the guide groove 11*m*. As a result, the head opening 11*h* is completely exposed. At this point in time, as already described for the fifth embodiment, the protrusions 46*c* are located under the disc holding members 43. Then, the disc holding portions are pushed up by the protrusions 46*c* toward the cartridge upper shell 12 (i.e., in the direction coming out of the paper of FIG. 20). As a result, the disc 100 that has been held by the disc holding members 43 is released and now freely rotatable.

The disc cartridge of this embodiment needs no disc holding/interlocking member. Thus, compared to the disc cartridge of the fifth embodiment, the disc cartridge can be thinner. Also, if the engaging pin 46*p* is moved manually along the guide groove 11*m*, the shutter 46 can be opened and the disc can be released from the disc holding members and removed.

In this embodiment, the shutter 46 rotates clockwise as viewed from over the cartridge upper shell. However, the shutter 46 may also be rotated counterclockwise if the position of the guide groove 11*m* is changed.

Embodiment 7

Figure 21:
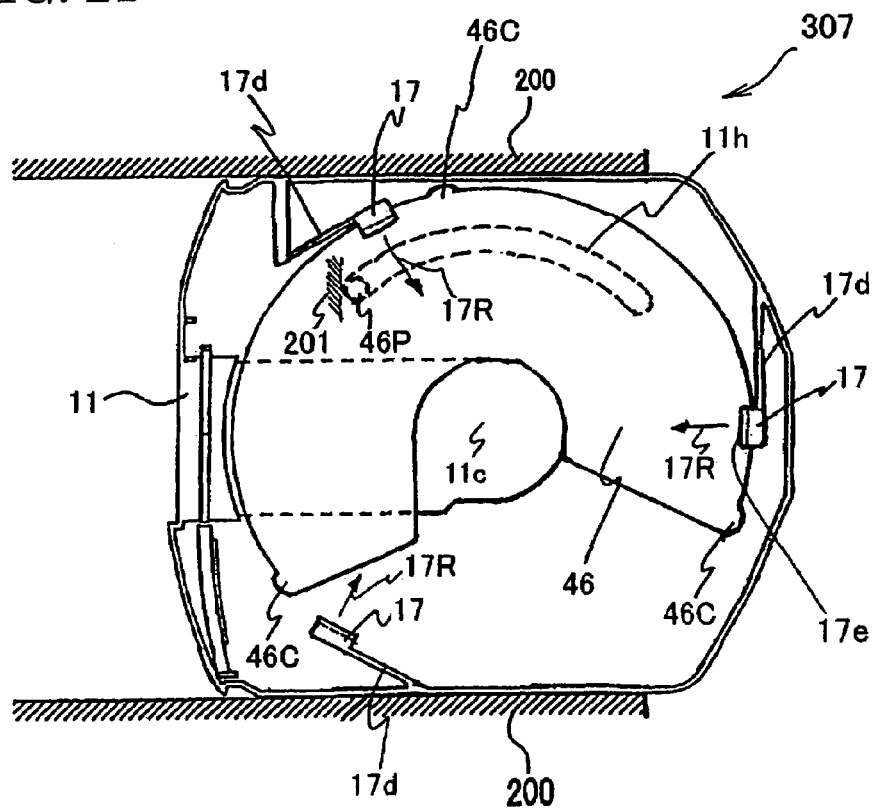
FIG. 21 is a plan view illustrating an overall configuration for a disc cartridge according to a seventh embodiment of the present invention in a state where its shutter is closed.
Figure 22:
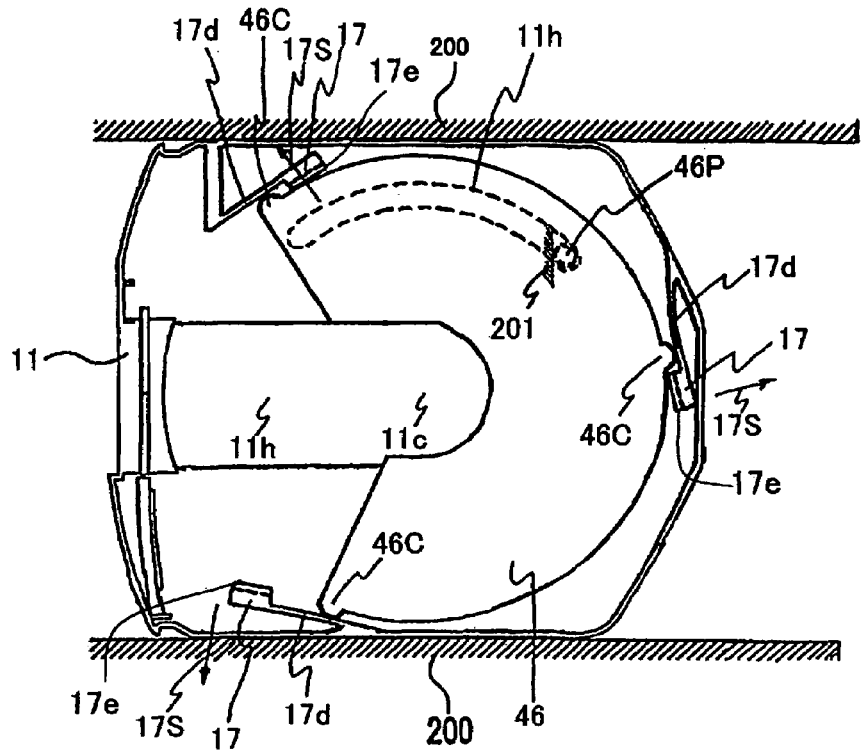
FIG. 22 is a plan view illustrating an overall configuration for the disc cartridge shown in FIG. 21 in a state where its shutter is opened.

Hereinafter, a seventh embodiment of the present invention will be described. FIGS. 21 and 22 are plan views illustrating the structure of a portion of a disc cartridge 307 according to this embodiment from which the cartridge upper shell has been removed. Specifically, FIG. 21 illustrates a state where the shutter covers the head opening, while FIG. 22 illustrates a state where the shutter exposes the head opening. In FIGS. 21 and 22, each member equivalent to the counterpart of the disc cartridge of the third or sixth embodiment is identified by the same reference numeral.

The disc cartridge of this embodiment is different from the disc cartridge of the sixth embodiment in the structure of the disc holding members. Specifically, as shown in FIGS. 21 and 22, the disc cartridge of this embodiment includes a plurality of disc holding members 17. Just like the disc holding members of the third embodiment described above, each of these disc holding members 17 also includes an elastic portion 17d. While the shutter 46 is closed, the elastic force applied from the elastic portions 17d holds the disc in such a manner as to press the disc 100 toward the center of the disc (17R). In this embodiment, the disc holding members 17 form integral parts of the cartridge lower shell 11. Alternatively, the disc holding members 17 may also be formed separately from the cartridge lower shell 11.

When a cross section thereof is taken in the disc radial direction, each of these disc holding members 17 also has a slope that tilts to overhang a portion of the projection area of the disc (i.e., the outer periphery of the disc) just like the disc holding member 43 shown in FIG. 18. Accordingly, if the disc gets held by the disc holding members 17 so as to have its outer edge contact with the respective slopes, then the disc is pressed against the shutter 46.

The shutter 46 includes a plurality of protrusions 46c on the outer periphery thereof. In this embodiment, the protrusions 46c protrude outward. Also, the protrusions 46c are located at such positions on the outer periphery of the shutter 46 as to contact with the elastic portions 17d of the disc holding members 17 when the shutter 46 is opened.

As shown in FIG. 22, when the shutter 46 is opened, the protrusions 46c dominate the elastic force of the elastic portions 17d, thereby pushing the elastic portions 17d outward from the disc 100 (i.e., in the directions 17s). As a result, the disc 100 is released. However, each of the disc holding members 17 also includes a rim 17e at the end thereof. Even after the disc 100 has been released, the rim 17e still overhangs a portion of the projection area of the disc. Accordingly, even if the disc cartridge has been loaded into the disc drive 200 that is supposed to mount the disc 100 thereon vertically, the disc 100 will not drop down from the disc cartridge.

The disc cartridge of this embodiment has all the features of the sixth embodiment described above. In addition, the disc holding members 17 may form integral parts of the cartridge lower shell 11. Thus, the disc cartridge can have a simplified structure and its manufacturing cost can be reduced.

Embodiment 8

Hereinafter, a disc cartridge 308 according to an eighth embodiment of the present invention will be described with reference to the drawings.

Figure 23:
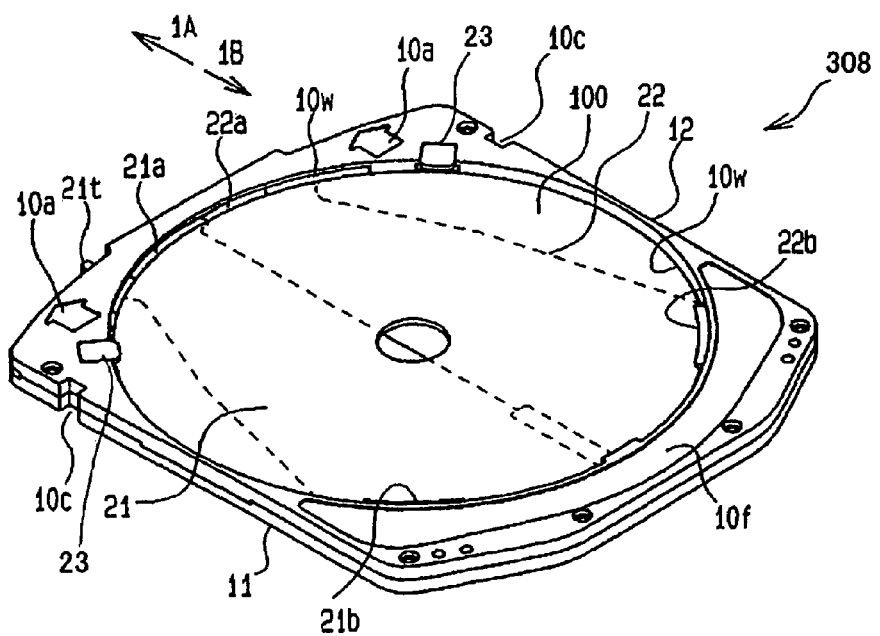
FIG. 23 is a perspective view illustrating an overall configuration for a disc cartridge according to an eighth embodiment.
Figure 24:
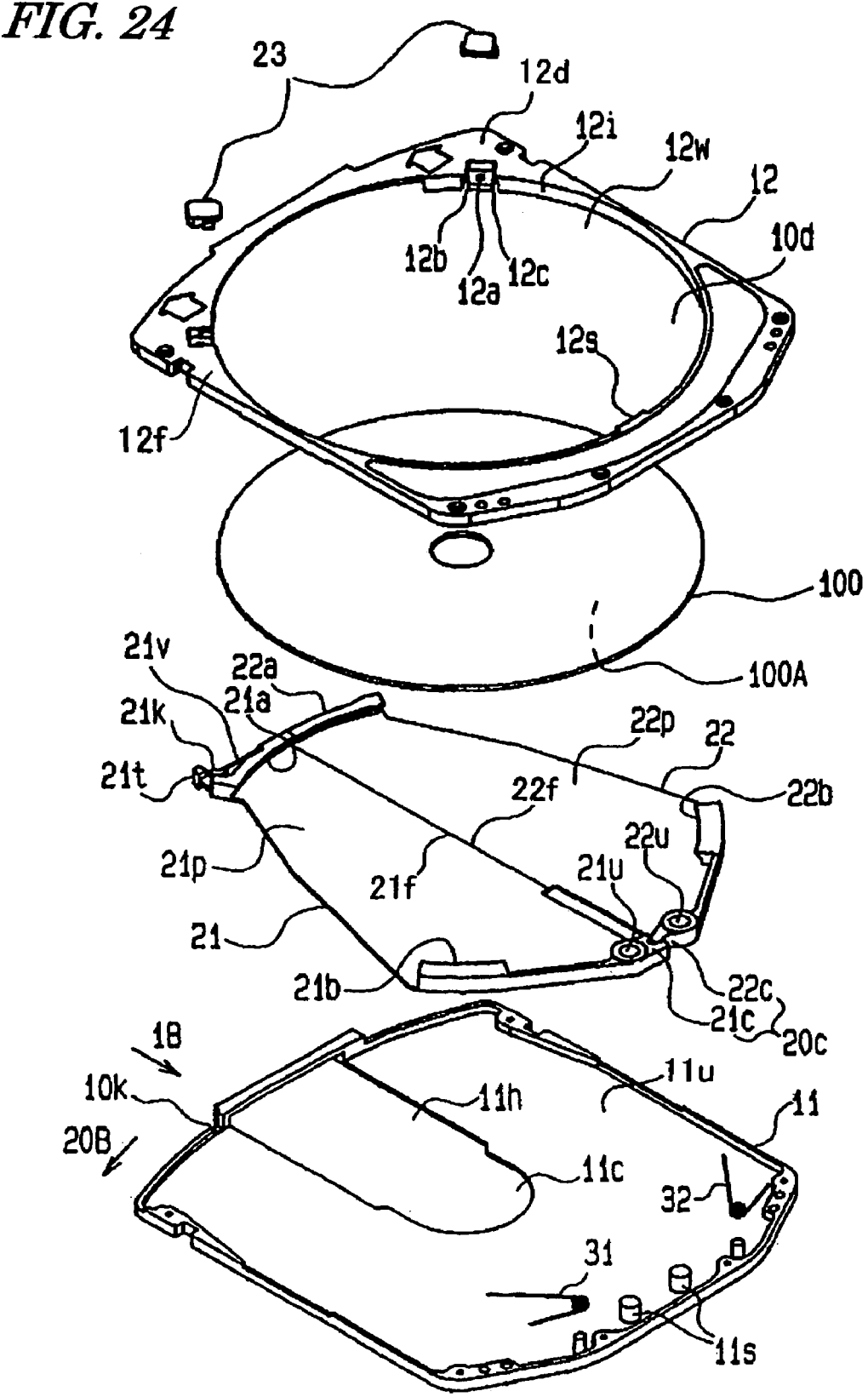
FIG. 24 is an exploded perspective view illustrating an exploded state of the disc cartridge shown in FIG. 23.

First, the structure of the disc cartridge 308 will be outlined with reference to FIGS. 23 and 24. As in the first embodiment, the disc 100 shown in FIGS. 23 and 24 also includes first and second sides. The first side of the disc, on which its label, for example, is normally printed, is illustrated in FIG. 23, while the second side of the disc 100, i.e., the signal recording side 100A, is illustrated as the back surface in FIG. 24.

As shown in FIGS. 23 and 24, the disc cartridge 308 includes a cartridge lower shell 11, a cartridge upper shell 12, a pair of shutters 21 and 22 and stopper members 23.

As shown in FIG. 24, the cartridge lower shell 11 includes a chucking opening 11c and a head opening 11h. The chucking opening 11c is provided to allow a chucking member (e.g., a spindle motor for rotating the disc 100) to enter the disc cartridge 308 externally. The head opening 11h is provided to allow a head, which reads and/or writes a signal from/on the signal recording side 100A of the disc 100, to enter the disc cartridge 308 and access the signal recording side 100A. The cartridge lower shell 11 faces the signal recording side 100A of the disc 100. Also, the head opening 11h reaches a side surface of the cartridge lower shell 11.

The cartridge upper shell 12 includes a circular disc window 12w, through which the disc 100 can be introduced and removed into/from the disc cartridge 308 and which expands over the entire projection area of the disc 100 to expose the upper surface of the disc. The cartridge upper and lower shells 12 and 11 are adhered or welded together at their outer periphery, thereby forming a cartridge body 10.

A disc storage portion 10d for storing the disc 100 therein is defined by a first inner surface 11u of the cartridge lower shell 11 and a second inner surface 12i of the cartridge upper shell 12. The first inner surface 11u is opposed to the signal recording side 100A of the disc 100, while the second inner surface 12i has a substantially cylindrical shape and defines the disc window 12w inside. That is to say, the first inner surface 11u becomes the bottom of the disc storage portion 10d.

In the disc storage portion 10d, a gap, which is wide enough to allow the disc 100 to rotate freely, is provided between the second inner surface 12i and the disc 100. Also, the top of the disc storage portion 10d is the disc window 12w so that the disc 100 stored in the disc storage portion 10d has one side thereof exposed through the disc window 12w.

The stopper members 23 are provided in a removable state for the cartridge upper shell 12 so as to partially protrude into the disc window 12w. In this embodiment, two stopper members 23 are provided as shown in FIGS. 23 and 24. On the other hand, a stopper portion 12s is provided for the cartridge upper shell 12 so as to protrude into the disc window 12w. The stopper portion 12s forms an integral part of the cartridge upper shell 12. The two stopper members 23 and the stopper portion 12s are arranged approximately at regular intervals around the circumference of the disc window 12w for the purpose of preventing the disc 100 from dropping down from the disc window 12w. These stopper members 23 and stopper portion 12s can prevent the dropping particularly effectively when this disc cartridge is vertically loaded into a disc drive and used.

The shutters 21 and 22 are disposed between the signal recording side 100A of the disc 100 and the inner surface 11u of the disc storage portion 10d. The shutters 21 and 22 include rotation holes 21u and 22u, respectively. These rotation holes 21u and 22u are engaged in a freely rotatable state with a pair of rotation shafts 11s, which is located outside of the disc storage portion 10d of the cartridge body 10 and opposite to the head opening 11h. Thus, the shutters 21 and 22 rotate on the rotation shafts 11s in such a manner as to expose or cover the chucking and head openings 11c and 11h.

A cam 21c and a follower 22c are provided near the rotation holes 21u and 22u of the shutters 21 and 22, respectively. The cam 21c and the follower 22c have mutually engaging shapes and together make up an interlocking mechanism 20c for opening and closing the shutters 21 and 22 while interlocking them with each other.

The respective surfaces of the shutters 21 and 22, which are opposed to the signal recording side 100A of the disc, are covered with protective layers 21p and 22p for the purpose of preventing the disc 100 from getting scratched or any dust from entering the signal recording side 100A thereof.

The protective layers 21p and 22p may be appropriately selected from the group consisting of an anti-scratching nonwoven fabric, a dustproof nonwoven fabric, an anti-scratching coating layer and a dustproof coating layer. In this embodiment, sheets of a dustproof nonwoven fabric are adhered or ultrasonic welded as the protective layers 21p and 22p.

Shutter springs 31 and 32 are provided outside of the disc storage portion 10d for the shutters 21 and 22, respectively. These springs 31 and 32 apply an elastic force to the shutters 21 and 22 in such a direction as to close the shutters 21 and 22. Optionally, the elastic force may also be applied from any other type of elastic members to the shutters 21 and 22 in that closing direction.

As shown in FIG. 24, the disc cartridge 308 includes disc holding portions 21a, 21b, 22a and 22b at both ends of the shutters 21 and 22. Each of these disc holding portions 21a, 21b, 22a and 22b has a downwardly tapered slope at the end of the shutter 21 or 22 to grip the outer edge of the disc 100 while the shutters 21 and 22 are closed. The structure and operation of the disc holding portions 21a, 21b, 22a and 22b will be described in further detail later.

As shown in FIG. 23, the upper surface of the cartridge body 10 (or the cartridge upper shell 12) has a label plane 10f, on which the contents that have been written on the disc 100 being stored can be noted down, and embossed arrow marks (or concave portions) 10a that indicate the direction (the arrow 1A) in which this disc cartridge 308 should be inserted into a disc drive. In addition, two concave portions 10c are further provided on two of the side surfaces of the cartridge body 10 that are parallel to the direction 1A in which the cartridge body 10 is inserted. These concave portions 10c may be used as either pull-in notches or positioning recesses when the disc cartridge 308 is loaded into a disc drive or when the cartridge 308 is stored in a changer.

Figure 25:
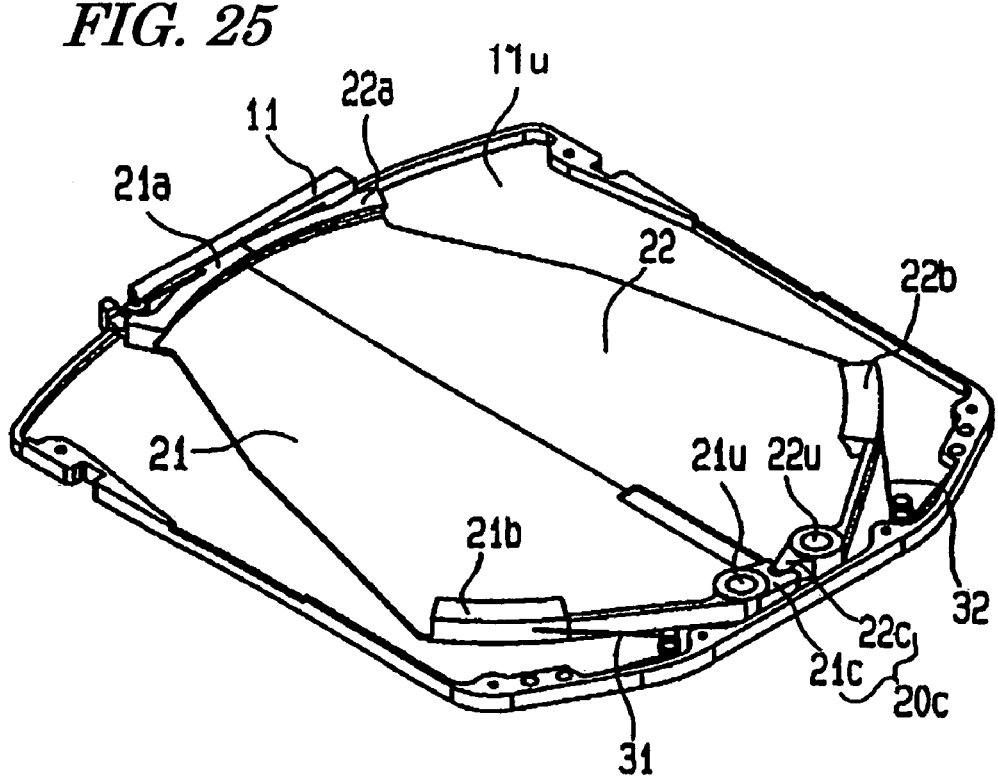
FIG. 25 is a perspective view illustrating a state of the disc cartridge shown in FIG. 23 in which its shutters are closed with its cartridge upper shell and the disc removed.

FIG. 25 is a perspective view illustrating a state where the shutters 21 and 22 cover the chucking and head openings 11c and 11h with the cartridge upper shell 12 and the disc 100 removed. In FIG. 25, the disc holding portions 21a, 21b, 22a and 22b of the shutters 21 and 22 are located at such positions as to grip the outer edge of the disc 100 (not shown).

Figure 26:
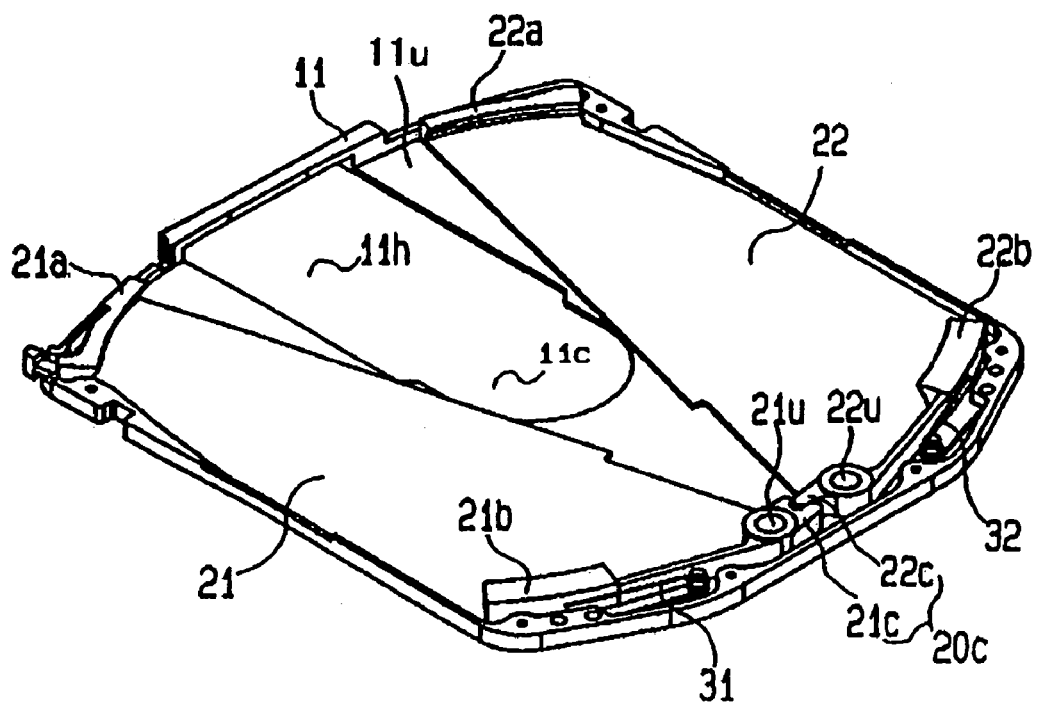
FIG. 26 is a perspective view illustrating a state of the disc cartridge shown in FIG. 23 in which its shutters are opened with its cartridge upper shell and the disc removed.

FIG. 26 is a perspective view illustrating a state where the shutters 21 and 22 expose the chucking and head openings 11c and 11h with the cartridge upper shell 12 and the disc 100 removed. As a result of the rotation of the shutters 21 and 22 on their rotation holes 21u and 22u, respectively, the chucking and head openings 11c and 11h are now exposed. Also, as the shutters 21 and 22 have rotated, the disc holding portions 21a, 21b, 22a and 22b have also rotated on the rotation holes 21u and 22u. Consequently, the disc holding portions 21a, 21b, 22a and 22b are now separated from the outer edge of the disc 100 (not shown).

Figure 27:
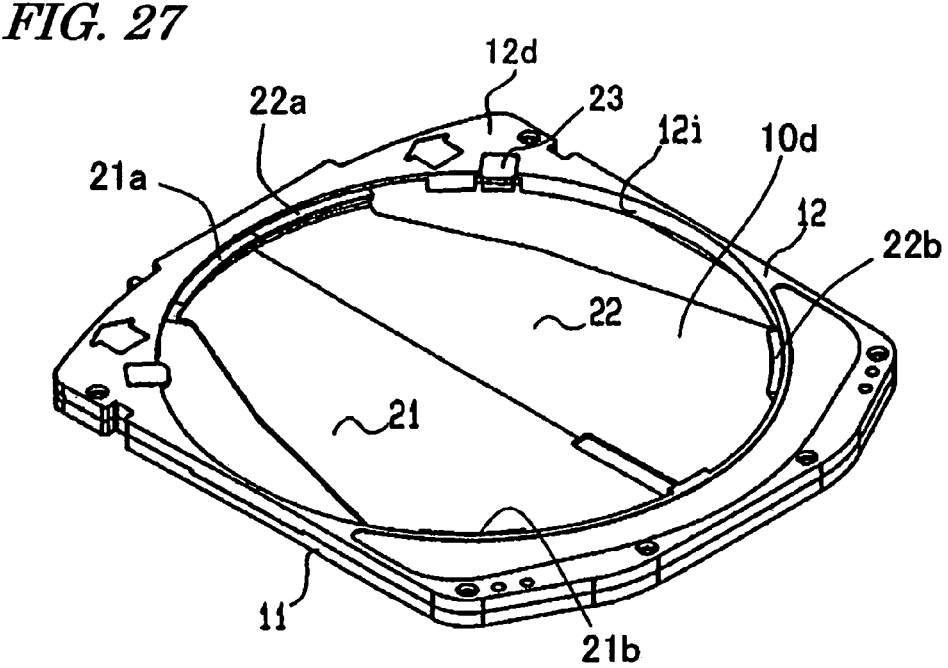
FIG. 27 is a perspective view illustrating a state of the disc cartridge shown in FIG. 23 in which its shutters are closed with the disc removed.
Figure 28:
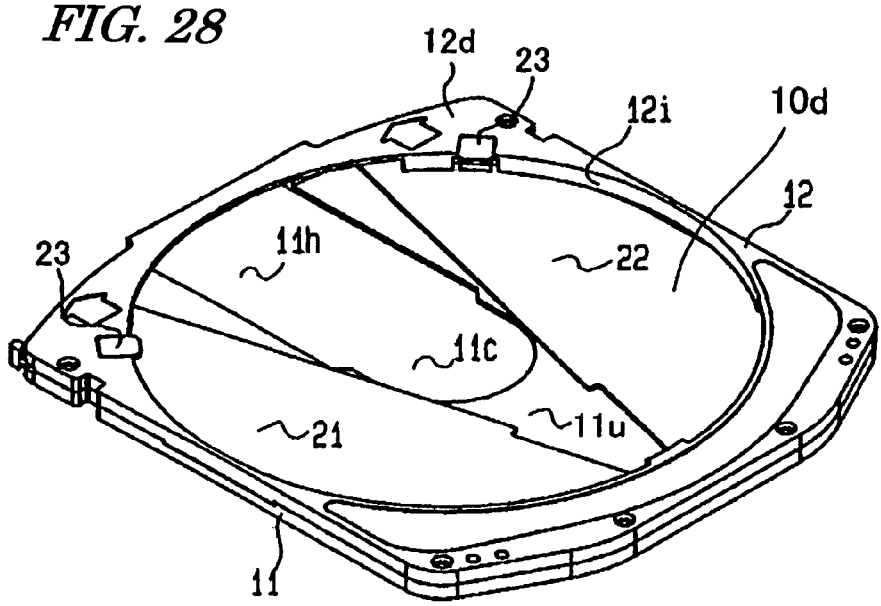
FIG. 28 is a perspective view illustrating a state of the disc cartridge shown in FIG. 23 in which its shutters are opened with the disc removed.

FIG. 27 is a perspective view illustrating a state where the shutters 21 and 22 cover the chucking and head openings 11c and 11h with the disc 100 removed. As shown in FIG. 27, the disc holding portions 21a, 21b, 22a and 22b protrude into the disc storage portion 10d to hold the disc 100 (not shown) thereon. On the other hand, FIG. 28 is a perspective view illustrating a state where the shutters 21 and 22 expose the chucking and head openings 11c and 11h with the disc 100 removed. As shown in FIG. 28, while the shutters 21 and 22 are opened, the disc holding portions 21a, 21b, 22a and 22b are stored outside of the disc storage portion 10d of the cartridge body.

Figure 29:
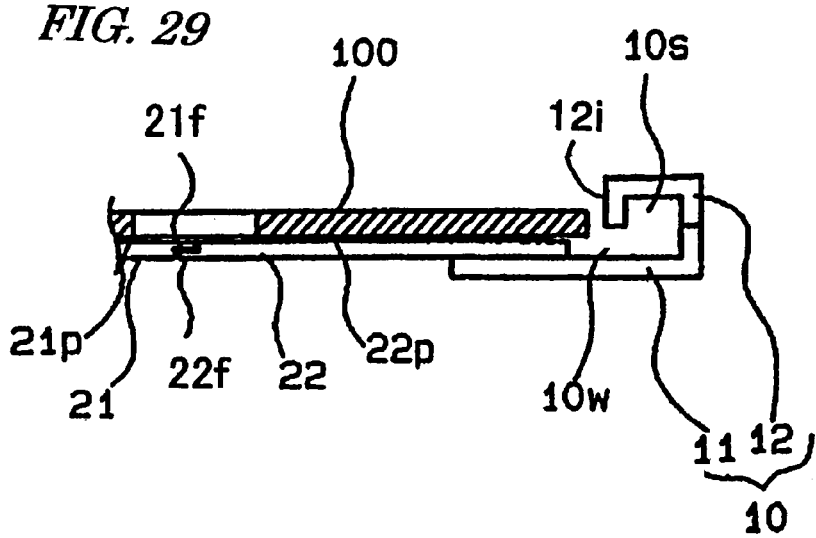
FIG. 29 is a partial cross-sectional view illustrating a cross section of the disc cartridge shown in FIG. 23 that passes the center of the disc.

Next, the structure and the operation of the shutters 21 and 22 will be described in further detail with reference to FIGS. 29, 30 and 31. FIG. 29 is a cross-sectional view as viewed along a plane that passes the center of the disc 100. As shown in FIG. 29, the second inner surface 12i of the disc storage portion 10d of the cartridge body 10 is provided with a notch 10w so as not to interfere with the opening and closing operations of the shutter 22 or 21. Also, the cartridge body 10 further includes a shutter storage portion 10s for storing a portion of the shutter 22 or 21 being opened. Furthermore, at least the edge portions 21f and 22f of the shutters 21 and 22, which are butted against each other over the head and chucking openings 11h and 11c while the shutters are closed, overlap with each other in the thickness direction of the disc 100 as shown in FIG. 29.

Figure 30:
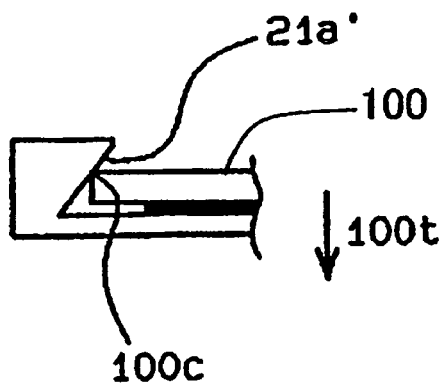
FIG. 30 is a cross-sectional view illustrating a portion of the shutter of the disc cartridge shown in FIG. 23.

On the other hand, as shown in FIG. 30, each of the disc holding portions 21a, 21b, 22a and 22b includes a slope 21a', 21b', 22a' or 22b', which overhangs a portion of the projection area of the disc and overlaps with the outer edge of the disc 100. That is to say, the slope 21a' has a downwardly tapered shape and leans toward the disc 100. While the chucking and head openings 11o and 11h are covered with the shutters 21 and 22, the slope 21a' is allowed to contact with the outer edge 100c of the disc 100, thereby gripping the disc 100 thereon and pressing the disc 100 in the thickness direction 100t. In this manner, the signal recording side 100A is brought into plane contact with the sheets 21p and 22p of the shutters 21 and 22 and the disc 100 is held and fixed onto the cartridge body 10. In such a state, the signal recording side 100A of the disc 100 is in close contact with the sheets 21p and 22p. Thus, no dust will be deposited on the signal recording side 100A.

Also, if the exposed side of the disc 100 is rotated manually or if the shutters 21 and 22 are opened or closed intentionally, then dust, finger marks or any other dirt that has adhered onto the signal recording side 100A of the disc 100 may be wiped away.

Figure 31:
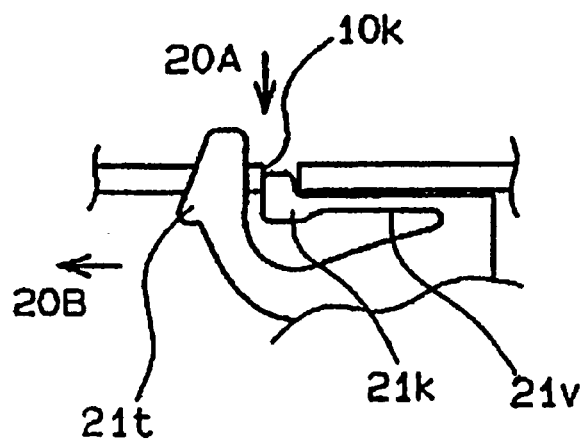
FIG. 31 is a partial plan view illustrating an operating portion and its surrounding portion of the disc cartridge shown in FIG. 23.

Furthermore, as shown in FIG. 31, the shutter 21 includes a shutter opening/closing portion 21t, an elastic portion 21v and a locking protrusion portion 21k. These portions 21t, 21v and 21k form integral parts of the shutter 21. Specifically, the shutter opening/closing portion 21t is for use to open and close the shutters externally. The locking protrusion portion 21k is connected to the shutter 21 by way of the elastic portion 21v. While the shutter 21 covers the chucking and head openings 11c and 11h, the locking protrusion portion 21k, to which an elastic force is being applied from the elastic portion 21v, engages with a locking hole 10k of the cartridge body 10, thereby preventing the shutter 21 from rotating and fixing and supporting the shutter 21 to the cartridge body 10 as shown in FIG. 31. When the shutter 21 is fixed, the other shutter 22, which is interlocked with the shutter 21 via the interlocking mechanism 20c, is also fixed.

Accordingly, only by getting the locking protrusion portion 21k pressed externally by a protrusion, for example, in the direction indicated by the arrow 20A and disengaged from the locking hole 10k while pressing the opening/closing portion 21t in the direction indicated by the arrow 20B at the same time, the shutters 21 and 22 can be rotated to expose the chucking and head openings 11c and 11h and the disc 100 can be released from the disc holding portions 21a, 21b, 22a and 22b. Thus, it is possible to prevent the operator from removing the disc accidentally.

Figure 32:
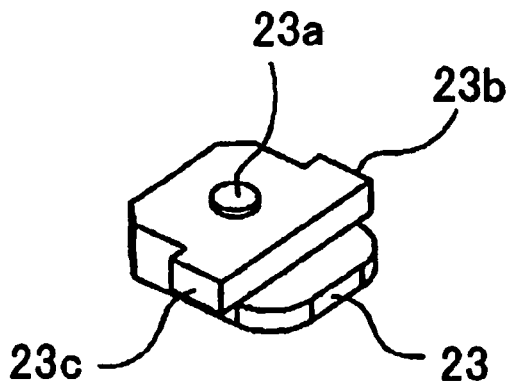
FIG. 32 is a perspective view illustrating a stopper member of the disc cartridge shown in FIG. 23.

Next, the structure and operation of the stopper members 23 will be described in further detail with reference to FIGS. 24 and 32. FIG. 32 is a perspective view illustrating the removable stopper member 23 upside down. The convex portions 23a, 23b and 23c of the stopper member 23 are respectively engaged with concave portions 12a, 12b and 12c provided for the cartridge upper shell 12 near the disc window 12w thereof as shown in FIG. 24. Thus, the stopper member 23 can be removed from the cartridge upper shell 12.

Figure 33:
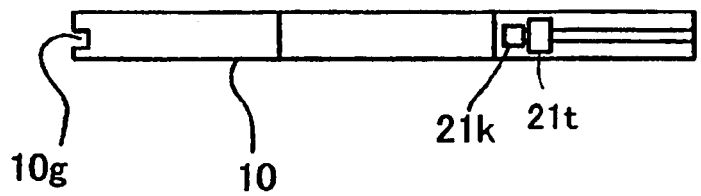
FIG. 33 is a front view of the disc cartridge shown in FIG. 23 as viewed from a direction in which the cartridge is inserted into a drive.

Next, a mechanism for preventing the erroneous insertion of the disc cartridge 308 into a disc drive will be described in further detail with reference to FIG. 33. FIG. 33 is a front view of the disc cartridge 308 shown in FIG. 23 as viewed in the direction in which the disc cartridge 308 is inserted into a disc drive (i.e., arrow 1B). As shown in FIG. 33, the cartridge body 10 includes a concave portion 10g on one side surface thereof and is asymmetric in the direction 1A in which the disc cartridge 308 is inserted into the disc drive (see FIG. 23). The concave portion 10g is not located at the center of thickness.

According to such a structure, only when a convex portion, provided for the disc drive, is fitted with this concave portion 10g, the disc cartridge 308 can be inserted into the disc drive correctly and the disc drive can operate normally.

Stated otherwise, even if one tries to insert the disc cartridge 308 into the disc drive upside down by mistake, he or she cannot insert the cartridge 308 into the disc drive. This is because the convex portion of the disc drive interferes with the opposite side surface with no concave portion 10g. Also, even if one tries to insert the disc cartridge 308 into the disc drive upside down and in the wrong way by mistake, he or she cannot insert the cartridge 308 into the disc drive, either. This is because the convex portion of the disc drive also interferes with the non-recessed portion of the side surface with the concave portion 10g. Thus, the erroneous insertion can be prevented.

The disc cartridge 308 of this embodiment may be modified in various manners.

For example, the thickness of the cartridge body 10 may be further reduced to such an extent that the stopper members 23 will not protrude from the upper surface 12f of the cartridge upper shell 12 (see FIG. 24) while the shutters 21 and 22 are closed. On the other hand, while the shutters 21 and 22 are opened, the stopper members 23 may be protruded from the upper surface 12f of the cartridge upper shell 12 in the following manner. Specifically, as the shutters 21 and 22 are going to be opened, the disc holding portions 21a and 22a, for example, may push the convex portions 23a of the stopper members 23 upward while passing under the stopper members 23. Then, the stopper members 23 are protruded from the upper surface 12f of the cartridge upper shell 12. According to such a structure, a sufficiently broad space can be allowed the disc 100 to rotate inside the disc storage portion 10d and yet the disc cartridge can have its thickness further reduced.

Also, the stopper members 23 may form integral parts of the cartridge body 10. In that case, the stopper members 23 may be able to be folded and unfolded.

Furthermore, the shutter springs 31 and 32 may apply an elastic force in such a direction as to open the shutters 21 and 21. If the shutters can operate almost completely synchronously by way of the interlocking mechanism, just one of the shutter springs 31 and 32 may be provided.

The locking protrusion portion 21k forms an integral part of the shutter 21. Alternatively, a locking lever, including a locking protrusion portion and a convex portion at the end thereof, may be connected to the cartridge body 10 via an elastic portion, and an associated concave portion may be provided for the shutter so that the convex and concave portions engage with each other. In that case, by pressing the locking protrusion portion through a locking hole of the cartridge body, these convex and concave portions may be disengaged from each other so as to allow the shutters to rotate freely. Optionally, the locking lever, as well as the shutter springs (i.e., elastic members), may be resin springs that form integral parts of the cartridge body 10.

Embodiment 9

Hereinafter, a disc cartridge 309 according to a ninth embodiment of the present invention will be described with reference to the drawings.

Figure 34:
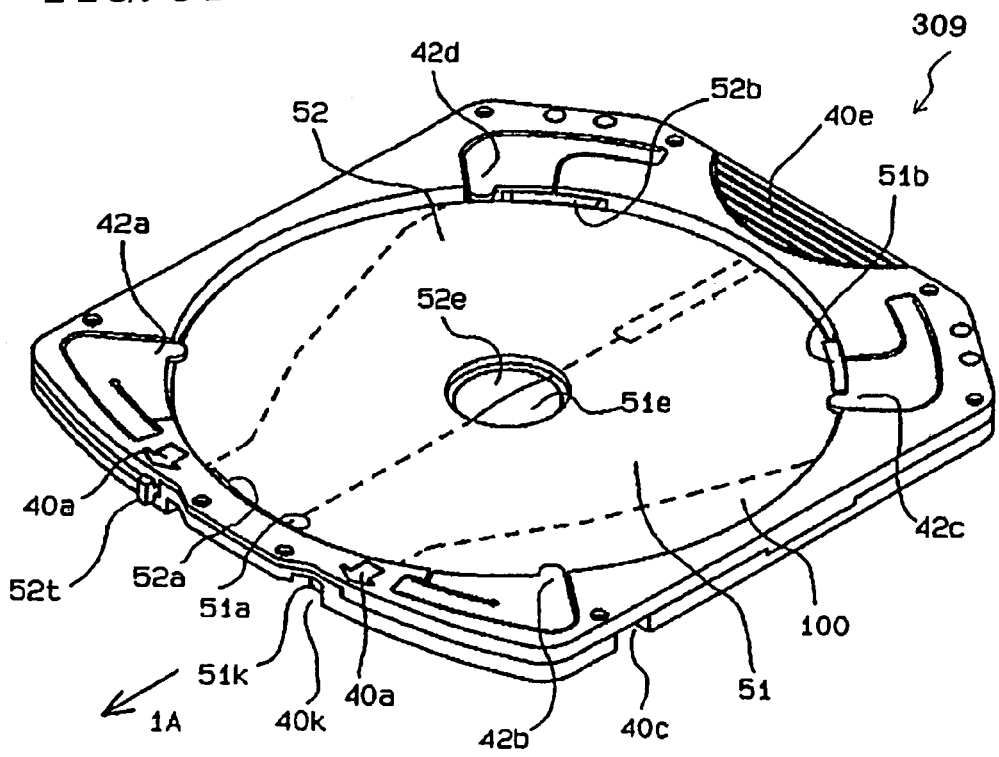
FIG. 34 is a perspective view illustrating an overall configuration for a disc cartridge according to a ninth embodiment of the present invention.
Figure 35:
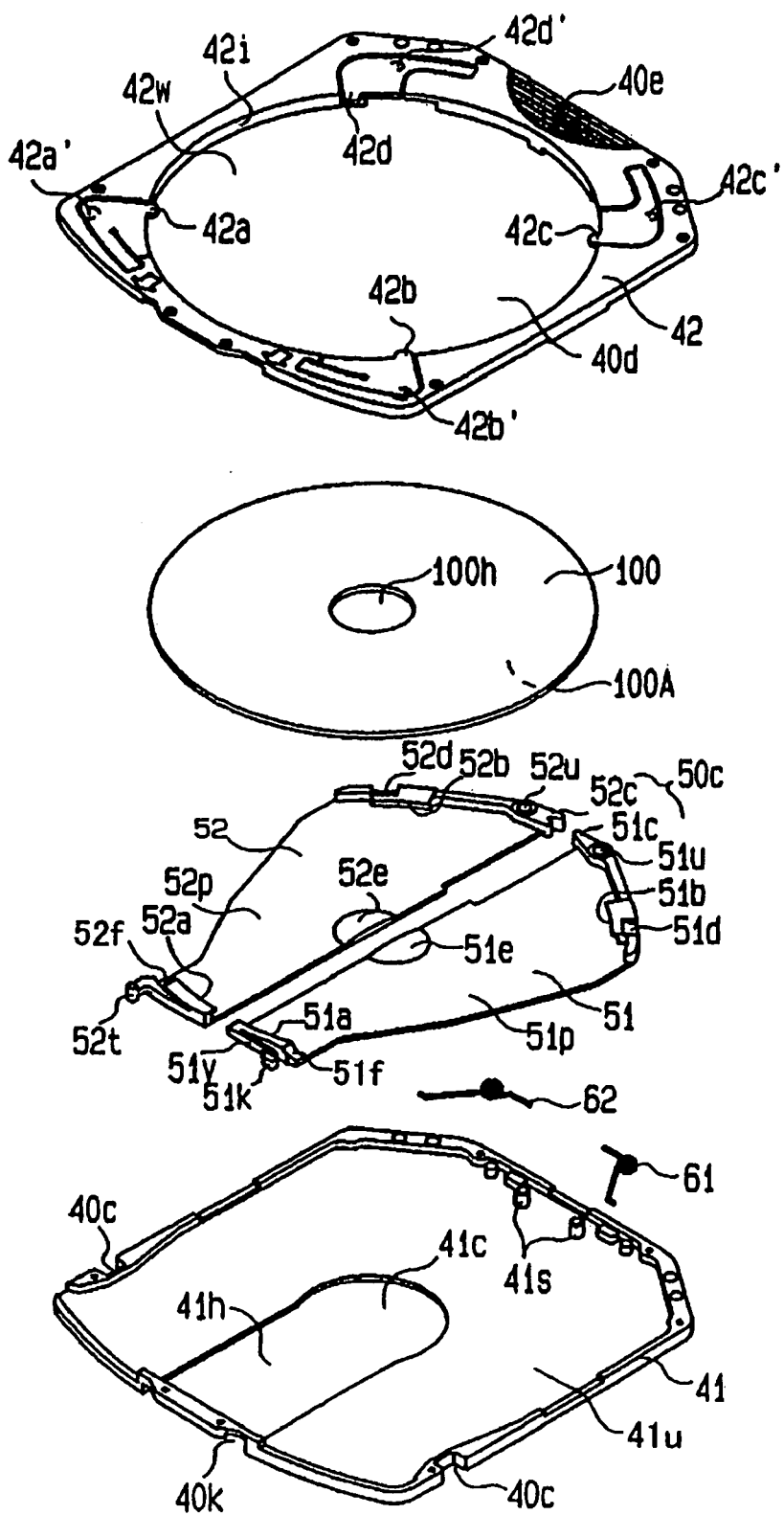
FIG. 35 is an exploded perspective view illustrating an exploded state of the disc cartridge shown in FIG. 34.

As shown in FIGS. 34 and 35, the disc cartridge 309 includes a cartridge lower shell 41, a cartridge upper shell 42, stopper members 42a, 42b, 42c and 42d, and a pair of shutters 51 and 52.

As shown in FIG. 35, the cartridge lower shell 41 includes a chucking opening 41c and a head opening 41h. The chucking opening 41c is provided to allow a chucking member (e.g., a spindle motor for rotating the disc 100) to enter the disc cartridge 309 externally. The head opening 41h is provided to allow a head, which reads and/or writes a signal from/on the signal recording side 100A of the disc 100, to enter the disc cartridge 309 and access the signal recording side 100A. The cartridge lower shell 41 faces the signal recording side 100A of the disc 100. Also, the head opening 41h reaches one side surface of the cartridge lower shell 41.

The cartridge upper shell 42 includes a circular disc window 42w, through which the disc 100 can be introduced and removed into/from the disc cartridge 309 and which expands over the entire projection area of the disc 100 to expose the upper surface of the disc. The cartridge upper and lower shells 42 and 41 are adhered or welded together at their outer periphery, thereby forming a cartridge body 40.

A disc storage portion 40d for storing the disc 100 therein is defined by a first inner surface 41u of the cartridge lower shell 41 and a second inner surface 42i of the cartridge upper shell 42. The first inner surface 41u is opposed to the signal recording side 100A of the disc 100, while the second inner surface 42i has a substantially cylindrical shape and defines the disc window 42w inside. That is to say, the first inner surface 41u becomes the bottom of the disc storage portion 40d.

In the disc storage portion 40d, a gap, which is wide enough to allow the disc 100 to rotate freely, is provided between the second inner surface 42i and the disc 100. Also, the top of the disc storage portion 40d is the disc window 42w so that the disc 100 stored in the disc storage portion 40d has one side thereof exposed through the disc window 42w.

The stopper members 42a, 42b, 42c and 42d form integral parts of the cartridge upper shell 42 so as to partially protrude into the disc window 42w. Each of these stopper members 42a, 42b, 42c and 42d is separated from the cartridge upper shell 42 via a slit. These stopper members 42a, 42b, 42c and 42d are used to prevent the disc 100 from dropping down from the disc window 42w. The stopper members 42a, 42b, 42c and 42d can prevent the dropping particularly effectively when the disc cartridge is vertically loaded into a disc drive and used. Optionally, these stopper members 42a, 42b, 42c and 42d may be integrated with the cartridge upper shell 42 by way of elastic members.

The shutters 51 and 52 are disposed between the signal recording side 100A of the disc 100 and the inner surface 41u of the disc storage portion 40d. The shutters 51 and 52 include rotation holes 51u and 52u, respectively. These rotation holes 51u and 52u are engaged in a freely rotatable state with a pair of rotation shafts 41s, which is located outside of the disc storage portion 40d of the cartridge body 40 and opposite to the head opening 41h. Thus, the shutters 51 and 52 rotate on the rotation shafts 41s in such a manner as to expose or cover the chucking and head openings 41c and 41h.

A cam 51c and a follower 52c are provided near the rotation holes 51u and 52u of the shutters 51 and 52, respectively. The cam 51c and the follower 52c have mutually engaging shapes and together make up an interlocking mechanism 50c for opening and closing the shutters 51 and 52 while interlocking them with each other.

The respective surfaces of the shutters 51 and 52, which are opposed to the signal recording side 100A of the disc, are covered with protective layers 51p and 52p for the purpose of preventing the disc 100 from getting scratched or any dust from reaching the signal recording side 100A thereof.

The protective layers 51p and 52p may be appropriately selected from the group consisting of an anti-scratching nonwoven fabric, a dustproof nonwoven fabric, an anti-scratching coating layer and a dustproof coating layer. In this embodiment, sheets of a dustproof nonwoven fabric are adhered or ultrasonic welded as the protective layers 51p and 52p.

Shutter springs 61 and 62 are provided outside of the disc storage portion 40d for the shutters 51 and 52, respectively. These springs 61 and 62 apply an elastic force to the shutters 51 and 52 in such a direction as to close the shutters 51 and 52. Alternatively, the shutter springs 61 and 62 may apply an elastic force to the shutters 51 and 52 in such a direction as to open the shutters 51 and 52. Also, if the shutters can operate almost completely synchronously by way of the interlocking mechanism, only one of the shutter springs 61 and 62 may be provided.

As in the eighth embodiment, the shutters 51 and 52 include disc holding portions 51a, 51b, 52a and 52b at the ends thereof as shown in FIG. 35. Furthermore, as will be described in detail later, convex portions 51e and 52e are provided on respective regions of the shutters 51 and 52 so as to be located under the center hole of the disc 100.

As shown in FIG. 34, the upper surface of the cartridge body 40 (or the cartridge upper shell 42) has embossed arrow marks (or concave portions) 40a that indicate the direction (the arrow 1A) in which the disc cartridge 309 is inserted into a disc drive. The cartridge body 40 further includes two concave portions 40c on a pair of its side surfaces that are parallel to the inserting direction 1A. These concave portions 40c may be used as either pull-in notches or positioning recesses when the disc cartridge 309 is loaded into a disc drive or when the cartridge 309 is stored in a changer. Optionally, just one side surface of the cartridge 309 may include the concave portion 40c. In that case, the concave portion 40c may be used as a mechanism for preventing erroneous (e.g., upside down) insertion when the disc cartridge 309 is inserted or loaded into a disc drive. The upper surface of the cartridge body 40 further includes a grip portion 40e that allows the operator to grip this disc cartridge 309. This grip portion 40e has an antislip embossed shape.

Figure 36:
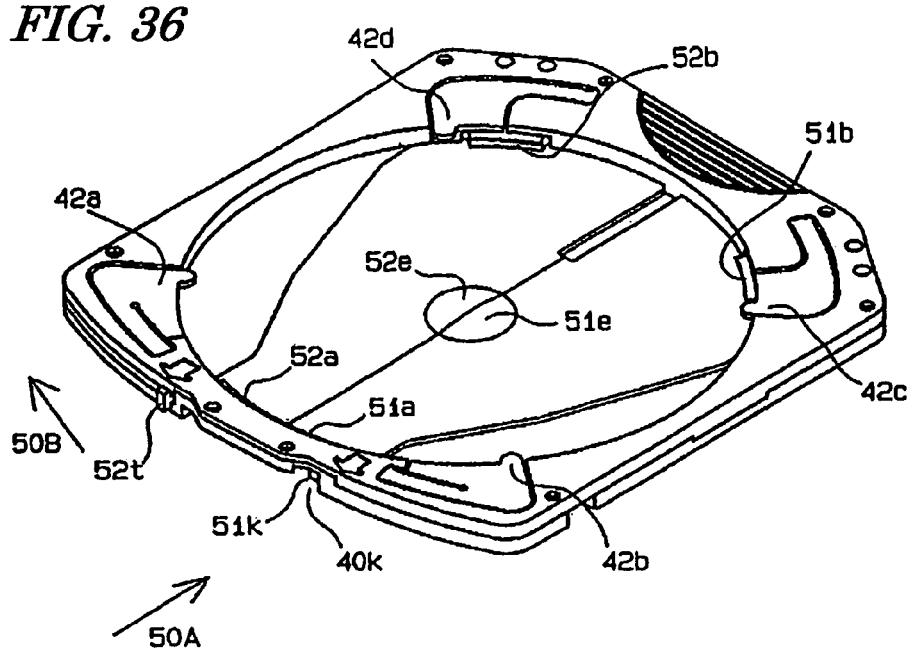
FIG. 36 is a perspective view illustrating a state of the disc cartridge shown in FIG. 34 in which its shutters are closed with the disc removed.
Figure 37:
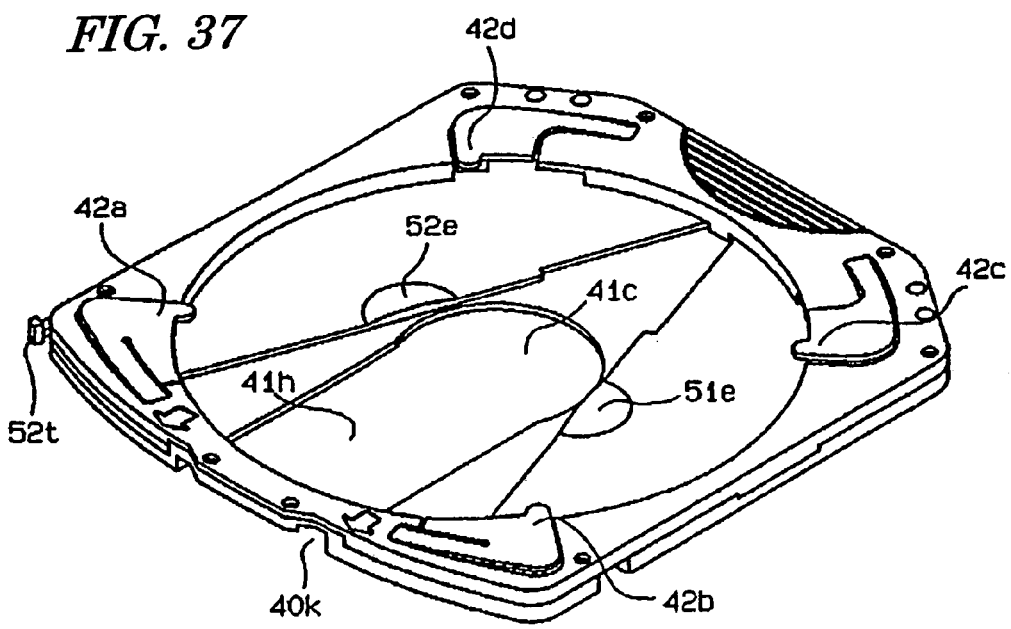
FIG. 37 is a perspective view illustrating a state of the disc cartridge shown in FIG. 34 in which its shutters are opened with the disc removed.

FIG. 36 is a perspective view illustrating a state where the shutters 51 and 52 cover the chucking opening 41c and the head opening 41h with the disc 100 removed. FIG. 37 is a perspective view illustrating a state where the shutters 51 and 52 expose the chucking opening 41c and the head opening 41h with the disc 100 removed.

Hereinafter, the structure and the operation of the shutters 51 and 52 will be described in further detail. As shown in FIGS. 34 and 35, the disc holding portions 51a, 51b, 52a and 52b provided for the shutters 51 and 52 also have such a shape as including a slope that tilts in such a manner as to overhang the projection area of the disc and to overlap with the outer periphery of the disc 100 as in the eighth embodiment. That is to say, the slope is downwardly tapered and leans toward the disc 100. Thus, the same effects as those of the eighth embodiment are also achieved.

Also, the shutter 52 includes an opening/closing portion 52t for use to open and close the shutters externally, while the shutter 51 includes an elastic portion 51v and a locking protrusion portion 51k as integral parts thereof. The locking protrusion portion 51k is connected to the shutter 51 by way of the elastic portion 51v. Thus, while the chucking and head openings 41c and 41h are covered with the shutters 51 and 52, the locking protrusion portion 51k, to which an elastic force is applied from the elastic portion 51v, engages with a locking hole 40k of the cartridge body 40, thereby fixing and supporting the shutter 51 in a non-rotatable state to the cartridge body 40. When the shutter 51 is fixed, the other shutter 52, which is interlocked with the shutter 51 via the interlocking mechanism 50c, is also fixed.

Accordingly, only by getting the locking protrusion portion 51k pressed externally by a protrusion, for example, in the direction indicated by the arrow 50A and disengaged from the locking hole 40k while pressing the opening/closing portion 52t in the direction indicated by the arrow 50B at the same time as shown in FIG. 36, the shutters 51 and 52 can be rotated to expose the chucking and head openings 41c and 41h and the disc 100 can be released from the disc holding portions 51a, 51b, 52a and 52b. Thus, it is possible to prevent the operator from removing the disc 100 accidentally.

Also, unlike the eighth embodiment, the locking protrusion portion 51k and the opening/closing portion 52t are provided for the two different shutters 51 and 52. Such a structure is particularly effective for a disc cartridge for a disc of a small diameter. This is because a disc cartridge for a disc of a small diameter and the shutters thereof should have relatively small sizes and it is normally difficult to provide the locking protrusion portion and opening/closing portion for a single shutter out of design considerations. Also, even when a single shutter can include both the locking protrusion portion and the opening/closing portion, a very narrow gap would be allowed between a shutter opening/closing mechanism and an unlocking mechanism on the disc drive side or these two mechanisms need to be provided within a very limited space, thus making it hard to design the disc drive as intended.

The locking protrusion portion 51k forms an integral part of the shutter 51. Alternatively, a locking lever, including a locking protrusion portion and a convex portion at the end thereof, may be connected to the cartridge body 40 by way of an elastic portion, and an associated concave portion may be provided for the shutter so that the convex and concave portions engage with each other. In that case, by pressing the locking protrusion portion through a locking hole of the cartridge body, these convex and concave portions may be disengaged from each other so as to allow the shutters to rotate freely. Optionally, in that case, the locking lever, as well as the shutter springs (i.e., elastic members), may be resin springs that form integral parts of the cartridge body 40.

Figure 38:
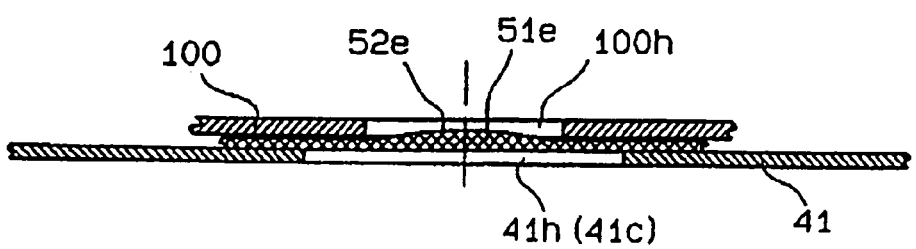
FIG. 38 is a partial cross-sectional view illustrating a cross section of the disc cartridge shown in FIG. 34 that passes the center of the disc to show a state where its shutters are closed.

Next, it will be described how the convex portions 51e and 52e on the shutters 51 and 52 work. FIG. 38 is a cross-sectional view illustrating the center of the disc and its surrounding portions as viewed along a plane that passes the center of the disc 100. As shown in FIG. 38, while the shutters 51 and 52 are closed, the convex portions 51e and 52e protrude into the center hole 100h and the disc 100 is now in plane contact with the shutters 51 and 52.

Figure 39:
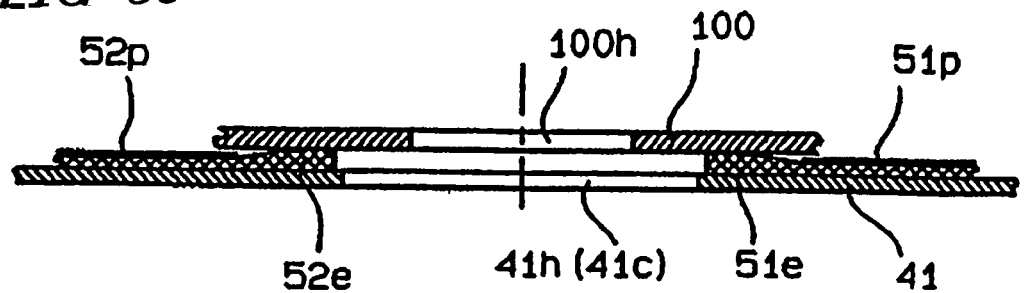
FIG. 39 is a partial cross-sectional view illustrating a cross section of the disc cartridge shown in FIG. 34 that passes the center of the disc to show a state where its shutters are opened.

As shown in FIG. 39, while the shutters 51 and 52 are going to be opened, the convex portions 51e and 52e slide from inside the center hole 10h into under the lower surface of the disc 100, thereby lifting the disc 100 and bringing the disc 100 out of plane contact with the shutters 51 and 52. In this manner, while the shutters 51 and 52 are going to be opened or closed, the signal recording side 100A will not get scratched by the shutters 51 and 52. Also, it is inside the signal recording area of the signal recording side 100A that the convex portions 51e and 52e move along with the shutters 51 and 52 being opened or closed. Accordingly, the convex portions 51e and 52e never contact with, or scratch, the signal recording area.

Figure 40:
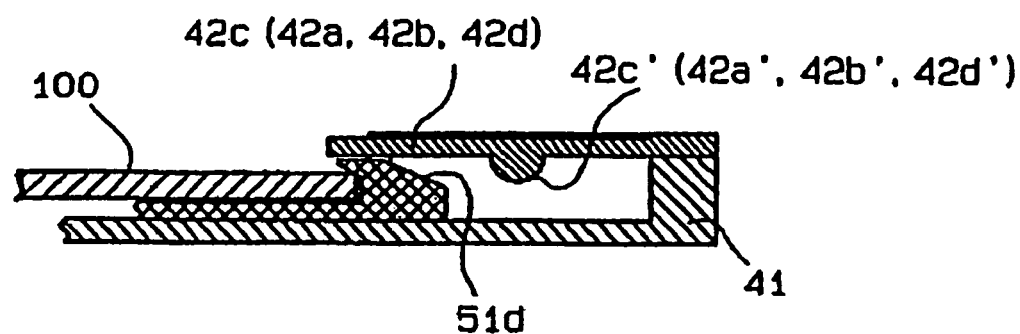
FIG. 40 is a cross-sectional view illustrating a disc outer peripheral cross section of the disc cartridge shown in FIG. 34 that passes the center of the disc to show a state where its shutters are closed.

Next, the structure and operation of the stopper members will be described with reference to FIGS. 40 and 41. FIG. 40 is a cross-sectional view illustrating a portion surrounding the disc outer periphery as viewed along a plane that passes the center of the disc 100. A convex portion 42c', (42a', 42b' or 42d') has been formed on the bottom of the stopper member 42c, (42a, 42b or 42d). While the shutters 51 and 52 are closed, the stopper member 42c is substantially parallel to the disc 100 and falls within the thickness of the cartridge 309 as shown in FIG. 40. An appearance of the disc cartridge 309 in such a state is illustrated in FIG. 36.

Figure 41:
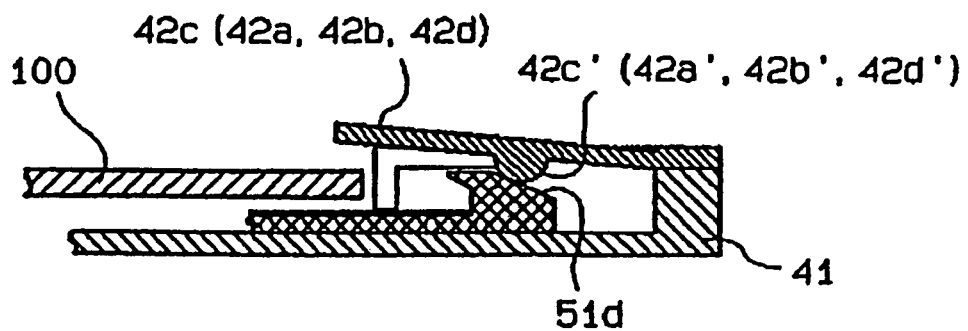
FIG. 41 is a cross-sectional view illustrating a disc outer peripheral cross section of the disc cartridge shown in FIG. 34 that passes the center of the disc to show a state where its shutters are opened.

On the other hand, while the shutters 51 and 52 are opened, the slope portions 52f, 51f, 51d and 52d of the shutters 51 and 52 contact with the convex portions 42a', 42b', 42c' and or 42d', respectively, thereby lifting the stopper members 42a, 42b, 42c and 42d to above the disc 100 as shown in FIG. 41. An appearance of the disc cartridge 309 in such a state is illustrated in FIG. 37. By using such a structure, particularly in an interval after the disc cartridge 309 has been vertically loaded into a disc drive and before the disc 100 gets chucked, it is possible to prevent the disc 100 from dropping down from the cartridge 309. In addition, while the disc 100 is being chucked, the disc 100 can move in a broader space. Furthermore, this structure also contributes to further reducing the thickness of the cartridge body.

It should be noted that to keep the shutters 51 and 52 temporarily opened for a while, the slope portion 51c, (52f, 51f or 52d) may have a convex or concave portion that engages with the convex portion 42a', (42b', 42c' or 42d').

Embodiment 10

Hereinafter, a disc cartridge 310 according to a tenth embodiment of the present invention will be described with reference to the drawings. The disc cartridge 310 of this embodiment is mainly characterized in that stopper members are provided for the shutters.

Figure 42:
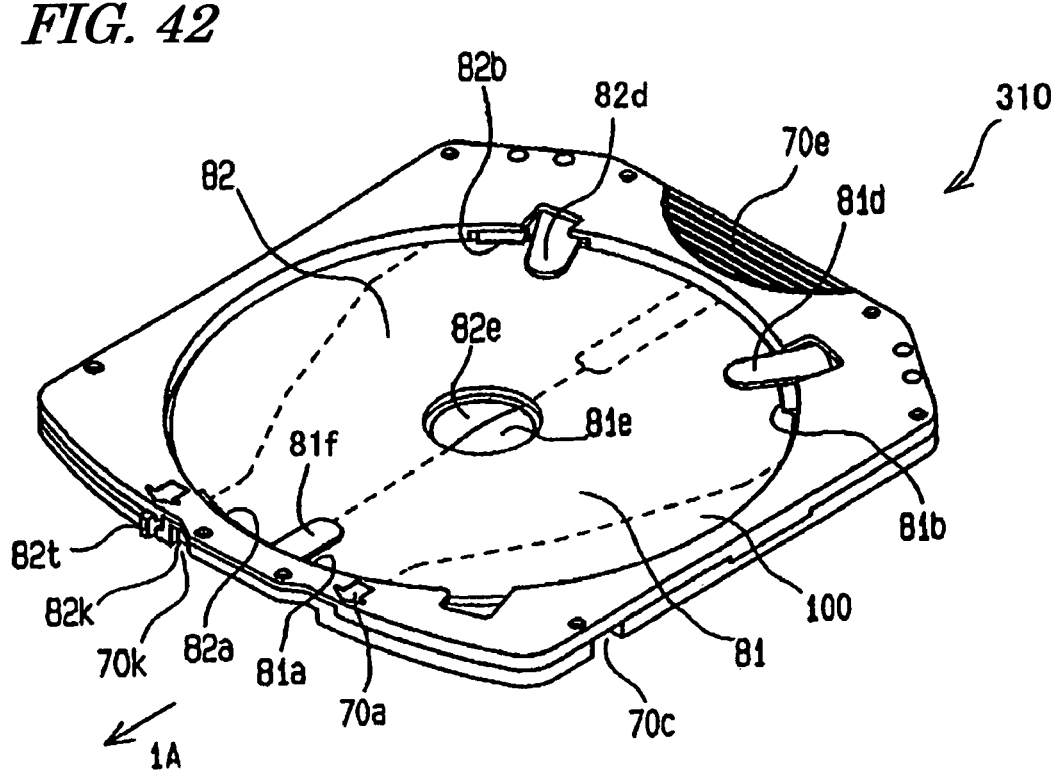
FIG. 42 is a perspective view illustrating an overall configuration for a disc cartridge according to a tenth embodiment of the present invention.
Figure 43:
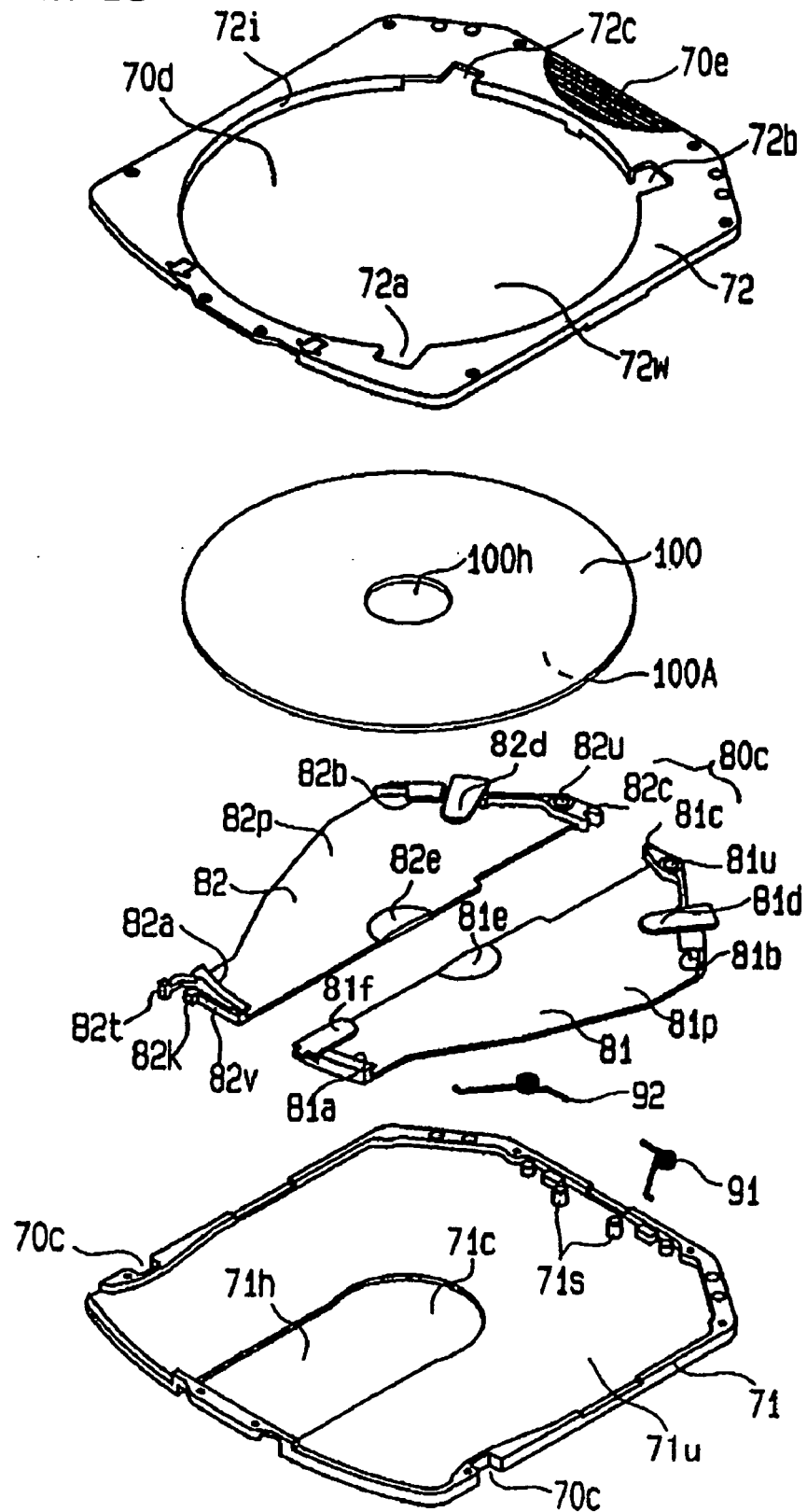
FIG. 43 is an exploded perspective view illustrating an exploded state of the disc cartridge shown in FIG. 42.

As shown in FIGS. 42 and 43, the disc cartridge 310 includes a cartridge lower shell 71, a cartridge upper shell 72, stopper members 81d, 81f and 82d, and a pair of shutters 81 and 82.

As shown in FIG. 43, the cartridge lower shell 71 includes a chucking opening 71c and a head opening 71h. The chucking opening 71c is provided to allow a chucking member (e.g., a spindle motor for rotating the disc 100) to enter the disc cartridge 310 externally. The head opening 71h is provided to allow a head, which reads and/or writes a signal from/on the signal recording side 100A of the disc 100, to enter the disc cartridge 310 and access the signal recording side 100A. The cartridge lower shell 71 faces the signal recording side 100A of the disc 100. Also, the head opening 71c reaches one side surface of the cartridge lower shell 71.

The cartridge upper shell 72 includes a circular disc window 72w, through which the disc 100 can be introduced and removed into/from the disc cartridge 310 and which expands over the entire projection area of the disc 100 to expose the upper surface of the disc 100. The cartridge upper and lower shells 72 and 71 are adhered or welded together at their outer periphery, thereby forming a cartridge body 70.

A disc storage portion 70d for storing the disc 100 therein is defined by a first inner surface 71u of the cartridge lower shell 71 and a second inner surface 72i of the cartridge upper shell 72. The first inner surface 71u is opposed to the signal recording side 100A of the disc 100, while the second inner surface 72i has a substantially cylindrical shape and defines the disc window 72w inside. That is to say, the first inner surface 71u becomes the bottom of the disc storage portion 70d.

In the disc storage portion 70d, a gap, which is wide enough to allow the disc 100 to rotate freely, is provided between the second inner surface 72i and the disc 100. Also, the top of the disc storage portion 70d is the disc window 72w so that the disc 100 stored in the disc storage portion 70d has one side thereof exposed through the disc window 72w.

The shutters 81 and 82 are disposed between the signal recording side 100A of the disc 100 and the inner surface 71u of the disc storage portion 70d. The shutters 81 and 82 include rotation holes 81u and 82u, respectively. These rotation holes 81u and 82u are engaged in a freely rotatable state with a pair of rotation shafts 71s, which is located outside of the disc storage portion 70d of the cartridge body 70 and opposite to the head opening 71h. Thus, the shutters 81 and 82 rotate on the rotation shafts 71s in such a manner as to expose or cover the chucking and head openings 71c and 71h.

A cam 81c and a follower 82c are provided near the rotation holes 81u and 82u of the shutters 81 and 82, respectively. The cam 81c and the follower 82c have mutually engaging shapes and together make up an interlocking mechanism 80c for opening and closing the shutters 81 and 82 while interlocking them with each other.

The respective surfaces of the shutters 81 and 82, which are opposed to the signal recording side 100A of the disc, are covered with protective layers 81p and 82p for the purpose of preventing the disc 100 from getting scratched or any dust from entering the signal recording side 100A thereof.

The protective layers 81p and 82p may be appropriately selected from the group consisting of an anti-scratching nonwoven fabric, a dustproof nonwoven fabric, an anti-scratching coating layer and a dustproof coating layer. In this embodiment, sheets of a dustproof nonwoven fabric are adhered or ultrasonic welded as the protective layers 81p and 82p.

Shutter springs 91 and 92 are provided outside of the disc storage portion 70d for the shutters 81 and 82, respectively. These springs 91 and 92 apply an elastic force to the shutters 81 and 82 in such a direction as to close the shutters 81 and 82. Alternatively, the shutter springs 91 and 92 may apply an elastic force to the shutters 81 and 82 in such a direction as to open the shutters 81 and 82. Also, if the shutters can operate almost completely synchronously by way of the interlocking mechanism, only one of the shutter springs 91 and 92 may be provided.

As in the eighth embodiment, the shutters 81 and 82 include disc holding portions 81a, 81b, 82a and 82b at the ends thereof as shown in FIG. 43. Convex portions 81e and 82e are also formed on the shutters 81 and 82, respectively.

Furthermore, as will be described in detail later, the stopper members 81f, 81d and 82d are provided as integral parts of the shutters 81 and 82 near the disc holding portions 81a, 81b and 82b of the shutters 81 and 82, respectively. Alternatively, these stopper members 81f, 81d and 82d may be integrated with the shutters 81 and 82 by way of elastic members.

As shown in FIG. 42, the upper surface of the cartridge body 70 (or the cartridge upper shell 72) has embossed arrow marks (or concave portions) 70a that indicate the direction (the arrow 1A) in which this disc cartridge 310 should be inserted into a disc drive. The cartridge body 70 further includes two concave portions 70c on a pair of its side surfaces that are parallel to the inserting direction 1A. These concave portions 70c may be used as either pull-in notches or positioning recesses when the disc cartridge 310 is loaded into a disc drive or when the disc cartridge 310 is stored in a changer. Optionally, just one side surface of the cartridge 310 may include the concave portion 70c. In that case, the concave portion 70c may be used as a mechanism for preventing erroneous (e.g., upside down) insertion when the disc cartridge 310 is inserted or loaded into a disc drive. The upper surface of the cartridge body 70 further includes a grip portion 70e that allows the operator to grip the cartridge 310. This grip portion 70e has an antislip embossed shape.

Figure 44:
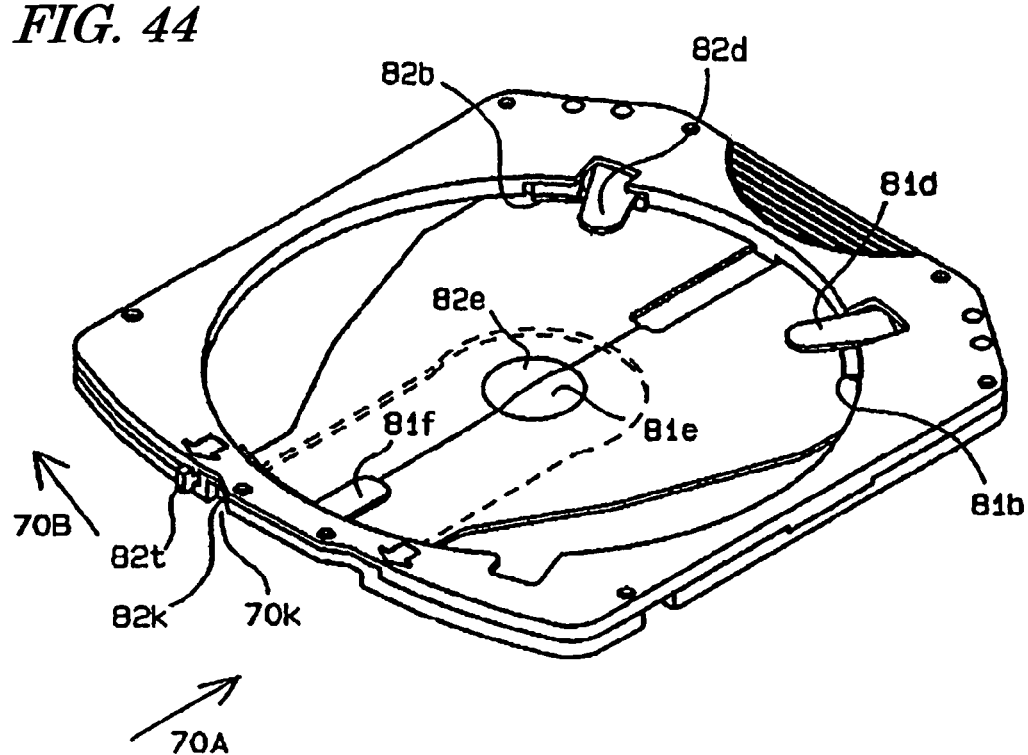
FIG. 44 is a perspective view illustrating a state of the disc cartridge shown in FIG. 42 in which its shutters are closed with the disc removed.
Figure 45:
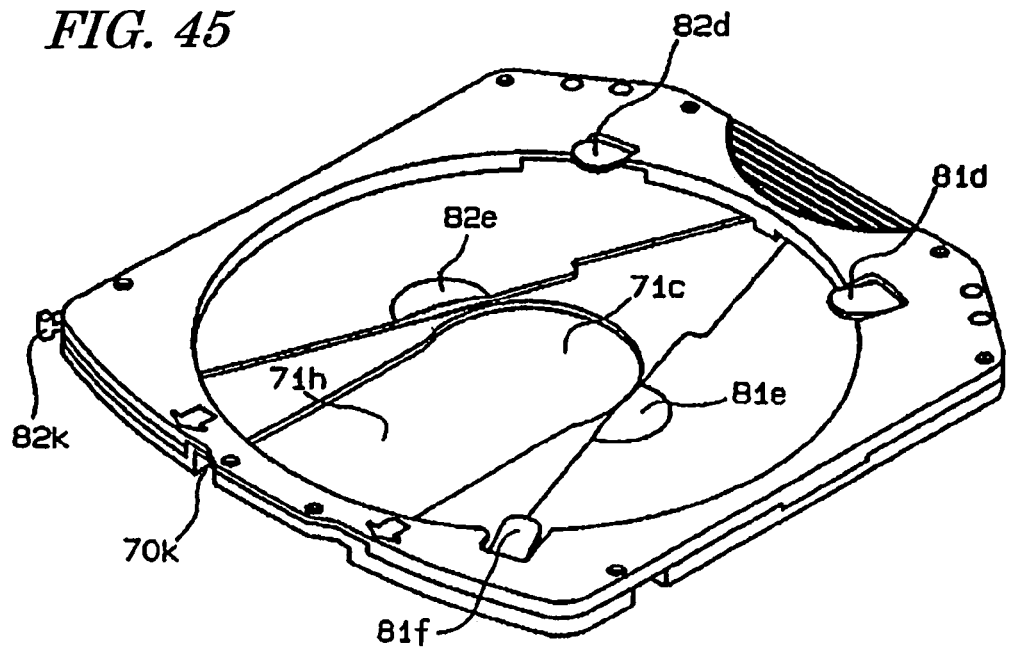
FIG. 45 is a perspective view illustrating a state of the disc cartridge shown in FIG. 42 in which its shutters are opened with the disc removed.

FIG. 44 is a perspective view illustrating a state where the shutters 81 and 82 cover the chucking opening 71c and the head opening 71h with the disc 100 removed. FIG. 45 is a perspective view illustrating a state where the shutters 81 and 82 expose the chucking opening 71c and the head opening 71h with the disc 100 removed.

Hereinafter, the structure and the operation of the shutters 81 and 82 will be described in further detail. As shown in FIGS. 42 and 43, the disc holding portions 81a, 81b, 82a and 82b provided for the shutters 81 and 82 have such a shape as including a slope that tilts in such a manner as to overhang the projection area of the disc and to overlap with the outer periphery of the disc 100 as in the eighth embodiment. That is to say, the slope is downwardly tapered and leans toward the disc 100. Thus, the same effects as those of the eighth embodiment are also achieved.

Also, the shutter 82 includes an opening/closing portion 82t for use to open and close the shutters externally, an elastic portion 82v and a locking protrusion portion 82k as integral parts thereof. The locking protrusion portion 82k is connected to the shutter 82 by way of the elastic portion 82v. Thus, while the chucking and head openings 71c and 71h are covered with the shutters 81 and 82, the locking protrusion portion 82k, to which an elastic force is applied from the elastic portion 82v, engages with a locking hole 70k of the cartridge body 70 as shown in FIG. 44, thereby fixing and supporting the shutter 82 in a non-rotatable state to the cartridge body 70. When the shutter 82 is fixed, the other shutter 81, which is interlocked with the shutter 82 via the interlocking mechanism 80c, is also fixed.

Accordingly, only by getting the locking protrusion portion 82k pressed externally by a protrusion, for example, in the direction indicated by the arrow 70A and disengaged from the locking hole 70k while pressing the opening/closing portion 82t in the direction indicated by the arrow 70B at the same time as shown in FIG. 44, the shutters 81 and 82 can be rotated to expose the chucking and head openings 71c and 71h and the disc 100 can be released from the disc holding portions 81a, 81b, 82a and 82b. Thus, it is possible to prevent the operator from removing the disc accidentally.

The locking protrusion portion 82k forms an integral part of the shutter 82. Alternatively, a locking lever, including a locking protrusion portion and a convex portion at the end thereof, may be connected to the cartridge body 70 by way of an elastic portion, and a concave portion may be provided for the shutter so that the convex and concave portions engage with each other. In that case, by pressing the locking protrusion portion through a locking hole of the cartridge body, these convex and concave portions may be disengaged from each other so as to allow the shutters to rotate freely. Optionally, in that case, the locking lever, as well as the shutter springs (i.e., elastic members), may be resin springs that form integral parts of the cartridge body 70.

Figure 46:
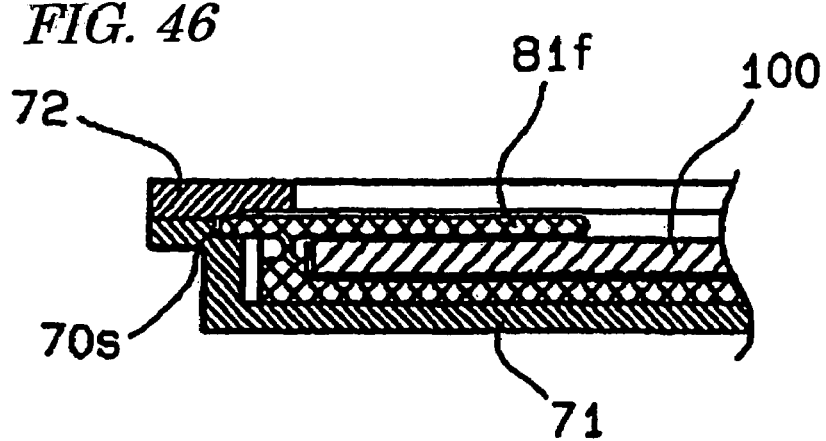
FIG. 46 is a partial cross-sectional view illustrating a cross section of the disc cartridge shown in FIG. 42 that passes the center of the disc to show a state where its shutters are closed.
Figure 48:
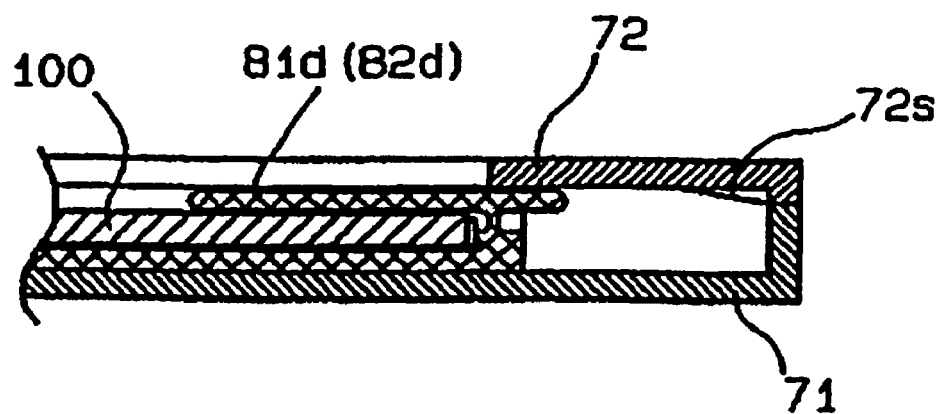
FIG. 48 is a cross-sectional view illustrating a disc outer peripheral cross section of the disc cartridge shown in FIG. 42 that passes the center of the disc to show a state where its shutters are closed.

Next, the structure and operation of the stopper members 81f, 81d and 82d will be described in further detail. While the shutters 81 and 82 are closed, the stopper members 81f, 81d and 82d are substantially parallel to the disc 100 and do not protrude from the upper surface of the disc cartridge 310 as shown in FIGS. 46 and 48. An appearance of the disc cartridge 310 in such a state is illustrated in FIG. 44.

Figure 47:
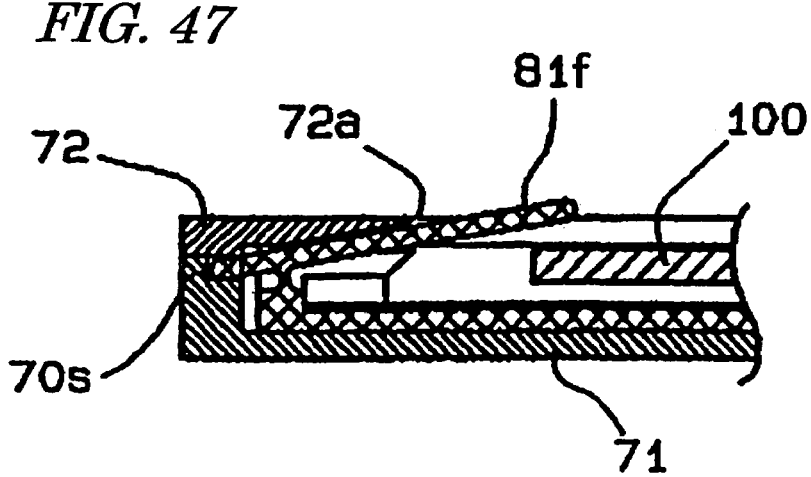
FIG. 47 is a partial cross-sectional view illustrating a cross section of the disc cartridge shown in FIG. 42 that passes the center of the disc to show a state where its shutters are opened.
Figure 49:
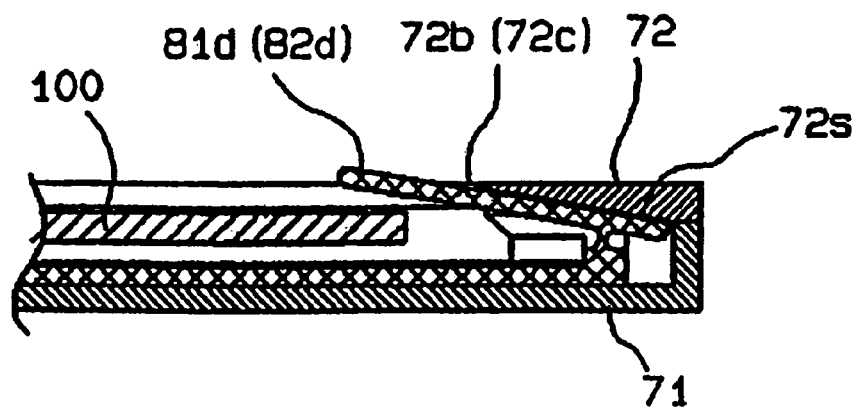
FIG. 49 is a cross-sectional view illustrating a disc outer peripheral cross section of the disc cartridge shown in FIG. 42 that passes the center of the disc to show a state where its shutters are opened.

On the other hand, while the shutters 81 and 82 are going to be opened, the stopper members 81f, 81d and 82d are guided by a slit 70s and a sloped portion 72s of the cartridge body 70 so as to be lifted to above the disc 100 as shown in FIGS. 47 and 49. The slit 70s is formed in the inner sidewall portion of the cartridge body 70, while the sloped portion 72s is formed on the inner upper wall of the cartridge body 70. Also, the cartridge upper shell 72 is provided with notched portions 72a, 72b and 72c so as not to interfere with the stopper members 81f, 81d and 82d that have been lifted up. An appearance of the disc cartridge 310 in such a state is illustrated in FIG. 45.

While the shutters 81 and 82 are closed, the stopper members 81f, 81d and 82d overhang the projection area of the disc 100 and are located over the disc 100. Thus, the stopper members 81f, 81d and 82d press the disc 100 against the shutters 81 and 82 in the thickness direction, thereby holding the disc 100 thereon. Accordingly, the disc holding portions 81a, 81b, 82a and 82b may be omitted from the shutters 81 and 82.

According to such a structure, particularly in an interval after the disc cartridge 310 has been vertically loaded into a disc drive and before the disc 100 gets chucked, it is possible to prevent the disc 100 from dropping down from the disc cartridge 310. In addition, while the disc 100 is being chucked, the disc 100 can move in a broader space. Furthermore, this structure also contributes to further reducing the thickness of the cartridge body.

Embodiment 11

Hereinafter, a disc cartridge 311 according to an eleventh embodiment of the present invention will be described with reference to the drawings.

Figure 50:
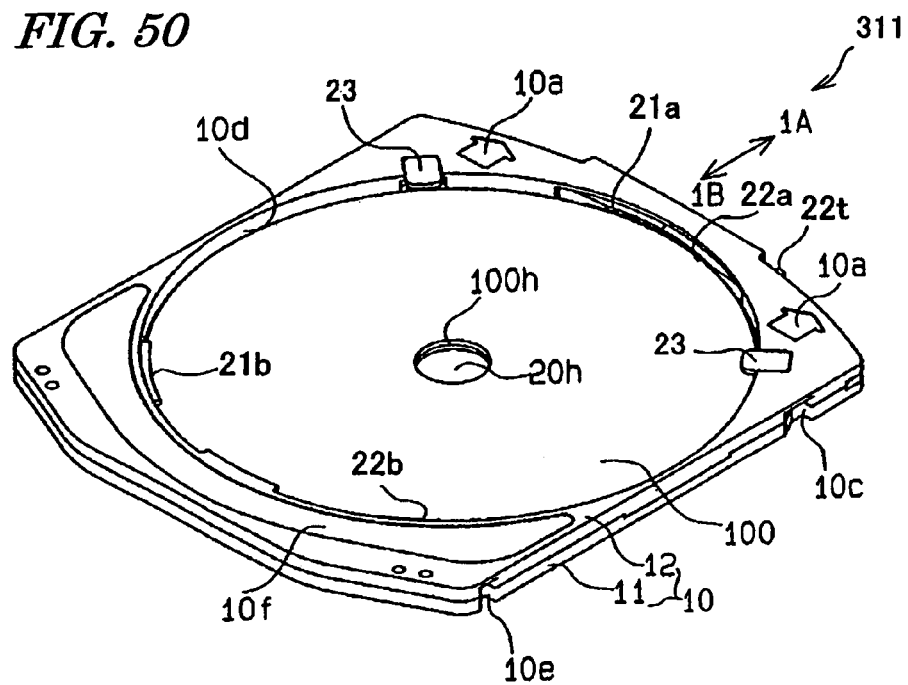
FIG. 50 is a perspective view illustrating an overall configuration for a disc cartridge according to an eleventh embodiment of the present invention.
Figure 51:
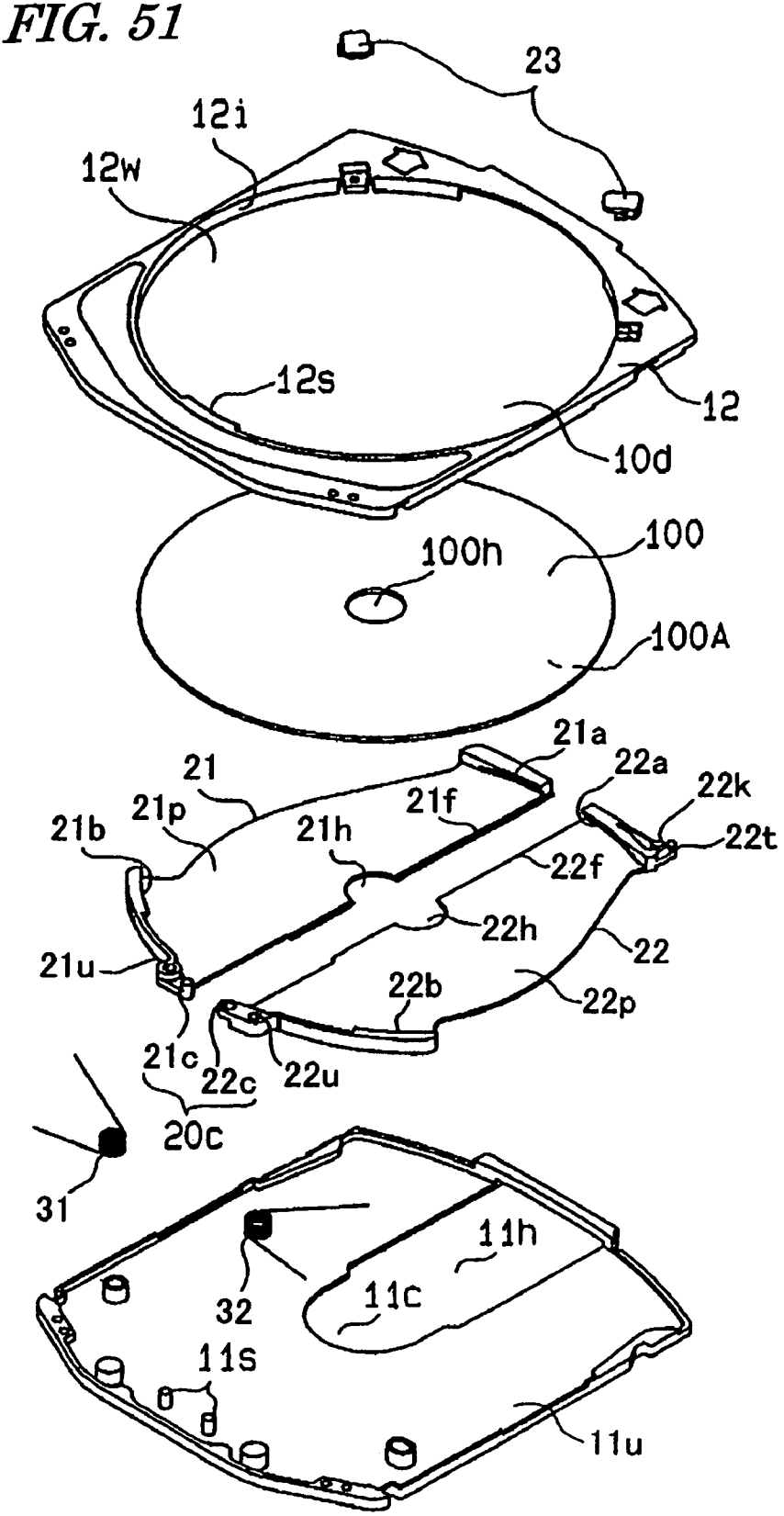
FIG. 51 is an exploded perspective view illustrating an exploded state of the disc cartridge shown in FIG. 50.
Figure 52:
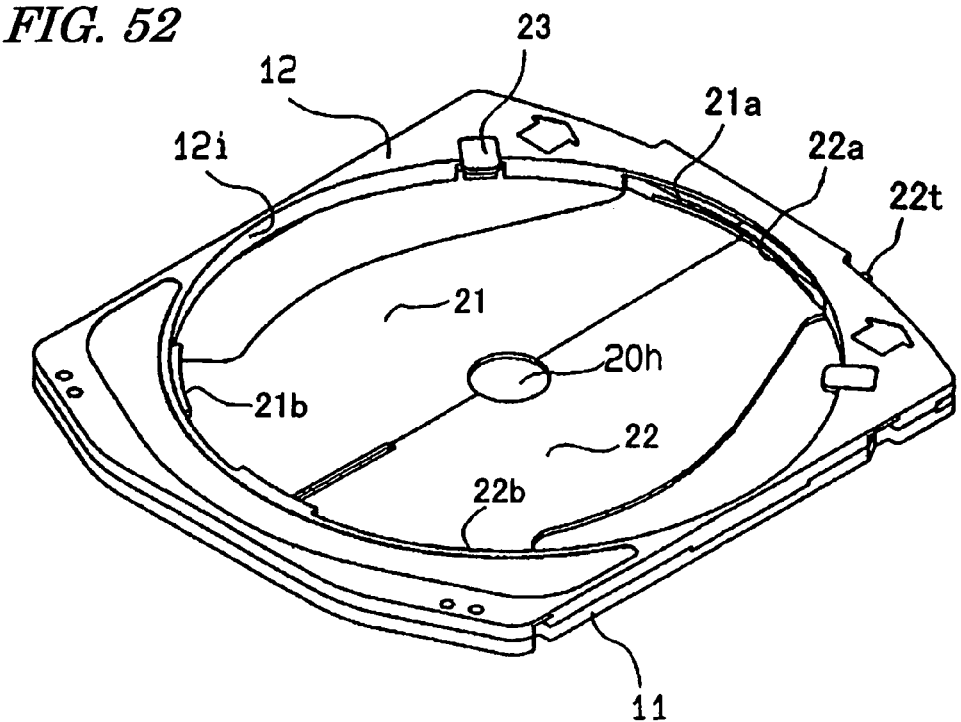
FIG. 52 is a perspective view illustrating a state of the disc cartridge shown in FIG. 50 in which its shutters are closed with the disc removed.
Figure 53:
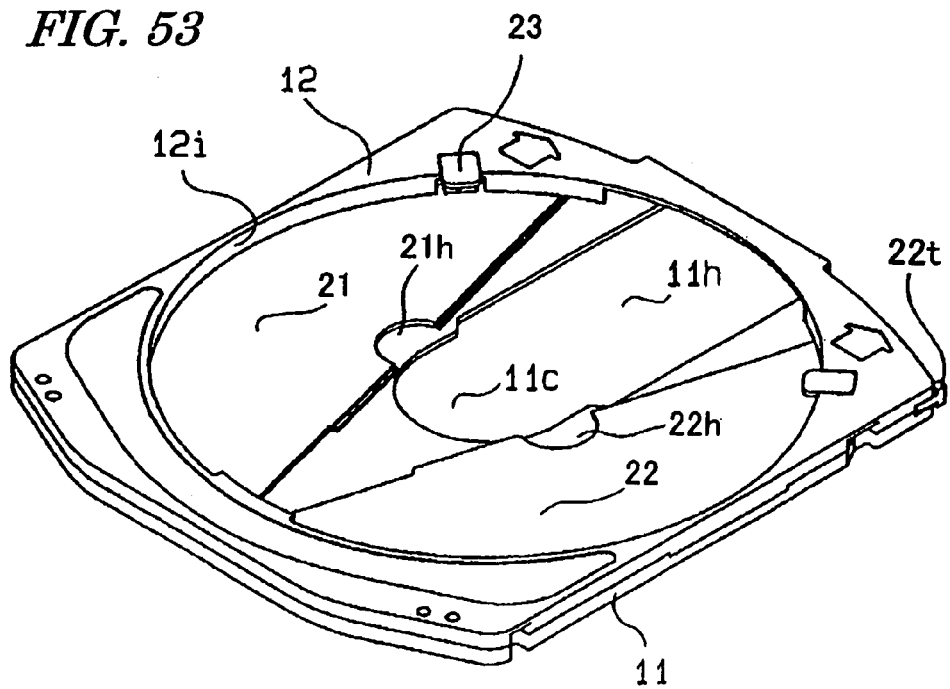
FIG. 53 is a perspective view illustrating a state of the disc cartridge shown in FIG. 50 in which its shutters are opened with the disc removed.
Figure 54:
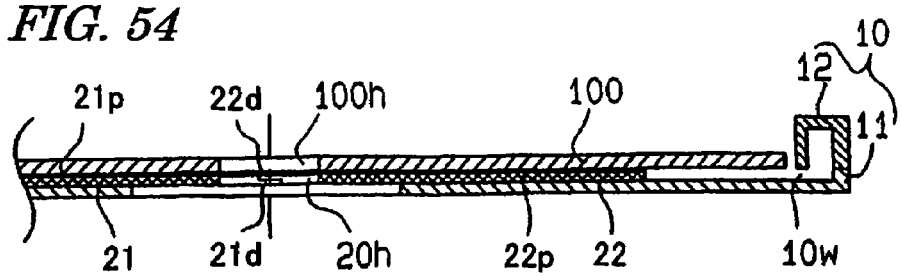
FIG. 54 is a partial cross-sectional view illustrating a cross section of the disc cartridge shown in FIG. 50 that passes the center of the disc to show a state where its shutters are closed.
Figure 55:
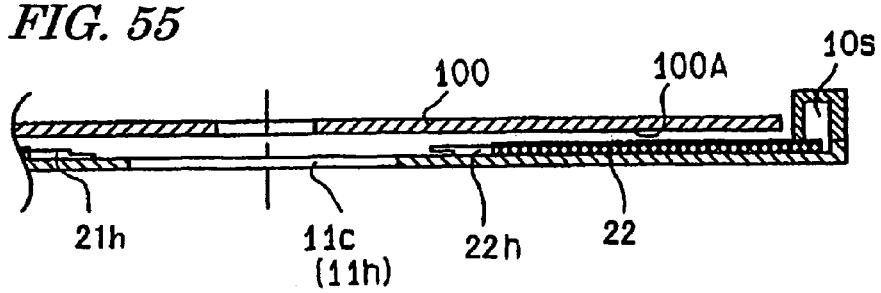
FIG. 55 is a partial cross-sectional view illustrating a cross section of the disc cartridge shown in FIG. 50 that passes the center of the disc to show a state where its shutters are opened.
Figure 56:
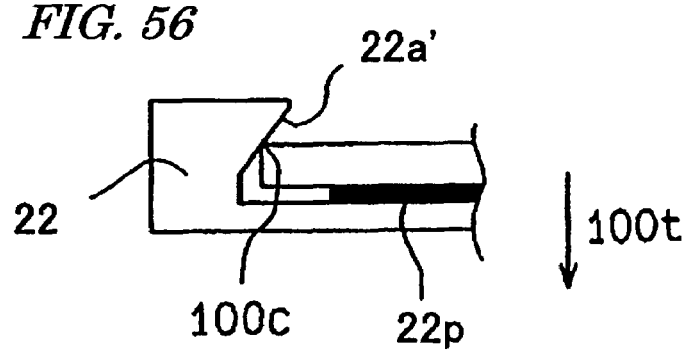
FIG. 56 is a cross-sectional view illustrating a portion of the shutter of the disc cartridge shown in FIG. 50.

As shown in FIGS. 50 and 51, the disc cartridge 311 includes a cartridge lower shell 11, a cartridge upper shell 12, a pair of shutters 21 and 22 and stopper members 23. As shown in FIGS. 52 through 56, the structures and functions of all of these members are the same as those already described for the eighth embodiment and the detailed description thereof will be omitted herein.

Unlike the disc cartridge 308 of the eighth embodiment, the shutters 21 and 22 of the disc cartridge 311 of this embodiment have a hole 20h as shown in FIGS. 50 and 51.

More specifically, while the shutters 21 and 22 of the disc cartridge 311 are closed, the shutters 21 and 22 define the hole 20h just under the center hole 100h of the disc 100. The hole 20h is made up of two notches 21h and 22h provided for the shutters 21 and 22, respectively.

If the disc cartridge 311 is left with the upper surface of the disc 100 exposed upward as shown in FIG. 50, dust may pass through the center hole 100h. Even so, in this structure, the dust should pass and go out through the hole 20h of the shutters 21 and 22 without remaining inside the disc cartridge 311, or without being deposited on the shutters 21 and 22. Thus, when the shutters 21 and 22 are opened (i.e., when this disc cartridge 311 is loaded into a disc drive), no dust will have been deposited on the signal recording side 100A of the disc.

Considering the disc cartridge 311 may be left either upside up as shown in FIG. 50 or upside down (i.e., with the cartridge lower shell 11 facing upward), the hole 20h preferably has a diameter that is approximately equal to that of the center hole 100h. This is because if such a relationship is satisfied, dust will be deposited neither on the shutters 21 and 22 when the disc cartridge 311 is left upside up nor on the signal recording side 100A of the disc 100 when the disc cartridge 311 is left upside down.

Figure 57:
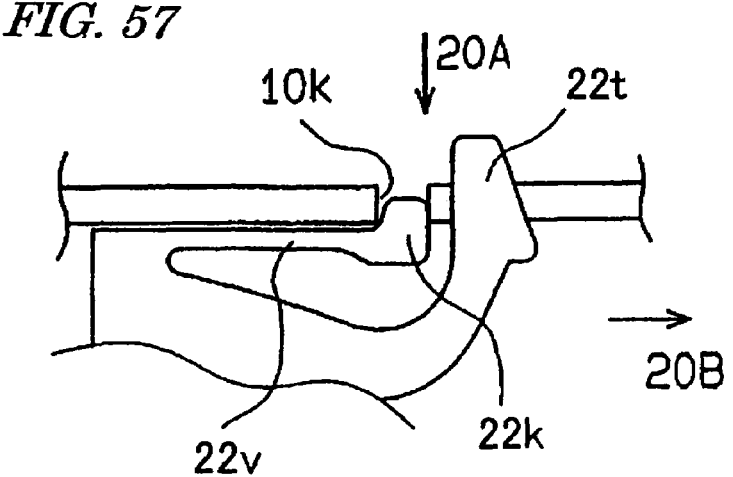
FIG. 57 is a partial plan view illustrating an operating portion and its surrounding portion of the disc cartridge shown in FIG. 50.

In this disc cartridge 311, the opening/closing portion for use to open and close the shutters 21 and 22 is provided for the shutter 22 unlike the disc cartridge 308 of the eighth embodiment. More specifically, as shown in FIGS. 51 and 57, the opening/closing portion 22t, elastic portion 22v and locking protrusion portion 22k are provided as integral parts of the shutter 22. The locking protrusion portion 22k is connected to the shutter 22 by way of the elastic portion 22v. Accordingly, unlike the eighth embodiment, the opening/closing portion 22t is located on the right-hand side of the head opening 11h with respect to the disc 100. The function and the operation of the opening/closing portion 22t are the same as those described for the disc cartridge 308 of the eighth embodiment.

Embodiment 12

Hereinafter, a disc cartridge 312 according to a twelfth embodiment of the present invention will be described with reference to the drawings.

Unlike the disc cartridge 311 of the eleventh embodiment, the disc cartridge 312 includes a rim 12t around the inner side surface 12i of the disc storage portion 10d and a convex portion 20w around the hole 20h defined by the shutters 21 and 22. These features will be described below.

Figure 58:
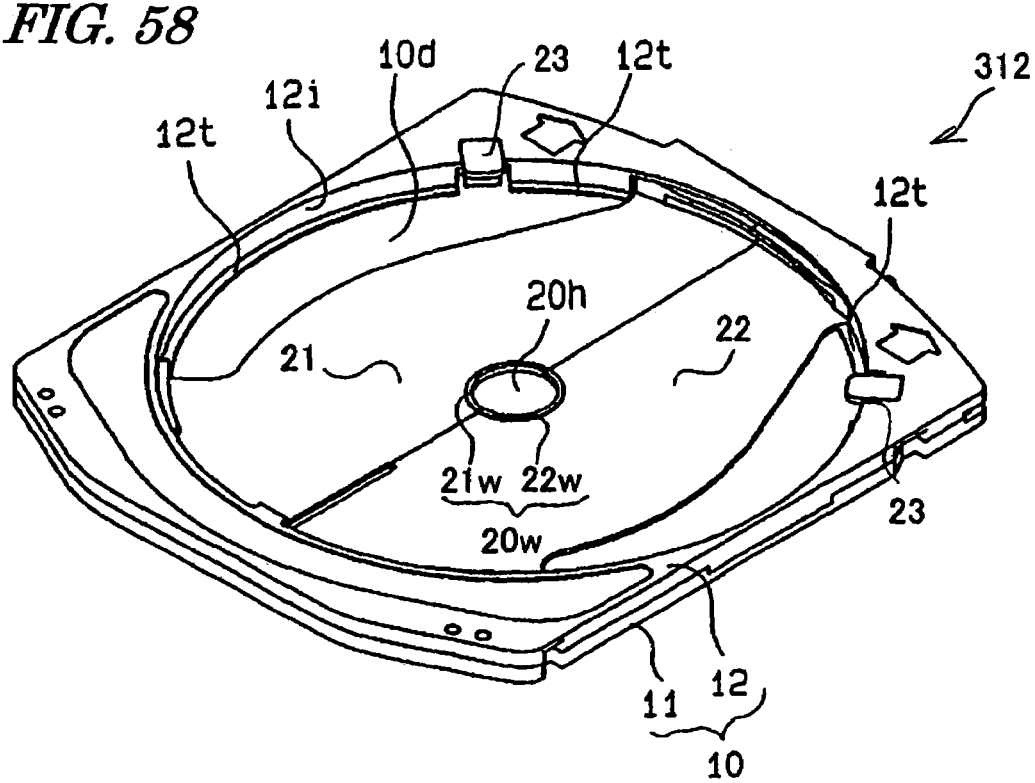
FIG. 58 is a perspective view illustrating a state of a disc cartridge according to a twelfth embodiment of the present invention in which its shutters are closed with the disc removed.
Figure 59:
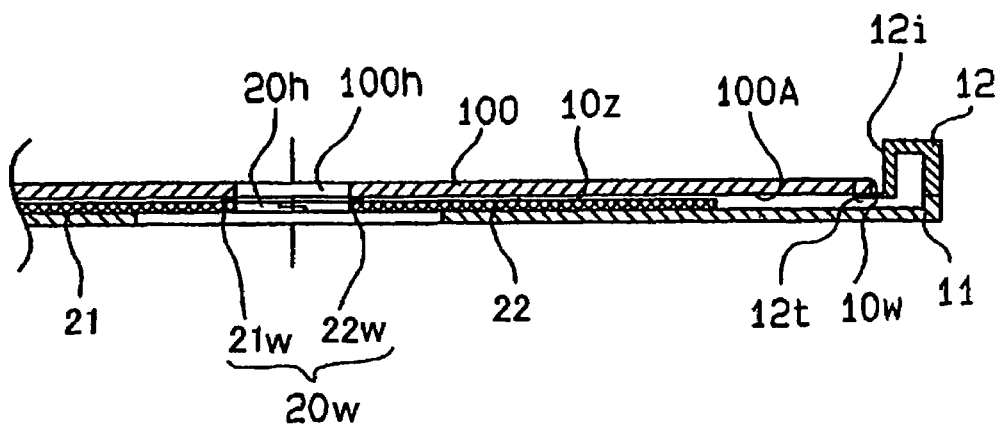
FIG. 59 is a partial cross-sectional view illustrating a cross section of the disc cartridge shown in FIG. 58 that passes the center of the disc to show a state where its shutters are closed.

As shown in FIG. 58, the rim 12t protrudes from the inner side surface 12i of the cartridge upper shell 12 toward the inner periphery of the disc 100 and substantially surrounds the outer periphery of the disc storage portion 10d. FIG. 59 shows a cross section of the disc cartridge 311 in a state where the disc 100 is stored in the disc storage portion 10d. While the shutters 21 and 22 are closed, the outer edge of the signal recording side 100A of the disc 100 contacts with the rim 12t as shown in FIG. 59. As a result, the gap between the outer periphery of the disc 100 and the cartridge body is closed, thereby preventing any dust from reaching the signal recording side 100A.

Figure 60:
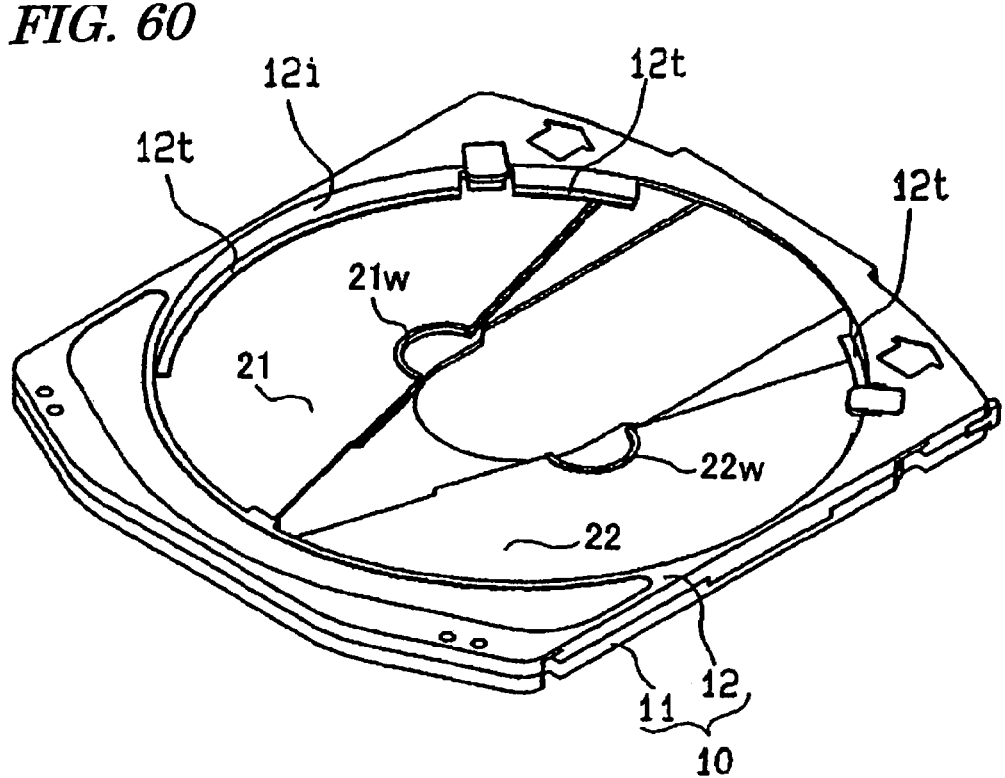
FIG. 60 is a perspective view illustrating a state of the disc cartridge shown in FIG. 58 in which its shutters are opened with the disc removed.
Figure 61:
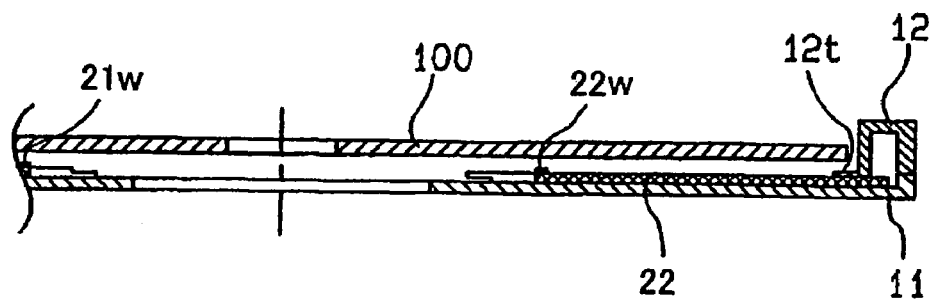
FIG. 61 is a partial cross-sectional view illustrating a cross section of the disc cartridge shown in FIG. 58 that passes the center of the disc to show a state where its shutters are opened.

Also, a gap 10w is provided between the rim 12t of the cartridge body 10 and the cartridge lower shell 11. Thus, when the shutters 21 and 22 are opened, respective portions of the shutters 21 and 22 enter the gap 10w as shown in FIGS. 60 and 61. In this manner, it is possible to prevent the shutters 21 and 22 from interfering with the cartridge body 10.

In such a structure, however, while the shutters 21 and 22 are closed, another gap 10z that leads to the open air is also created between the disc 100 and the shutters 21 and 22 as shown in FIG. 59. To close this gap 10z, the shutters 21 and 22 include convex portions 21w and 22w, respectively, around the center hole 100h of the disc. As shown in FIG. 58, when the shutters 21 and 22 are closed, these convex portions 21w and 22w are in tight contact with each other, thereby forming the convex portion 20w that closes the gap 10z around the entire disc center hole 100h. As a result, no dust will reach the signal recording side 100A of the disc 100 through the disc center hole 100h.

However, the top of these convex portions 21w and 22w might contact with the signal recording side 100A of the disc 100. Accordingly, the edge of the convex portions 21w and 22w should preferably be round so as not to scratch the disc. Optionally, the convex portions 21w and 22w may form integral parts of the shutters 21 and 22, respectively. In that case, an anti-scratching nonwoven fabric is preferably adhered or ultrasonic welded to that portion of the convex portion 20w that contacts with the disc 100 or an anti-scratching coating is preferably formed on that portion. Alternatively, the convex portions 21w and 22w themselves may be made of an anti-scratching nonwoven fabric or an anti-scratching coating and directly ultrasonic welded or bonded to the shutters 21 and 22, respectively.

Also, as shown in FIG. 59, while the shutters 21 and 22 are closed, the disc 100 is held by the shutters 21 and 22 so as to be lifted by the convex portion 20w and the rim 12t over the shutters 21 and 22 with the gap 10z left between them. That is to say, most of the signal recording side 100A of the disc 100 is not in plane contact with the shutters 21 and 22. Accordingly, even if the shutters 21 and 22 are subjected to no treatment (e.g., even when no anti-scratching nonwoven fabric is attached thereto), the signal recording side 100A still will not get scratched.

Figure 62:
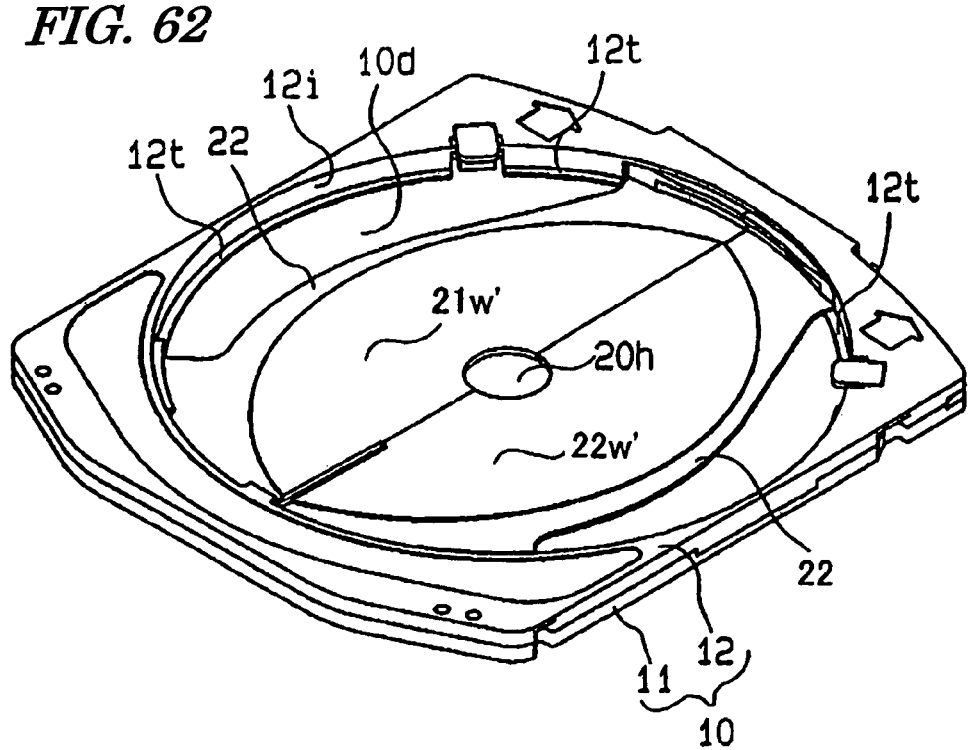
FIG. 62 is a perspective view illustrating a modified example of the disc cartridge shown in FIG. 58 to show a state where its shutters are closed with the disc removed.
Figure 63:
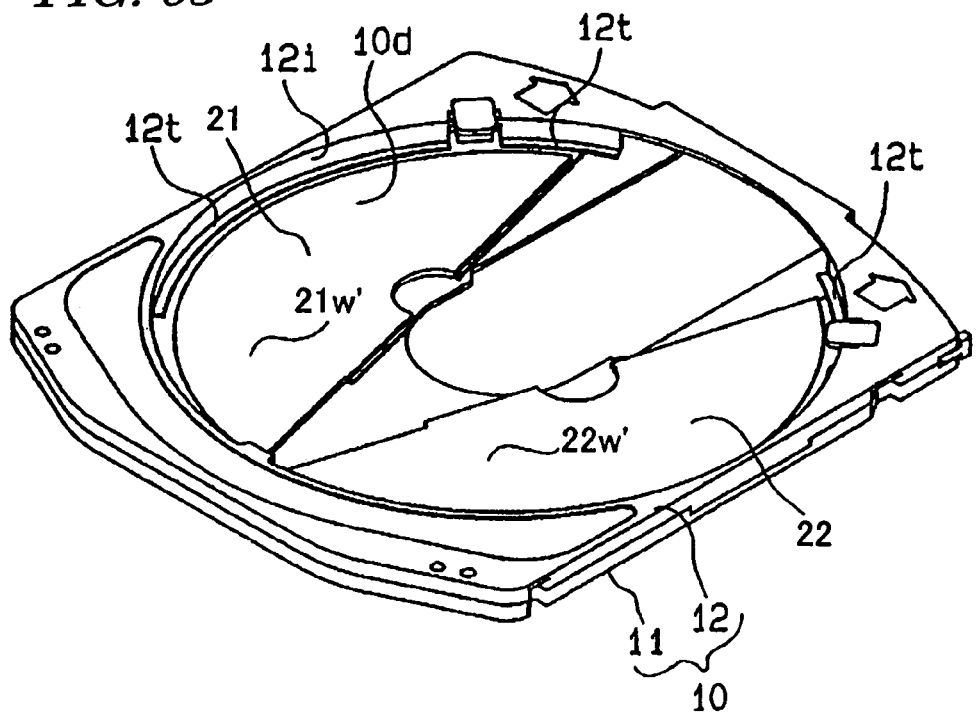
FIG. 63 is a perspective view illustrating a state of the disc cartridge shown in FIG. 61 in which its shutters are opened with the disc removed.

FIGS. 62 and 63 illustrate a disc cartridge including alternative convex portions 21w' and 22w' that have been expanded toward the outer periphery of the disc 100. Specifically, FIG. 62 illustrates a state where the shutters 21 and 22 are closed, while FIG. 63 illustrates a state where the shutters 21 and 22 are opened.

As shown in FIGS. 62 and 63, while the shutters 21 and 22 are opened, the convex portions 21w' and 22w' are preferably located inside the rim 12t of the disc storage portion 10d (i.e., closer to the center of the disc storage portion). Then, the convex portions 21w' and 22w' will not contact with, or interfere with, the rim 12t.

Optionally, the convex portions 21w' and 22w' may form integral parts of the shutters 21 and 22, respectively. In that case, an anti-scratching nonwoven fabric is preferably adhered or ultrasonic welded to those portions of the convex portions 21w' and 22w' that contact with the disc 100 or an anti-scratching coating is preferably formed thereon. Alternatively, the convex portions 21w' and 22w' themselves may be made of an anti-scratching nonwoven fabric or an anti-scratching coating and directly ultrasonic welded or bonded to the shutters 21 and 22, respectively.

Embodiment 13

Hereinafter, a disc cartridge 313 according to a thirteenth embodiment of the present invention will be described with reference to the drawings.

Figure 64:
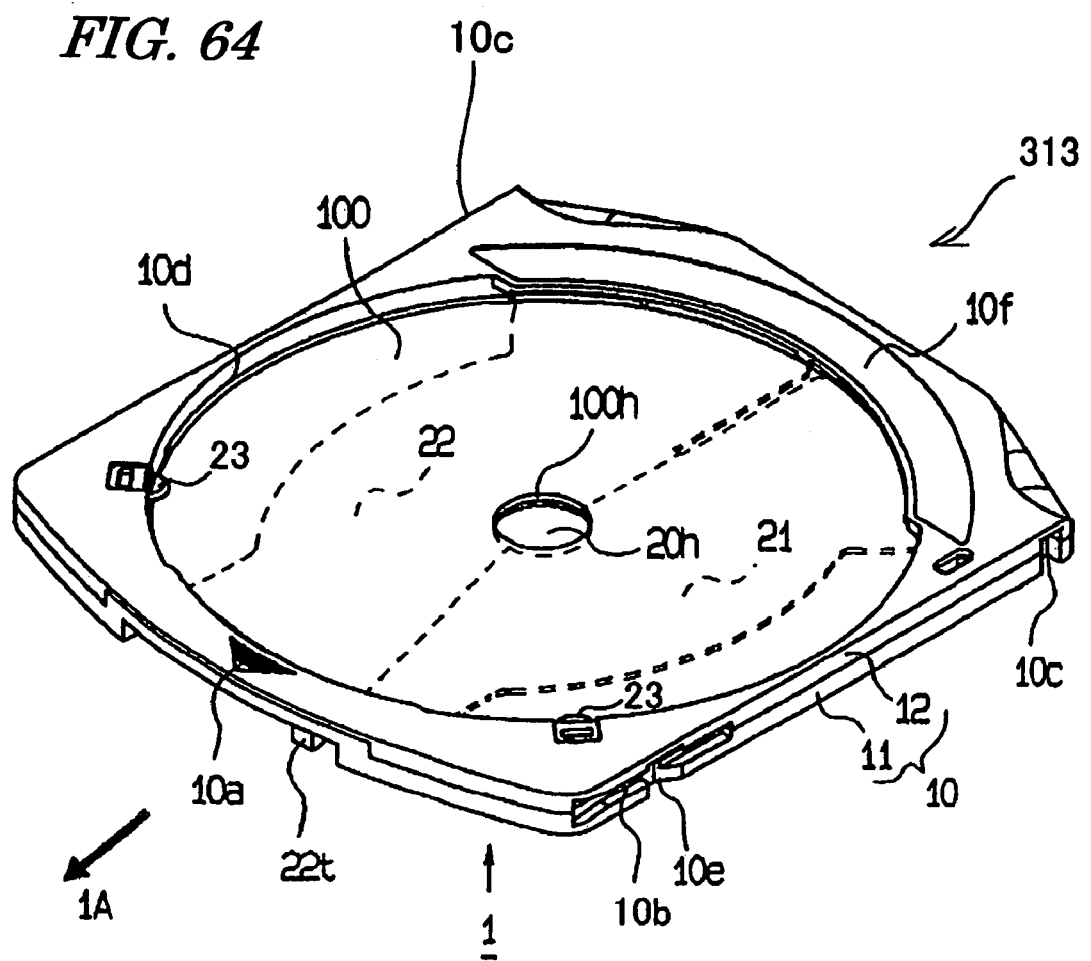
FIG. 64 is a perspective view illustrating an overall configuration for a disc cartridge according to a thirteenth embodiment of the present invention.
Figure 65:
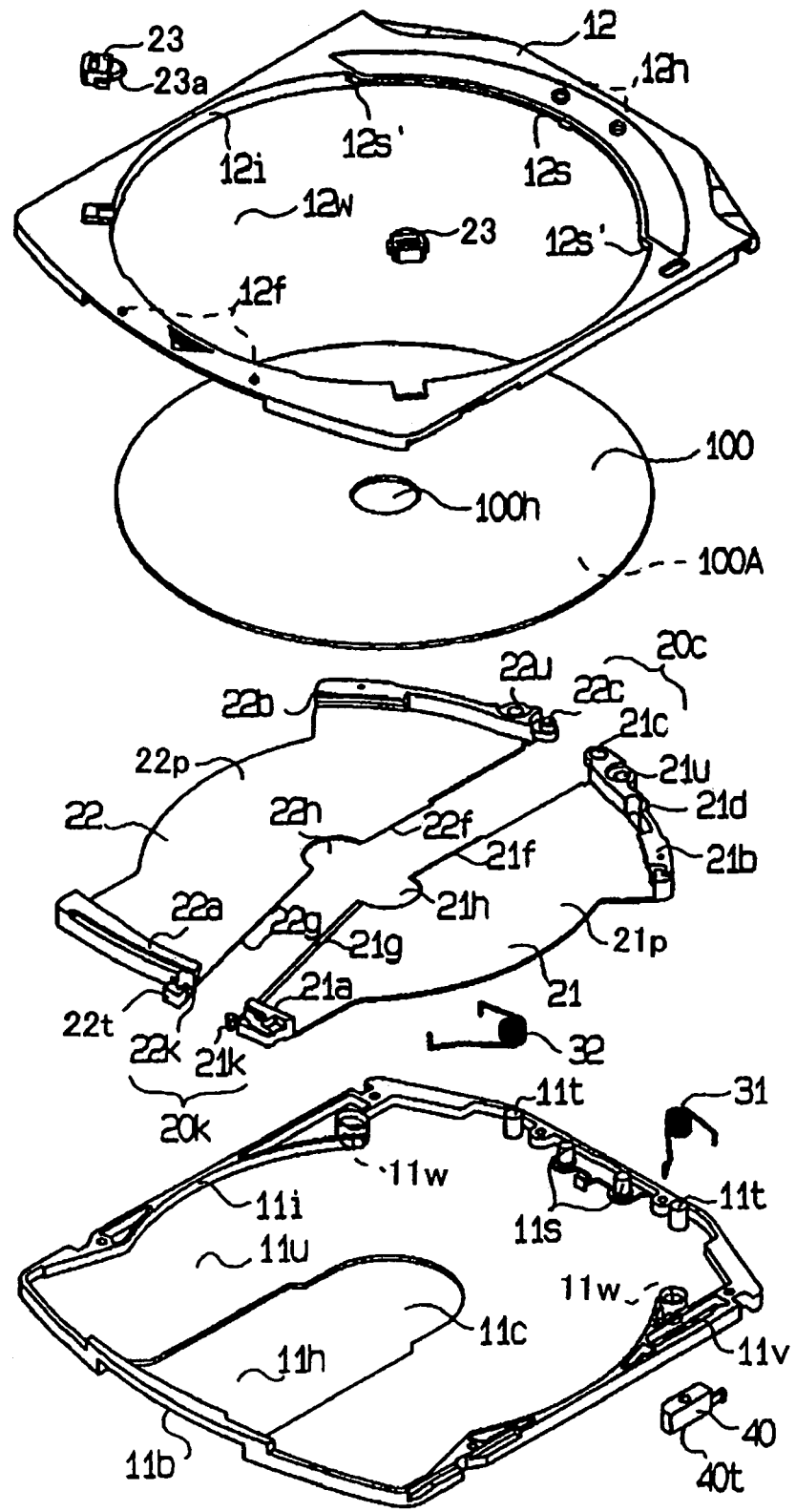
FIG. 65 is an exploded perspective view illustrating an exploded state of the disc cartridge shown in FIG. 64.

First, the structure of the disc cartridge 313 will be outlined with reference to FIGS. 64 and 65. As in the eighth embodiment, the disc 100 shown in FIGS. 64 and 65 also has first and second sides. The first side, on which the label of the disc, for example, is normally printed, is illustrated in FIG. 64, while the second side of the disc 100, i.e., the signal recording side 100A, is illustrated as the back surface in FIG. 65.

As shown in FIGS. 64 and 65, the disc cartridge 313 includes a cartridge lower shell 11, a cartridge upper shell 12, a pair of shutters 21 and 22 and stopper members 23.

As shown in FIG. 65, the cartridge lower shell 11 includes a chucking opening 11c and a head opening 11h. The chucking opening 11c is provided to allow a chucking member (e.g., a spindle motor for rotating the disc 100) to enter the disc cartridge 313 externally. The head opening 11h is provided to allow a head, which reads and/or writes a signal from/on the signal recording side 100A of the disc 100, to enter the disc cartridge 313 and access the signal recording side 100A. The cartridge lower shell 11 faces the signal recording side 100A of the disc 100. The cartridge lower shell 11 is formed by molding a synthetic resin.

The head opening 11 reaches one side surface of the cartridge lower shell 11. To minimize a decrease in rigidity of the cartridge lower shell 11 due to the presence of the head opening 11$h$, the cartridge lower shell 11 includes a bridge portion 11$b$ that links both ends of the head opening 11$h$ together. The bottom of the cartridge lower shell 11 further includes two positioning holes 11$w$ into which cartridge positioning pins of a disc drive are inserted.

The cartridge upper shell 12 includes a circular disc window 12$w$, through which the disc 100 can be introduced and removed into/from the disc cartridge 313 and which expands over the entire projection area of the disc 100 to expose the upper surface of the disc 100. The cartridge upper and lower shells 12 and 11 are adhered or welded together at their outer periphery, thereby forming a cartridge body 10. The cartridge upper shell 12 is also made of a synthetic resin.

A disc storage portion 10$d$ for storing the disc 100 therein is defined by a first inner surface 11$u$ of the cartridge lower shell 11 and a second inner surface 12$i$ of the cartridge upper shell 12. The first inner surface 11$u$ is opposed to the signal recording side 100A of the disc 100, while the second inner surface 12$i$ has a substantially cylindrical shape and defines the disc window 12$w$ inside. That is to say, the first inner surface 11$u$ becomes the bottom of the disc storage portion 10$d$.

In the disc storage portion 10$d$, a gap, which is wide enough to allow the disc 100 to rotate freely, is provided between the second inner surface 12$i$ and the disc 100. Also, the top of the disc storage portion 10$d$ is the disc window 12$w$ so that the disc 100 stored in the disc storage portion 10$d$ has one side thereof exposed through the disc window 12$w$.

The stopper members 23 are provided in a removable state for the cartridge upper shell 12 so as to partially protrude into the disc window 12$w$. As shown in FIGS. 64 and 65, two stopper members 23 are provided in this embodiment. On the other hand, a stopper portion 12$s$ is provided for the cartridge upper shell 12 so as to protrude into the disc window 12$w$. The stopper portion 12$s$ forms an integral part of the cartridge upper shell 12. The two stopper members 23 and the stopper portion 23$s$ are arranged approximately at regular intervals around the circumference of the disc window 12$w$ for the purpose of preventing the disc 100 from dropping down from the disc window 12$w$. Also, two convex disc contact portions 12$s'$ are formed on the stopper portion 12$s$. For the disc 100, these disc contact portions 12$s'$ are as high as the disc contact portions 23$a$ of the stopper members 23.

According to this structure, even if the disc cartridge 313 is mounted vertically or upside down, the disc 100 still can be kept in a fixed position. That is to say, when the disc cartridge 313 is inserted vertically or upside down into a disc drive, the dropping can be prevented particularly effectively. It should be noted that the stopper members 23 do not have to be removable from the cartridge body 10. Alternatively, as long as the stopper members 23 can be rotated or turned inside the disc storage portion 10$d$ to such an extent as to allow the operator to remove the disc 100 from the cartridge body 10, the stopper members 23 may also be secured to the cartridge upper shell 12.

The shutters 21 and 22 lie on a single plane between the signal recording side 100A of the disc 100 and the inner surface 11$u$ of the disc storage portion 10$d$. The shutters 21 and 22 include rotation holes 21$u$ and 22$u$, respectively. These rotation holes 21$u$ and 22$u$ are engaged in a freely rotatable state with a pair of rotation shafts 11$s$, which is located outside of the disc storage portion 10$d$ of the cartridge body 10 and opposite to the head opening 11$h$. Thus, the shutters 21 and 22 rotate on the rotation shafts 11$s$ in such a manner as to expose or cover the chucking and head openings 11$c$ and 11$h$. The shutters 21 and 22 are also made of a synthetic resin.

A ring-shaped portion 21$c$ and a pin-shaped portion 22$c$ are provided near the rotation holes 21$u$ and 22$u$ of the shutters 21 and 22, respectively. The ring-shaped portion 21$c$ and the pin-shaped portion 22$c$ have mutually engaging shapes and together make up an interlocking mechanism 20$c$ for opening and closing the shutters 21 and 22 while interlocking them with each other. The interlocking mechanism 20$c$ may also be any other interlocking mechanism such as a cam mechanism or a gear mechanism.

The respective surfaces of the shutters 21 and 22, which are opposed to the signal recording side 100A of the disc, are covered with protective layers 21$p$ and 22$p$ for the purpose of preventing the disc 100 from getting scratched or any dust from entering the signal recording side 100A thereof.

The protective layers 21$p$ and 22$p$ may be appropriately selected from the group consisting of an anti-scratching nonwoven fabric, a dustproof nonwoven fabric, an anti-scratching coating layer and a dustproof coating layer. In this embodiment, sheets of a dustproof nonwoven fabric are adhered or ultrasonic welded as the protective layers 21$p$ and 22$p$.

A locking protrusion portion 21$k$ is provided for the shutter 21, while a locking engaging portion 22$k$, which engages with the locking protrusion portion 21$k$, is provided for the shutter 22. The locking protrusion portion 21$k$ and locking engaging portion 22$k$ together make up a locking mechanism 20$k$ for locking and unlocking the shutters 21 and 22 to/from each other. By using this structure, the shutters 21 and 22 can be locked and unlocked, thus preventing the operator from opening the shutters accidentally. In addition, the signal recording side 100A of the disc 100 can be protected from dust, finger marks or scratches. The locking protrusion portion 21$k$ and the locking engaging portion 22$k$ form integral parts of the shutters 21 and 22, respectively.

Furthermore, the shutters 21 and 22 are provided with notches 21$h$ and 22$h$, respectively. When the shutters 21 and 22 are closed, these notches 21$h$ and 22$h$ contact with each other to form a hole 20$h$. While the shutters 21 and 22 are closed, the hole 20$h$ is located just under the center hole 100$h$ of the disc 100. The diameter of the hole 20$h$ is approximately equal to that of the center hole 100$h$ of the disc 100. In such a structure, even if this disc cartridge 313 is left with the upside up, no dust will be deposited on the shutters 21 and 22. Also, even if the disc cartridge 311 is left upside down, no dust will be directly deposited on the signal recording side 100A of the disc 100, either.

As described for the eighth embodiment, the shutters 21 and 22 include disc holding portions 21$a$, 21$b$, 22$a$, and 22$b$ for holding the disc 100 thereon while the shutters are closed. The disc holding portions 21$a$, 21$b$, 22$a$ and 22$b$ have been molded integrally with the shutters 21 and 22 so as to be dispersed around the circumference of the disc. Each of these disc holding portions 21$a$, 21$b$, 22$a$ and 22$b$ has a downwardly tapered slope to contact with the disc 100. By providing these slopes, the disc 100 can be held firmly and pressed against the shutters 21 and 22 while the shutters 21 and 22 are closed.

In this embodiment, only the disc holding portion 21$b$ is not secured to the shutter 21 but is connected thereto via an elastic portion 21d and is freely rotatable in the radial direction of the disc 100 (i.e., toward the center of the disc). Accordingly, the disc holding portions 21a, 21b, 22a and 22b can firmly hold a disc 100 having any of various diameters or thicknesses without allowing the disc 100 to move inconstantly.

A shutter opening/closing portion 22t for use to open and close the shutter 22 is formed as an integral part of the shutter 22 so as to be opposed to the rotation hole 22u, i.e., near the disc holding portion 22a. When the shutters 21 and 22 are attached to the cartridge body 10, the shutter opening/closing portion 22t is located under the bridge portion 11b and inside the head opening 11h. In opening or closing the shutters 21 and 22, the opening/closing portion 22t is moved along the bridge portion 11b inside the head opening 11h. In this arrangement, there is no need to separately provide any gap for allowing the shutter opening/closing portion 21t to move therein for the cartridge body 10. In other words, since there is no need to provide an extra gap for the cartridge body 10, no dust will enter the cartridge body 10 unnecessarily. Furthermore, the shutter opening/closing portion 22t can be disposed inside the head opening of the cartridge body 10, thus providing a cartridge of a good design.

Figure 66:
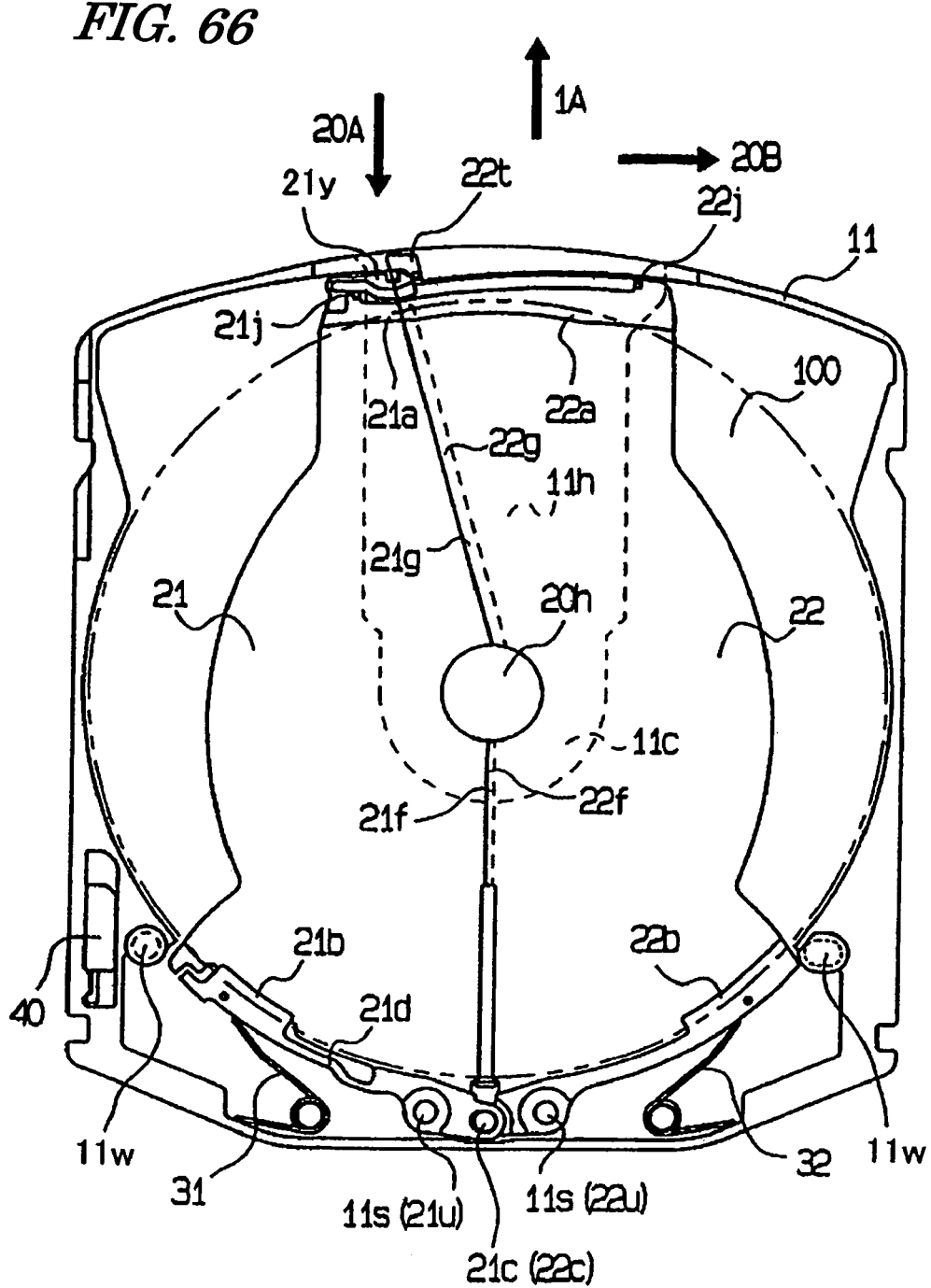
FIG. 66 is a schematic plan view illustrating a state of the disc cartridge shown in FIG. 64 in which its shutters are closed.

As shown in FIG. 66, the shutters 21 and 22 are not entirely in contact with each other along a line but have a plurality of contact surfaces that are not aligned with the line. More specifically, the shutters 21 and 22 have a first pair of contact surfaces 21f and 22f over the chucking opening 11o and a second pair of contact surfaces 21g and 22g over the head opening 11h, respectively. In this embodiment, the contact surfaces 21f and 22f contact with each other along the center-of-symmetry line of the disc cartridge 313. On the other hand, the contact surfaces 21g and 22g contact with each other along a line that defines a predetermined angle (e.g., approximately 15 to 16 degrees) with the center-of-symmetry line. When the shutters 21 and 22 have such shapes, the shutter 22 can have an integral shape from the vicinity of the shutter opening/closing portion 22t and can have sufficiently high rigidity.

Shutter springs 31 and 32 are provided outside of the disc storage portion 10d for the shutters 21 and 22, respectively. These springs 31 and 32 apply an elastic force to the shutters 21 and 22 in such a direction as to close the shutters 21 and 22. The shutter springs 31 and 32 are inserted into two spring poles 11t provided for the cartridge lower shell 11. In this embodiment, torsion coil springs are used as the shutter springs 31 and 32. Springs of the same shape are used as the shutter springs 31 and 32 to reduce the cost. Examples of other elastic members that may be used as the shutter springs include compression springs, leaf springs and elastic resin springs.

As shown in FIG. 65, the disc cartridge 313 includes a write protect member 40, which is inserted into a groove portion 11v of the cartridge lower shell 11 so as to slide along the groove portion 11v. By sliding the write protect member 40, the convex portion 40t thereof is displaced. Thus, in accordance with the position of the convex portion 40t, a sensor switch provided for a disc drive is turned ON or OFF. In this manner, writing on the disc 100 may be either prohibited or allowed.

This disc cartridge 313 is made up of the cartridge body 10 consisting of the cartridge lower and upper shells 11 and 12, stopper members 23, shutters 21 and 22, shutter springs 31 and 32, and write protect member 40.

When the cartridge lower and upper shells 11 and 12 are joined together, the two rotation shafts 11s of the cartridge lower shell 11 are engaged with two concave portions 12h of the cartridge upper shell 12. In this manner, the rotation shafts 11s can have their rigidity increased. Thus, even when the shutters 21 and 22 are open, reduced torsion is created around the respective centers of rotation of the shutters by the elastic force applied from the shutter springs 31 and 32. As a result, the shutters can be opened to the intended angle.

The upper surface of the cartridge body 10 (or the cartridge upper shell 12) has a label plane 10f, on which the contents that have been written on the disc 100 stored can be noted down, and an embossed arrow mark (or concave portion) 10a that indicates the direction (the arrow 1A) in which this disc cartridge 313 is inserted into a disc drive.

The cartridge body 10 further includes two pairs of concave portions 10c and 10e on two side surfaces thereof that are parallel to the inserting direction 1A. These concave portions 10c and 10e may be used as either pull-in notches or positioning recesses when the disc cartridge 313 is loaded into a disc drive or when the disc cartridge 313 is stored in a changer. The cartridge body further includes a slit portion 10b on one of its side surfaces. The slit portion 10b may be used as a recess to identify the upside and downside of the disc cartridge 313 when this disc cartridge 313 is inserted into the disc drive.

Figure 67:
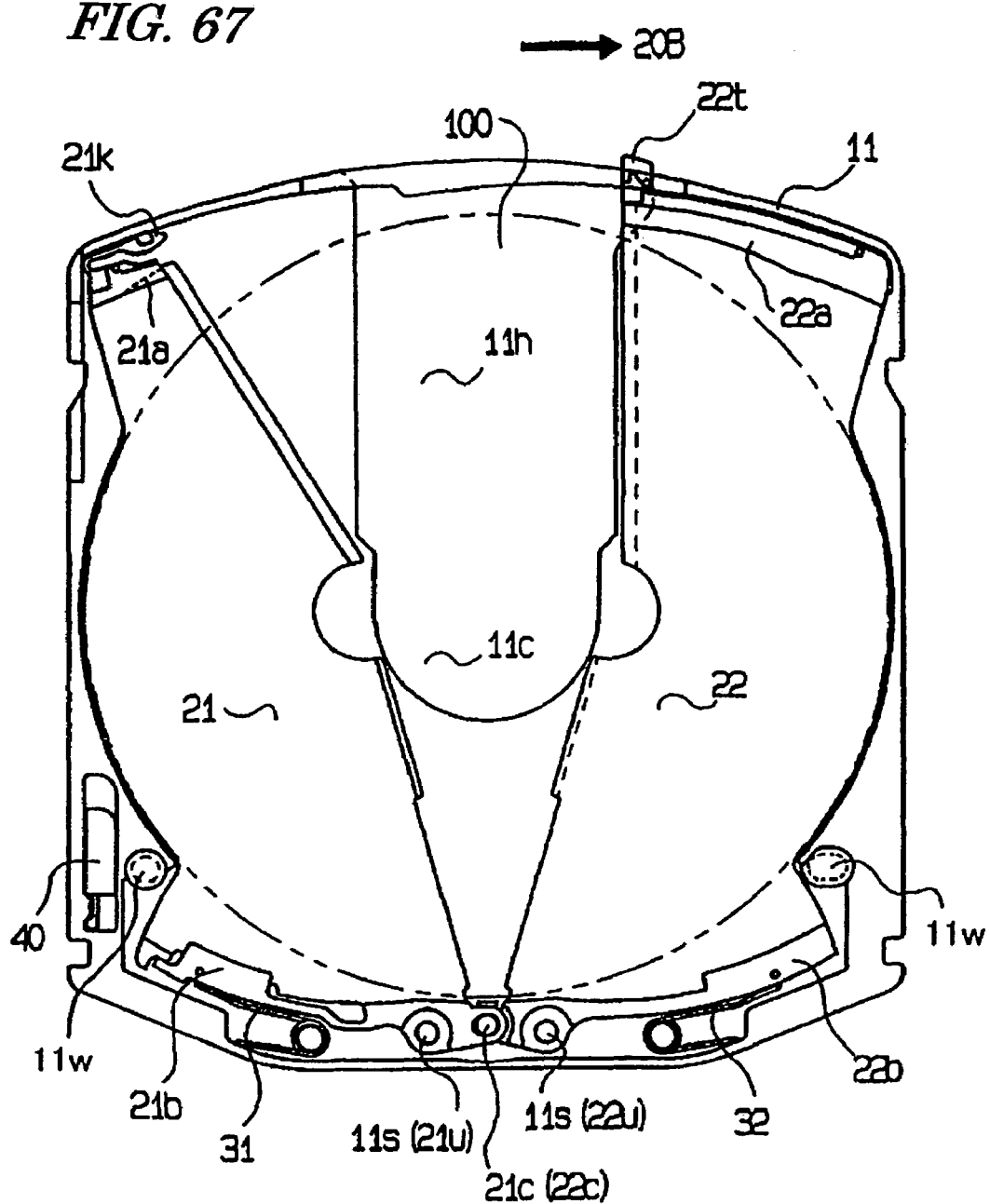
FIG. 67 is a schematic plan view illustrating a state of the disc cartridge shown in FIG. 64 in which its shutters are opened.
Figure 68:
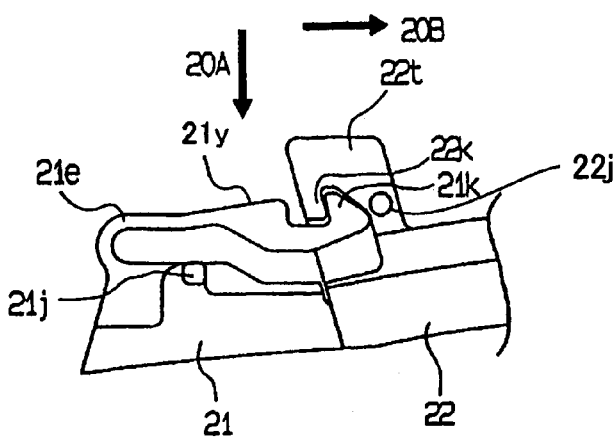
FIG. 68 is a detailed perspective view of a shutter locking portion.
Figure 69:
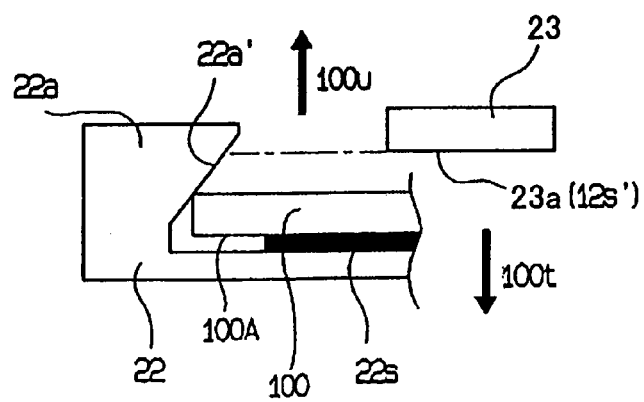
FIG. 69 is a detailed cross-sectional view of a disc holding portion of the shutter.

Hereinafter, it will be described with reference to FIGS. 66, 67, 68 and 69 how this disc cartridge 313 operates. FIGS. 66 and 67 illustrate a state where the shutters are closed and a state where the shutters are opened, respectively. FIG. 68 illustrates the details of the shutter locking portion. And FIG. 69 illustrates the details of the disc holding portion of the shutter.

First, a storage state of the disc cartridge 313, i.e., a state of the disc cartridge 313 that has not been loaded into a disc drive yet, will be described. In that state, the shutters 21 and 22 are closed as shown in FIG. 66. Also, as shown in FIG. 69, the sloped portion 22a' of the disc holding portion 22a of the shutter 22 contacts with the outer edge of the disc 100, thereby holding the disc 100 thereon and pressing the disc 100 in the thickness direction 100t. In this manner, the signal recording side 100A is brought into plane contact with the sheet 22p of the shutter 22 and the disc 100 is held and fixed onto the cartridge body 10. The other disc holding portions 21a, 21b and 22b also have their own sloped portions 21a', 21b' and 22b', respectively. Thus, just like the sloped portion 22a', these sloped portions 21a', 21b' and 22b' also hold and fix the disc 100 onto the cartridge body 10.

In this state, the signal recording side 100A of the disc 100 is in close contact with the sheets 21p and 22p. Thus, no dust will be deposited on the signal recording side 100A. Also, if the exposed side of the disc 100 is rotated manually or if the shutters 21 and 22 are opened or closed intentionally, then dust, finger marks or any other dirt that has adhered onto the signal recording side 100A of the disc 100 may be wiped away.

Furthermore, since the shutters 21 and 22 are locked by the locking mechanism 20k, the operator cannot open the shutters 21 and 22 accidentally. Thus, the signal recording side 100A of the disc 100 can be protected from dust, finger marks or scratches.

Furthermore, the hole 20h, which is defined by the notches 21h and 22h provided for the shutters 21 and 22, respectively, is provided in the regions of the shutters 21 and 22 that are located under the center hole 100h of the disc 100. In such a structure, even if the cartridge 313 is left, dust may pass through the center hole 100h but will not be deposited on the shutters 21 and 22.

Figure 70:
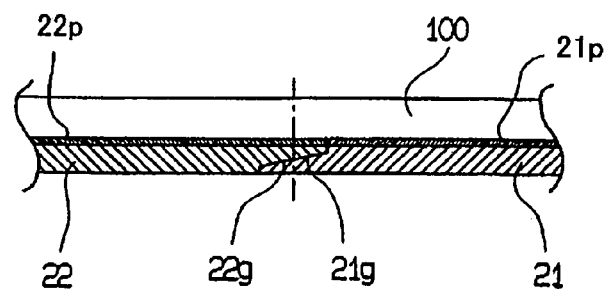
FIG. 70 is a cross-sectional view illustrating the shapes of a pair of contact surfaces of the two shutters.
Figure 71:
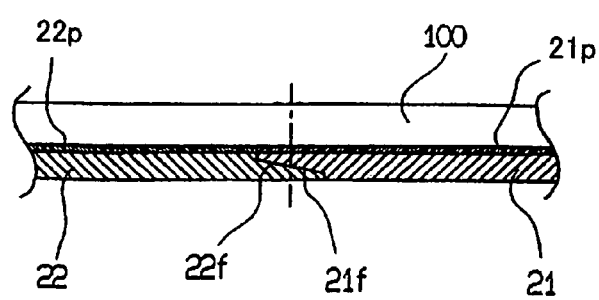
FIG. 71 is a cross-sectional view illustrating the shapes of another pair of contact surfaces of the two shutters.

Also, while the shutters 21 and 22 are closed, at least the two pairs of contact surfaces 21f, 22f and 21g, 22g of the shutters 21 and 22, which are butted with each other over the head and chucking openings 11h and 11c, each overlap with each other in the thickness direction of the disc 100 as shown in FIGS. 70 and 71. Accordingly, even if the shutters 21 and 22 have been closed incompletely because a disc 100 having a non-regular diameter has been mounted or because the shutters 21 and 22 have not been locked completely, no gap will be created between the contact surfaces of the shutters 21 and 22. Thus, even in such a situation, the disc 100 can also be protected from dust, finger marks or scratches.

Also, as shown in FIG. 70, the shutters 21 and 22 are in contact with each other around the head opening 11h so that the contact surface 22g of the shutter 22 is located over the contact surface 21g of the shutter 21. On the other hand, as shown in FIG. 71, the shutters 21 and 22 are in contact with each other around the chucking opening 11c so that the contact surface 21f of the shutter 21 is located over the contact surface 22f of the shutter 22. In this manner, the angle defined by one of multiple contact surfaces of the shutter 21 or 22 may be different from the angle defined by another one of the contact surfaces of the shutter 21 or 22. In such a structure, the two shutters 21 and 22 can be tightly engaged with each other in the thickness direction of the disc. Thus, neither the shutter 21 nor the shutter 22 will be raised unintentionally. In addition, while the shutters 21 and 22 are closed, the contact surfaces of the shutters 21 and 22 can have increased rigidity.

In this embodiment, the shutters 21 and 22 have the contact surfaces 21g, 22g, 21f and 22g shown in FIGS. 70 and 71. However, the shutters 21 and 22 may also have contact surfaces at different locations or may contact with each other in a different manner from those shown in FIGS. 70 and 71. For example, the contact surfaces 21g and 22g shown in FIG. 70 may be shifted to a location around the head opening 11h and contact with each other. Alternatively, the contact surfaces 21f and 22f shown in FIG. 71 may be shifted to a location around the chucking opening 11c and contact with each other. Then, the shutters 21 and 22 can exhibit even higher rigidity when closed, and the gap between the contact surfaces can be further reduced, thus preventing any dust from entering the inside of the cartridge.

Also, while the shutters 21 and 22 are closed, convex portions 21j and 22j, provided for the shutters 21 and 22 as shown in FIG. 68, are in contact with two shutter stopper portions 12f provided for the cartridge upper shell 12 as shown in FIG. 65. Accordingly, the shutters 21 and 22 have its rotation regulated and cannot move from their locked positions. As a result, the shutters will not move inconstantly. In addition, it is possible to prevent the operator from breaking the shutters intentionally. Furthermore, since the shutters 21 and 22 have their rotation regulated, the shutter opening/ closing portion 22t is not displaced. Accordingly, when this disc cartridge 313 is loaded into a disc drive, the shutter opening/closing portion 22t can be engaged with the shutter opening/closing mechanism of the disc drive just as intended.

Next, it will be described how this disc cartridge 313 is loaded into the disc drive. As shown in FIG. 66, when the disc cartridge 313 is inserted into the disc drive in the direction 1A, the cartridge positioning pins of the disc drive engage with the positioning holes 11w of the disc cartridge 313, thereby determining the horizontal and vertical positions of the disc cartridge 313 inside the disc drive.

Then, a shutter opening/closing member of the shutter opening/closing mechanism provided inside the disc drive engages with the shutter opening/closing portion 22t shown in FIG. 68. At the same time, an unlocking member of the shutter opening/closing mechanism presses a locking press portion 21y, which is connected to the shutter 21 by way of a locking elastic portion 21e, in the direction 20A. As a result, the locking protrusion portion 21k of the locking mechanism 20k is disengaged from the locking engaging portion 22k thereof, thereby unlocking the shutters 21 and 22 from each other. In such a state, the shutter opening/closing member moves the shutter opening/closing portion 22t in the direction 20B at the same time. Consequently, the shutter 21 rotates on the rotation shaft 11s while overcoming the elastic force applied from the shutter spring 31 as shown in FIG. 67. Synchronously, the other shutter 22, which is interlocked with the shutter 21 via the interlocking mechanism 20c, also rotates while overcoming the elastic force applied from the shutter spring 32. Accordingly, when the shutter 21 has been opened, the shutter 22 will have also been opened.

By this point in time, the locking protrusion portion 21k and the locking press portion 21y will have recovered their original shapes and returned to their home positions along with the locking elastic portion 21e. Thus, the locking elastic portion 21e made of a resin is not deformed plastically. In this manner, the signal recording side 100A of the disc 100 is exposed through the chucking and head openings 11c and 11h. Also, the disc 100, which has been held by the disc holding portions 21a, 21b, 22a and 22b, is released therefrom as the shutters 21 and 22 rotate. As a result, the disc 100 is now freely rotatable inside the disc storage portion 10d.

Subsequently, the spindle motor and the turntable of the disc drive enter the chucking opening 11c and the head thereof enters the head opening 11h. Consequently, the disc drive is now ready to perform a write or read operation on the disc 100.

As described above, only by getting the locking protrusion portion 21k pressed externally by a protrusion, for example, in the direction 20A and disengaged from the locking engaging portion 22k while pressing the shutter opening/closing portion 22t in the direction indicated by the arrow 20B at the same time, the shutters 21 and 22 can be rotated to expose the chucking and head openings 11c and 11h and the disc 100 can be released from the disc holding portions 21a, 21b, 22a and 22b. Thus, it is possible to prevent the operator from opening the shutters or removing the disc accidentally. As a result, the disc 100 can be protected from dust, finger marks or scratches.

Hereinafter, it will be described how the disc cartridge 313 is ejected from the disc drive. When an ejecting mechanism of the disc drive starts to operate, the shutter opening/closing member, which has been engaged with the shutter opening/ closing portion 22t, disengages itself from the shutter opening/closing portion 22t. As a result, the shutters 21 and 22 cannot be kept opened anymore. That is to say, the shutters 21 and 22, to which an elastic force is being applied from the shutter springs 31 and 32 in such a direction as to close the shutters 21 and 22, start to rotate in the closing direction. Consequently, the shutters 21 and 22 close up the head and chucking openings 11h and 11c. In this case, the shutters 21 and 22 are locked to each other by the locking mechanism 20k. In the meantime, the disc 100 gets held by the disc holding portions 21a, 21b, 22a and 22b again to recover its original state. In such a state, the disc cartridge 313 is ejected from the disc drive.

In the disc cartridge 313, the disc contact portion 23a of the stopper members 23 provided for the cartridge body 10 and the disc contact portion 12s' of the cartridge upper shell 12 are located at the same vertical level as shown in FIG. 69. Also, the top of the sloped portions 21a', 21b', 22a' and 22b' of the disc holding portions 21a, 21b, 22a and 22b of the shutters 21 and 22 is higher in level than the bottom of the disc contact portions 23a and 12s' in the direction 100u in which the disc 100 is moved upward. Accordingly, although the disc cartridge 313 may be used either vertically or upside down depending on the type of the disc drive, the shutters 21 and 22 still can hold the disc 100 firmly thereon. For example, particularly when the disc 100 is used upside down, the disc 100 that is no longer chucked contacts with the disc contact portions 23a and 12s' and still can maintain its horizontal position. And when the shutters 21 and 22 are closed in such a state, the disc 100 contacts with the slopes 21a', 21b', 22a' and 22b' this time. Then, the disc 100 will slide along the slopes smoothly to be held firmly by the disc holding portions 21a, 21b, 22a and 22b.

As described above, in the disc cartridge of this embodiment, the cartridge body thereof has a disc window and covers only one side of the disc. Also, a shutter opening/closing portion is provided inside a head opening of the cartridge body, and therefore, there is no need to provide any unnecessary gap for the cartridge body. As a result, no dust will enter the inside of the cartridge body.

In addition, the two shutters are made to contact with each other along the centerline of the disc over the chucking opening and along a line, which defines a predetermined angle with the centerline of the disc, over the head opening. Accordingly, these shutters can have an integrated structure from the vicinity of the shutter opening/closing portion and can exhibit sufficiently high rigidity.

Furthermore, since the two shutters are locked or unlocked to/from each other, the operator cannot open or close the shutters accidentally. Thus, the disc can be protected from dust, finger marks or scratches.

Moreover, at least one of multiple disc holding portions is not secured to the shutter but is just connected thereto via an elastic portion. As an elastic force is also applied from a shutter spring, the disc holding portion can be deformed elastically in the disc radial direction. For that reason, even if a disc of a non-regular diameter has been mounted, such a disc can also be held firmly without allowing it to move inconstantly.

Embodiment 14

Hereinafter, a disc cartridge 314 according to a fourteenth embodiment of the present invention will be described with reference to FIGS. 72 through 81. In the disc cartridge 314 of this embodiment, the same member as the counterpart of the disc cartridge 313 of the thirteenth embodiment is identified by the same reference numeral.

Figure 72:
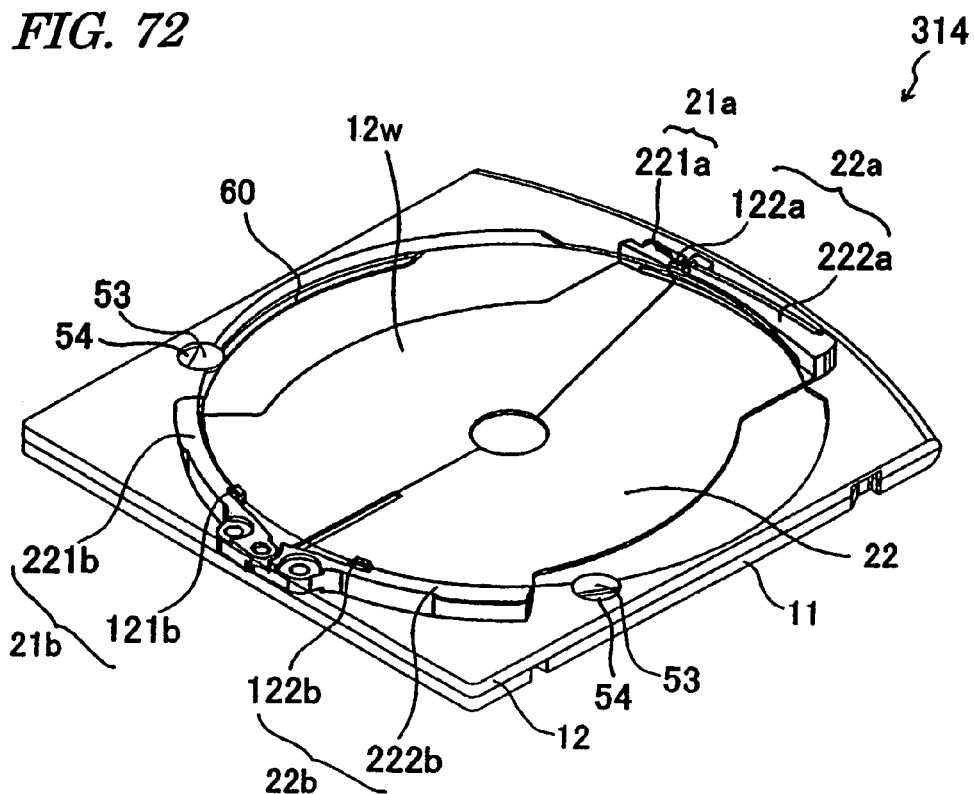
FIG. 72 is a perspective view illustrating an overall configuration for a disc cartridge according to a fourteenth embodiment of the present invention.
Figure 76:
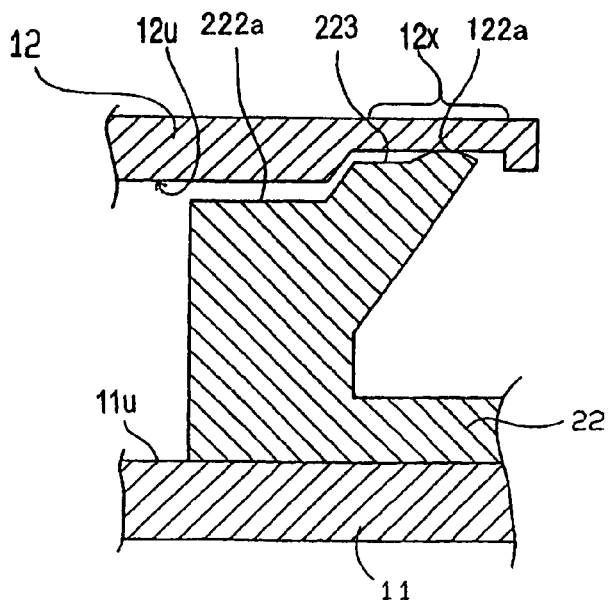
FIG. 76 is an enlarged cross-sectional view illustrating the disc holding portion and its surrounding members of the disc cartridge shown in FIG. 72.
Figure 77:
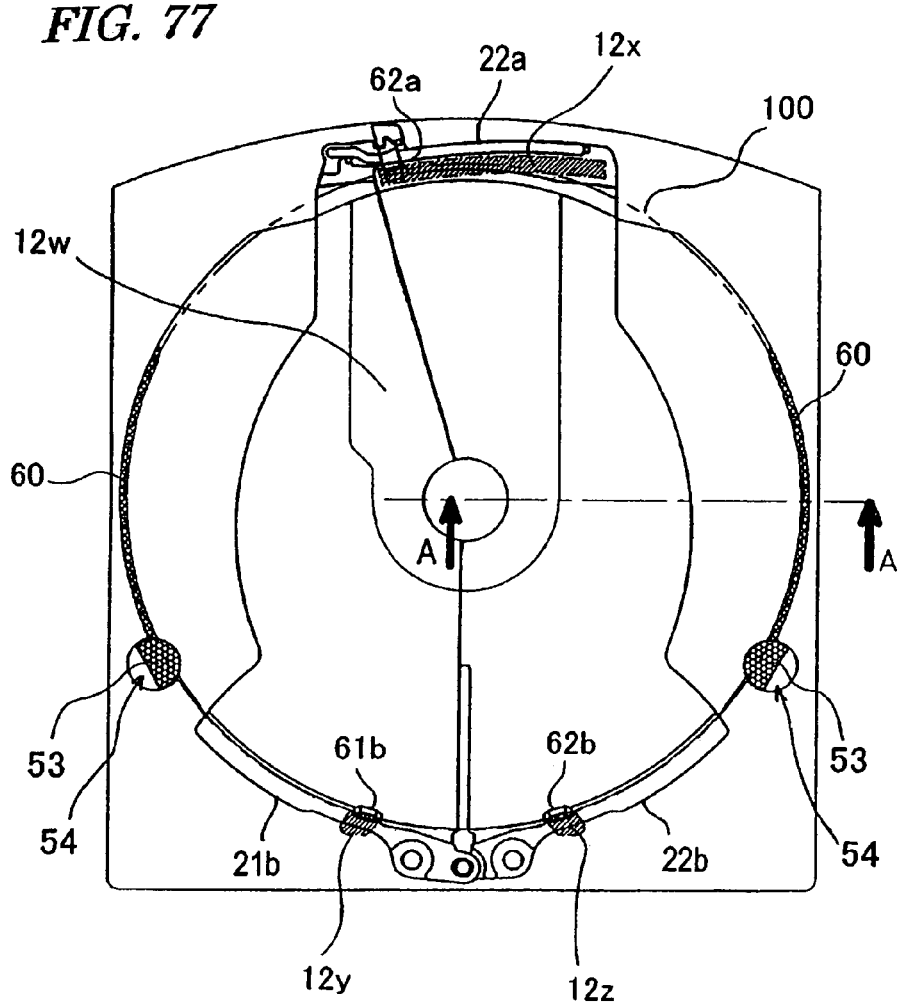
FIG. 77 is a schematic plan view illustrating a state of the disc cartridge shown in FIG. 72 in which its shutters are closed.
Figure 78:
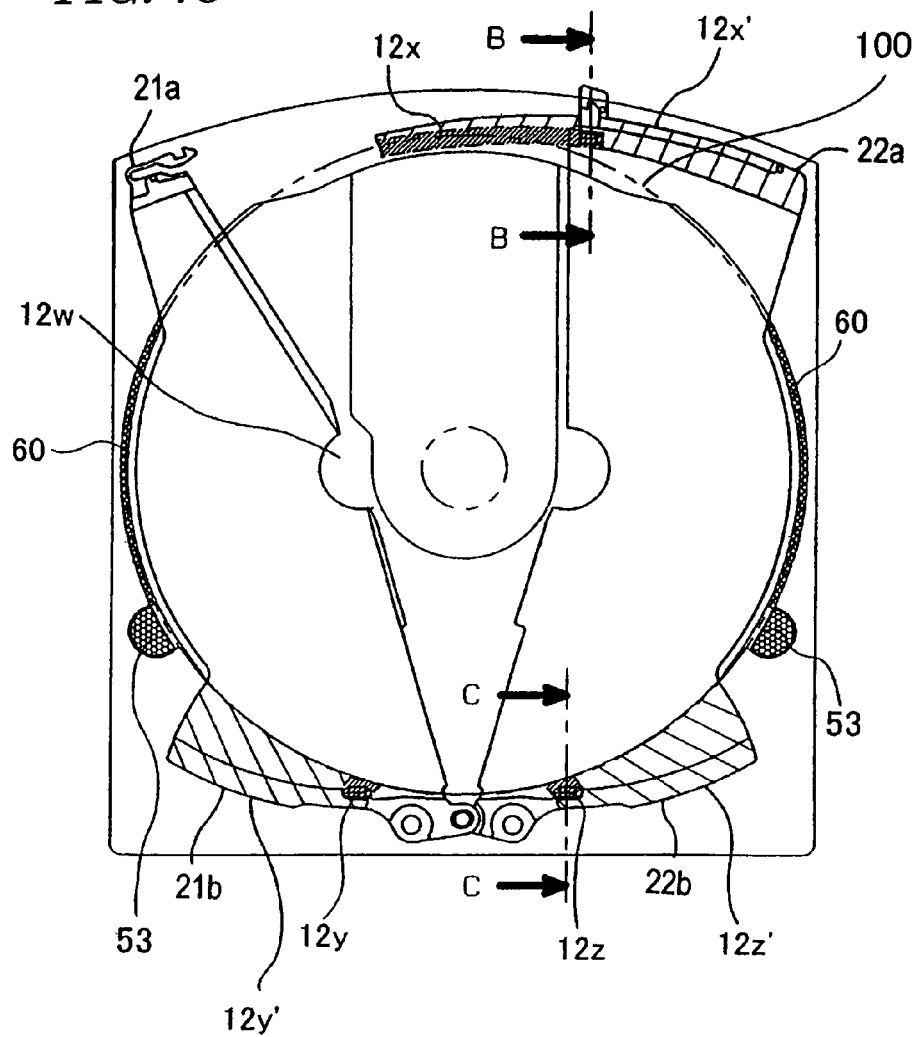
FIG. 78 is a schematic plan view illustrating a state of the disc cartridge shown in FIG. 72 in which its shutters are opened.

The disc cartridge 314 is different from the disc cartridge 313 of the thirteenth embodiment in the respective shapes of the inner upper surface 12u of the cartridge upper shell 12 (see FIG. 79), the disc holding portions 21a, 21b, 22a and 22b (see FIGS. 72 through 79) and the stopper members 53 (see FIGS. 72, 77 and 78). In addition, the disc cartridge 314 further includes a disc receiving portion 60 (see FIGS. 72 and 81). Thus, the following description of the disc cartridge 314 will be focused on these differences.

Figure 73:
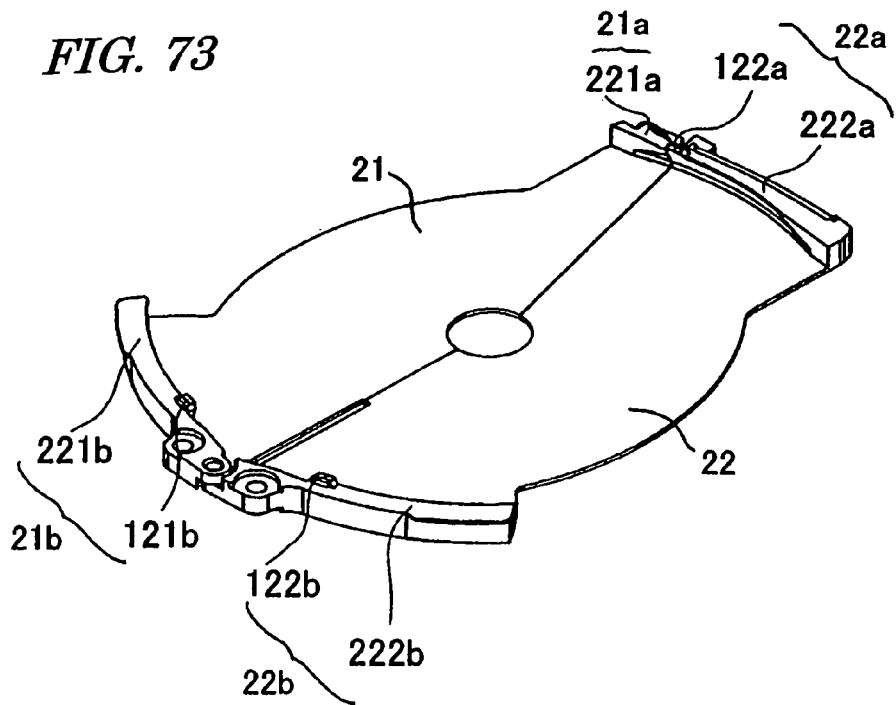
FIG. 73 is a perspective view illustrating the shutters of the disc cartridge shown in FIG. 72.
Figure 79:
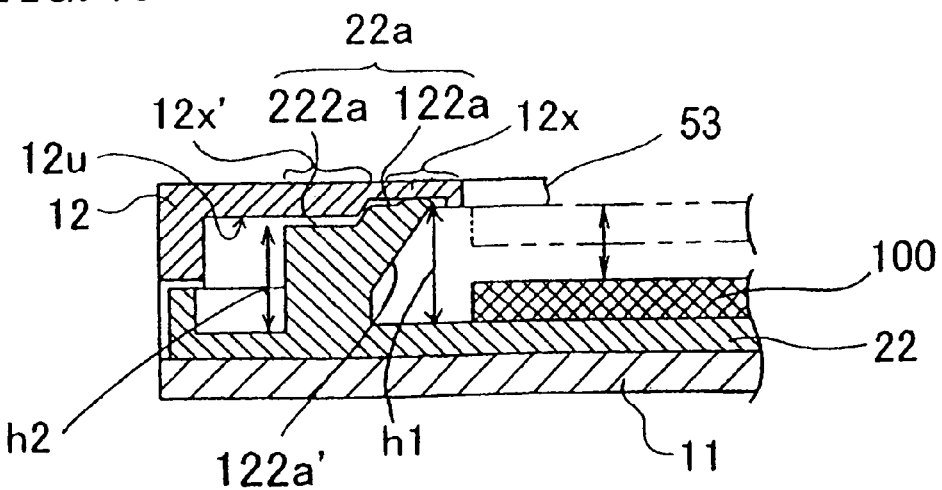
FIG. 79 is a cross-sectional view taken along the line B-B shown in FIG. 78.

In the disc cartridge 313 of the thirteenth embodiment, the respective tops of the disc holding portions 21a, 21b, 22a and 22b thereof are located at substantially the same vertical levels along the outer periphery of the disc 100. In contrast, in the disc cartridge 314 of this embodiment, protrusions are formed on the disc holding portions 21b, 22a and 22b as shown in FIGS. 73 and 79. More specifically, each of the disc holding portions 21b, 22a and 22b includes: a first portion 121b, 122a or 122b that has a protrusion thereon and has a first height h1; and a second portion 221b, 222a or 222b that has a second height h2. The other disc holding portion 21a consists of a second portion 221a that has the second height h2.

The first height h1 is greater than the second height h2 and is approximately equal to the height of the disc holding portions 21a, 21b, 22a and 22b of the disc cartridge 313 of the thirteenth embodiment. That is to say, the disc holding portions 21a, 21b, 22a and 22b of this embodiment are lower than the disc holding portions 21a, 21b, 22a and 22b of the disc cartridge 313 of the thirteenth embodiment except their first portions 121b, 122a and 122b.

Figure 74:
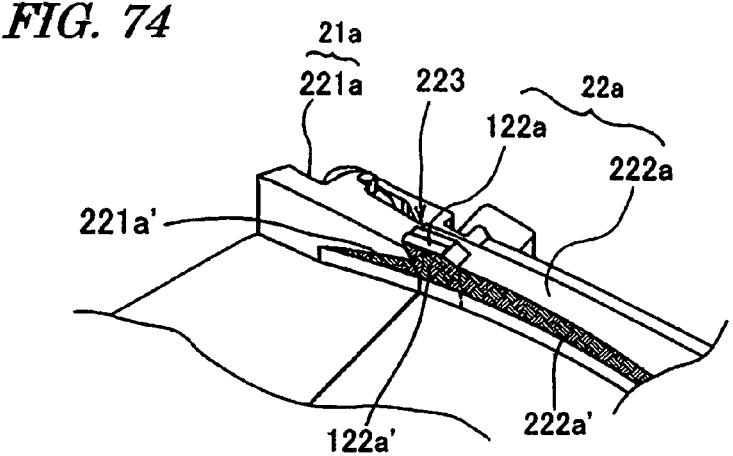
FIG. 74 is an enlarged perspective view illustrating the disc holding portions and their surrounding members of the disc cartridge shown in FIG. 72.
Figure 75:
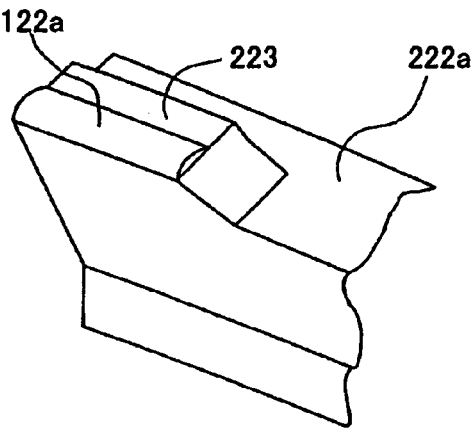
FIG. 75 is an enlarged perspective view illustrating the disc holding portion and its surrounding portion of the disc cartridge shown in FIG. 72.

Also, as shown in FIGS. 74 and 75, a step 223 is formed on the upper surface of the first portion 122a of the disc holding portion 22a. Specifically, the step 223 is provided along the outer periphery of the disc so that a part of the first portion 122a that is closer to the disc is higher than the other part thereof. A similar step is also formed on the upper surface of the first portion 121b of the disc holding portion 21b and on the upper surface of the first portion 122b of the disc holding portion 22b.

As the shutters 21 and 22 are going to be closed, the first portion 121b, 122a or 122b of the disc holding portion 21b, 22a or 22b contacts with the disc 100 earlier than any other portion thereof (i.e., earlier than the second portion 221b, 222a or 222b thereof).

Figure 80:
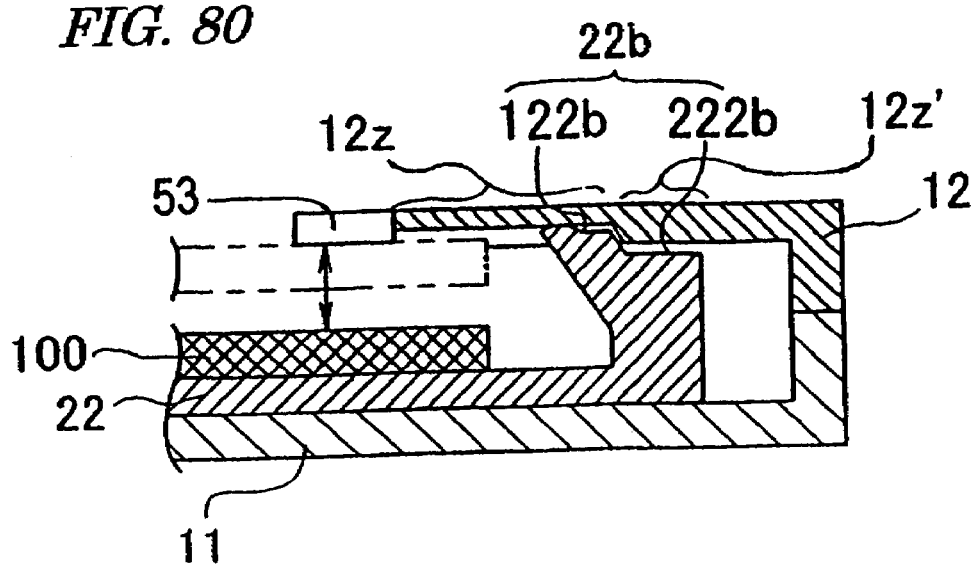
FIG. 80 is a cross-sectional view taken along the line C-C shown in FIG. 78.

The disc holding portions 21a, 21b, 22a and 22b move as the shutters 21 and 22 are opened or closed. FIG. 77 illustrates the respective positions of the disc holding portions 21a, 21b, 22a and 22b while the shutters 21 and 22 are closed. On the other hand, FIG. 78 illustrates the respective positions of the disc holding portions 21a, 21b, 22a and 22b while the shutters 21 and 22 are opened. FIGS. 79 and 80 illustrate cross sections that are respectively taken along the lines B-B and C-C shown in FIG. 78.

As shown in FIGS. 77, 78 and 79, the regions 12y, 12x and 12z on the inner upper surface 12u of the cartridge upper shell 12, through which the first portions 121b, 122a and 122b of the disc holding portions 21b, 22a and 22b pass as the shutters 21 and 22 are opened or closed, are recessed. On the other hand, the regions 12y', 12x' and 12z', through which the second portions 221b, 222a and 222b thereof pass, are not recessed. Accordingly, the cartridge upper shell 12 is thinner in the regions 12x, 12y and 12z than in the regions 12x', 12y' and 12z' and the other regions.

As shown in FIGS. 76 and 79, the top of the first portion 122a is located at a vertical level higher than the bottom of the stopper member 51. Also, the top of the first portion 122a of the disc holding portion 22a enters the recessed region 12x on the inner upper surface 12u of the cartridge upper shell 12, and the recessed region 12x receives the top of the first portion 62a. Since the step 223 is formed at the top of the first portion 122a, just a part of the upper surface of the first portion 122a is in contact with the inner upper surface 12u. On the other hand, the second portion 222a is not in contact with the inner upper surface 12u of the cartridge upper shell 12.

To open and close the shutters 21 and 22 smoothly, the friction caused by the contact between the top of the first portion 122a of the disc holding portion 22a and the inner upper surface 12u of the cartridge upper shell 12 is preferably small. For that purpose, the top of the first portion 122a of the disc holding portion 22a has a convex arc-shaped cross section when taken in the radial direction of the disc 100. This step 223 is provided to compensate for shortage in strength, which would be caused by a sharpened top, and to make that top moldable more accurately and more easily.

As shown in FIG. 80, the top of the first portion 122b of the disc holding portion 22b is also located at a vertical level higher than the bottom of the stopper member 53. And the top of the first portion 122b enters the recessed region 12z on the inner upper surface 12u of the cartridge upper shell 12 (i.e., the recessed region 12z receives the top of the first portion 122b). Although not shown, the top of the first portion 121b of the disc holding portion 21b is also located at a vertical level higher than the bottom of the stopper member 53, and enters the recessed region 12y on the inner upper surface 12u of the cartridge upper shell 12.

As described above, the regions 12x, 12y and 12z on the inner upper surface 12u of the cartridge upper shell 12 are recessed to receive portions of the disc holding portions. Thus, the overall thickness of the disc cartridge 314 can be reduced by the depth of those recessed regions 12x, 12y and 12z.

Even if the cartridge having such a structure is used either vertically or upside down, the disc 100 that is no longer chucked never fails to contact with the sloped portion 122a' of the first portion 122a of the disc holding portion 22a as the shutters 21 and 22 are going to be closed. Thereafter, the disc 100 will slide smoothly along the sloped portion 122a' to contact with the sloped portion 222a' of the second portion 222a of the disc holding portion 22a (see FIG. 74). At the same time, the disc 100 also contacts with the sloped portion 221a' of the second portion 221a of the disc holding portion 21a including no protrusion. In this manner, the disc holding portions 21a and 22b hold the disc 100 thereon cooperatively. The two other disc holding portions 21b and 22b also hold the disc 100 thereon through similar operations. Accordingly, although this disc cartridge has a reduced thickness, the disc cartridge can close the shutters in any position and can hold the disc thereon just as intended.

If this disc cartridge had its overall thickness just reduced without changing the shapes of the disc holding portions (or using the disc holding portions of the first embodiment as they are), the regions 12x, 12x', 12y, 12y', 12z and 12z' on the inner upper surface 12u of the cartridge upper shell 12, through which the disc holding portions 22a, 21b and 22b pass, should all be recessed as can be seen from FIG. 78. In that case, the cartridge upper shell 12 would have a reduced thickness over a rather wide area and such a disc cartridge would have a decreased strength. In contrast, the disc cartridge 314 can have its thickness reduced without decreasing its overall strength because the regions 12x, 12y and 12z with a reduced thickness are relatively narrow.

In this embodiment, protrusions are provided for three of the four disc holding portions to define the first portions. However, any other number may be selected depending on the number of disc holding portions or the shapes of the shutters.

The disc cartridge 314 of this embodiment is also different from the disc cartridge 313 of the thirteenth embodiment in the shape of the stopper members 53.

As shown in FIG. 72, the stopper members 53 have the shape of a notched circular plate. Specifically, notches 54 having substantially the same shape as the stopper members 53 are provided along the disc window 12w of the cartridge upper shell 12 and the stopper members 53 are engaged in a rotatable state with the notches 54. As shown in FIG. 77, the stopper members 53 are held in such a manner as to partially protrude into the disc window 12w of the cartridge upper shell 12 when rotated. Also, as shown in FIG. 78, by rotating the stopper members 53, the stopper members 53 may also be held in such a manner as to be stored inside the cartridge upper shell and not to protrude into the disc window 12w. If the stopper members 53 are easily disengaged from the notches 54 unintentionally, then the side surfaces of the stopper members 53 and the notches 54 of the cartridge upper shell 12 may have mutually engaging concave and convex portions, for example.

In such a structure, the thickness of the stopper members 53 may be substantially equal to that of the upper part of the cartridge upper shell 12. Thus, the disc cartridge 314 can have a reduced overall thickness.

The disc cartridge 314 of this embodiment is also characterized by including a disc receiving portion 60 at the bottom of the inner periphery of the disc storage portion. The disc storage portion is defined by the inner lower surface 11u and the inner side surface 11i of the cartridge lower shell 11 as shown in FIGS. 72, 77, 78 and 81. The disc receiving portion 60 has an upper surface 60a, which is parallel to the inner lower surface 11u of the cartridge lower shell 11.

While the shutters 21 and 22 are closed and the disc 100 is held by the disc holding portions, the outer edge and its surrounding portion of the signal recording side 100A of the disc 100 are in contact with the upper surface 60a of the disc receiving portion 60. Thus, no dust will be deposited on the signal recording side 100A of the disc 100 or accumulated on the inner lower surface 11 of the cartridge lower shell.

Figure 81:
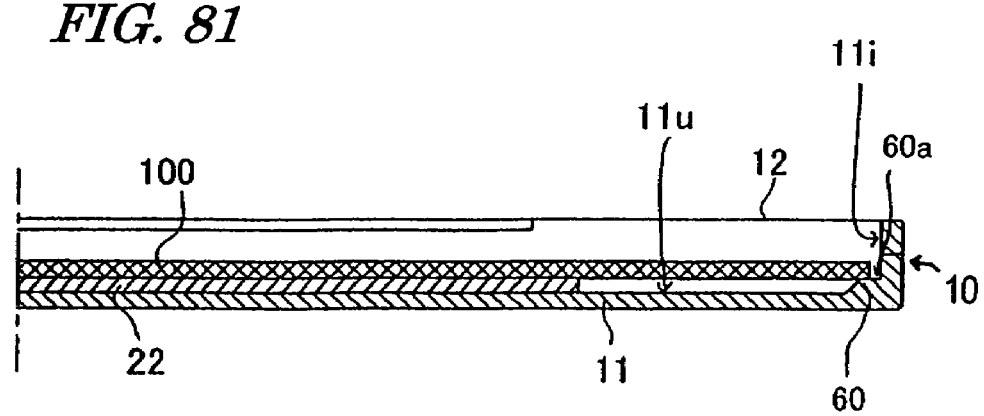
FIG. 81 is a cross-sectional view taken along the line A-A shown in FIG. 77.
Figure 82:
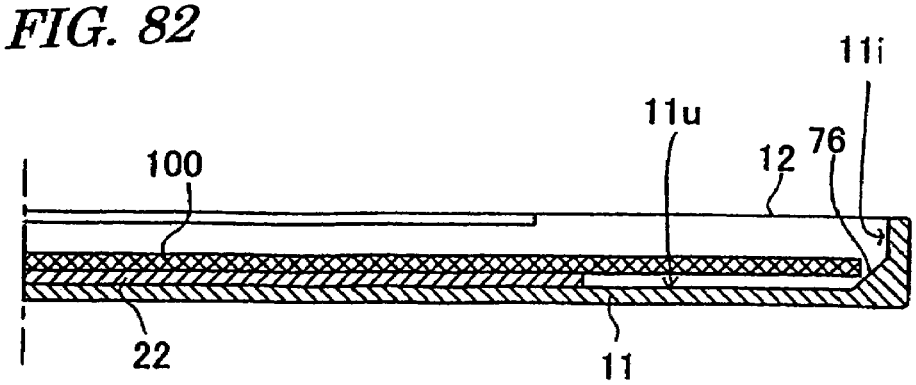
FIG. 82 is a cross-sectional view illustrating a modified example of the disc receiving portion.

Alternatively, the disc receiving portion 60 may have any shape other than that shown in FIG. 81. For example, as shown in FIG. 82, a disc receiving portion 76 having a tapered shape may be formed so as to contact with the inner lower surface 11u and the inner side surface 11i of the cartridge lower shell. In that case, while the shutters 21 and 22 are closed and the disc 100 is held by the disc holding portions, the outer edge of the signal recording side 100A of the disc 100 contacts with the disc receiving portion 76.

Embodiment 15

Hereinafter, a disc cartridge 315 according to a fifteenth embodiment of the present invention will be described with reference to FIGS. 83 through 87. In the disc cartridge 315 of this embodiment, the same member as the counterpart of the disc cartridge 314 of the fourteenth embodiment is identified by the same reference numeral.

Figure 83:
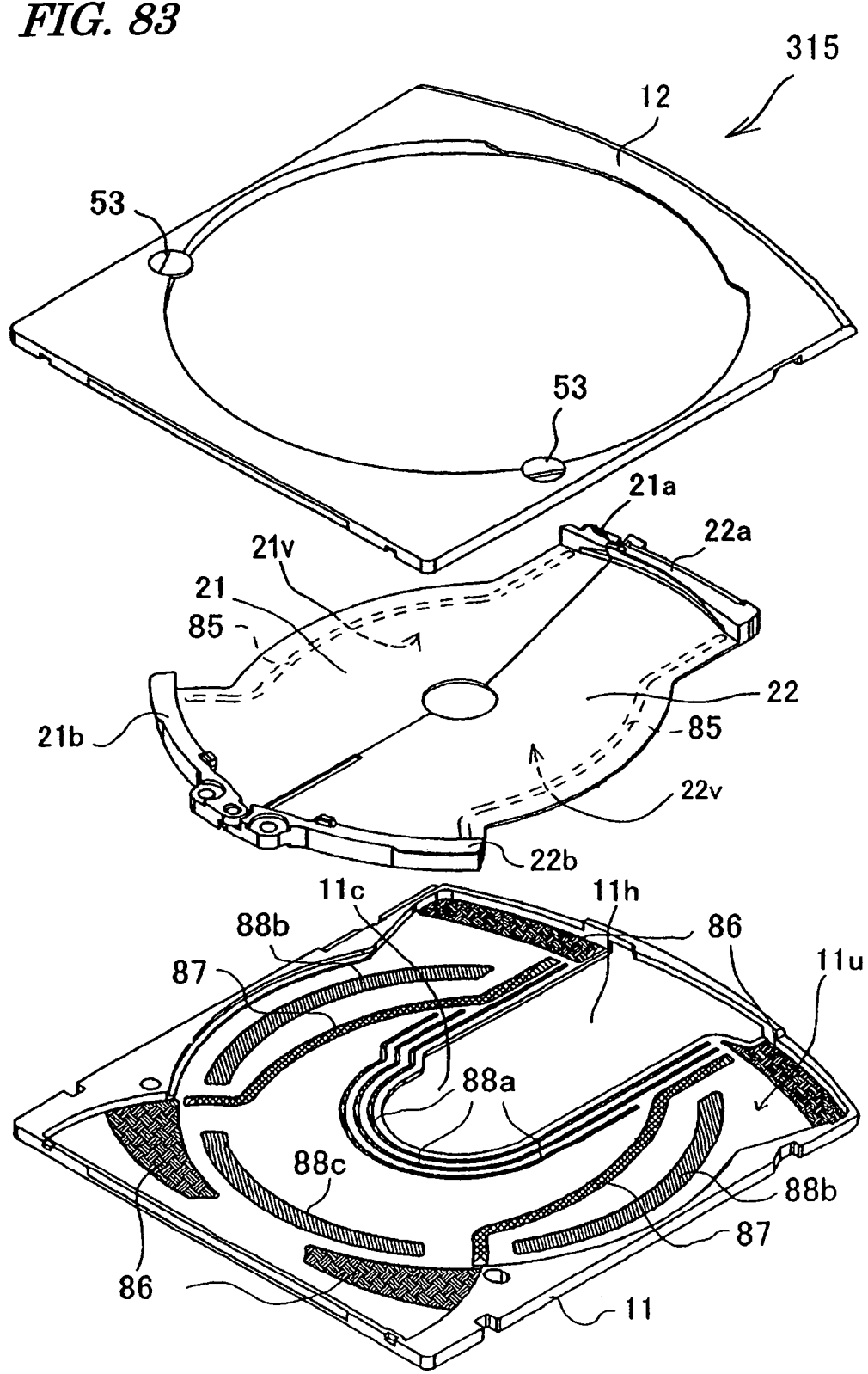
FIG. 83 is an exploded perspective view illustrating an exploded state of a disc cartridge according to a fifteenth embodiment of the present invention.

As shown in FIG. 83, the disc cartridge 315 is different from the disc cartridge 314 in that the disc cartridge 315 includes four types of recesses 85, 86, 87 and 88a through 88c on respective regions of the inner lower surface 11u of the cartridge lower shell 11 that contact with the shutters 21 and 22 and on the lower surfaces 21v and 22v of the shutters 21 and 22. These four types of recesses will be described one by one. Where the disc cartridge is supposed to hold a 12 cm disc, these recesses may have a depth of about 0.1 mm to about 0.3 mm, for example.

Figure 84:
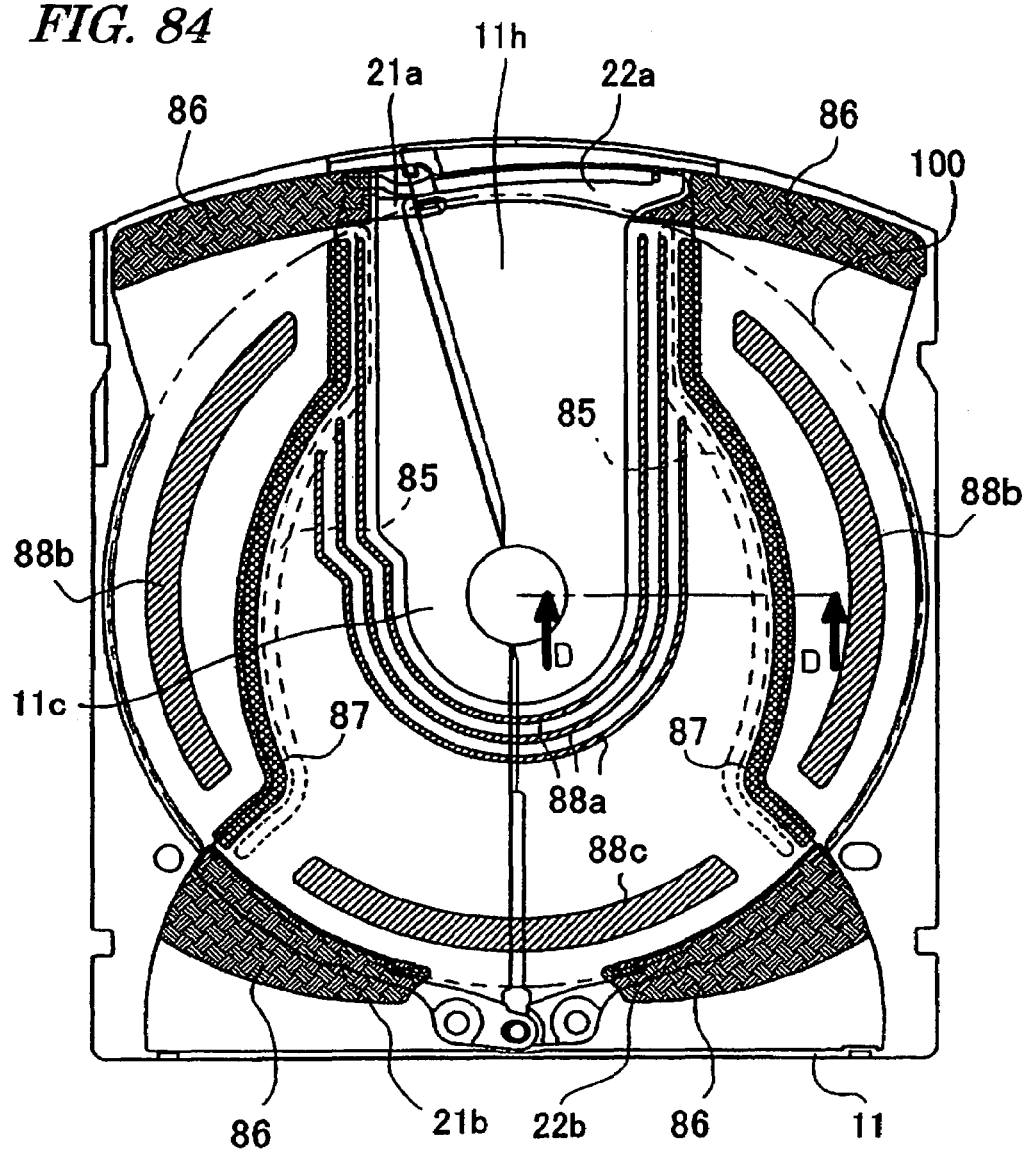
FIG. 84 is a schematic plan view illustrating a state of the disc cartridge shown in FIG. 83 in which its shutters are closed.
Figure 85:
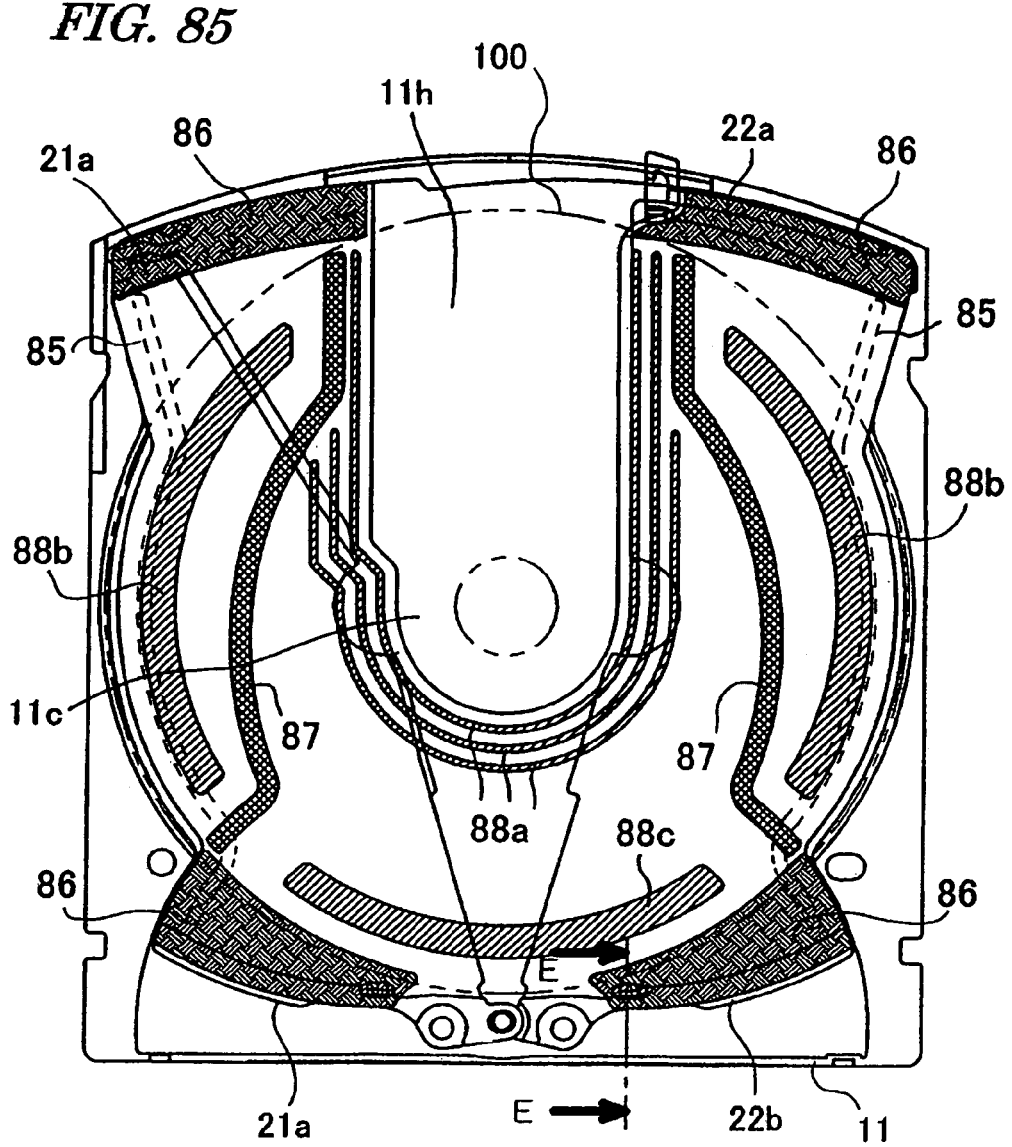
FIG. 85 is a schematic plan view illustrating a state of the disc cartridge shown in FIG. 83 in which its shutters are opened.

As can be seen from FIGS. 84 and 85 illustrating a state where the shutters 21 and 22 are closed and a state where the shutters 21 and 22 are opened, respectively, the first type of recesses 86 are formed on respective regions of the inner lower surface 11u of the cartridge lower shell 11 that contact with the disc holding portions 21a, 21b, 22a and 22b of the shutters 21 and 22 being opened or closed.

The disc holding portions 21a, 21b, 22a and 22b are sandwiched between the cartridge upper and lower shells 12 and 11 with almost no gap left between them. Accordingly, when respective members of the disc cartridge 315 are assembled together or if any of those members of the disc cartridge 315 has a size that is greatly different from the designed one, the disc holding portions 21a, 21b, 22a and 22b might contact with the cartridge upper and lower shells 12 and 11 strongly. In that case, excessive friction would be created between the disc holding portions 21a, 21b, 22a and 22b and the cartridge upper or lower shell 12 or 11. As a result, the shutters 21 and 22 might be unable to be opened or closed so easily or dust might be stirred up due to the friction.

However, by providing the first type of recesses 86, gaps are provided under the disc holding portions 21a, 21b, 22a and 22b, thus reducing such friction. Then, the shutters 21 and 22 can always be opened or closed smoothly and the dust to be stirred up due to the friction can be reduced.

Figure 86:
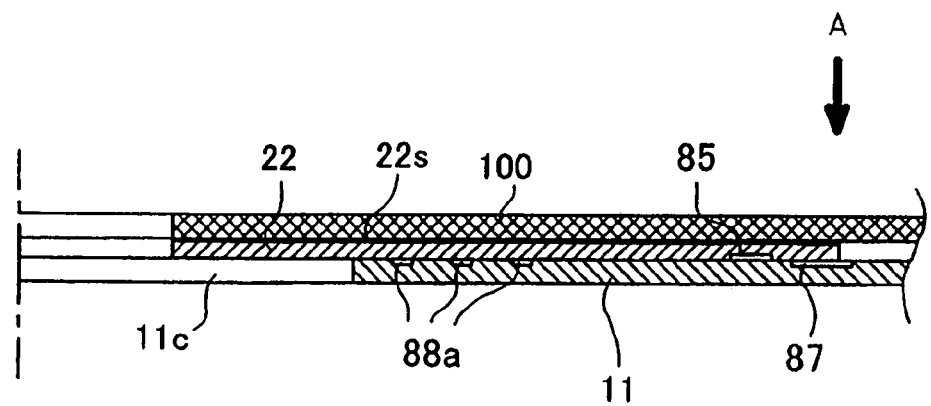
FIG. 86 is a cross-sectional view taken along the line D-D shown in FIG. 84.
Figure 87:
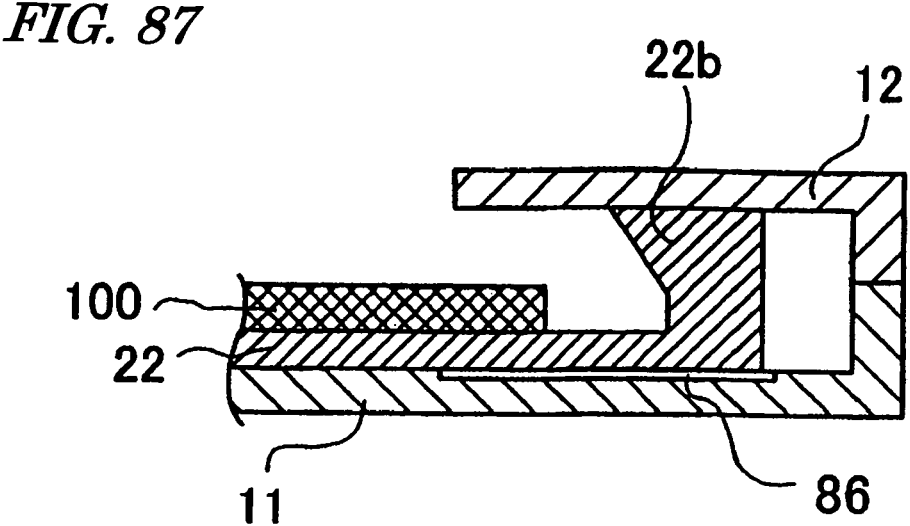
FIG. 87 is a cross-sectional view taken along the line E-E shown in FIG. 85.

The second type of recesses 87 are formed on those regions where the respective outer edges of the shutters 21 and 22 are located while the shutters 21 and 22 are closed. As shown in FIGS. 84 and 86, the second type of recesses 87 preferably include the lines on the inner lower surface 11u of the cartridge lower shell 11 that correspond to the outer edges of the shutters 21 and 22 and are preferably present both inside and outside the lines.

The disc cartridge 315 is supposed to store the disc therein with one side thereof exposed, and the disc 100 can be pressed in the direction indicated by the arrow A in FIG. 86. To protect the signal recording side 100A of the disc 100, the nonwoven fabrics 21s and 22s are provided but the outer edges of the shutters 21 and 22 are not completely covered with the nonwoven fabrics 21s and 22s. Accordingly, if the disc 100 is pressed in the arrowed direction A, then the outer edges of the shutters 21 and 22 contact with the signal recording side 100A of the disc 100, thus possibly scratching the signal recording side 100A.

However, if the second type of recesses 87 are provided, the shutters 21 and 22 may be deformed in such a manner that the outer edges thereof are partially forced into the second type of recesses 87. Then, the pressing force can be dispersed, and the outer edges of the shutters 21 and 22 will not contact with the signal recording side 100A of the disc 100 too strongly.

The third type of recesses include: the third type of recesses 88a that are provided on the inner lower surface 11u so as to surround the chucking and head openings 11c and 11h; the third types of recesses 88b that are formed on those regions of the inner lower surface 11u that are not overlapped by the shutters 21 and 22 being closed; and the third type of recess 88c that is provided on a region of the inner lower surface 11u that is overlapped by the shutters 21 and 22 being closed. The third type of recesses 88b and 88c are provided as arcs along the inner side surface of the disc storage portion. In this embodiment, the number of the recesses 88a of the third type is three.

This disc cartridge 315 is also provided with various types of structures (e.g., a disc receiving portion) for preventing dust from entering the disc cartridge or being deposited on the signal recording side of the disc. However, it is difficult to totally eliminate that entering or deposition of dust.

Thus, the third type of recesses are provided to accumulate the dust that has entered the disc cartridge 315. Specifically, as the shutters 21 and 22 are going to be opened or closed, the dust is gathered in these recesses of the third type. Once gathered in the third type of recesses, the dust never contacts with the shutters 21 and 22 and remains in the third type of recesses without going out of the third type of recesses. Accordingly, by accumulating the dust in the third type of recesses in this manner, the dust will not interfere with the operation of the shutters or will be stirred up to a much lesser degree due to the friction.

It should be noted that these effects are also achievable by the first type of recesses 86 or the second type of recesses 87. Accordingly, the disc cartridge 315 does not have to include all of the first, second and third types of recesses 86, 87, 88a, 88b and 88c but may include just one type of recesses. Even so, the shutters will not be interfered with their operation by the dust and almost no dust will be stirred up due to the friction to say the least.

Also, to remove the dust that has entered the gap between the shutters 21 and 22 and the inner lower surface 11u of the cartridge lower shell 11 and accumulate it in the second type of recesses 87, for example, even more effectively, the respective lower surfaces 21v and 22v of the shutters 21 and 22 may be provided with the recesses 85 along the outer edges thereof. In that case, when the shutters 21 and 22 are closed, these recesses 85 are preferably located inside the second type of recesses 87 (i.e., closer to the center of the cartridge) as shown in FIG. 84. Also, as shown in FIG. 86, while the shutters 21 and 22 are closed, the recesses 85 of the shutters 21 and 22 are preferably discontinuous from the second type of recesses 87 on the inner lower surface 11u of the cartridge lower shell 11.

When the recesses 85 are provided, the outer edge portions of the shutters 21 and 22 are deformed more easily. Accordingly, even when a force is externally applied to the disc 100 in the arrowed direction A, the outer edge portions of the shutters 21 and 22 will much less likely contact with the signal recording side 100A so strongly as to scratch it. Optionally, a nonwoven fabric, for example, may be welded or adhered to these recesses 86, 87, 88a, 88b and 88c. Then, the gaps of the cartridge body can be filled and entering of extraneous dust can be prevented with even more certainty.

In this embodiment, the various types of recesses are provided for the disc cartridge 314 of the fourteenth embodiment. Alternatively, these recesses may also be provided for the disc cartridge according to any of the eighth through thirteenth embodiments.

Embodiment 16

Hereinafter, a disc cartridge 316 according to a sixteenth embodiment of the present invention will be described with reference to FIGS. 88 through 93. In the disc cartridge 316 of this embodiment, the same member as the counterpart of the disc cartridge 313 of the thirteenth embodiment is identified by the same reference numeral.

Figure 88:
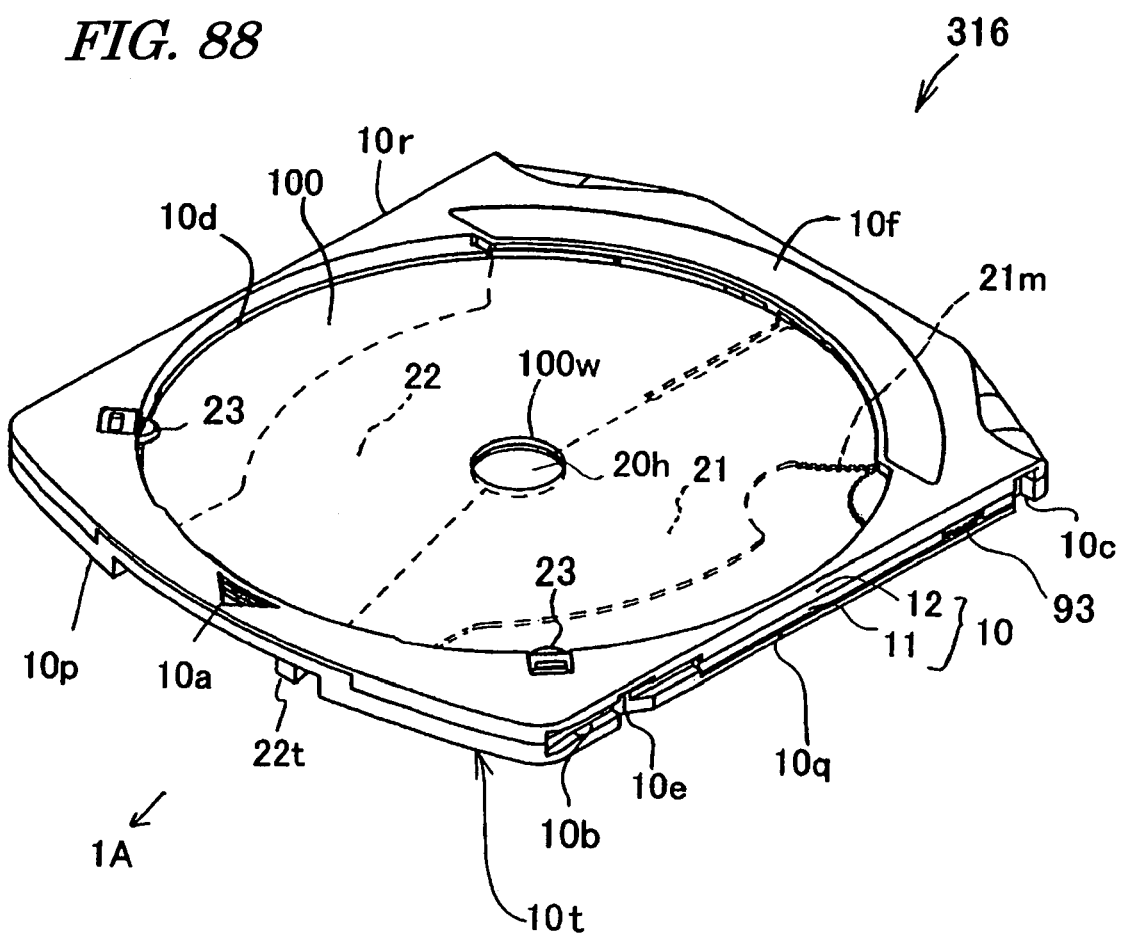
FIG. 88 is a perspective view illustrating an overall configuration for a disc cartridge according to a sixteenth embodiment of the present invention.

As shown in FIG. 88, the disc cartridge 316 of this embodiment includes: a first opening/closing portion 22t on a first side surface 10p of the cartridge body that extends substantially vertically to the direction 1A in which this disc is inserted; and a second opening/closing portion 93 on a second side surface 10q thereof. The first opening/closing portion 22t has the same structure as the opening/closing portion 22t of the disc cartridge of the thirteenth embodiment.

Figure 89:
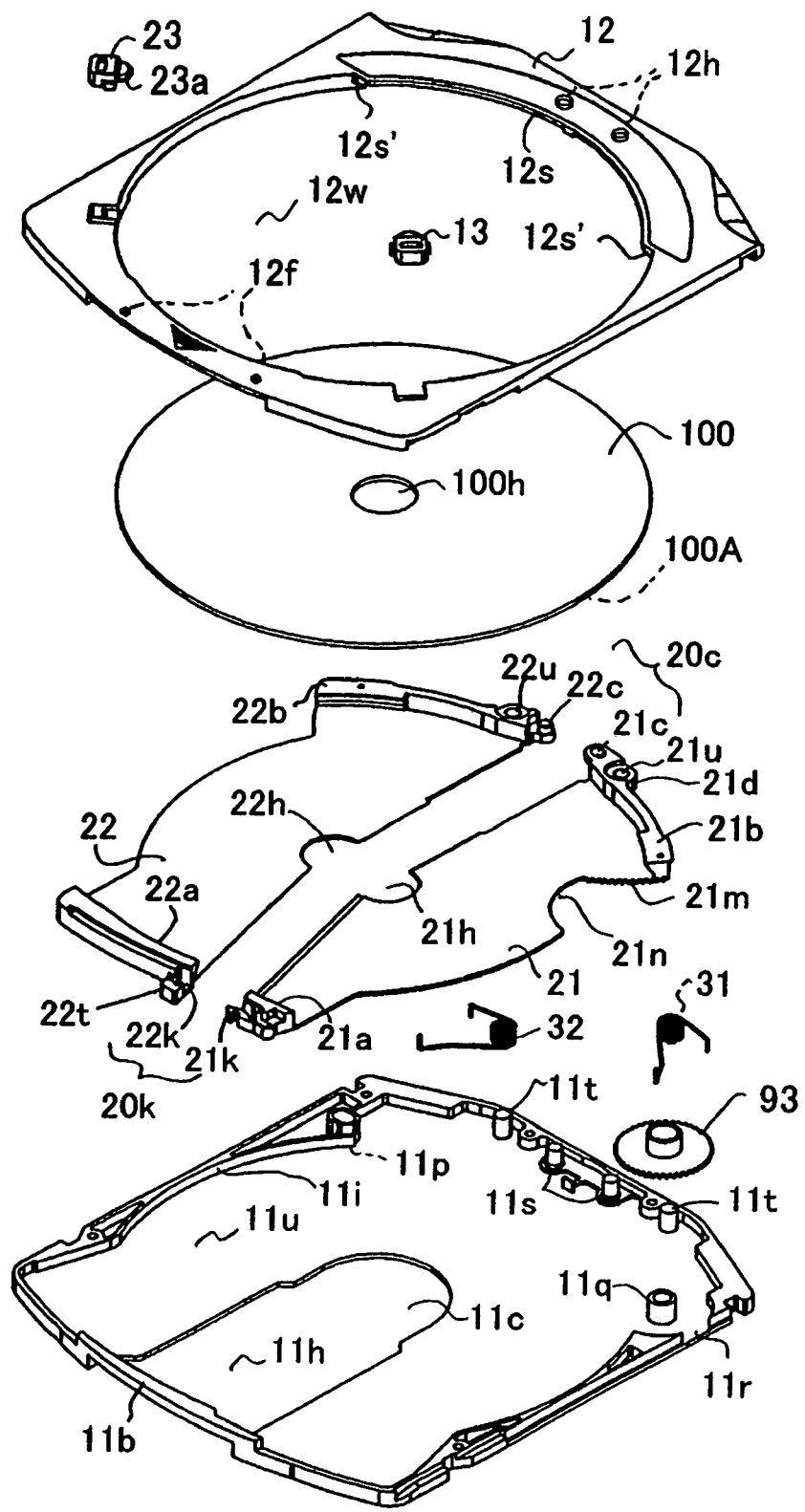
FIG. 89 is an exploded perspective view illustrating an exploded state of the disc cartridge shown in FIG. 88.

As shown in FIG. 89, the second opening/closing portion 93 is formed in the shape of a gear having a hole that can be inserted into a rotation shaft 11q provided for the cartridge lower shell 11. A side surface of the cartridge lower shell 11 has an opening 11r to expose a portion of the second opening/closing portion 93 through the second side surface 10q of the cartridge body 10 when the second opening/closing portion 93 is inserted into the rotation shaft 11q. Alternatively, the rotation shaft 11q may be provided for the cartridge upper shell 12.

Two shutters 21 and 22 are also provided to expose or cover the head and chucking openings 11h and 11c of the cartridge lower shell 11. The first opening/closing portion 22t forms an integral part of the shutter 22 (i.e., the first shutter member). On the other hand, a sector gear 21m, which engages with the second opening/closing portion 93 having the gear shape, is formed on the outer side surface of the shutter 21 (i.e., the second shutter member) and is located near the disc holding portion 21b. The center of the sector gear 21m is the rotation hole 21u of the shutter 21. A concave portion 21n is provided adjacent to the sector gear 21m. This concave portion 21n is formed to define a space in which the second opening/closing portion 93 having the gear shape engages with the sector gear 21m.

Figure 90:
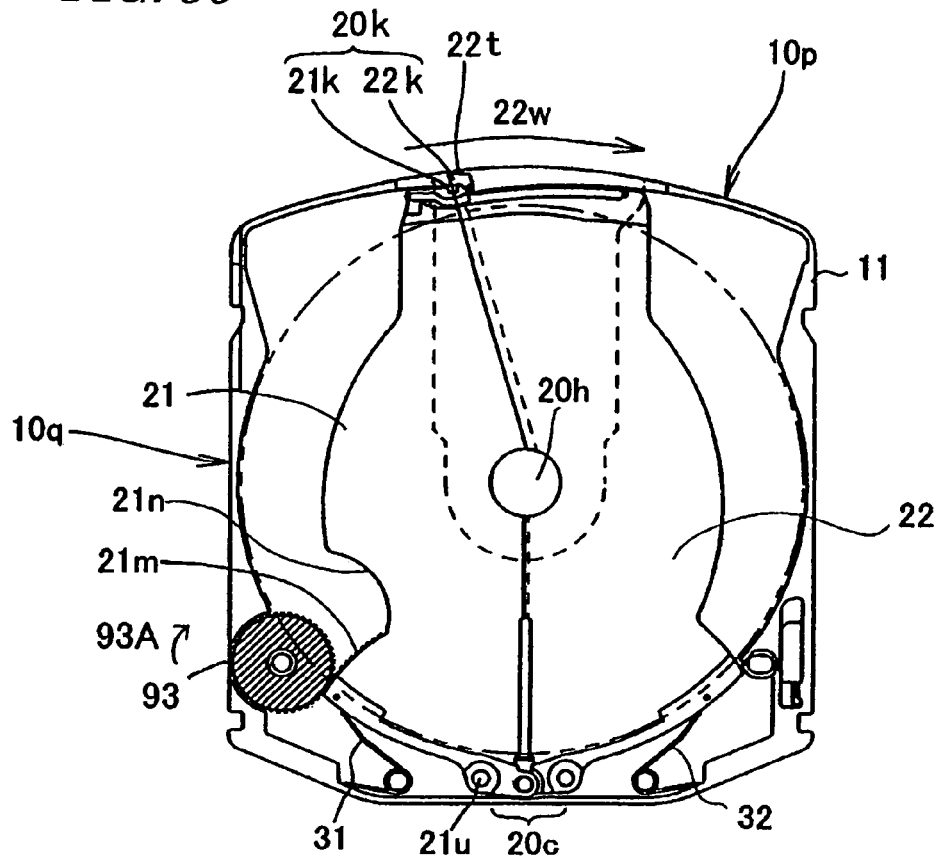
FIG. 90 is a schematic plan view illustrating a state of the disc cartridge shown in FIG. 88 in which its shutters are closed.
Figure 91:
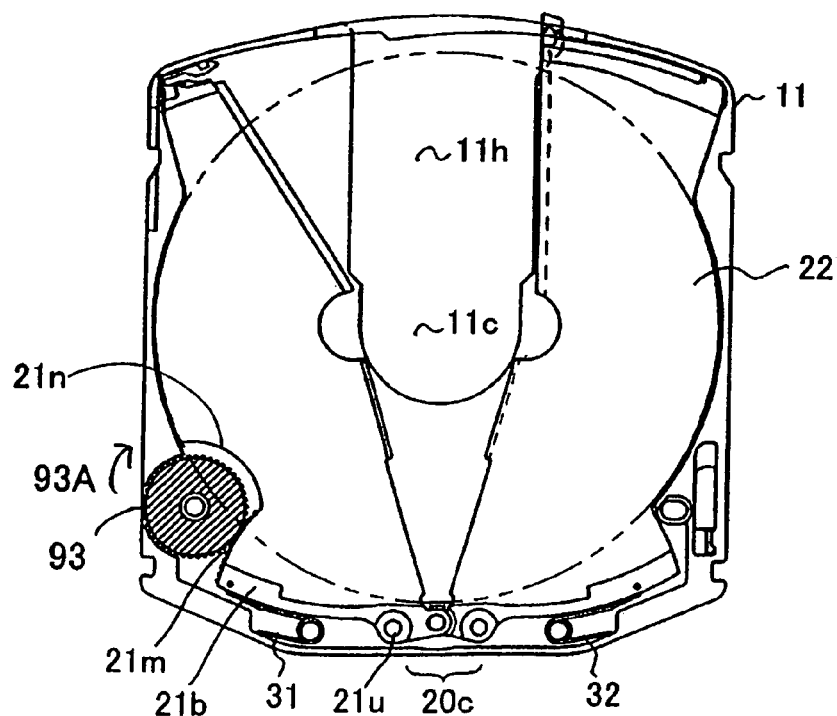
FIG. 91 is a schematic plan view illustrating a state of the disc cartridge shown in FIG. 88 in which its shutters are opened.

The shutters 21 and 22 may be opened or closed by using the first opening/closing portion 22t in the following manner. First, as shown in FIG. 90, the locking protrusion portion 21k and the locking engaging portion 22k, which together make up the locking mechanism 20k, are disengaged from each other. Then, the first opening/closing portion 22t is slid along the first side surface 10p of the cartridge as indicated by the arrow 22W. As a result, the movement of the shutter 22 is transmitted to the shutter 21 by way of the interlocking mechanism 20c and these two shutters 21 and 22 expose the head and chucking openings 11h and 11c cooperatively as shown in FIG. 91.

The shutters 21 and 22 may also be opened or closed by using the second opening/closing portion 93 in the following manner. First, the locking mechanism 20k is unlocked as shown in FIG. 90. Next, the second opening/closing portion 93 is rotated to the direction indicated by the arrow 93A. Then, the sector gear 21m gets engaged with the geared second opening/closing portion 93 and starts to rotate around the rotation hole 21u, thereby opening the shutter 21. Since the movement of the shutter 21 is transmitted to the shutter 22 by way of the interlocking mechanism 20c and these two shutters 21 and 22 expose the head and chucking openings 11h and 11c cooperatively. When the head and chucking openings 11h and 11c are completely exposed by the shutters 21 and 22 as shown in FIG. 91, a portion of the second opening/closing portion 93 is located inside the concave portion 21n of the shutter 21.

In closing the shutters 21 and 22, the first opening/closing portion 22t may be slid in the direction opposite to the direction 22W or the second opening/closing portion 93 may be rotated to the direction opposite to the direction 93A. In this embodiment, the shutter springs 31 and 32 are provided to apply an elastic force to the shutters 21 and 22 in such a direction as to close the shutters 21 and 22. Accordingly, unless a force that is strong enough to open, or keep opened, the shutters 21 and 22 against the elastic force of the shutter springs 31 and 32 is applied to the first or second opening/closing portion 22t or 93, the shutters 21 and 22 close themselves automatically even without performing the operations described above.

In the disc cartridge 316 of this embodiment, the opening/closing portions are provided for the shutters 21 and 22 both on a surface that is perpendicular to the disc inserting direction and on a surface that is parallel to the disc inserting direction. Accordingly, no matter whether the disc drive used is compatible with only a disc cartridge including a shutter opening/closing portion on a side surface that extends perpendicularly to the disc cartridge inserting direction or only a disc cartridge including a shutter opening/closing portion on a side surface that extends parallel to the disc cartridge inserting direction, the disc drive can always write or read a signal on/from the disc stored in the disc cartridge of this embodiment.

Also, in the disc cartridge 316 of this embodiment, the second opening/closing portion 93, provided for the side surface parallel to the direction in which the disc cartridge 316 is inserted, has a gear shape. Accordingly, a shutter opening/closing mechanism to be provided for the disc drive may also be any of various shapes of gears that can engage with the second opening/closing portion 93. Thus, the disc drive may use a relatively simple mechanism to open or close the shutters 21 and 22 of the disc cartridge 316.

Figure 92:
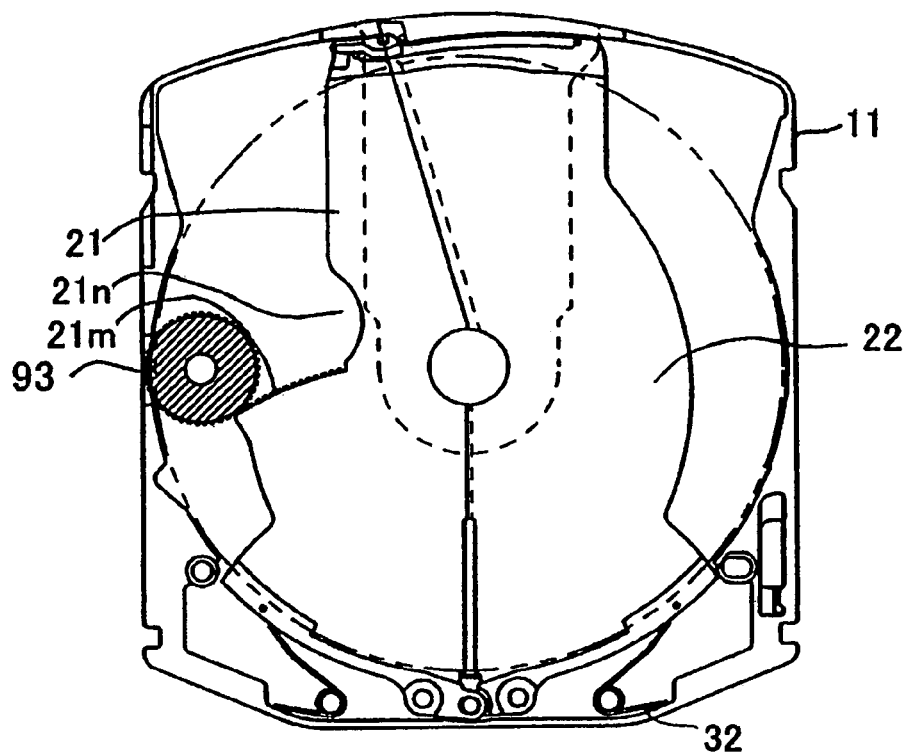
FIG. 92 is a schematic plan view illustrating a modified example of the disc cartridge shown in FIG. 88 to show a state where the shutters of the disc cartridge are closed.
Figure 93:
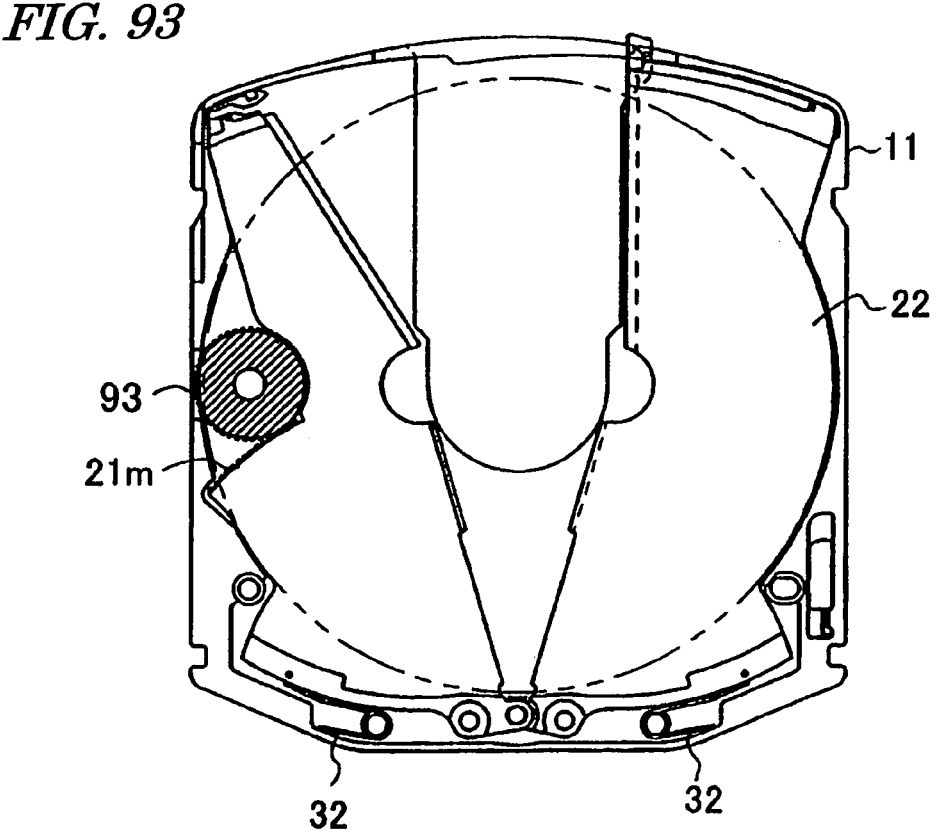
FIG. 93 is a schematic plan view illustrating a state of the disc cartridge shown in FIG. 92 in which its shutters are opened.

In the embodiment described above, the sector gear 21m is provided near the disc holding portion 21b. This is because the distance between the sector gear 21m at such a position and the rotation hole 21u of the shutter 21 is relatively short and because the sector gear 21m needs to have a relatively short length to open the shutter 21 fully. However, the sector gear 21m does not have to be provided at this position. Alternatively, the sector gear 21m and the second opening/closing portion 93 may also be provided at such positions as shown in FIGS. 92 and 93. In FIGS. 92 and 93, the sector gear 21m is located at such a position that when extended, a circular trace drawn by the sector gear 21m will substantially intersect with the center of the disc, while the second opening/closing portion 93 is provided at such a position as to engage with the sector gear 21m. When the second opening/closing portion 93 is provided at such a position, the sector gear 21m should be relatively long to open the shutter 21 fully, but the distance between the sector gear 21m and the rotation hole 21u may also be relatively long. That is to say, since there is a longer distance between the fulcrum and the application point in that case, a lighter force is needed to rotate the second opening/closing portion 93 and open or close the shutters 21 and 22.

Embodiment 17

Hereinafter, a disc cartridge 317 according to a seventeenth embodiment of the present invention will be described with reference to FIGS. 94 through 97. In the disc cartridge 317 of this embodiment, the same member as the counterpart of the disc cartridge 316 of the sixteenth embodiment is identified by the same reference numeral.

Figure 94:
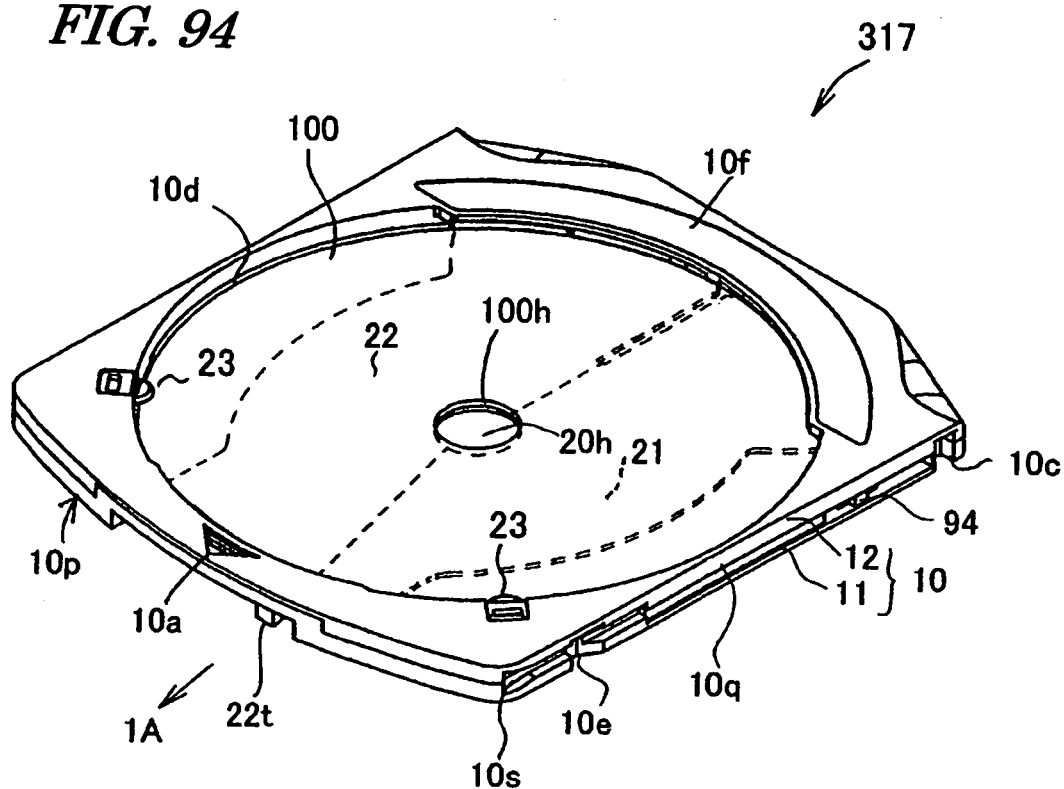
FIG. 94 is a perspective view illustrating an overall configuration for a disc cartridge according to a seventeenth embodiment of the present invention.

As shown in FIG. 94, the disc cartridge 317 of this embodiment includes a second opening/closing portion 94 on its second side surface 10q instead of the second opening/closing portion 93 of the disc cartridge 316 of the sixteenth embodiment.

Figure 95:
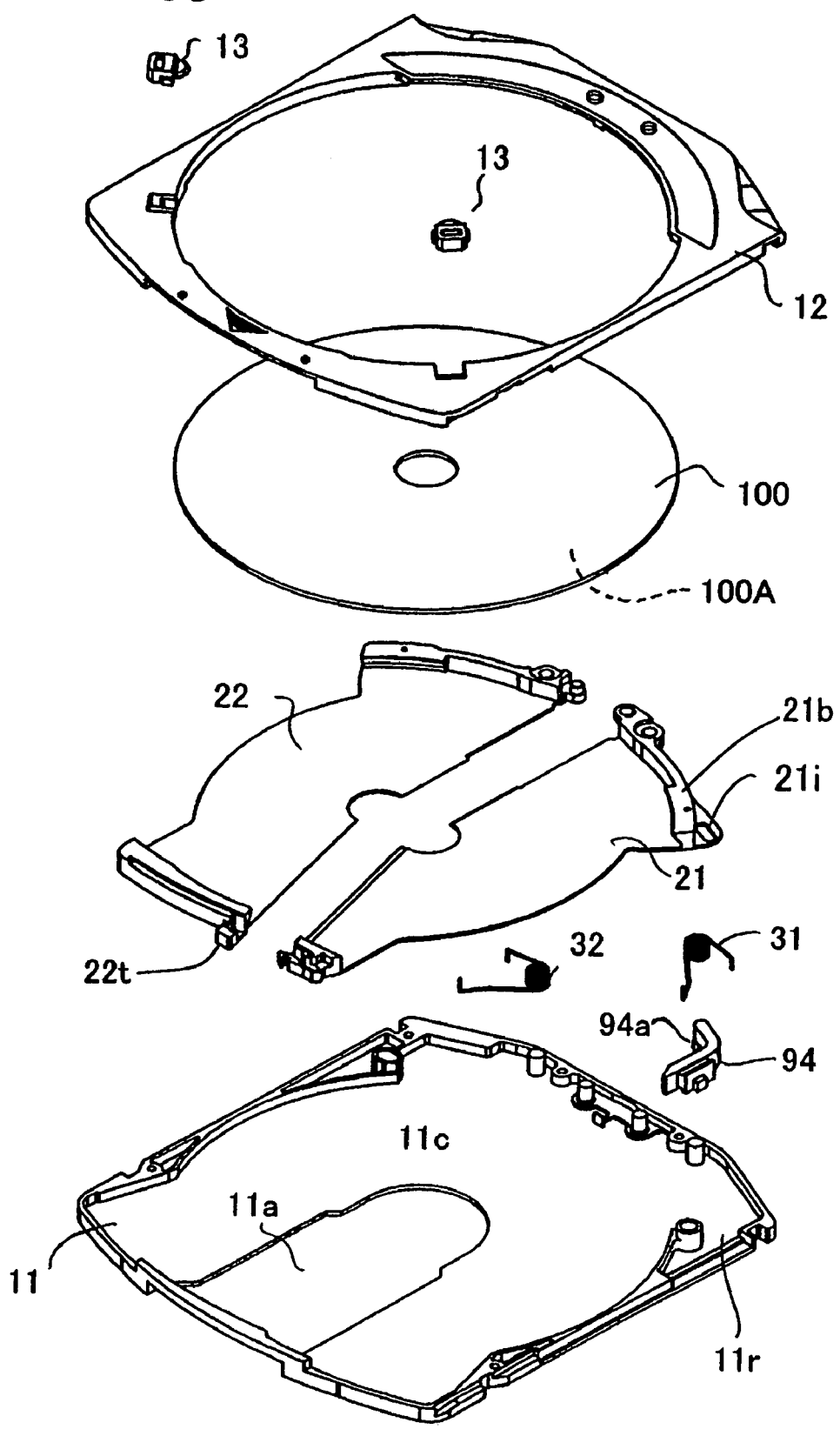
FIG. 95 is an exploded perspective view illustrating an exploded state of the disc cartridge shown in FIG. 94.

As can be seen from FIG. 95, the second opening/closing portion 94 is a link member that can slide along the opening 11r on the side surface of the cartridge lower shell 11 and is bent approximately at the center thereof. Also, the second opening/closing portion 94 includes a protrusion 94a at one end thereof. This protrusion 94a engages with a groove 21i that is provided on the shutter 21 near the disc holding portion 21b thereof.

Figure 96:
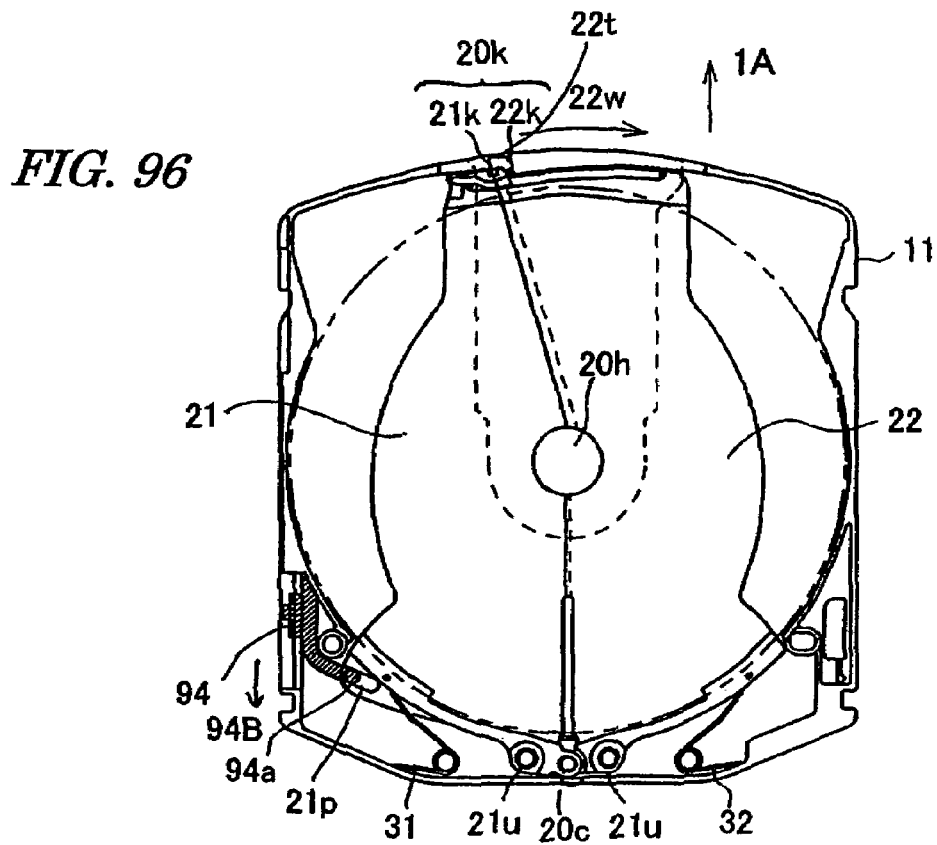
FIG. 96 is a schematic plan view illustrating a state of the disc cartridge shown in FIG. 94 in which its shutters are closed.
Figure 97:
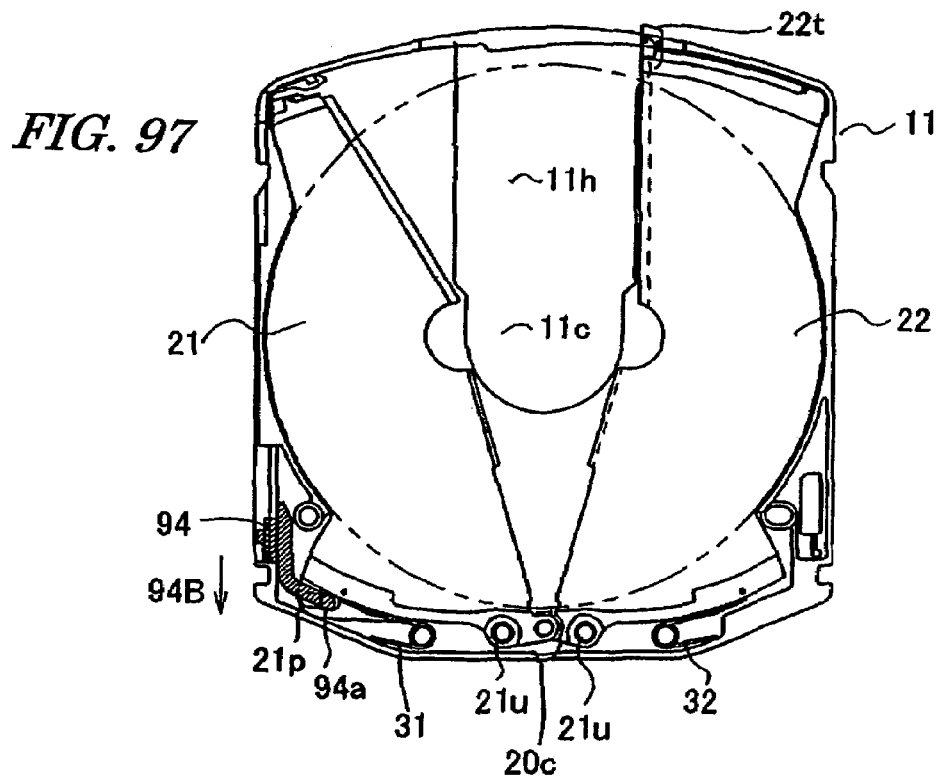
FIG. 97 is a schematic plan view illustrating a state of the disc cartridge shown in FIG. 94 in which its shutters are opened.

FIGS. 96 and 97 illustrate two states of the disc cartridge 317 in which the shutters 21 and 22 thereof are closed and opened, respectively. As already described for the thirteenth and sixteenth embodiments, the shutters 21 and 22 can be opened or closed by sliding the first opening/closing portion 22t in either the direction indicated by the arrow 22w or the opposite direction.

The shutters 21 and 22 may also be opened or closed by using the second opening/closing portion 94 in the following manner. First, the locking mechanism 20k is unlocked as shown in FIG. 96. Next, the second opening/closing portion 94 is slid in the direction indicated by the arrow 94B. As a result of this operation, a force is applied to the second opening/closing portion 94 in such a direction as to move the protrusion 94a of the second opening/closing portion 94 in the direction indicated by the arrow 94B. Thus, the shutter 21 is rotated around the rotation hole 21u and opened. Since the movement of the shutter 21 is transmitted to the shutter 22 by way of the interlocking mechanism 20c, these two shutters 21 and 22 expose the head and chucking openings 11h and 11c cooperatively. As in the sixteenth embodiment, the shutters 21 and 22 can also be closed by sliding the second opening/closing portion 94 in the direction opposite to the direction 94B, and the shutter springs 31 and 32 also apply an elastic force to the shutters 21 and 22 in the same direction.

Just like the disc cartridge of the sixteenth embodiment, no matter whether the disc drive used is compatible with only a disc cartridge including a shutter opening/closing portion on a side surface that extends perpendicularly to the disc cartridge inserting direction or only a disc cartridge including a shutter opening/closing portion on a side surface that extends parallel to the disc cartridge inserting direction, the disc drive can always write or read a signal on/from the disc stored in the disc cartridge of this embodiment.

Also, as shown in FIGS. 96 and 97, the direction 94B in which the second opening/closing portion 94 is slid to open the shutters 21 and 22 is antiparallel to the disc cartridge inserting direction 1A. Accordingly, if a protrusion that engages with the second opening/closing portion 94 is provided for a disc drive, that protrusion engages with the second opening/closing portion 94 and opens the shutters 21 and 22 of the disc cartridge while the disc cartridge of this embodiment is going to be inserted into the disc drive. Thus, a simplified shutter opening/closing mechanism may be provided for the disc drive.

Embodiment 18

Hereinafter, a disc cartridge 318 according to an eighteenth embodiment of the present invention will be described with reference to FIGS. 98 through 101. In the disc cartridge 318 of this embodiment, the same member as the counterpart of the disc cartridge 316 of the sixteenth embodiment is identified by the same reference numeral.

Figure 98:
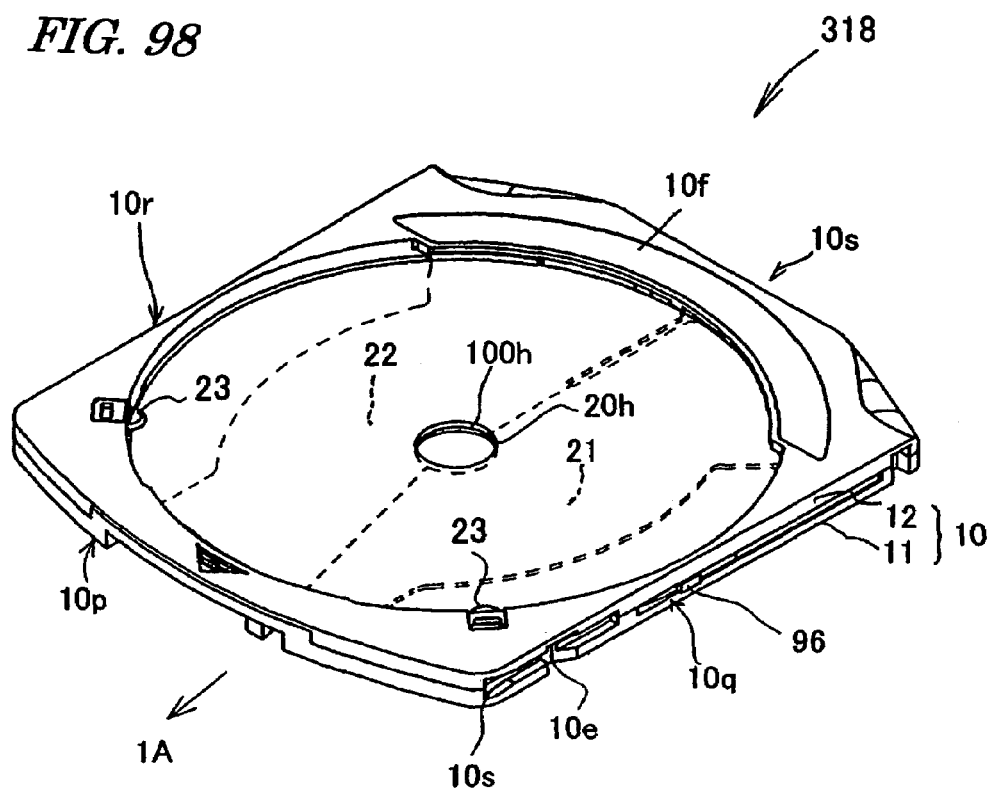
FIG. 98 is a perspective view illustrating an overall configuration for a disc cartridge according to an eighteenth embodiment of the present invention.

As shown in FIG. 98, the disc cartridge 318 of this embodiment includes a second opening/closing portion 96 on its second side surface 10q instead of the second opening/closing portion 93 of the disc cartridge 316 of the sixteenth embodiment.

Figure 99:
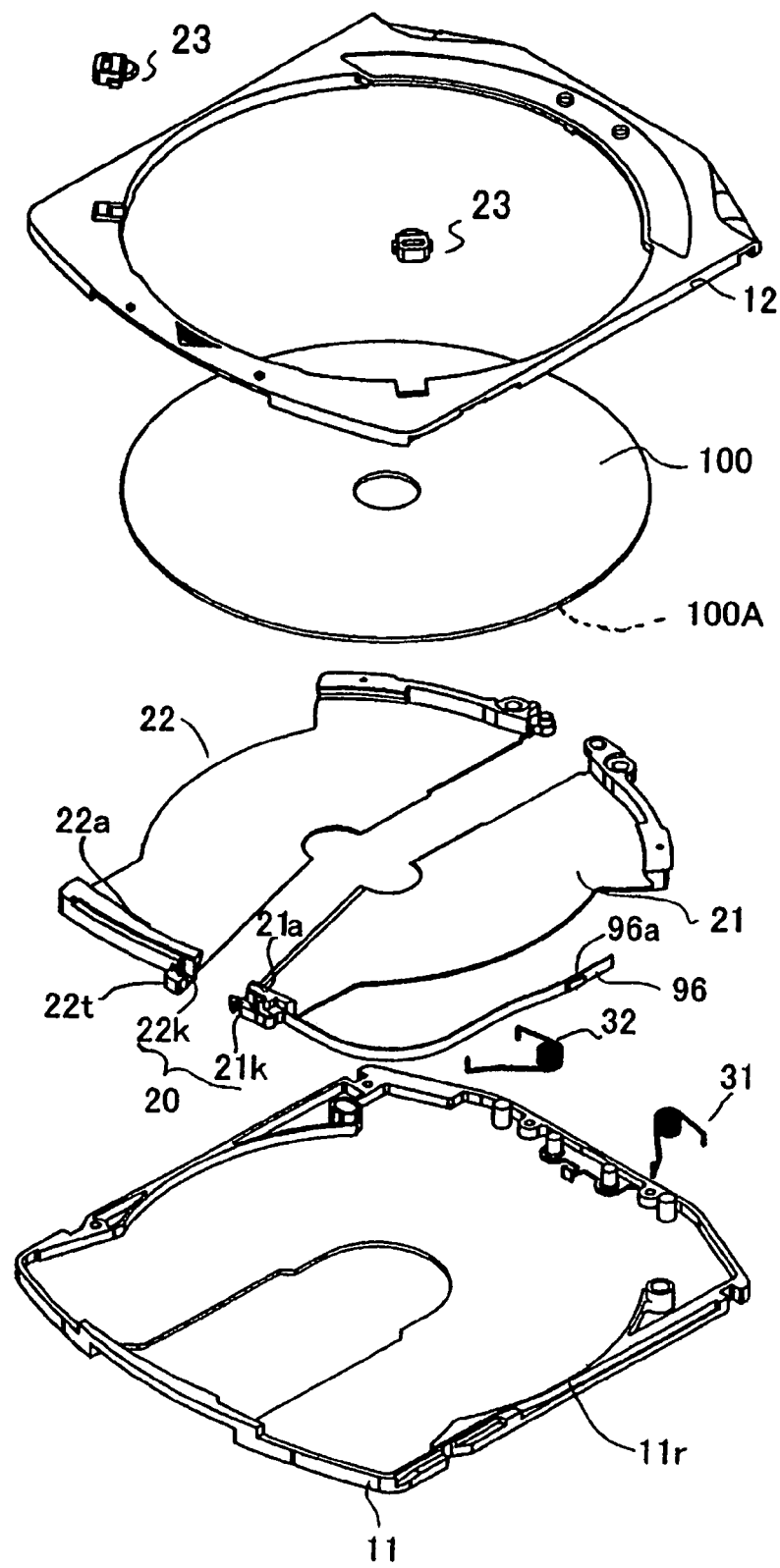
FIG. 99 is an exploded perspective view illustrating an exploded state of the disc cartridge shown in FIG. 98.

As can be seen from FIG. 99, the second opening/closing portion 96 is a belt member that is connected to the disc holding portion 21a of the shutter 21. This belt member has a protrusion 96a at one end thereof. And the protrusion 96a can slide along the opening 11r on the side surface of the cartridge lower shell 11. Alternatively, the second opening/closing portion 96 may form an integral part of the shutter 21.

Figure 100:
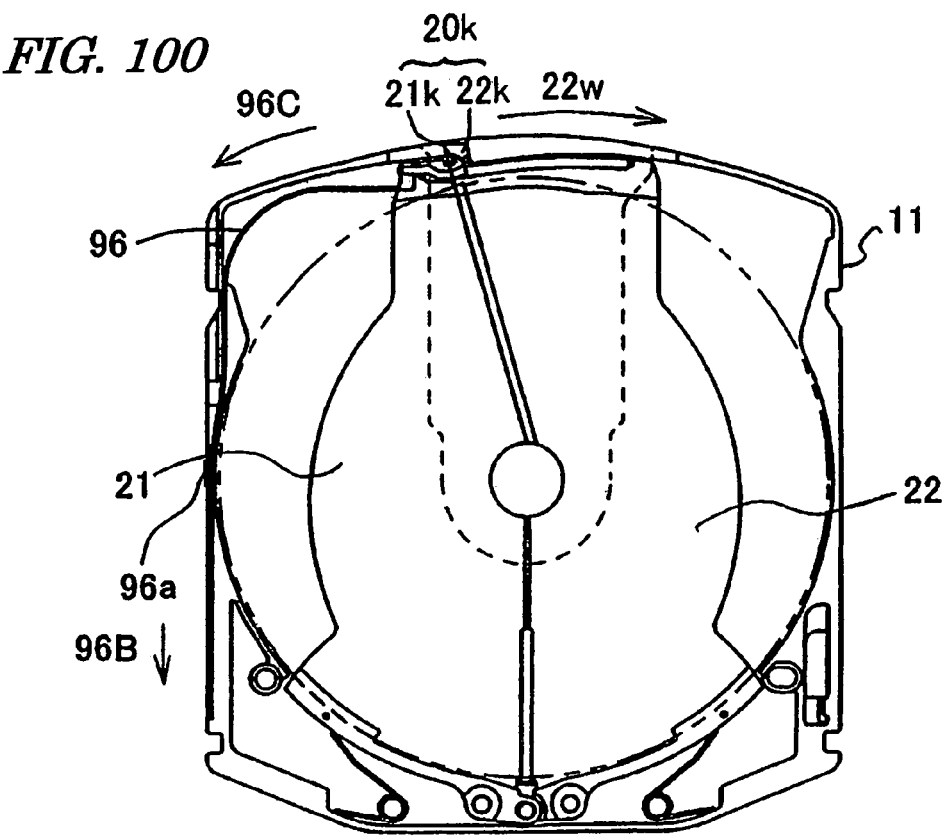
FIG. 100 is a schematic plan view illustrating a state of the disc cartridge shown in FIG. 98 in which its shutters are closed.
Figure 101:
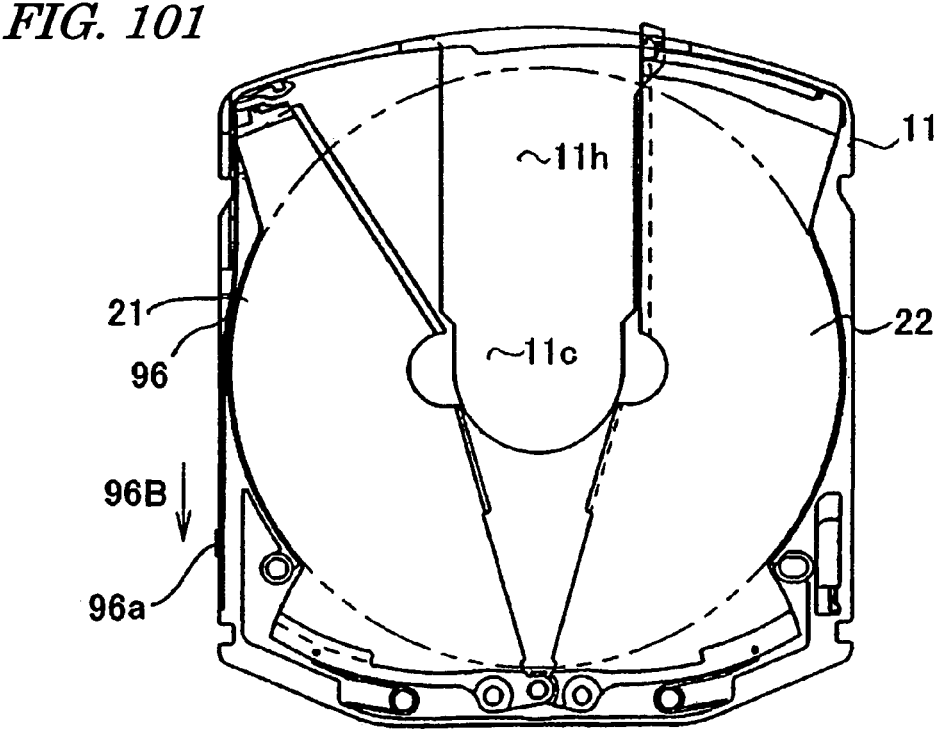
FIG. 101 is a schematic plan view illustrating a state of the disc cartridge shown in FIG. 98 in which its shutters are opened.

FIGS. 100 and 101 illustrate two states of the disc cartridge 318 in which the shutters 21 and 22 thereof are closed and opened, respectively. As already described for the sixteenth and seventeenth embodiments, the shutters 21 and 22 can be opened or closed by sliding the first opening/closing portion 22t in either the direction indicated by the arrow 22w or the opposite direction.

The shutters 21 and 22 may also be opened or closed by using the second opening/closing portion 96 in the following manner. First, the locking mechanism 20k is unlocked as shown in FIG. 100. Next, the protrusion 96a of the second opening/closing portion 96 is slid in the direction indicated by the arrow 96B. As a result of this operation, a force is applied to the shutter 21 in such a direction as to rotate the shutter 21 on the rotation hole 21u and pull the end of the shutter 21 to the direction indicated by the arrow 96C. Since the movement of the shutter 21 is transmitted to the shutter 22 by way of the interlocking mechanism 20c, these two shutters 21 and 22 expose the head and chucking openings 11h and 11c cooperatively. To close the shutters 21 and 22, the opposite operation is performed.

Just like the disc cartridge of the sixteenth embodiment described above, no matter whether the disc drive used is compatible with only a disc cartridge including a shutter opening/closing portion on a side surface that extends perpendicularly to the disc cartridge inserting direction or only a disc cartridge including a shutter opening/closing portion on a side surface that extends parallel to the disc cartridge inserting direction, the disc drive can always write or read a signal on/from the disc cartridge of this embodiment.

If the second opening/closing portion 96 forms an integral part of the shutter 21, the number of members that make up the disc cartridge can be reduced. As a result, the manufacturing cost of the disc cartridge can be reduced or the manufacturing process thereof can be simplified.

In the sixteenth through eighteenth embodiments described above, the second opening/closing portion is provided on the left-hand side with respect to the disc inserting direction. However, the location of the second opening/closing portion is not limited to the left-hand side described above. Alternatively, the second opening/closing portion may be provided on the right-hand side 10r with respect to the disc inserting direction as shown in FIG. 88. As another alternative, the second opening/closing portion may also be provided on the back surface 10t of the disc cartridge as shown in FIG. 88. In that case, the belt-shaped second opening/closing portion 96 of this eighteenth embodiment is preferably used because the disc cartridge can have the second opening/closing portion on its back surface without changing its details so much.

Embodiment 19

Hereinafter, a disc cartridge 319 according to a nineteenth embodiment of the present invention will be described with reference to FIGS. 102 and 103. In the disc cartridge 319 of this embodiment, the same member as the counterpart of the disc cartridge 313 of the thirteenth embodiment is identified by the same reference numeral.

The disc cartridge 319 of this embodiment is characterized by providing rotation stopper members 97 for the disc holding portions 21b, 22a and 22b and concave portions 89 for the shutters 21 and 22, respectively. The concave portions 89 are used to ultrasonic weld a nonwoven fabric to the shutters 21 and 22.

More specifically, the disc holding portions 21b, 22a and 22b include holes 21q, 22r and 22q, in which the rotation stopper members 97 are embedded. As shown in FIG. 103, the rotation stopper member 97 partially protrudes from the slope 21b', (22a' or 22b') of the disc holding portion 21b, (22a or 22b) and contacts with the outer edge of the disc 100 while the disc 100 is held by the disc holding portions 21a, 21b, 22a and 22b. The rotation stopper members 97 are preferably made of a material that has some elasticity and a large coefficient of friction. For example, rotation stopper members 97 made of rubber are preferably used.

It should be noted that at least one of the disc holding portions 21a, 21b, 22a and 22b should be provided with the rotation stopper member 97 to stop the rotation effectively. However, to prevent the unintentional rotation of the disc 100 with more certainty, the three rotation stopper members 97 are preferably provided as shown in FIG. 102.

In this structure, while the disc 100 is held by the disc holding portions 21a, 21b, 22a and 22b, the rotation stopper members 97 that are in tight contact with the disc 100 do not allow the operator to rotate the disc 100 so easily. Accordingly, even if the operator tries to rotate the disc 100 intentionally while pressing the disc 100 against the shutters 21 and 22, the disc 100 will not rotate. Thus, even if relatively stiff dust has adhered to the nonwoven fabric provided for the shutters 21 and 22, the disc will not get scratched by the operator's operation such as that described above.

In addition, by providing the rotation stopper members 97, it is also possible to prevent the disc 100 from moving inconstantly inside the disc holding portions.

Figure 102:
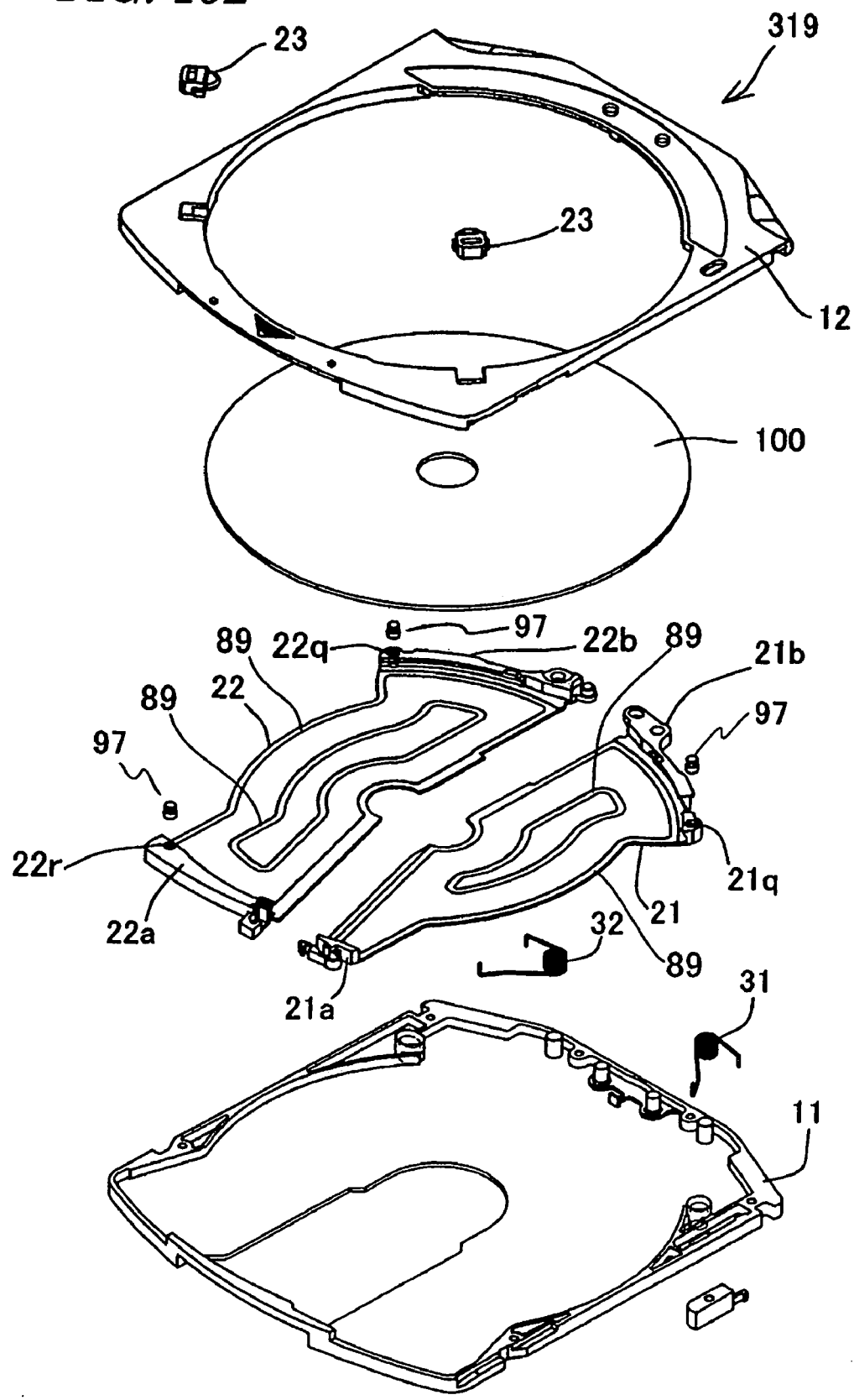
FIG. 102 is an exploded perspective view illustrating an exploded state of a disc cartridge according to a nineteenth embodiment of the present invention.
Figure 103:
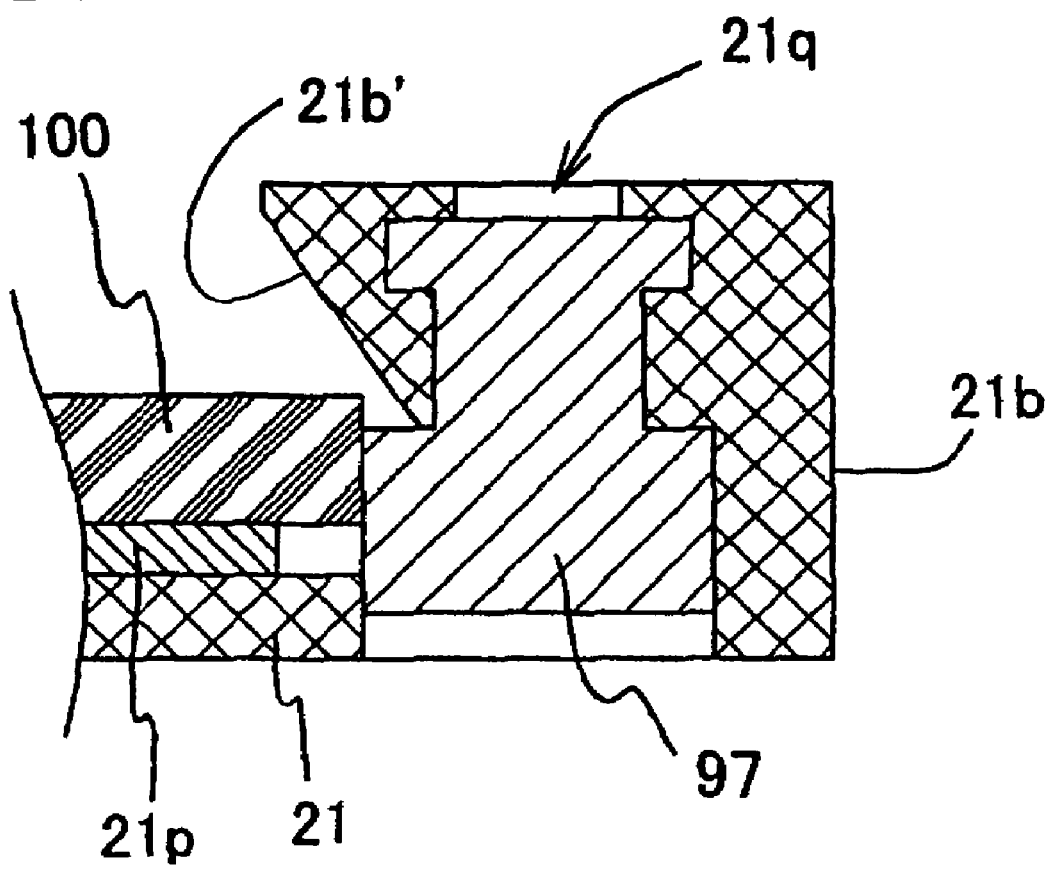
FIG. 103 is an enlarged cross-sectional view illustrating a disc holding portion and its surrounding members of the disc cartridge shown in FIG. 102.

As shown in FIG. 102, the shutters 21 and 22 include the concave portions 89, which are used to ultrasonic weld a nonwoven fabric to those portions of the shutters 21 and 22 that will contact with the signal recording side of the disc 10. In FIG. 102, the concave portions 89 are formed so as to surround the outer periphery of those portions of the shutters 21 and 22 that will contact with the signal recording side. The concave portions 89 are also formed inside the concave portions 89 that surround the outer periphery. However, the regions where the concave portions 89 are provided are not limited to those illustrated in FIG. 102 as long as the nonwoven fabric can be adhered to the shutters 21 and 22 just as intended. At these concave portions 89, the nonwoven fabric is ultrasonic welded to the shutters 21 and 22. The nonwoven fabric might be partially cured or the resin material of the shutters 21 and 22 might partially protrude from the nonwoven fabric during the ultrasonic welding process. Even so, when these concave portions 89 are provided, those cured or protruding portions are received by the concave portions 89 and do not contact with the disc. Thus, the disc does not get scratched. When a nonwoven fabric is provided, these concave portions 89 are also preferably formed on the shutters in any of the first through eighteenth embodiments described above.

Embodiment 20

Hereinafter, a disc cartridge according to a twentieth embodiment of the present invention will be described.

Figure 104:
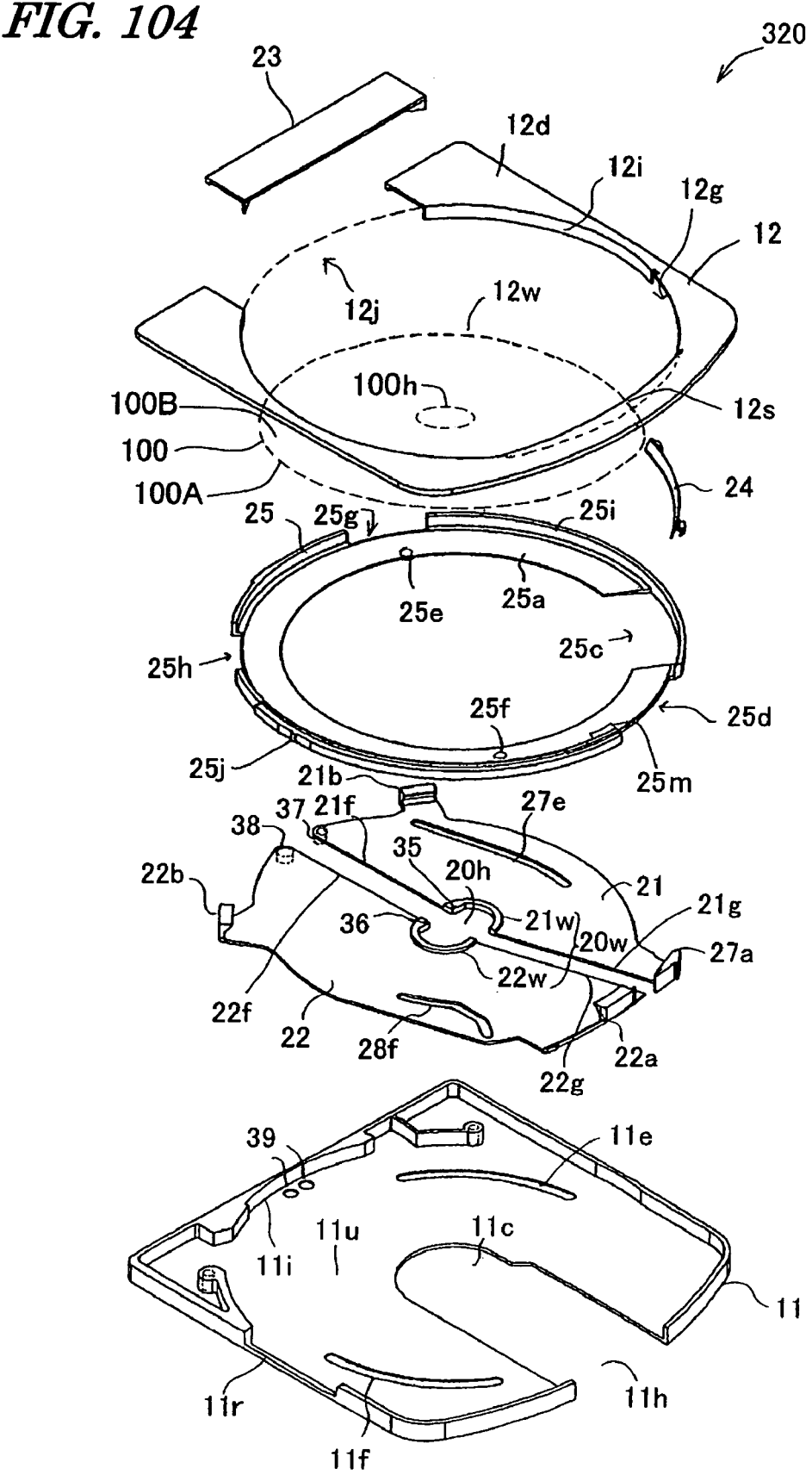
FIG. 104 is an exploded perspective view of a disc cartridge according to a twentieth embodiment of the present invention.

First, the overall structure of the disc cartridge 320 will be outlined with reference to FIG. 104. The disc cartridge 320 includes cartridge lower shell 11, cartridge upper shell 12, first shutter 21, second shutter 22, stopper member 23, shielding member 24 and rotational member 25. These members may be made of a synthetic resin, for example. However, there is no need to make all of these members of the same material. Instead, best materials may be selected for these members in view of the mechanical strengths or appearance required for them.

As shown in FIG. 104, the cartridge lower shell 11 has an inner lower surface 11u. The inner lower surface 11u has a chucking opening 11c and a head opening 11h. The chucking opening 11 allows a chucking member (e.g., a spindle motor for rotating the disc 100) to enter the disc cartridge 320 externally. The head opening 11h allows a head, which reads and/or writes a signal (or information) from/on the signal recording side 100A of the disc 100, to enter the disc cartridge 320 and access a target location on the disc 100. The head opening 11h is continuous with the chucking opening 11c and reaches one side surface of the cartridge lower shell 11. Also, another opening 11r is provided on another side surface of the cartridge lower shell 11, which is adjacent to the side surface having the head opening 11h.

As will be described in detail later, the inner lower surface 11u has two grooves 11e and 11f that receive the respective ends of convex portions 25e and 25f provided for the rotational member 25. These grooves 11e and 11f preferably do not reach the bottom of the inner lower surface 11u. The inner lower surface 11u further includes rotation holes 39 that receive rotation shafts 37 and 38 provided for the first and second shutters 21 and 22, respectively. These rotation holes 39 preferably do not reach the bottom of the inner lower surface 11u, either. In this embodiment, the shafts 37 and 38 are formed on the first and second shutters 21 and 22 and the rotation holes 39 are formed on the cartridge lower shell. Alternatively, rotation holes may be formed on the first and second shutters 21 and 22 and rotation shafts may be formed on the cartridge lower shell 11.

The cartridge upper shell 12 includes a circular disc window 12w, which expands over the entire projection area of the disc 100. The disc window 12w is defined by a cylindrical inner side surface 12i. The disc 100 can be inserted into the disc cartridge 320 through this disc window 12w. The inner side surface 12i has a notch 12g.

The upper surface 12d of the cartridge upper shell 12 also has a notch 12j, which engages with the stopper member 23. Although not shown, the stopper member 23 and the upper surface 12d of the cartridge upper shell 12 are provided with concavo/convex portions engaging with each other so that the stopper member 23 does not disengage itself from the cartridge upper shell 12 so easily. When the stopper member 23 is fitted with the cartridge upper shell 12, a portion of the stopper member 23 protrudes into the disc window 12w. In this preferred embodiment, to reduce the overall thickness of the cartridge body as much as possible, the notch 12j is formed by removing a portion of the upper surface 12d of the cartridge upper shell 12 completely. However, if the disc cartridge may have a thickness somewhat greater than that of the illustrated one, a concave portion may also be formed instead of the notch 12j by removing a portion of the cartridge upper shell 12 incompletely, and a stopper member engaging with such a concave portion may be prepared. For example, the notch and the stopper member 23 of the disc cartridge 308 of the eighth preferred embodiment described above may be provided for the disc cartridge 320 of this twentieth preferred embodiment.

Another stopper member 12s is provided as an integral part of the cartridge upper shell 12 so as to expand into the window 12w. The stopper members 12s and 23 are used to prevent the disc 100 mounted from dropping down through the disc window 12w. These stopper members 12s and 23 are particularly effective when this disc cartridge 320 is loaded into a vertically mounted disc drive. To remove the disc 100 from this disc cartridge 320, the stopper member 23 needs to be disengaged and removed from the cartridge upper shell 12, and the disc 100 needs to be picked up from around the notch 12j, for example. Optionally, three or more stopper members may be provided and/or each of the stopper members may be formed in any other shape or disposed at any position other than that illustrated in FIG. 104.

The cartridge upper and lower shells 12 and 11 are adhered, welded or joined (e.g., screwed up) together around their outer periphery, thereby forming a cartridge body. Also, the inner lower surface 11u of the cartridge lower shell 11 and the inner side surface 12i of the cartridge upper shell 12 together make up a disc storage portion for storing the disc 100 therein.

In the disc storage portion, the space defined by the inner side surface 12i is wide enough to allow the disc 100 to rotate freely therein without contacting with the inner side surface 12i. The top of the disc storage portion is opened as the disc window 12w, and the first side 100A of the disc 100 stored in the disc storage portion is exposed entirely through the disc window 12w. On the other hand, the second side, i.e., the signal recording side 100A, of the disc 100 faces the inner lower surface 11u.

By adopting such a structure, the cartridge 320 can be thinner than the conventional cartridge in which both sides of the disc are covered. In addition, the label side of the disc 100 can be displayed inside the disc window 12w and the operator can check the contents of the disc 100 that were printed on the label side (i.e., the first side) 100B. Moreover, by displaying the design of the label side, the disc cartridge including the disc can also have a good design.

The first and second shutters 21 and 22 are provided on the inner lower surface 11u of the cartridge lower shell 11. When the disc 100 is stored inside the disc cartridge 320, the first and second shutters 21 and 22 are located between the signal recording side (i.e., the second side) 100A of the disc 100 and the inner lower surface 11u. The first and second shutters 21 and 22 have the rotation shafts 37 and 38, respectively, which are inserted into the rotation holes 39 of the cartridge lower shell 11. Thus, the first and second shutters 21 and 22 rotate on the rotation shafts 37 and 38, thereby covering or exposing the head and chucking openings 11h and 11c. When the first and second shutters 21 and 22 are opened, the second side 100A of the disc 100 is partially exposed through the head opening 100h.

The first and second shutters 21 and 22 are provided with notches so as to define a hole 20h in a region that overlaps with the center hole 100h of the disc 100 stored in the disc storage portion when the first and second shutters 21 and 22 are closed. The notches of the first and second shutters 21 and 22 are surrounded with convex portions 21w and 22w, respectively. When the first and second shutters 21 and 22 are closed, these convex portions 21w and 22w are in close contact with each other, thereby forming a ring 20w that is adjacent to the inner circumference of the center hole 100h of the disc 100. As already described in detail for the twelfth preferred embodiment, the ring 20w prevents the dust from reaching the signal recording side 100A of the disc 100 by way of the center hole 100h. Furthermore, the convex portions 21w and 22w have protrusions 35 and 36, respectively. That is to say, the top of the protrusions 35 and 36 is higher than that of the convex portions 21w and 22w.

Furthermore, to hold the disc 100 in the disc storage portion while the first and second shutters 21 and 22 are closed, the first shutter 21 includes a disc holding portion 21b and the second shutter 22 includes disc holding portions 22a and 22b. These disc holding portions 21b, 22a and 22b work just like the disc holding portions as described for the eighth through nineteenth preferred embodiments described above. In the eighth through nineteenth preferred embodiments, the first shutter 21 further includes the disc holding portion 21a. In this twentieth preferred embodiment, however, the first shutter 21 includes a convex portion 27a instead of the disc holding portion 21a. The convex portion 27a is provided to prevent the side surface of the disc 100 from being exposed through the chucking opening 11h, which reaches one side surface of the cartridge lower shell 11, while the first and second shutters 21 and 22 are closed.

When closed, the first and second shutters 21 and 22 are not entirely in contact with each other along a line but have a plurality of contact surfaces that are not aligned with the line. More specifically, the shutters 21 and 22 have a first pair of contact surfaces 21f and 22f and a second pair of contact surfaces 21g and 22g. In this preferred embodiment, the contact surfaces 21f and 22f contact with each other approximately along the centerline of the disc cartridge 320. On the other hand, the contact surfaces 21g and 22g contact with each other along a line that defines a predetermined angle (e.g., approximately 15 degrees to approximately 18 degrees) with the centerline of the disc cartridge 320. The effects achieved by such a structure are already described in detail for the thirteenth preferred embodiment. As also described for the thirteenth preferred embodiment, the contact surfaces 21g and 22g partially overlap with each other in the thickness direction of the disc 100.

As will be described in detail later, the first and second shutters 21 and 22 include guide grooves 27e and 28f that respectively engage with the convex portions 25e and 25f of the rotational member 25. The guide grooves 27e and 28f extend vertically through the first and second shutters 21 and 22, respectively, so that the convex portions 25e and 25f of the rotational member 25 can reach the grooves 11e and 11f, respectively.

The rotational member 25 includes a sidewall 25i and a disc receiving portion 25a that is connected to the bottom of the sidewall 25i. The sidewall 25i has a cylindrical shape and has such a size as to surround the side surface of the disc 100 stored in the disc storage portion. The sidewall 25i is discontinued by three notches 25d, 25g and 25h. The disc receiving portion 25a has a flat ring shape including a notch 25c. As the first and second shutters 21 and 22 are opened, the rotational member 25 is rotated, thereby overlapping the notch 25c with the head opening 11h. A protrusion 25m for moving the shielding member 24 is provided near the notch 25d.

As described above, the convex portions 25e and 25f, which protrude toward the cartridge lower shell 11, are provided on the lower surface of the disc receiving portion 25a. Furthermore, an operating portion 25j, which engages with the shutter opening/closing mechanism of a disc drive, is provided on the outer side surface of the sidewall 25i. Alternatively, where the shutter opening/closing mechanism of the disc drive has a gear shape, a gear may be provided on the outer side surface of the sidewall 25i instead of the operating portion 25j.

The shielding member 24 is disposed inside the notch 12g of the inner side surface 12i of the cartridge upper shell 12. The structure and operation of the shielding member 24 will be described in detail later.

The respective members of the disc cartridge 320 are assembled in such a manner as to satisfy the vertical positional relationship shown in FIG. 104. As a result, the cartridge lower and upper shells 11 and 12 are joined together so that the first and second shutters 21 and 22 are disposed on the cartridge lower shell 11 and that the rotational member 25 is located over the shutters 21 and 22.

Figure 105:
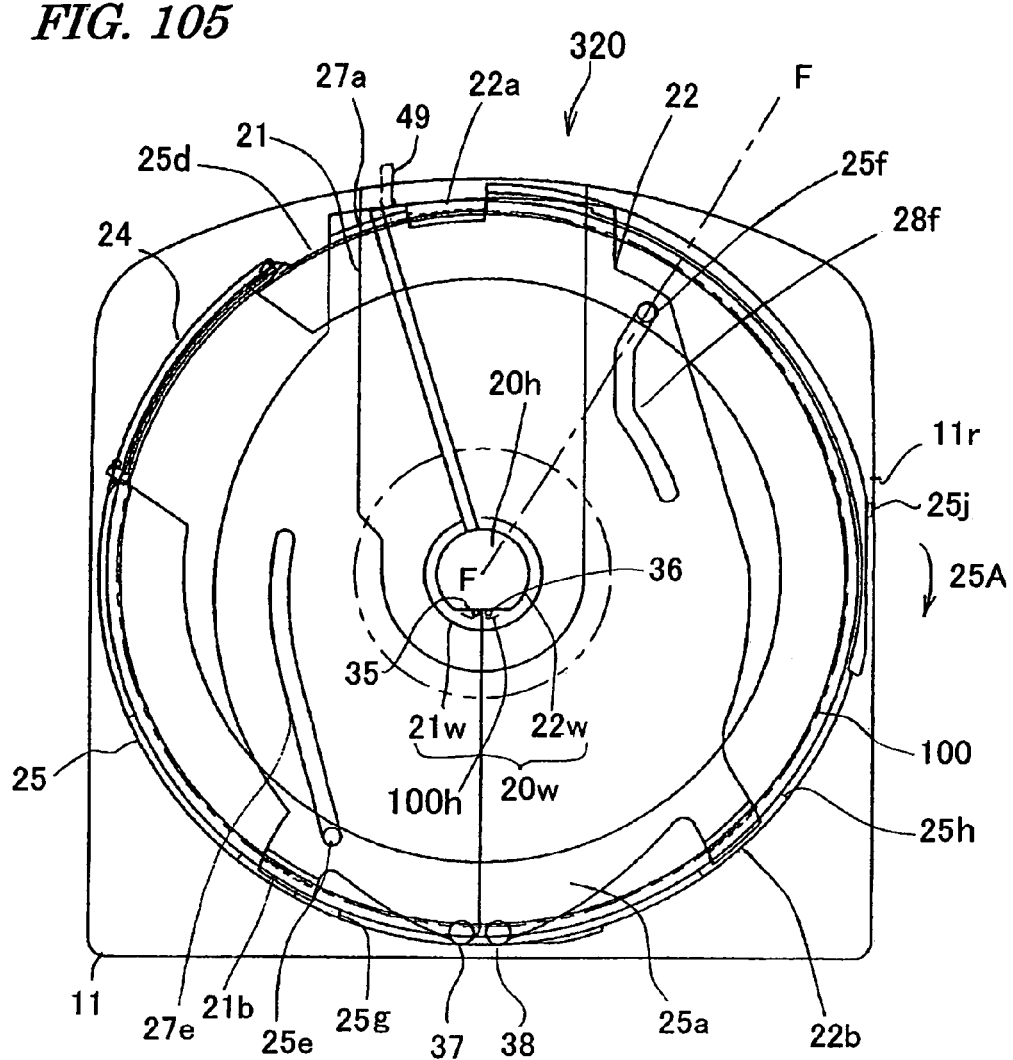
FIG. 105 is a plan view illustrating the disc cartridge shown in FIG. 104 with its cartridge upper shell removed.
Figure 106:
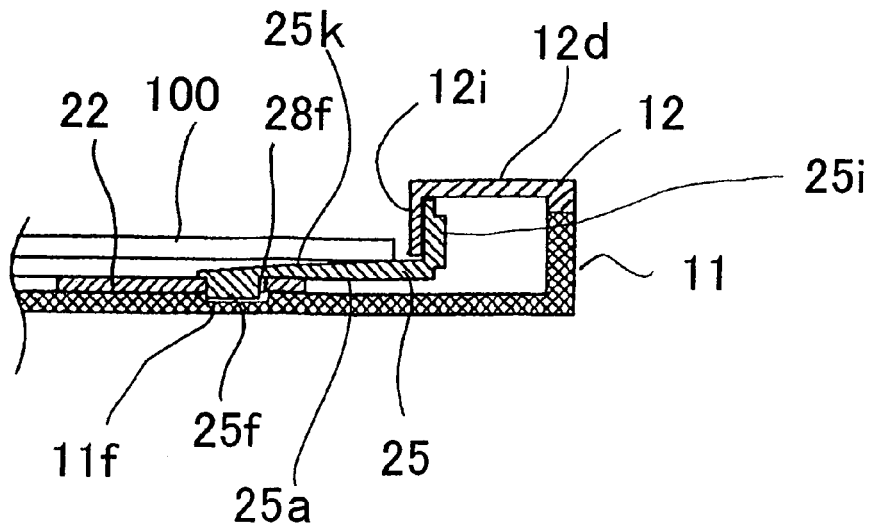
FIG. 106 is a cross-sectional view of the disc cartridge shown in FIG. 104 as viewed along the line F-F shown in FIG. 105.

FIG. 105 is a plan view illustrating the disc cartridge 320 with the cartridge upper shell 12 thereof removed. FIG. 106 is a cross-sectional view of the disc cartridge 320 as viewed along the line F-F shown in FIG. 105. The first and second shutters 21 and 22 are now closed.

As shown in FIG. 105, the disc holding portion 22a of the second shutter 22 holds the disc 100 thereon inside the notch 25d of the rotational member 25. The disc 100 is also held by the disc holding portions 21b and 22b of the first and second shutters 21 and 22 inside the notches 25g and 25h of the rotational member 25, respectively.

The operating portion 25j of the rotational member 25 is located inside the opening 11r of the cartridge lower shell 11. The protrusions 35 and 36 of the first and second shutters 21 and 22 protrude into the center hole 100h of the disc 100. The center of rotation of the rotational member 25 is substantially aligned with the center of the disc 100. That is to say, the rotational member 25 is disposed inside the disc storage portion so as to rotate substantially around the center of the disc 100.

The rotation shafts 37 and 38 of the first and second shutters 21 and 22 are located under the disc receiving portion 25a of the rotational member 25. As shown in FIG. 106, there is almost no gap between the top of the sidewall 25i of the rotational member 25 and the bottom of the upper surface 12d of the cartridge upper shell 12, thus regulating the vertical movement of the rotational member 25. Accordingly, the rotational member 25 can effectively prevent the rotation shafts 37 and 38 of the first and second shutters 21 and 22 from being raised and disengaged from the rotation holes 39 of the cartridge lower shell 11 when the first and second shutters 21 and 22 rotate.

As shown in FIG. 106, the disc receiving portion 25a of the rotational member 25 has a sloped upper surface 25k, and therefore, the disc 100 is in contact with only a portion of the upper surface 25k of the disc receiving portion 25a near the sidewall 25i. In such a structure, even if the ring-shaped disc receiving portion 25a has its width increased to increase the mechanical strength of the rotational member 25, the upper surface 25k is in contact with only a portion of the signal recording side 100A of the disc 100 around its outer periphery. Thus, the signal recording area is hardly in contact with the disc receiving portion 25a. It should be noted that the top of that portion of the disc receiving portion 25a that is in contact with the disc 100 is located at the same vertical level as the top of the convex portions 21w and 22w of the first and second shutters 21 and 22.

Figure 107:
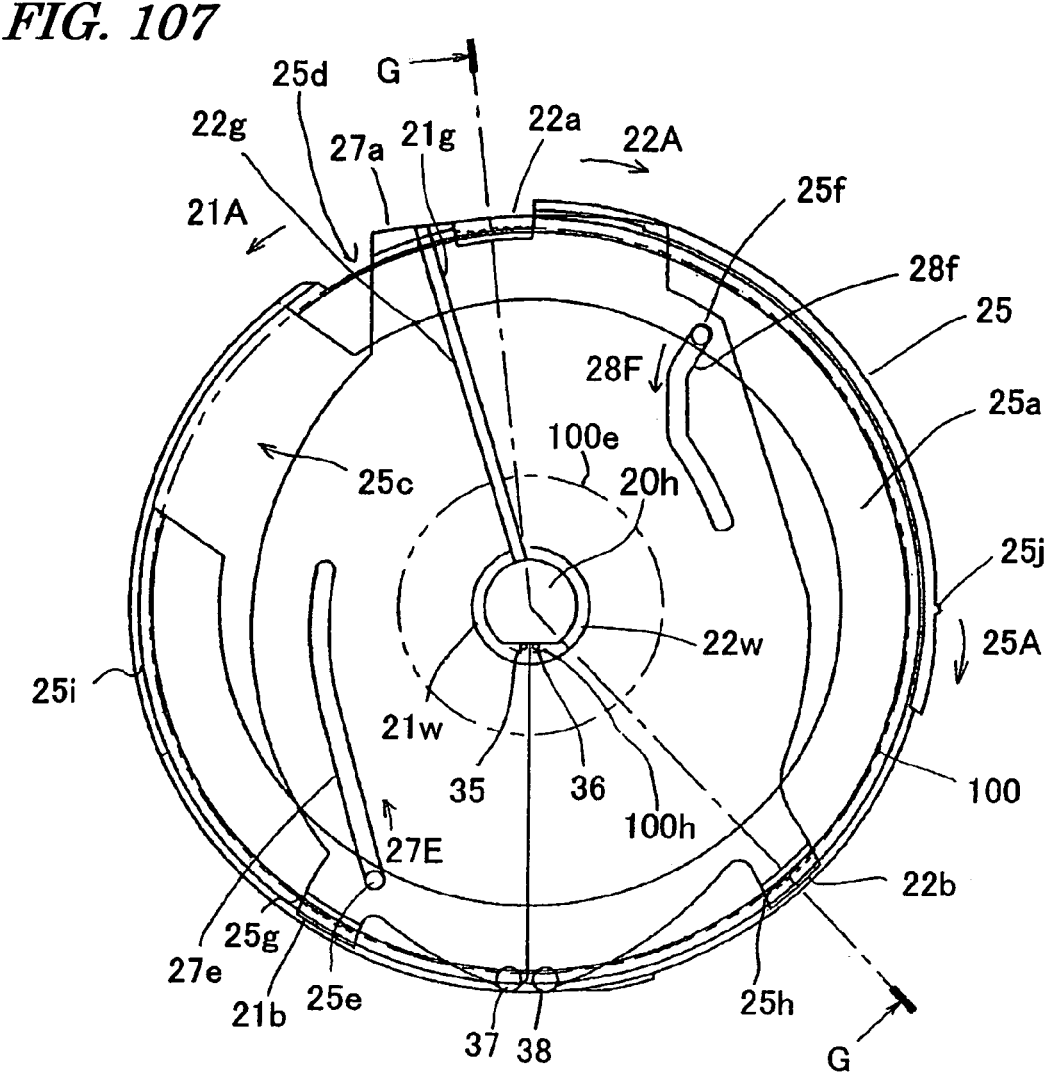
FIG. 107 is a plan view illustrating the shutters and rotational member of the disc cartridge shown in FIG. 104 in a state where the shutters are closed.
Figure 108:
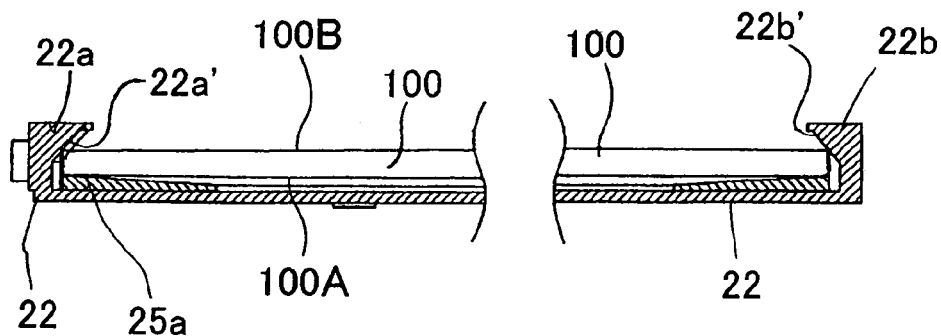
FIG. 108 is a cross-sectional view of the disc cartridge shown in FIG. 104 as viewed along the line G-G shown in FIG. 107.
Figure 109:
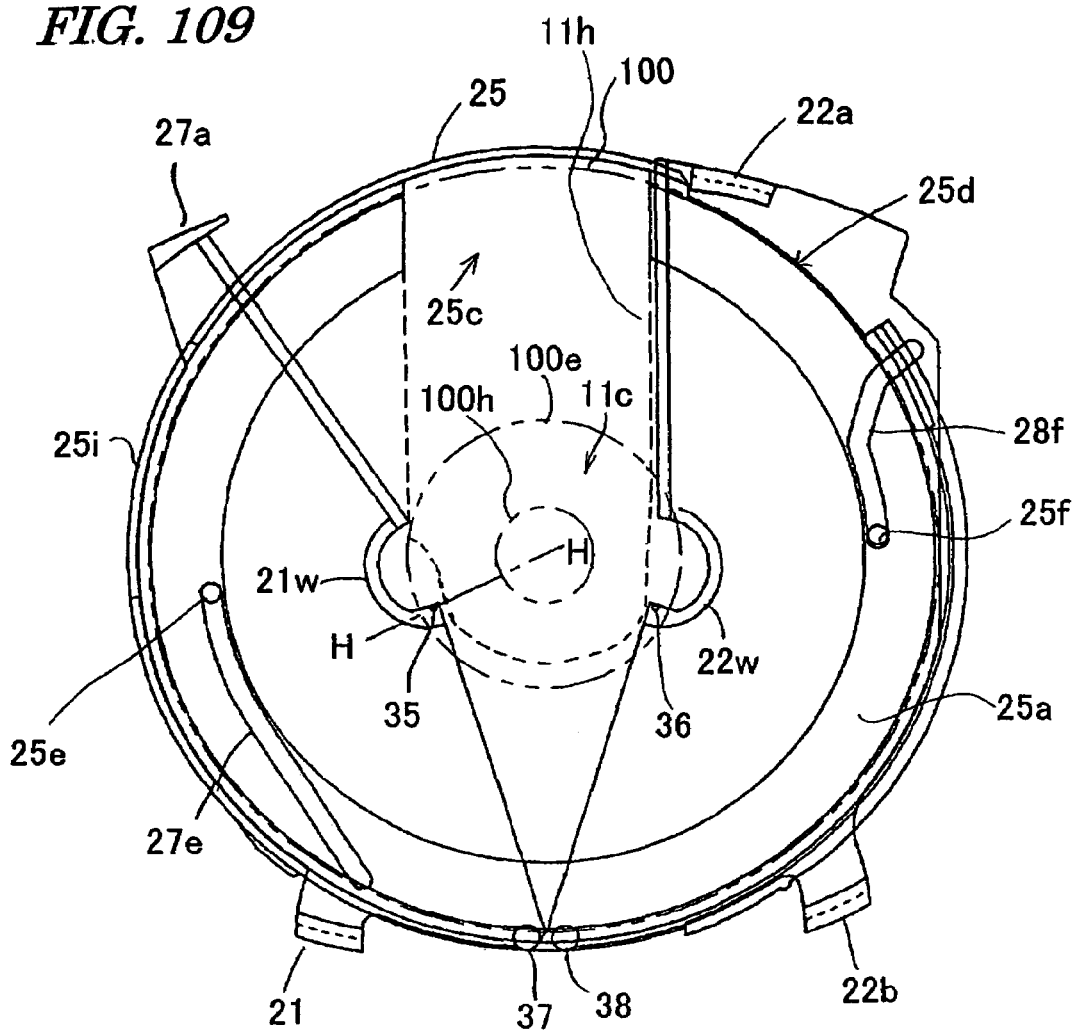
FIG. 109 is a plan view illustrating the shutters and rotational member of the disc cartridge shown in FIG. 104 in a state where the shutters are opened.
Figure 110:
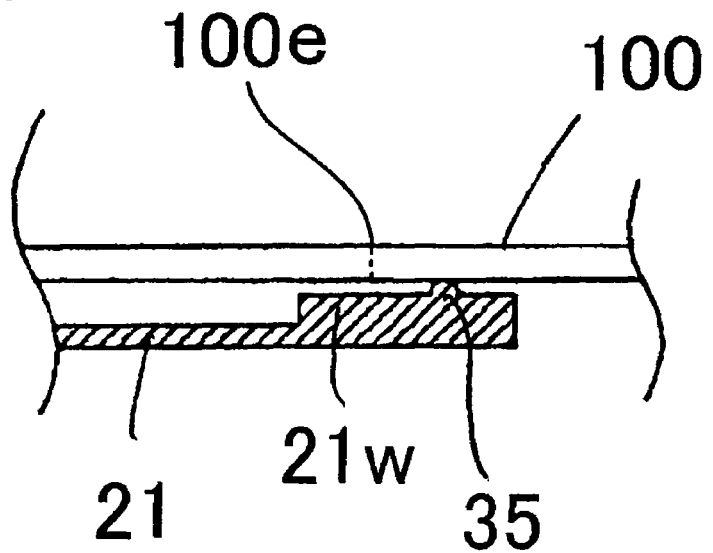
FIG. 110 is a cross-sectional view of the disc cartridge shown in FIG. 104 as viewed along the line H-H shown in FIG. 109.

Next, it will be described how the first and second shutters 21 and 22 that is going to be closed or opened mount or dismount the disc 100 thereon/therefrom. FIG. 107 is a plan view illustrating the respective positions of the first and second shutters 21 and 22 and the rotational member 25 in a state where the first and second shutters 21 and 22 are closed. FIG. 108 is a cross-sectional view of the disc cartridge 320 as viewed along the line G-G shown in FIG. 107. FIG. 109 is a plan view illustrating the respective positions of the first and second shutters 21 and 22 and the rotational member 25 in a state where the first and second shutters 21 and 22 are opened. FIG. 110 is a cross-sectional view of the disc cartridge 320 as viewed along the line H-H shown in FIG. 107. In FIGS. 107 and 109, the disc 100 is indicated by the two-dot chain.

As shown in FIG. 107, while the first and second shutters 21 and 22 are closed, the disc holding portions 21b, 22a and 22b protrude through the notches 25g, 25d and 25h of the sidewall 25i of the rotational member 25 toward the center of the disc 100, thereby holding the disc 100 thereon. As shown in FIG. 108, the disc holding portions 22a and 22b have downwardly tapered slopes 22a' and 22b' that are in contact with the outer edge of the first side 100B of the disc 100. Thus, the disc holding portions 22a and 22b press the disc 100 not only toward the center thereof but also toward the first and second shutters 21 and 22. Although not shown, the other disc holding portion 21b is also in the same state. As a result, a portion of the signal recording side 100A of the disc 100 around the outer periphery thereof contacts with the disc receiving portion 25a. Also, as already described for the twelfth preferred embodiment, the convex portions 21w and 22w of the first and second shutters 21 and 22 contact with a portion of the signal recording side 100B of the disc 100 near the center hole 100h thereof (not shown). In this manner, the signal recording area on the signal recording side 100A of the disc 100 is shut off from the open air by the disc receiving portion 25a of the rotational member 25 and by the convex portions 21w and 22w of the first and second shutters 21 and 22. Consequently, no dust or fine particles will be deposited on, or no scratches will be created on, the signal recording area.

The hole 20h defined by the first and second shutters 21 and 22 has a diameter approximately equal to that of the center hole 100h of the disc 100. Accordingly, even if this disc cartridge 320 is left upside down with the first and second shutters 21 and 22 thereof closed, no part of the signal recording side 100A of the disc 100 will be exposed through the hole 20h of the first and second shutters 21 and 22. For that reason, no dust or fine particles will be deposited on the signal recording side 100A of the disc 100.

To open the first and second shutters 21 and 22, the operating portion 25j is engaged with the shutter opening/closing mechanism of the disc drive, and is turned to the direction indicated by the arrow 25A. Then, the rotational member 25 starts to rotate inside the disc storage portion and the protrusions 25e and 25f also start to rotate around the center of the disc 100. The protrusions 25e and 25f are engaged with the guide grooves 27e and 28f, respectively. Accordingly, the protrusions 25e and 25f rotating go inside the guide grooves 27e and 28f in the directions indicated by the arrows 27E and 28F, respectively, while pressing the sidewalls of the guide grooves 27e and 28f. As the sidewalls of the guide grooves 27e and 28f are pressed by the protrusions 25e and 25f, the first and second shutters 21 and 22 rotate on the rotation shafts 37 and 38 to the directions indicated by the arrows 21A and 22A, respectively.

The disc holding portion 21b also starts to rotate on the rotation shaft 37 to the direction indicated by the arrow 21A, while the disc holding portions 22a and 22b start to rotate on the rotation shaft 38 to the direction indicated by the arrow 22A. Thus, the disc holding portions 21b, 22a and 22b go away from the disc 100 and release the disc 100.

As the first and second shutters 21 and 22 are opened, the protrusions 35 and 36 on the first and second shutters 21 and 22 also rotate to the directions 21A and 22B, respectively. In the meantime, the disc 100 does not move. Accordingly, the protrusions 35 and 36 contact with the non-signal recording area 100e on the signal recording side 100A of the disc 100. The protrusions 35 and 36 are located at a vertical level higher than that of the convex portions 21w and 22w. Thus, while the protrusions 35 and 36 are in contact with the signal recording side 100A, the convex portions 21w and 22w are out of contact with the signal recording side 100A. Consequently, it is possible to prevent the convex portions 21w and 22w from scratching the signal recording side 100A, or the signal recording area thereof, in particular.

As the rotational member 25 is rotated to a certain degree, the convex portions 25e and 25f will soon reach the ends of their guide grooves 27e and 28f, respectively, as shown in FIG. 109. Then, the first and second shutters 21 and 22 will be fully opened to expose the head and chucking openings 11h and 11c entirely.

At that time, the notch 25c of the disc receiving portion 25a of the rotational member 25 is aligned with the head opening 11h, and no part of the disc receiving portion 25a is exposed through the head opening 11h. Accordingly, when the first and second shutters 21 and 22 are fully opened, the head of the disc drive can access the disc 100 easily and is not interfered with by the rotational member 25.

Also, as shown in FIGS. 109 and 110, even when the first and second shutters 21 and 22 are opened, the protrusions 35 and 36 of the first and second shutters 21 and 22 are still in contact with the non-signal recording area 100e on the signal recording side 100A of the disc 100. Thus, the signal recording area will not get scratched by the protrusions 35 and 36.

To close the shutters 21 and 22, the respective members should be moved in the opposite directions. That is to say, as the first and second shutters 21 and 22 are closed, the disc holding portions 21b, 22a and 22b are getting closer to the disc 100 and eventually hold the disc 100 thereon. These operations have already been described in detail for the eighth through thirteenth preferred embodiments, and the description thereof will be omitted herein.

Figure 111:
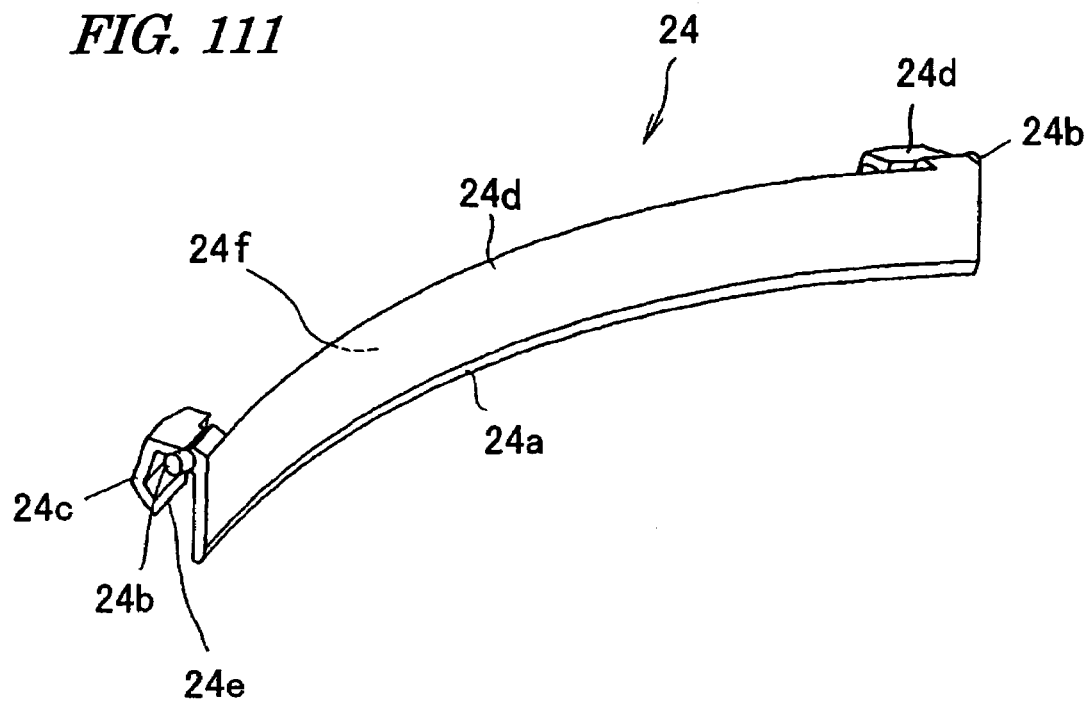
FIG. 111 is a perspective view illustrating the shielding member of the disc cartridge shown in FIG. 104.

Next, the structure and operation of the shielding member 24 will be described. As shown in FIG. 111, the shielding member 24 includes a sidewall 24d and a pair of rotation shafts 24b provided at the ends of the sidewall 24d. At the bottom of the sidewall 24d, a first contacting portion 24a is provided. The first contacting portion 24a needs to contact with the outer side surface of the disc 100 and has a curved surface having the same radius of curvature as the outer side surface of the disc 100. The backside of the sidewall 24d is a second contacting portion 24f. An arm 24c is provided near each of the rotation shafts 24b and has a third contacting portion 24e at the end thereof.

Figure 112:
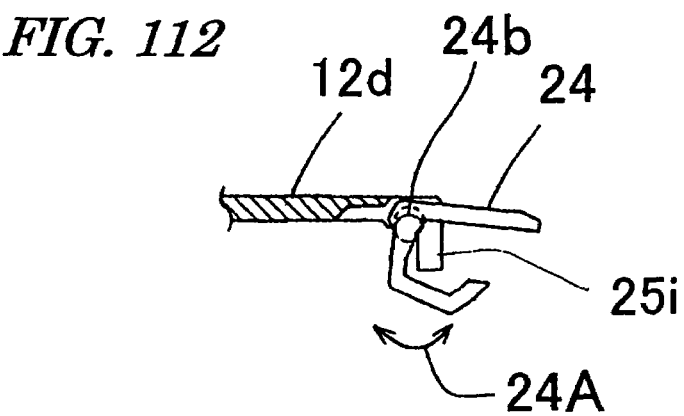
FIG. 112 is a cross-sectional view illustrating how the shielding member shown in FIG. 111 is supported by the cartridge upper shell.

As shown in FIG. 112, the shielding member 24 is disposed at such a position that the rotation shaft 24b thereof is located between the upper surface 12d of the cartridge upper shell 12 and the sidewall 25i of the rotational member 25. As indicated by the arrow 24A, the shielding member 24 can swing on the rotation shaft 24b. A line that connects the respective centers of the rotation shafts 24b together is parallel to a tangent line defined with respect to the disc 100 and is located at a vertical level higher than the first side 100B of the disc 100.

Figure 113:
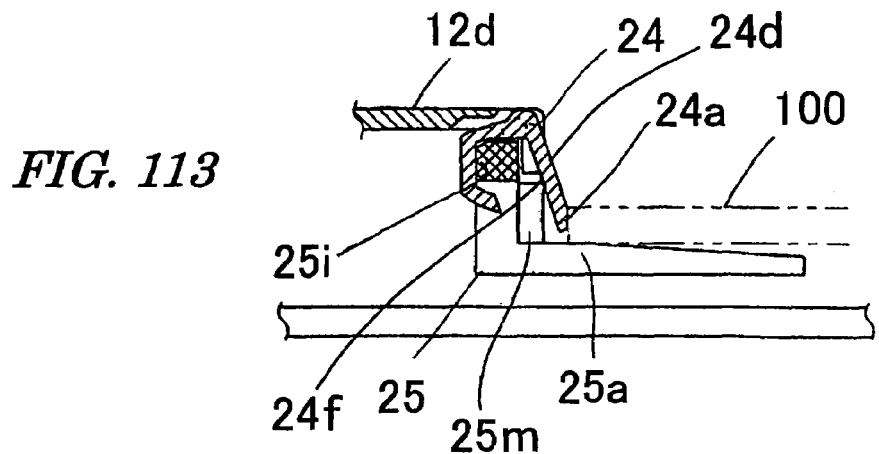
FIG. 113 is a cross-sectional view illustrating the end of the shielding member in a state where the shutters are closed.
Figure 114:
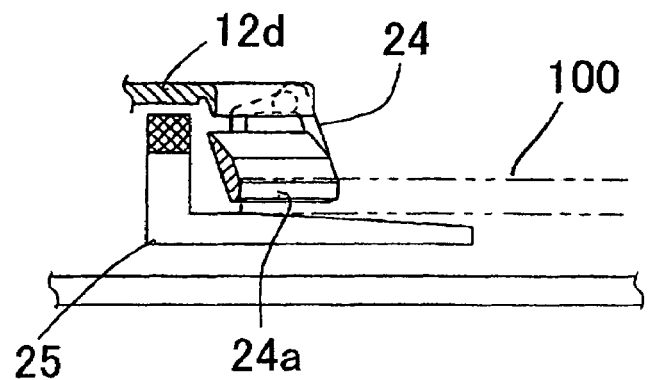
FIG. 114 is a cross-sectional view illustrating the center of the shielding member in a state where the shutters are closed.

FIGS. 113 and 114 illustrate cross sections of the shielding member 24 at one end and the center thereof while the first and second shutters 21 and 22 are closed. As shown in FIGS. 113 and 114, the sidewall 24d is pressed toward the center of the disc 100 so that the convex portion 25m of the rotational member 25 contacts with the second contacting portion 24f of the shielding member 24 and that the first contacting portion 24a contacts with the outer side surface of the disc 100. Thus, no dust or dirt will reach the signal recording side 100A of the disc 100 by way of the notch 25c of the disc receiving portion 25a (see FIG. 104). In this manner, the disc receiving portion 25a and the shielding member 24 are in contact with the outer periphery of the disc 100 continuously, thereby preventing the dust or dirt from reaching the signal recording side 100A.

As the rotational member 25 is rotated to open the first and second shutters 21 and 22, the convex portion 25m of the rotational member 25 goes away from the shielding member 24. As a result, no force is applied to the shielding member 24 toward the disc 100 anymore.

Figure 115:
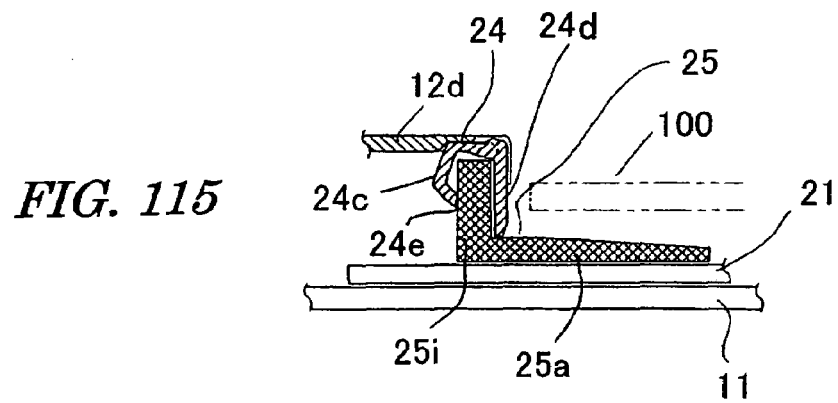
FIG. 115 is a cross-sectional view illustrating the end of the shielding member in a state where the shutters are opened.
Figure 116:
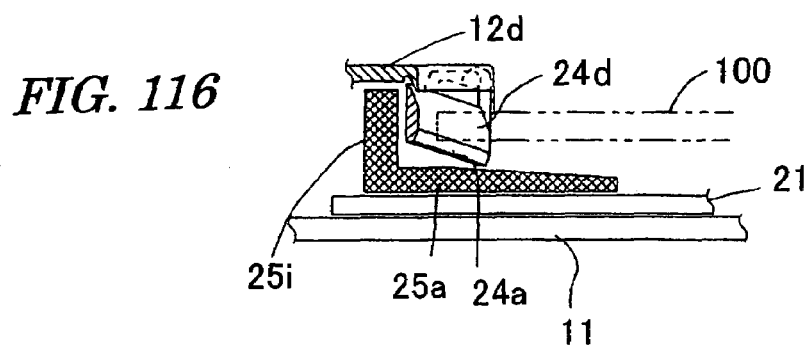
FIG. 116 is a cross-sectional view illustrating the center of the shielding member in a state where the shutters are opened.

As the first and second shutters 21 and 22 are further opened and as the rotational member 25 is further rotated, the outer side surface of the sidewall 25i of the rotational member 25 will soon contact with the third contacting portion 24e of the shielding member 24, thereby pressing the sidewall 24d outward. FIGS. 115 and 116 illustrate cross sections of the shielding member 24 at one end and the center thereof. As shown in FIG. 115, the outer side surface of the disc 100 has been out of contact with the first contacting portion 24a of the shielding member 24. As a result, the disc 100 is now rotatable inside the disc storage portion.

In this manner, the shielding member 24 swings as the rotational member 25 is rotated, thereby alternately coming into contact with the outer side surface of the disc 100 and out of contact with the outer side surface of the disc 100 to allow the disc 100 to rotate freely.

As described above, in this preferred embodiment, the label side 100B of the disc 100 is displayed inside the disc cartridge 320. Thus, the disc cartridge 320 can have a good design and a reduced thickness.

In addition, the first and second shutters 21 and 22 can be opened and closed by rotating the rotational member 25. While the shutters 21 and 22 are closed, the disc 100 can be held firmly by the disc holding portions 21b, 22a and 22b.

Furthermore, while the disc 100 is held inside the disc storage portion, the label side 100B of the disc 100 is exposed. Even so, the disc holding portion 25a of the rotational member 25, the protrusions 21w and 22w of the first and second shutters 21 and 22, and the shielding member 24 interlocked with the rotational member 25 together protect the signal recording side 100A of the disc 100 from dust, dirt or scratches.

In the preferred embodiment described above, the opening 11r is provided on one side surface of the cartridge lower shell 11 so that the operating portion 25j for use to rotate the rotational member 25 is operated on the side surface that is adjacent to another side surface thereof including the head opening 11h. Alternatively, the operating portion 25j may be provided on any other side surface of the cartridge body 10. As another alternative, a plurality of operating portions may be provided as well. For example, the operating portion 25j of the preferred embodiment described above may be used as a first operating portion and a protrusion may be provided as a second operating portion for the sidewall 25i of the rotational member 25 so as to be located within the head opening 11h. Optionally, as shown in FIG. 105, a protrusion 49 may be provided as a second operating portion near the disc holding portion 22a of the second shutter 22 so that the second shutter 22 can be operated directly. In that case, as the second shutter 22 is moved, the rotational member 25 rotates, thereby moving the first shutter 21 synchronously.

In the preferred embodiment described above, the shielding member 24 prevents dust from reaching the signal recording side 100A of the disc 100 by way of the notch 25c of the disc receiving portion 25a. Alternatively, any other structure may be used to prevent dust from entering the disc cartridge 320 through the notch 25c.

Figure 117:
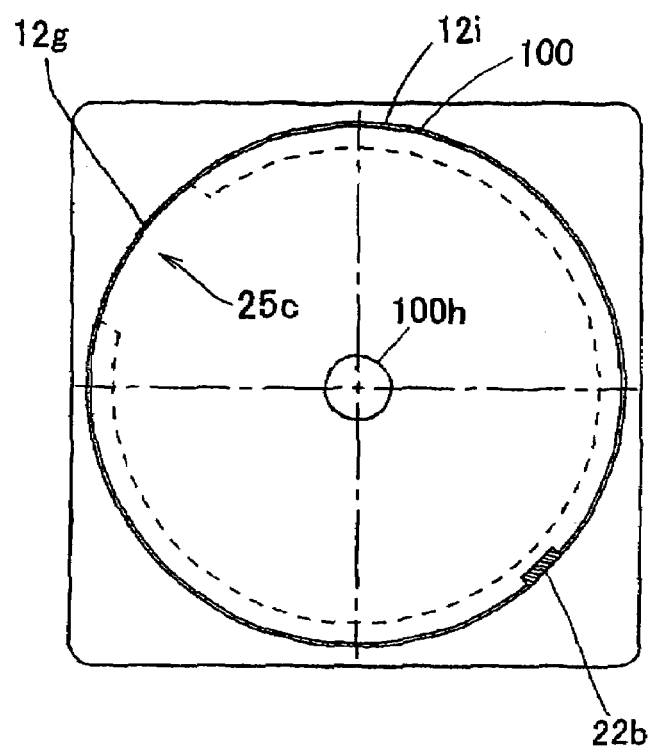
FIG. 117 is a schematic plan view illustrating a modified example of the disc cartridge shown in FIG. 104.

For example, as schematically illustrated in FIG. 117, the notch 12g of the inner side surface 12i of the cartridge upper shell 12 may be closed up by extending the inner side surface 12i, and the disc holding portion 22b of the second shutter 22 (not shown) may be disposed at a position that is symmetrical to the notch 12g with respect to the center of the disc 100. Just like the disc holding portion of the thirteenth preferred embodiment described above, the disc holding portion 22b needs to be movable toward the center of the disc 100 and an elastic force needs to be applied to the disc holding portion 22b toward the center of the disc 100, too. As another alternative, as in the disc holding portion of the nineteenth preferred embodiment described above, an elastic member may be provided for a portion of the disc holding portion 22b that contacts with the disc 100 so that the elastic force applied therefrom presses the disc 100 toward the center thereof as shown in FIG. 118.

Figure 118:
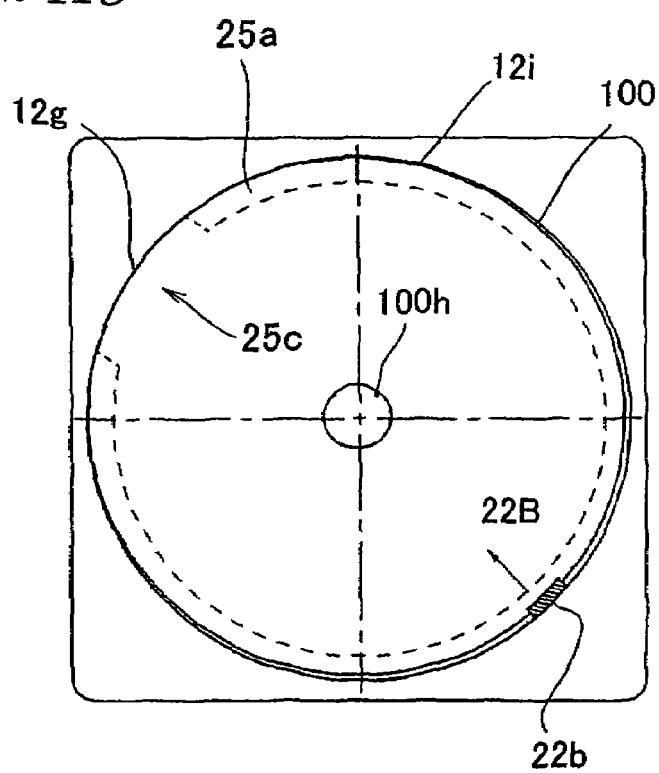
FIG. 118 is a schematic plan view illustrating another modified example of the disc cartridge shown in FIG. 104.

Specifically, such a disc holding portion 22b contacts with the disc 100 and holds it thereon, thereby pressing the outer side surface of the disc 100 toward the notch 25c of the inner side surface 12i of the cartridge upper shell as shown in FIG. 118. The sizes of the disc storage portion and the disc 100 are almost equal to each other. Accordingly, the radius of curvature of the inner side surface 12i is approximately equal to that of the outer side surface of the disc 100. As a result, the outer side surface of the disc 100 closely contacts with the inner side surface 12i of the cartridge upper shell 12. Thus, the inner side surface 12i and the disc receiving portion 25a together prevent dust from reaching the signal recording side 100A of the disc 100.

Such a structure needs no shielding member 24, thus simplifying the structure of the disc cartridge.

Embodiment 21

Hereinafter, a disc cartridge according to a twenty-first embodiment of the present invention will be described.

Figure 119:
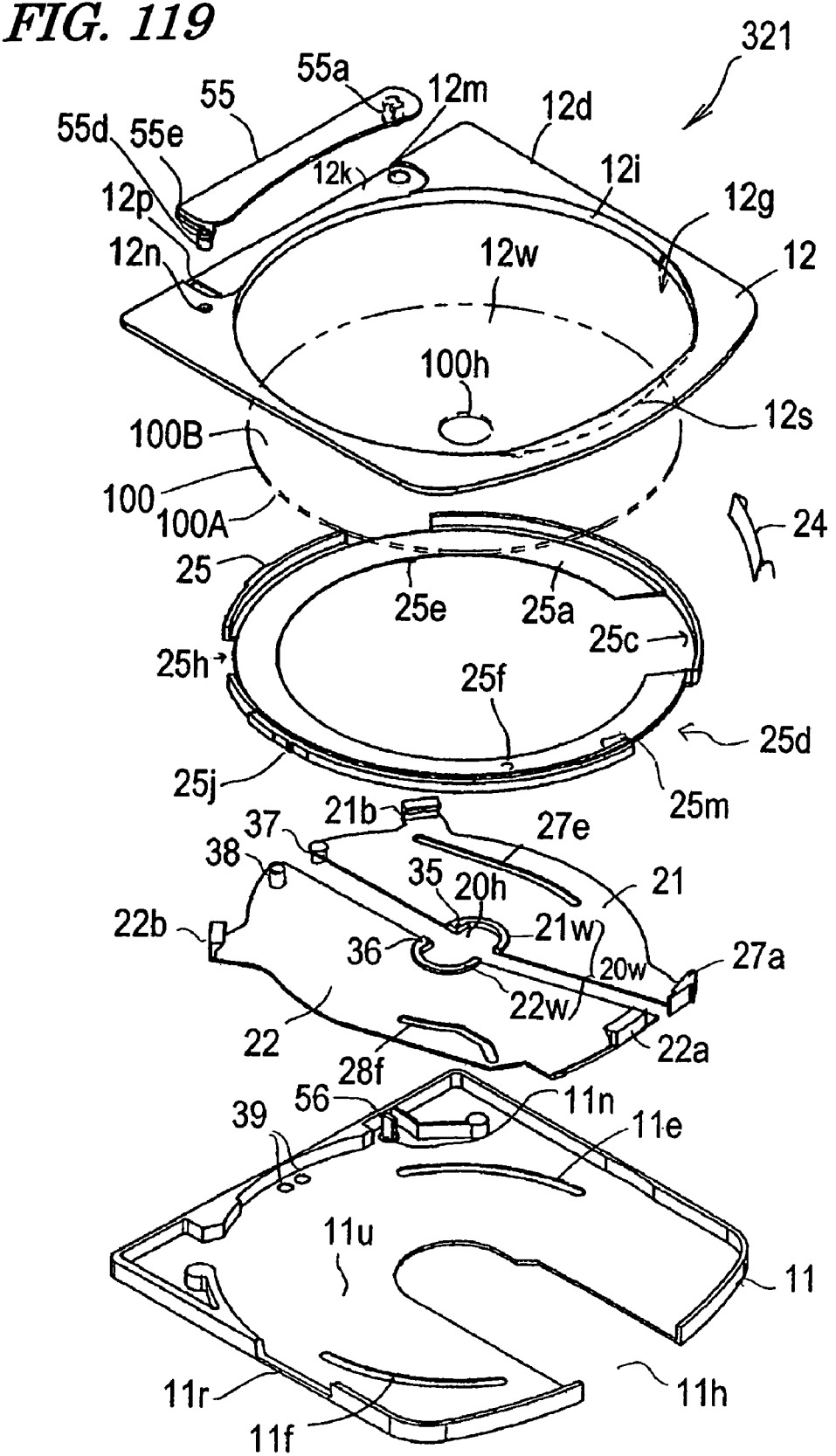
FIG. 119 is an exploded perspective view of a disc cartridge according to a twenty-first embodiment of the present invention.

FIG. 119 is an exploded perspective view of the disc cartridge 321. The disc cartridge 321 is different from the disc cartridge 320 of the twentieth preferred embodiment shown in FIG. 104 in that the disc cartridge 321 includes a stopper member 55 of a different shape and a removal history hole 11n on the cartridge lower shell 11 thereof. Thus, the following description will be focused on the stopper member 55 and the removal history hole 11n.

As shown in FIG. 119, the stopper member 55 is provided near a side surface of the cartridge body, consisting of the cartridge upper and lower shells 12 and 11, so as to face another side surface of the cartridge body having the head opening 11h. A rotation shaft 55a is provided near one end of the longer side of the stopper member 55, while the other end thereof includes a latching portion 55d with a protrusion 55e.

The cartridge upper shell 12 includes a rotation hole 12m to receive the rotation shaft 55a of the stopper member 55, an opening 12p into which the latching portion 55d is inserted, and another hole 12n to receive the protrusion 55e of the latching portion 55d. The cartridge upper shell 12 also includes a recessed portion 12k so that the upper surface of the stopper member 55 is leveled with the upper surface 12d of the cartridge upper shell 12 when the stopper member 55 is attached to the cartridge upper shell 12. The rotation hole 12m and the opening 12p are formed in the recessed portion 12k. While the stopper member 55 is protruding into the disc window 12w and over the disc 100 stored, the protrusion 55e of the latching portion 55d is inserted into the hole 12n, thereby fixing the stopper member 55 onto the cartridge upper shell 12.

Figure 120:
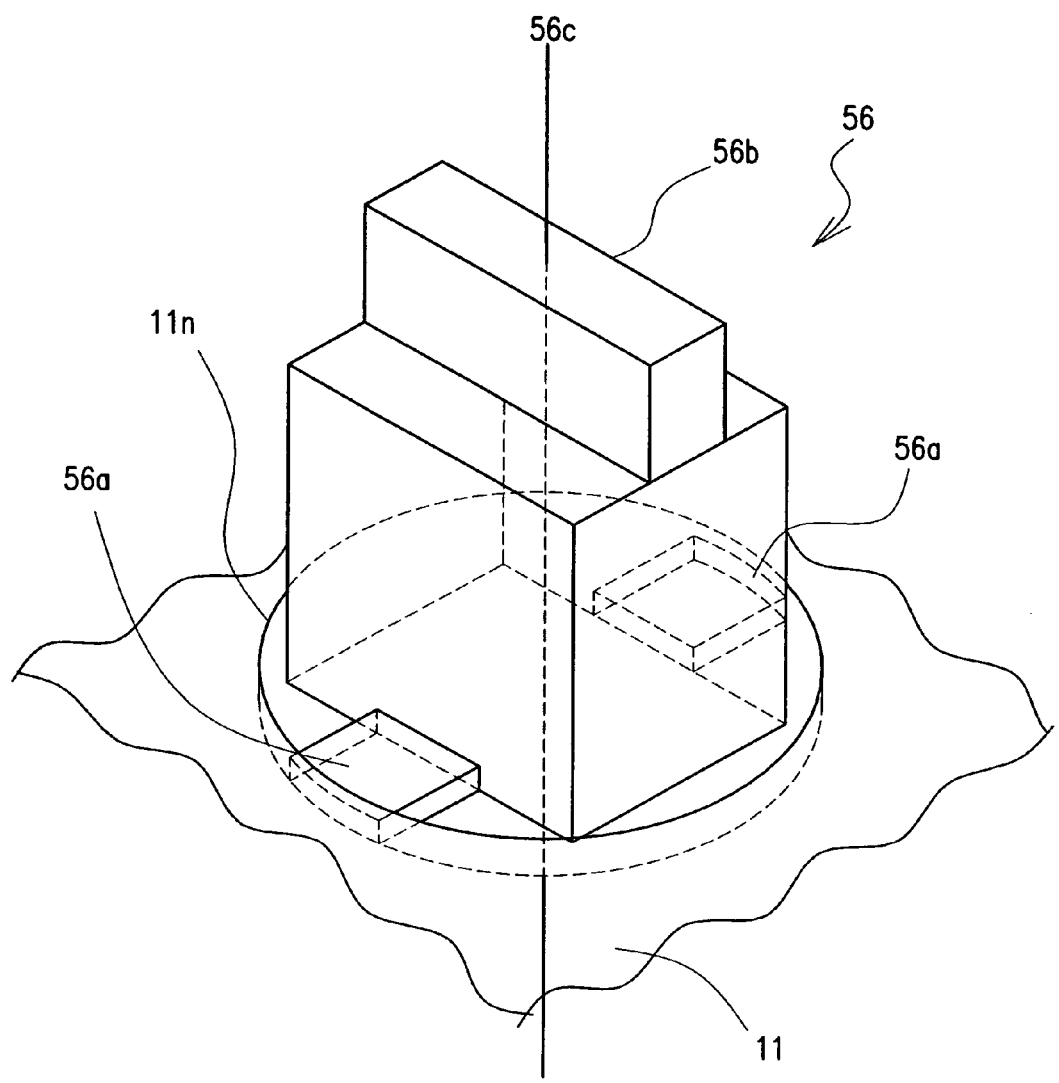

The cartridge lower shell 11 includes the removal history hole 11n. FIG. 120 illustrates the removal history hole 11n and its surrounding members to a larger scale. As shown in FIG. 120, the removal history hole 11n is almost covered with a cap member 56. Specifically, the cap member 56 is connected to the inner sidewall of the removal history hole 11n by way of connectors 56a. The cap member 56 has a columnar (or pin) shape and includes a protrusion 56b at the top thereof.

The center of the removal history hole 11n is aligned with that of the rotation hole 12m of the cartridge upper shell 12 and that of the rotation shaft 55a of the stopper member 55. As will be described in detail later, the cap member 56 is engaged with the stopper member 55. Accordingly, when the stopper member 55 is rotated on its rotation shaft 55a, a rotational force is applied to the cap member 56 in such a direction as to rotate the cap member 56 around its axis 56C. As a result, the connectors 56 are snapped off, the cap member 56 drops off from the cartridge lower shell 11, and the removal history hole 11n is fully opened.

When the disc cartridge 321 is manufactured, the disc 100 is stored in the disc storage portion that is defined by the inner side surface 12i of the cartridge upper shell 12. Thereafter, when the operator rotates the stopper member 55 to remove the disc 100 from the disc cartridge 321, the cap member 56 will drop off and the removal history hole 11n will be opened. Once the cap member 56 has been eliminated, the removal history hole 11n remains open even if another disc 100 is stored in the disc cartridge 321 by operating the stopper member 55. In other words, as long as the removal history hole 11n is closed with the cap member 56, the disc 100 stored in the disc cartridge 321 should be the disc that was originally stored there during the manufacturing process of the disc cartridge 321. On the other hand, if the removal history hole 11n is open, then the disc 100 stored in the disc cartridge 321 might be different from the original disc that was stored there during the manufacturing process of the disc cartridge 321.

A disc drive to be loaded with this disc cartridge 321 senses the opened or closed state of this removal history hole 11n, thereby controlling the read or write operation in accordance with the result. For example, suppose the disc cartridge 321 manufactured should store a disc to be read from or written to in compliance with only a predetermined standard. In that case, if the disc drive finds the removal history hole 11n of the disc cartridge 321 closed, the disc drive recognizes the disc stored in the disc cartridge 321 as readable or writable in compliance with the predetermined standard. Then, the disc drive can quickly perform a read or write operation on the disc in compliance with that standard. On the other hand, if the disc drive finds the removal history hole 11n of the disc cartridge 321 opened, the disc drive senses the disc stored in the disc cartridge 321 as an unknown type. In that case, to recognize the type of the disc that is stored in the disc cartridge 321, the disc drive applies various test signals to the disc first. Next, in accordance with the test results, the disc drive reads or writes a signal from/on the disc under optimized conditions.

Hereinafter, the structure of the stopper member 55 and the operation of exchanging the original disc 100 for a different one will be described in further detail.

Figure 121:
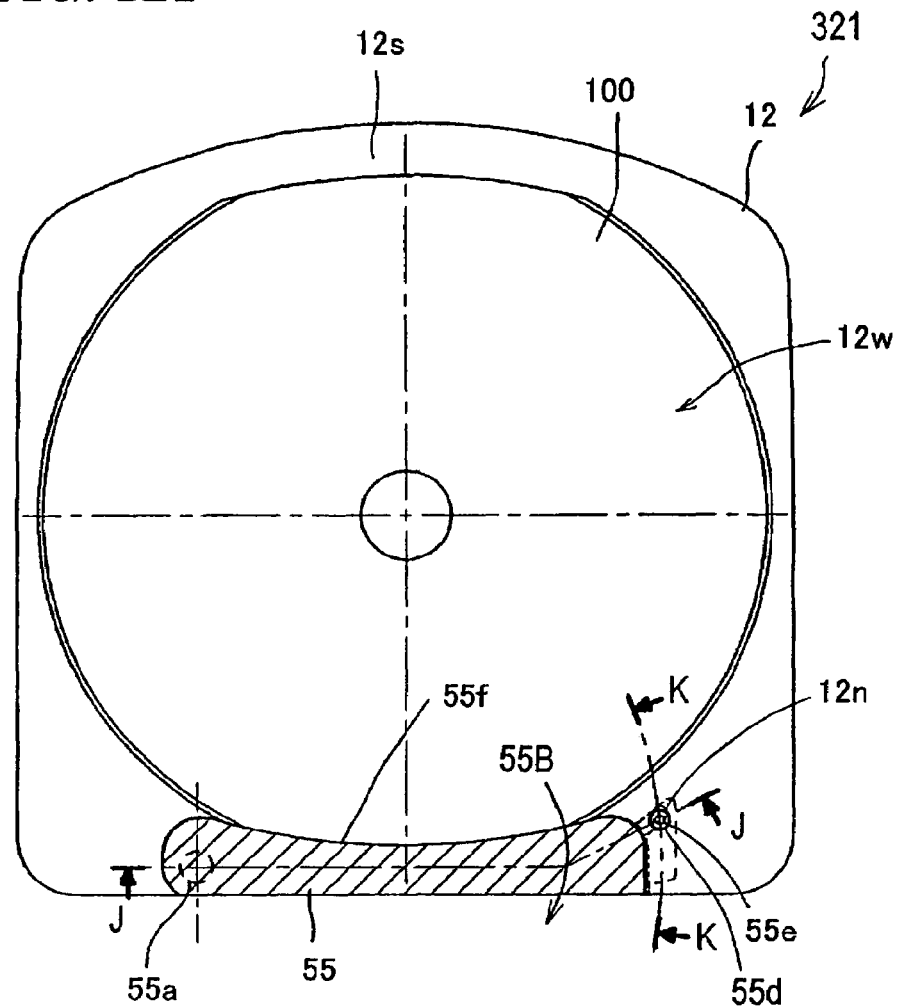
Figure 122:
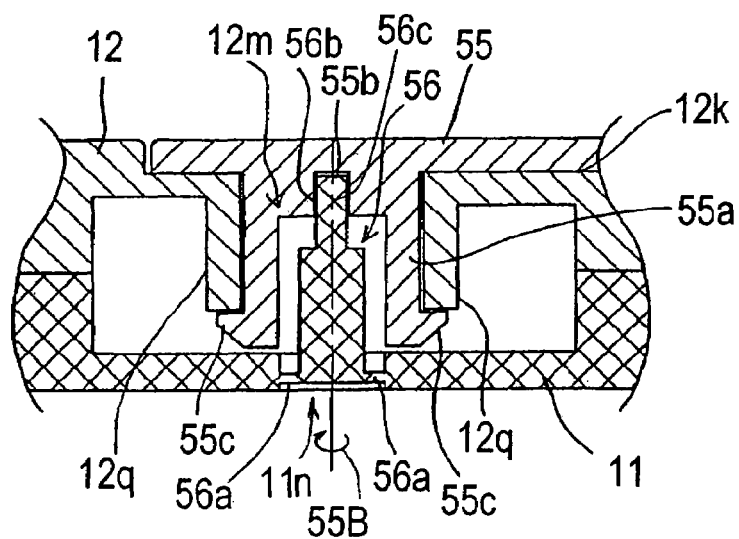
Figure 123:
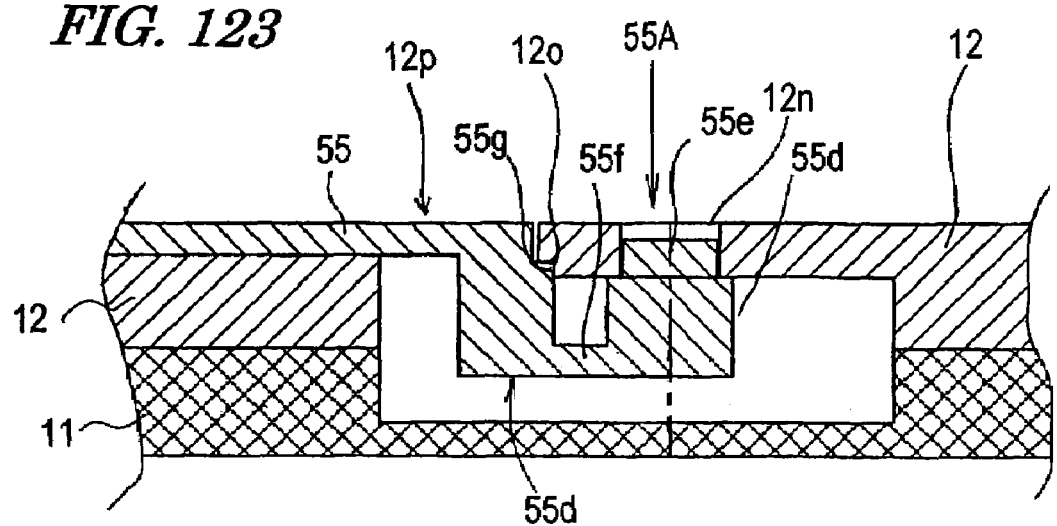
Figure 124:
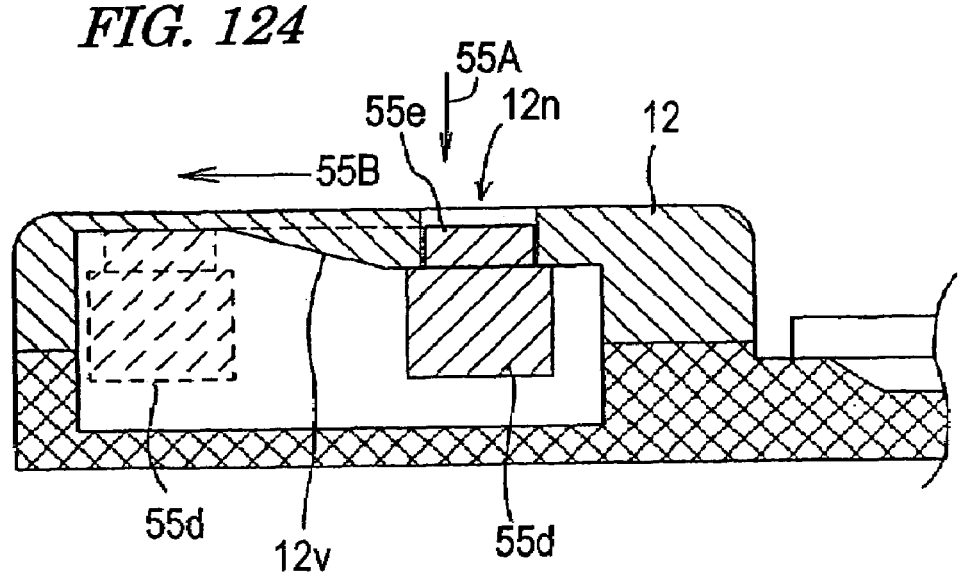

FIG. 121 illustrates a state in which the stopper member 55 protrudes over the disc 100 to prevent the disc 100 from dropping through the disc window 12w of the cartridge upper shell 12. It is in such a state that the disc cartridge 321 is either stored or inserted into a disc drive. FIGS. 122 and 123 are cross-sectional views illustrating portions of the disc cartridge 321 around the rotation shaft 55a and the latching portion 55d, respectively, as viewed along the line J-J shown in FIG. 121. FIG. 124 is a cross-sectional view illustrating portions of the disc cartridge 321 as viewed along the line K-K shown in FIG. 121.

As shown in FIG. 121, the stopper member 55 is opposed to another stopper member 12s that protrudes from the cartridge upper shell 12 toward the center of the disc window 12w. The stopper member 55 has an arched concave side surface 55f along the length thereof.

As shown in FIG. 122, the cartridge upper shell 12 includes a cylindrical boss 12q, inside which the rotation hole 12m is defined. The rotation shaft 55a of the stopper member 55 is inserted into the rotation hole 12m as described above. The rotation shaft 55a includes a protrusion 55c at the bottom thereof so as not to be disengaged from the rotation hole 12m easily. Also, inside the rotation shaft 55a, an inner space having an inside diameter that is approximately equal to the diameter of the removal history hole 11n is defined. The cap member 56 is stored inside that inner space. The protrusion 56b of the cap member 56 is fitted with a concave portion 55b of the stopper member 55. The center of the rotation shaft 55a of the stopper member 55 is aligned with the axis of rotation 56C of the cap member 56. Also, as described above, the cap member 56 is connected to the inner sidewall of the removal history hole 11n by way of the connectors 56a. The connectors 56a are thinner than the bottom of the cartridge lower shell 11.

As shown in FIG. 123, the latching portion 55d at the other end of the stopper member 55 is inserted into the opening 12p of the cartridge upper shell 12 and in contact with the back surface of the cartridge upper shell 12. The protrusion 55e, provided at the end of the latching portion 55d, is fitted with the hole 12n of the cartridge upper shell 12. The stopper member 55 further includes a bridge portion 55f with a reduced thickness so that the latching portion 55d is partially deformed elastically when the protrusion 55e is depressed in the direction indicated by the arrow 55A in FIG. 123. Furthermore, the latching portion 55d of the stopper member 55 and its associated contact surface of the cartridge upper shell 12 are provided with stepped portions 55g and 12o, respectively, which engage with each other. These stepped portions 55g and 12o are provided to prevent the latching portion 55d and its surrounding portions from being raised over the cartridge upper shell 12 when the stopper member 55 is rotated.

To remove the disc 100 from the disc cartridge 321, the protrusion 55e that is engaged with the hole 12n of the cartridge upper shell 12 is depressed in the direction 55A as shown in FIGS. 123 and 124, and at the same time, the stopper member 55 is rotated to the direction indicated by the arrow 55B shown in FIG. 121. Then, as shown in FIG. 124, the bridge portion 55f of the latching portion 55d is deformed elastically and the latching portion 55d slides while the top of the protrusion 55e keeps contact with a slope 12v on the back surface of the cartridge upper shell 12. Since the slope 12v is provided on the back surface of the cartridge upper shell 12, the latching portion 55d can easily reach the dashed-line location shown in FIG. 124 even if no great force is applied thereto along the slope 12v. To make the elastically deformed bridge portion 55f of the latching portion 55d recover its original shape, when the latching portion 55d reaches this position, the top of the protrusion 55e is located at the same vertical level as it was when engaged with the hole 12n.

In the meantime, the stopper member 55 rotates to the direction 55B around the center 55C of the rotation shaft 55a thereof as shown in FIG. 122. As a result, a force that rotates the cap member 56 to the direction 55B around its axis of rotation 56C is applied to the cap member 56, thereby snapping the connectors 56a off and dropping the cap member 56 off.

Figure 125:
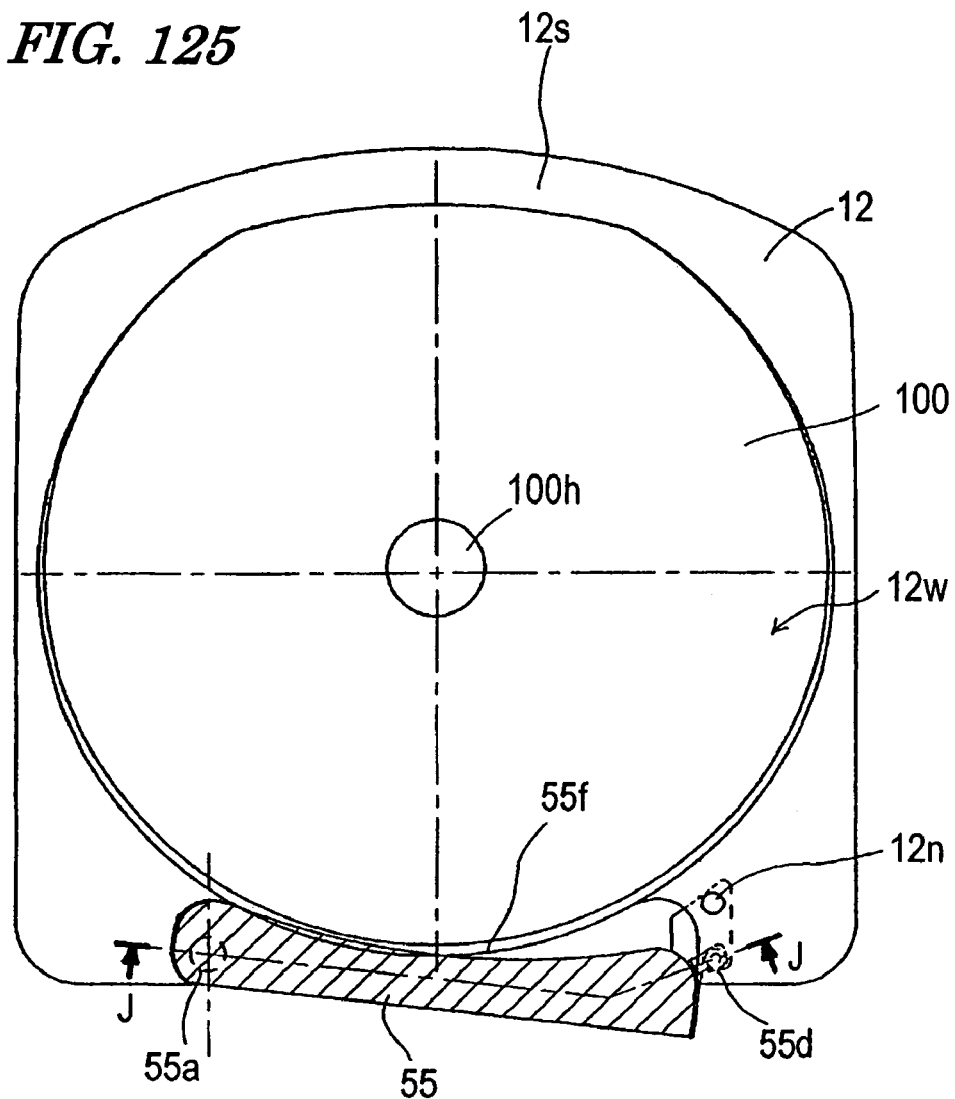

FIG. 125 illustrates a state where the stopper member 55 has moved to such a position as allowing the operator to remove the disc 100 from the disc cartridge 321. At this point in time, the latching portion 55d has already contacted with the inner side surface of the cartridge upper shell 12 as shown in FIG. 124, and therefore, the stopper member 55 can no longer be rotated to the direction 55B.

As shown in FIG. 125, just a portion of the stopper member 55 still protrudes into the disc window 12w. However, if the disc 100 is slightly moved toward the stopper member 12s, the stopper member 55 will not be located over the disc 100 anymore. Then, the operator can remove the disc 100 from the disc cartridge 321 by gripping the disc 100 with a finger laid on the center hole 100h thereof and lifting the edge of the disc 100 from around the stopper member 55 on the cartridge upper shell 12.

Figure 126:
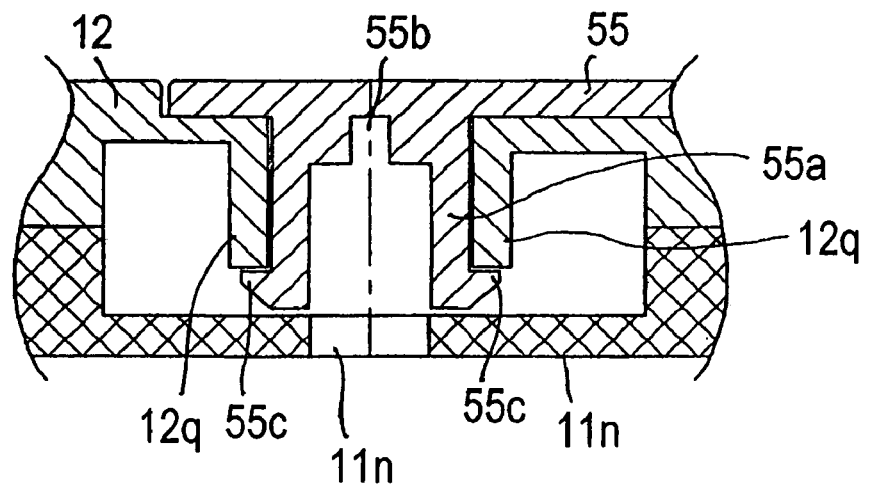
Figure 127:
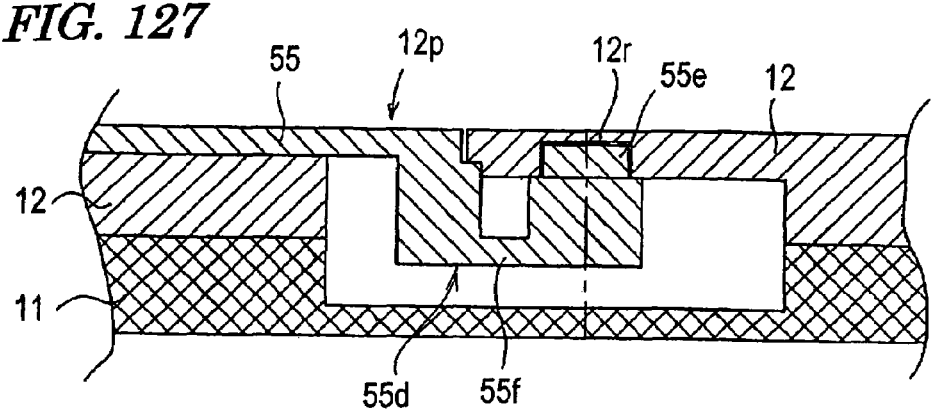

FIGS. 126 and 127 are cross-sectional views illustrating portions of the disc cartridge 321 around the rotation shaft 55a and the latching portion 55d, respectively, as viewed along the line J-J shown in FIG. 125. As described above, while the stopper member 55 is being rotated, the cap member 56 drops off. Accordingly, when the stopper member 55 has moved to the limit, the removal history hole 11n will be fully opened as shown in FIG. 126. Also, the protrusion 55e of the latching portion 55d engages with a recessed portion 12r of the cartridge upper shell 12 as shown in FIG. 127. Thus, the elastically deformed bridge portion 55f of the latching portion 55d recovers its original shape.

After the originally stored disc 100 is removed from the disc cartridge 321, another disc 100 is stored in the disc cartridge 321 and then the stopper member 55 is rotated in the direction opposite to the arrowed direction 55B. When the stopper member 55 gets to its original position shown in FIG. 121, the protrusion 55e of the latching portion 55d is engaged with the hole 12n of the cartridge upper shell 12 again and the stopper member 55 is fixed onto the cartridge upper shell 12 again.

To replace the disc 100 with still another disc, the stopper member 55 may be operated just as described above. However, since the cap member 56 has already been removed, no cap member 56 will be dropped off by the stopper member 55 rotating.

In the disc cartridge 321 of this twenty-first preferred embodiment, the stopper member 55 has the arched concave side surface 55f. Thus, even if the stopper member 55 is not rotated so much, the stopper member 55 can soon stop protruding over the disc 100. Also, since the stopper member 55 is rotated to just a small degree, the latching portion 55d of the stopper member 55 can keep contacted and engaged with the cartridge upper shell 12. Accordingly, even when the disc 100 is removed from the disc cartridge 321, both ends of the stopper member 55 still can keep contact with the cartridge upper shell 12 and the stopper member 55 can maintain sufficient mechanical strength. Thus, even if the operator dropped the disc cartridge 321 by mistake or pressed the stopper member 55 too strongly in removing the disc 100 therefrom, the stopper member 55 would not be broken.

In addition, according to this preferred embodiment, when the stopper member 55 is rotated, the removal history hole 11n is opened. Accordingly, unlike the conventional disc cartridge, the operator does not have to snap off the tab of the history hole.

Furthermore, in the preferred embodiment described above, the cap member 56 has a columnar shape. Alternatively, the cap member 56 may also have any other shape as long as the cap member 56 can be connected to the cartridge lower shell 11 in such a manner as to cover the removal history hole 11n at least partially and can be removed as the stopper member 55 rotates. For example, the cap member may include: a tab provided for the removal history hole 11n; and an auxiliary member, which is provided between the stopper member 55 and the tab and snaps the tab off as the stopper member 55 rotates.

Also, in the preferred embodiment described above, the stopper member 55 is moved from a first position, at which the disc 100 is held tight so as not to drop from the disc cartridge 321, to a second position, at which the disc 100 is ready to remove from the disc cartridge 321, or vice versa, by rotating the stopper member 55 parallel to the disc 100. Alternatively, the stopper member 55 may be moved in a different direction.

Figure 128:
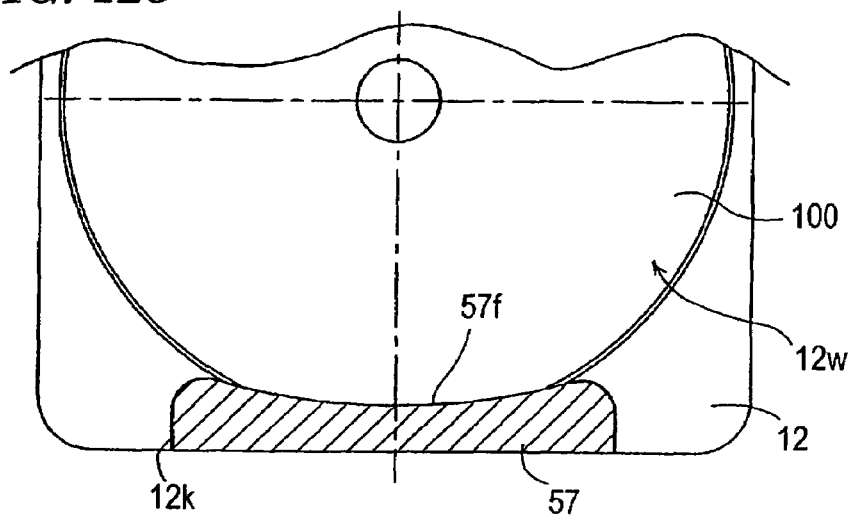
Figure 129:
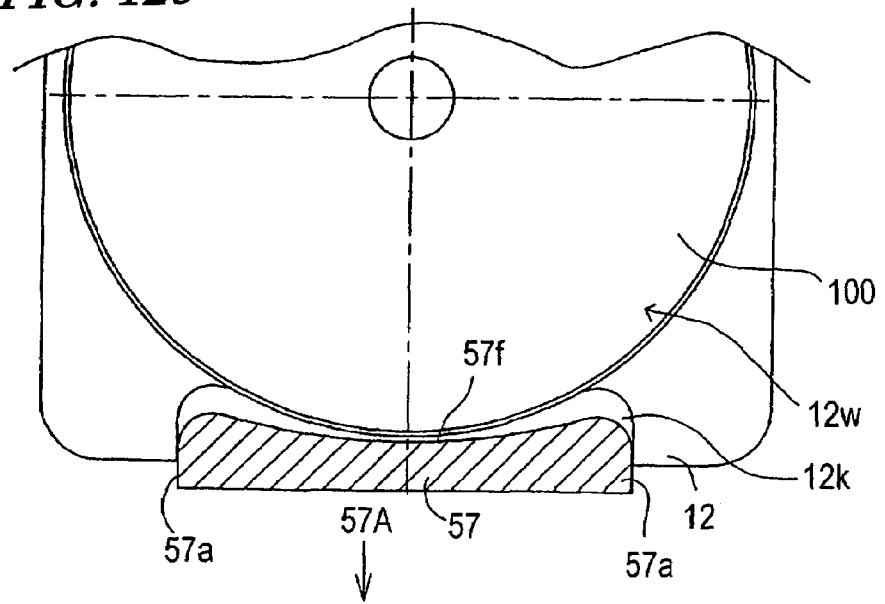

FIGS. 128 and 129 illustrate an alternative stopper member 57 that slides parallel to the side surfaces of the disc cartridge 321. The stopper member 57 also has an arched concave side surface 57f along the length thereof. Specifically, FIG. 128 illustrates a state where the disc 100 is held by the stopper member 57. As shown in FIG. 128, in such a state, the stopper member 57 is partially protruded over the disc 100. To remove the disc 100, the stopper member 57 is moved in the direction indicated by the arrow 57A (i.e., vertically to the longer side of the stopper member 57) as shown in FIG. 129. The side surfaces 57a of the stopper member 57 are preferably provided with convex or concave portions that engage with the cartridge upper shell 12 so that the stopper member 57 is not disengaged from the cartridge upper shell 12 so easily.

The side surface 57f of the stopper member 57 is also arched and recessed. Thus, just by moving the stopper member 57 only slightly, the stopper member 57 can soon stop protruding over the disc 100. For that reason, the disc 100 can be removed from the disc cartridge 321 while most of the stopper member 57 keeps contact with the cartridge upper shell 12. As a result, even when the discs 100 are exchanged, the stopper member 57 does not lose its mechanical strength at all.

Figure 130:
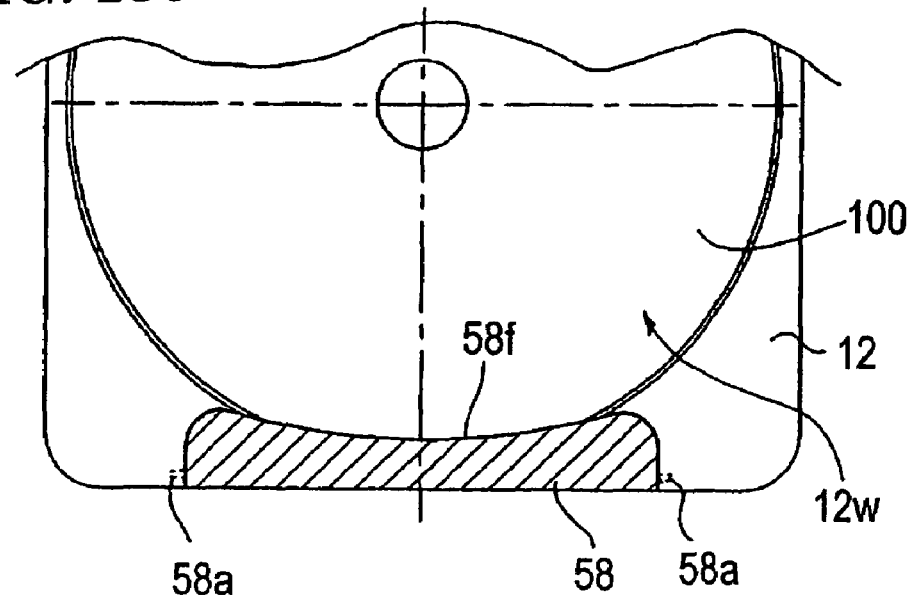
Figure 131:
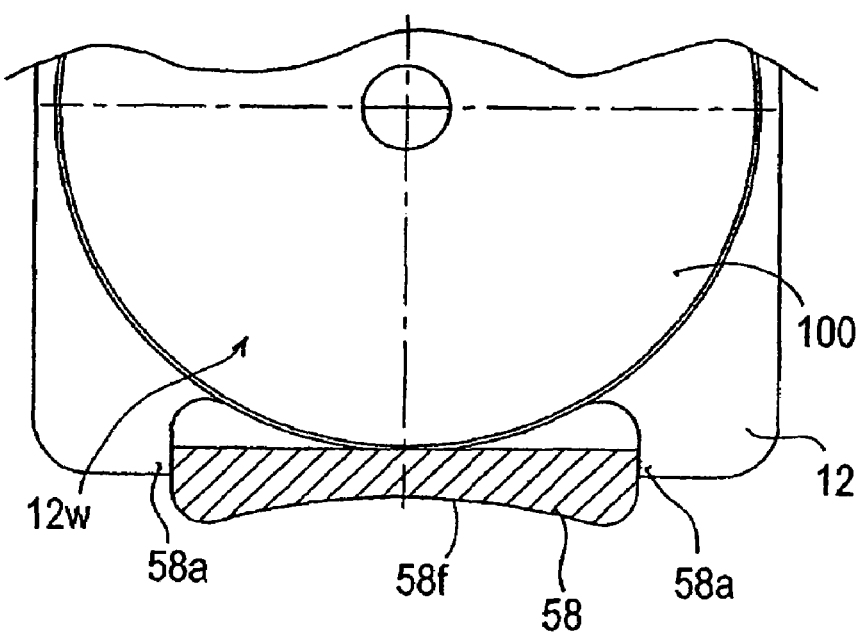

FIGS. 130 and 131 illustrate another alternative stopper member 58, which rotates on a rotation shaft 58a that is secured to the cartridge upper shell 12 at both ends of its longer side. In this alternative preferred embodiment, an elastic force is preferably applied from a spring, for example, to the stopper member 58 so that the stopper member 58 keeps contact with the cartridge upper shell 12 as shown in FIG. 130. If necessary, the stopper member 58 may be rotated to the position shown in FIG. 131. However, since the stopper member 58 also has an arched concave side surface 58f along the length thereof, the disc 100 may be removed just by rotating the stopper member 58 slightly from the position shown in FIG. 130.

If the stopper member 57 or 58 is provided for the disc cartridge 321, the disc cartridge 321 may have a mechanism that removes the cap member as the stopper member 57 or 58 slides or rotates. Alternatively, the cap member that covers the removal history hole may not be interlocked with the stopper member 57 or 58. In that case, the disc cartridge may have a mechanism that allows the stopper member 57 or 58 to slide or rotate only after the operator has removed the cap member.

Embodiment 22

Hereinafter, a disc cartridge according to a twenty-second embodiment of the present invention will be described.

FIG. 132 is a plan view illustrating the disc cartridge 322. FIG. 133 is a cross-sectional view of the disc cartridge 322 as viewed along the line L-L shown in FIG. 133. Just like the disc cartridge of the twentieth preferred embodiment as already described with reference to FIGS. 117 and 118, the disc cartridge 322 can also prevent dust from entering the disc cartridge 322 through the notch 25c of the disc receiving portion 25a without using any shielding member. Although not shown in detail in FIG. 132, the disc cartridge 322 also includes the first and second shutters 21 and 22, rotational member 25 and stopper member 55 as already described for the twentieth and twenty-first preferred embodiments. Each of these members may have the same structure as the counterpart of the twentieth or twenty-first preferred embodiment described above.

In the disc cartridges 320 and 321 of the twentieth and twenty-first preferred embodiments shown in FIGS. 104 and 119, respectively, the sidewall 12i of the cartridge upper shell 12 includes the notch 12g, which is located at the same position as the notch 25c of the disc receiving portion 25a while the first and second shutters 21 and 22 are closed.

Meanwhile, in the disc cartridge 322 of this twenty-second preferred embodiment, the sidewall 12i does not have the notch 12g but is continuous around the circumference of the disc 100. Also, as shown in FIG. 134, an extended sidewall 12i' is provided under the sidewall 12i so as to contact with the outer side surface of the disc 100. The extended sidewall 12i' is located at a position corresponding to the notch 12g.

The sidewall 12i defines the disc window 12w, and therefore has a greater radius of curvature than the disc 100. On the other hand, the extended sidewall 12i' has the same radius of curvature as the disc 100 as shown in FIG. 135. As shown in FIG. 132, the center of the cylinder that is defined by the sidewall 12i is aligned with the center C1 of the disc storage portion. Meanwhile, the center of the curvature that is defined by the extended sidewall 12i' is aligned with a point C2. That is to say, the point C2 is offset from the point C1. It should be noted that the sidewall 25i of the rotational member 25 defines a cylinder, of which the center is aligned with the center C1 of the disc storage portion, and rotates around the point C1.

Also, the disc holding portion 22b holds the disc 100 thereon such that the center of the disc 100 is aligned with the point C2. Although only one disc holding portion 22b is illustrated in FIG. 132, the two other disc holding portions 21b and 22a (not shown) also hold the disc 100 thereon so that the center of the disc 100 is aligned with the point C2. In such a position, the disc receiving portion 25a receives the disc 100 thereon without contacting with the signal recording side (i.e., the back surface) of the disc 100. Accordingly, the center of the disc receiving portion 25a is also offset from the point C1. The distance between the points C1 and C2 is changeable with the radius of the cylinder defined by the sidewall 12i and the radius of the disc 100. For example, if the disc 100 has a diameter of 5 inches, the distance between the points C1 and C2 is preferably from about 0.5 mm to about 1.5 mm. The reason is as follows. Specifically, if the distance is smaller than about 0.5 mm, then the disc 100 rotating might contact with the sidewall 12i because the disc 100 will flutter when the disc 100 is rotated inside of the disc cartridge 322 that has been loaded into the disc drive. However, if the distance between the points C1 and C2 is greater than about 1.5 mm, then the gap between the disc 100 and the sidewall 12i of the disc storage portion will be so wide that a 10t of dust or other dirt might enter the disc cartridge 322 through the gap.

FIG. 136 is a cross-sectional view illustrating the disc holding portion 22b and its surrounding portions of the disc cartridge 322 as viewed along the line L-L shown in FIG. 132. As already described for the twentieth preferred embodiment, the upper surface 15k of the disc receiving portion 25a is sloped, and the disc 100 contacts with only a portion of the upper surface 15k of the disc receiving portion 25 near the sidewall 25i (not shown in FIG. 137) of the rotational member 25. In this preferred embodiment, that portion of the upper surface 25k of the disc receiving portion 25a around the sidewall 25i is parallel to the bottom of the cartridge lower shell 11. Accordingly, while the first and second shutters 21 and 22 are closed so that the disc 100 gets held by the disc holding portions 21b, 22a (not shown) and 22b, the disc 100 contacts with the disc receiving portion 25a in this region 25b. The inner circumference of the region 25b in which the disc receiving portion 25a contacts with the disc 100 is defined by the dashed circle 25n as shown in FIG. 132.

As shown in FIG. 132, the region 25b of the disc receiving portion 25a is located almost around the outer periphery of the disc 100 but discontinued by the notch 25c. Also, the inner circumference 25n of the region 25b defines a circle of which the center is aligned with the point C2. On the other hand, the outer circumference of the region 25b is defined by the outer circumference of the disc 100. Accordingly, the region 25b is a notched ringlike region that is defined by two concentric circles having their centers aligned with the point C2 and that is discontinued by the notch 25c.

While the first and second shutters 21 and 22 (not shown in FIG. 132) are closed so that the disc 100 gets held by the disc holding portions 21b, 22a (not shown) and 22b of the first and second shutters 21 and 22, the center of the disc 100 is aligned with the point C2. Also, since the radius of curvature of the disc 100 is equal to that of the extended sidewall 12i', the outer side surface of the disc 100 comes into tight contact with the extended sidewall 12*i*' at the position where the notch 12*g* exists in other disc cartridges. In other words, the center of the disc 100 held by the disc holding portions 21*b*, 22*a* and 22*b* is offset from the center of the disc storage portion so that the outer side surface of the disc 100 comes into contact with, and gets held by, the extended sidewall 12*i*'.

Also, while the first and second shutters 21 and 22 (not shown in FIG. 132) are closed, the center of the notched ringlike region 25*b*, in which the disc receiving portion 25*a* and the disc 100 contact with each other, is also offset from the center of the disc storage portion. Accordingly, the signal recording side (i.e., the back surface) of the disc 100 contacts with the disc receiving portion 25*a* around the outer periphery thereof and the outer side surface of the disc 100 closely contacts with the extended sidewall 12*i*' where the disc receiving portion 25*a* is discontinued by the notch 25*c*.

On the other hand, around the disc hole 10*h*, the disc 100 is in contact with the convex portions 21*w* and 22*w* of the first and second shutters 21 and 22 as already described for the twentieth preferred embodiment. Thus, the signal recording area of the disc 100 is completely shut off from the air, and no dust will be deposited on the signal recording area of the disc 100.

Also, as shown in FIGS. 136 and 137, the disc holding portion 22*b* of the second shutter 22 of the disc cartridge 322 has a tapered bottom 26*c*, while a recessed portion 11*x* is provided for the cartridge lower shell 11 to receive the bottom 26*c* of the disc holding portion 22*b*. Accordingly, if the thickness or the diameter of the disc 100 is not quite equal to, but slightly greater than, the standard one, then a portion 26*b* of the second shutter 22 is deformed elastically near the end of the recessed portion 11*x* of the cartridge lower shell 11 as shown in FIG. 137. As a result, the sloped portion 22*b*' of the disc holding portion 22*b* contacts with the outer edge of the disc 100 and the first and second shutters 21 and 22 can firmly hold the disc 100 thereon without allowing the disc 100 to move inconstantly. Also, as the second shutter 22 is deformed elastically, the disc holding portion 22*b* applies an elastic force to the disc 100 toward the center thereof. Consequently, the disc 100 is pressed against, and comes into closer contact with, the extended sidewall 12*i*' as shown in FIGS. 132 and 134. Then, the unwanted deposition of dust on the signal recording area of the disc 100 can be prevented with even more certainty.

To get the disc 100 held just as intended irrespective of the variation in thickness or diameter of the disc 100, the disc cartridge 322 may be designed such that the second shutter 22 is slightly deformed elastically as shown in FIG. 137 when the thickness or the diameter of the disc 100 to be held is approximately equal to the center value of its standard range and that the second shutter 22 is hardly deformed elastically as shown in FIG. 136 when the thickness or the diameter of the disc 100 to be held is approximately equal to the lower limit of that range.

As described above, according to this preferred embodiment, no dust will be deposited on the signal recording area of the disc 100 even if no shielding member 24 is provided. That is to say, neither the shielding member 24 nor the mechanism for interlocking the shielding member 24 with the rotational member 25 is needed, thus simplifying the structure of the disc cartridge significantly.

Embodiment 23

Hereinafter, a disc cartridge according to a twenty-third embodiment of the present invention will be described.

The disc cartridge according to the present invention stores a disc therein with one side of the disc exposed unlike the conventional disc cartridge. Thus, the disc cartridge of the present invention can be thinner than the conventional one. Also, since the label side of the disc is displayed, the overall disc cartridge can have a good design.

However, since one side of the disc is supposed to be exposed inside of this disc cartridge, the operator may touch the label side of the disc. Accordingly, a careless operator might press the label side of the disc too strongly. Thus, the disc cartridge of this type should hold the disc in such a manner as to prevent the signal recording side of the disc from getting scratched or the disc itself from being deformed even in such a situation. In view of these potential unfavorable situations, the present inventors carried out an intensive research on how the disc should be held to have its signal recording side protected from scratches, for example.

FIG. 138 illustrates a holding structure 59 (e.g., the disc receiving portion 25*a*) for holding the disc 100 thereon and a space to be provided under the signal recording area 100*d* of the disc 100 so that the signal recording area 100*d* will not get scratched by the holding structure 59 even if the disc 100 is pressed by the operator too strongly. It should be noted that the sizes of some portions of the holding structure 59 are not to scale in FIG. 138 so as to make the features of the holding structure 59, which defines that space, clearly understandable. Accordingly, the aspect ratio illustrated in FIG. 138 is different from the actual one.

If plenty of space was allowed under the disc 100, the height of the space had only to be slightly greater than the maximum flexure of the disc 100. This is because, in that case, the disc 100 would never contact with the holding structure 59 no matter how much the disc 100 was deformed. However, a disc cartridge with such an ample space would be too thick. So the space under the disc 100 should actually be minimized. To minimize the space, the disc 100 needs to be held so as to have as small flexure as possible. And to reduce the flexure, portions of the disc 100 to be held by the holding structure 59 are preferably as close to the signal recording area 100*d* of the disc 100 as possible. As shown in FIG. 138, the portions of the holding structure 59, on which the signal recording side 100A of the disc 100 is supported, are defined by an inner radius Rin and an outer radius Rout. That is to say, the disc 100 is held not only by the inside portion of the holding structure 59 that is located inside of the inner radius Rin but also by the outside portion of the holding structure 59 that is located outside of the outer radius Rout. The "inner radius Rin" is herein supposed to be a distance from the center of the disc 100 to a point that is located closer to the center of the disc 100 than, and defined near, the inner periphery of the signal recording area 100*d*. On the other hand, the "outer radius Rout" is herein supposed to be a distance from the center of the disc 100 to a point that is located closer to the outer edge of the disc 100 than, and defined near, the outer periphery of the signal recording area 100*d*. As described above, these two points that define the inner and outer radii Rin and Rout are as close to the signal recording area 100*d* as possible. For example, if the disc 100 has a diameter of 5 inches (i.e., a radius of 60 mm), then the inner radius Rin is preferably 20 mm and the outer radius Rout is preferably 59 mm.

The space 69*b* to be provided under the disc 100 to prevent the signal recording area 100*d* from getting scratched is defined in the following manner. First, the height (or the depth) S (mm) of the space 69*b* is defined. Next, three circles 69*d*, 69*e* and 69*f* are defined. Specifically, the circle 69*d* has a radius that is equal to the outer radius Rout and is defined on the signal recording side 100A; the circle 69*e* has a radius obtained by (Rout—1.2S) and is defined on a plane that is parallel to, and 0.3S mm separated from, the signal recording side 100A; and the circle 69f has a radius obtained by (Rout—16.2S) and is defined on a plane that is parallel to, and S mm separated from, the signal recording side 100A. A truncated cone, of which the top and bottom are defined by the circles 69d and 69e, respectively, has a side surface 59a, while another truncated cone, of which the top and bottom are defined by the circles 69e and 69f, respectively, has a side surface 59b.

A circular cylinder is also defined so as to have a circular bottom with the radius Rin as measured from the center of the disc 100 and a side surface 59d with the height (or depth) S as measured from the signal recording side 100A. The space 69b to be provided under the signal recording area 100d is obtained by removing the circular cylinder, defined by the side surface 59d, from the two-stepped truncated cone defined by the side surfaces 59a and 59b.

The S value defines the height of the space 69b. Accordingly, the greater the S value, the less likely the signal recording area 100d gets scratched even if the disc 100 is deformed. However, as the S value is increased, the disc cartridge increases its thickness. Thus, to make a thin disc cartridge, the S value is preferably as small as possible. The present inventors discovered and confirmed via experiments that even an S value of about 1 mm was great enough to protect the signal recording area 100d of the disc 100 from scratches as long as the flexure of the disc 100 was caused by a pressure that was manually applied by the operator.

On the other hand, a clamp area 100e of the disc 100 preferably does not contact with the holding structure 250 within the region defined by the inner radius Rin. The reason is as follows. When the disc cartridge 323 is loaded into a disc drive to read and/or write a signal from/on the disc 100, the clamp area 100e will contact with a turntable or a clamper. Accordingly, if this area 100e has been scratched or partially covered with dust, then the disc 100 cannot get chucked as intended. The clamp area 100e is defined by two concentric circles that have diameters of 22 mm and 33 mm, respectively, and have their centers aligned with that of the disc 100. The clamp area 10e accounts for just a small percentage of the overall area of the disc 100. Thus, even if the operator presses the disc 100 from over the clamp area 100e, the disc 100 will be hardly bent. For that reason, only if a space 69a is provided so as to contact with the entire clamp area 100e, the space 69a may have any height (or depth).

FIG. 139 schematically illustrates how much the disc 100 is deformed if the space 69b is provided under the disc 100 with the S value set to 1 mm and a pressure is applied onto the disc 100 toward the space 69b. The present inventors discovered and confirmed via experiments that the pressure that was applied manually onto the disc 100 by the operator never exceeded 3 kg. The present inventors also discovered that even when the maximum pressure of 3 kg was applied, the disc 100 was bent fully within the space 69b and never contacted with the side surface 59a or 59b.

In this case, the space 69b defined has minimum required dimensions to prevent the signal recording area 100d of the disc 100 from getting scratched. Accordingly, a greater space may be provided under the signal recording area 100d of the disc 100. That is to say, the space 69b may be provided beyond the side surfaces 59a and 59b as shown in FIGS. 140 and 141. In that case, however, to sufficiently increase the mechanical strength of the outside portion of the holding structure 59 to hold the outer periphery of the disc 100 thereon, a reinforced portion 59' or 59" is preferably provided adjacent to the outside portion. The side surfaces 59a and 59b can be used effectively to determine the allowable shapes of those reinforced portions 59' and 59".

Hereinafter, a disc cartridge that was designed in view of these considerations will be described specifically. FIG. 142 is a plan view of the disc cartridge 322. FIG. 143 is a cross-sectional view thereof as viewed along the line A-A shown in FIG. 142. FIG. 144 is an exploded perspective view of the disc cartridge 323. In the disc cartridge 322 of this twenty-third preferred embodiment, each member that is equivalent to the counterpart of the disc cartridge according to the twentieth, twenty-first or twenty-second preferred embodiment described above is identified by the same reference numeral.

Just like the disc cartridge 322 of the twenty-second preferred embodiment described above, the disc cartridge 323 has no shielding member but holds the disc 100 thereon by bringing the outer side surface of the disc 100 into contact with the sidewall 12i of the cartridge upper shell 12.

More specifically, while the first and second shutters 21 and 22 are closed, the disc cartridge 323 gets the disc 100 held by the disc holding portion 21b of the first shutter 21 and the disc holding portions 22a and 22b of the second shutter 22 as shown in FIGS. 142 and 144. In this case, the outer side surface of the disc 100 contacts with the sidewall 12i of the cartridge upper shell 12 where the notch 25c of the rotational member 25 is located. Also, the center of the disc 100 is aligned with the point C2. The inner circumference of the region, in which the disc receiving portion 25a of the rotational member 25 contacts with the disc 100, has its center aligned with the point C2 so that the region contacts with the first side 100A of the disc 100 equally. On the other hand, the center of the sidewall 25i of the rotational member 25 is aligned with the point C1.

As shown in FIGS. 142 and 144, a ring 20w, consisting of convex portions 21w and 22w, is provided around the hole 20h that is defined by the first and second shutters 21 and 22 of the disc cartridge 323. The hole 20h corresponds to the center hole 100h of the disc 100. Another pair of convex portions 35d and 36d is provided so as to be separated from the ring 20w by a predetermined distance. The upper surface of the convex portions 35d and 36d is leveled with that of the convex portions 21w and 22w. When the first and second shutters 21 and 22 are closed, the convex portions 35d and 36d define a continuous ring 20d that holds a portion of the disc 100 near the signal recording area thereof. The concave portion that is created between these two rings 20w and 20d defines the space 69a. When the disc 100 is held thereon, the clamp area of the disc 100 is located right over the space 69a.

Also, as shown in FIG. 143, the convex portion 36d, first shutter 22 and disc receiving portion 25a of the rotational member 25 are designed such that the space 69b shown in FIG. 138 is provided under the disc 100 when the disc 100 is held on this disc cartridge 323. Although not shown in FIG. 143, the other convex portion 35d and the first shutter 21 are also designed for the same purpose. Furthermore, the disc cartridge 323 is also designed such that a gap of 1 mm or more is provided between the disc 100 mounted and the first and second shutters 21 and 22. Also, the disc receiving portion 25a is located outside of the space 69b shown in FIG. 138 (i.e., under the side surfaces 59a and 59b that define the space 69b) and does not obstruct the space 69b at all.

By providing the space 69b shown in FIG. 138 under the disc 100 in this manner, the signal recording area of the disc 100 stored in the disc cartridge 323 can be protected just as intended even if the disc 100 is pressed by the operator too strongly.

The disc cartridge 323 of this preferred embodiment further includes other structures that are specially designed to increase the mechanical strength of its members, selectively attach one of two types of stopper members, and increase the dustproofness, respectively, for the purpose of increasing the usefulness of this disc cartridge 323. Hereinafter, those structures will be described in detail.

First, the structure for increasing the mechanical strength of the members of the disc cartridge 323 will be described. As shown in FIGS. 142 and 144, while the first and second shutters 21 and 22 are closed, the disc holding portions 21a, 22a and 22b apply an elastic force to the disc 100 toward the center thereof. This is because the connecting portion between the first shutter 21 and the disc holding portion 21b and the connecting portions between the second shutter 22 and the disc holding portions 22a and 22b are deformed elastically by the disc 100.

However, if the operator dropped the disc cartridge 323 by mistake or tried to rotate the disc 100 forcibly inside of the disc cartridge 323 by applying a force onto the exposed side 100B of the disc 100, then a force could be applied from the center of the disc 100 to the disc holding portions 21a, 22a and 22b outward. And if such a force were great enough, the connecting portion between the first shutter 21 and the disc holding portion 21a and the connecting portions between the second shutter 22 and the disc holding portions 22a and 22b might be snapped. Among other things, the portion that connects the disc holding portion 21b to the first shutter 21 and the portion that connects the disc holding portion 22b to the second shutter 22 are too narrow to sufficiently resist the forces that are applied in the directions indicated by the arrows 21B and 22B, respectively, in FIG. 142.

In view of this potential snapping of those connecting portions, the sidewall 12i of the rotational member 25 of this disc cartridge 323 is formed such that the cross sections 65a and 65b of its notches 25g and 25h are not parallel to the radial direction of the disc 100 (i.e., the directions 21B and 22B) but face the disc storage portion 10d. Accordingly, while the shutters 21 and 22 are closed, the displacement of the disc holding portions 21b and 22b in the directions 21B and 22B is regulated by the cross sections 65a and 65b, respectively, so as not to exceed their predetermined limits.

By providing these cross sections 65a and 65b, the disc holding portions 21b and 22b would not be snapped off even if the operator dropped the disc cartridge 323 by mistake or tried to move the disc holding portions 21b and 22b outward intentionally. Also, even if some force is applied in such a direction as to open the first and second shutters 21 and 22 accidentally while the shutters 21 and 22 are supposed to be closed, the disc holding portions 21b and 22b, which are going to move along with the shutters 21 and 22 being opened, will soon contact with the cross sections 65a and 65b, respectively. As a result, the first and second shutters 21 and 22 will not open accidentally. Thus, it is possible to minimize the unintentional movement of the first and second shutters 21 and 22 being closed.

Also, if the operator attempts to open the first and second shutters 21 and 22 intentionally, then the first and second shutters 21 and 22 are going to rotate around the rotation holes 37 and 38, respectively, as shown in FIG. 142. Then, the inner sidewalls of the respective guide grooves 27e and 28f of the first and second shutters 21 and 22 are going to rotate the convex portions 25e and 25f of the rotational member 25 to the directions 25E and 25F around the rotation holes 37 and 38, respectively, as shown in FIG. 142.

In this case, if the ends of the guide grooves 27e and 28f were elongated in the directions 25E and 25F or if the guide grooves 27e and 28f allowed the convex portions 25e and 25f to move in the directions 25E and 25F, respectively, then the first and second shutters 21 and 22 would move inconstantly.

To eliminate such an inconstant movement of the first and second shutters 21 and 22, those ends of the guide grooves 27e and 28f, where the convex portions 25e and 25f are located while the shutters 21 and 22 are closed, are elongated in the directions indicated by the arrows 27E and 28F, which substantially cross the arrows 25E and 25F at right angles. As shown in FIG. 142, the directions 27E and 28F are substantially parallel to the lines that connect the convex portions 25e and 25f to the rotation holes 37 and 38, respectively.

Furthermore, as shown in FIG. 144, the cartridge lower shell 11 is provided with a raised portion 33b and the rotational member 25 is provided with a raised portion 25w. The heights of these raised portions 33b and 25w are approximately equal to the thickness of the first and second shutters 21 and 22. The raised portion 33b contacts with the back surface of the disc receiving portion 25a of the rotational member 25. The raised portion 25w engages with a concave portion 33c that is formed on the inner lower surface 11u of the cartridge lower shell 11. These raised portions 33b and 25w are provided to support the portions of the rotational member 25 that are not in contact with the first or second shutter 21 or 22. Thus, even those portions of the rotational member 25 that are not in contact with the first or second shutter 21 or 22 would not be deformed or lose contact with the disc 100.

As already described for the fourteenth preferred embodiment, the disc holding portion 22a includes the first and second portions 122a and 222a and the upper surface of the first portion 122a is higher than that of the second portion 222a. Also, the top of the first portion 122a is inserted into a recessed portion 12x that is provided on the back surface of the cartridge upper shell 12. The recessed portion 12x is provided along a region where the top of the first portion 122a passes as the shutters are going to be opened or closed.

As shown in FIGS. 142 and 144, the head opening 11h is provided where the disc holding portion 22a passes as the shutters are going to be opened or closed, and reaches a side surface of the cartridge lower shell 11. Accordingly, when the cartridge body is formed by combining the cartridge lower and upper shells 11 and 12 together, the mechanical strength of the cartridge body around the head opening 11h should be secured only by the cartridge upper shell 12.

In the disc cartridge 323, as the shutters are going to be closed, the first portion 122a of the disc holding portion 22a can grip the disc 100 thereon just as intended as already described for the fourteenth preferred embodiment. Also, since the upper surface of the second portion 222a of the disc holding portion 22a is located at a low vertical level, the cartridge upper shell 12 does not have to have a reduced thickness over the second portion 222a. Accordingly, the recessed region 12x of the cartridge upper shell 12, where the first portion 122a of the disc holding portion 22a passes as the shutters are going to be opened or closed, should have a reduced thickness but can be just a small portion of the overall cartridge upper shell 12. Thus, it is possible to prevent the mechanical strength of the overall cartridge body from decreasing excessively around the head opening 11h.

Furthermore, the disc cartridge 323 of this preferred embodiment has a structure of increasing the rigidity thereof while the shutters are closed as described for the thirteenth preferred embodiment.

Specifically, as shown in FIGS. 145 and 146, the first and second shutters 21 and 22 have two pairs of contact portions 21f', 22f and 21g', 22g', which are discontinuous and separated from each other by the hole 20h and each pair of which overlaps with each other vertically. That is to say, the first shutter 21 includes the contact portions 21g' and 21f', while the second shutter 22 includes the contact portions 22g' and 22f'. FIG. 146 shows cross-sectional views of the first and second shutters 21 and 22 as viewed along the lines N-N and O-O shown in FIG. 145, respectively. In one pair of contact portions 21g' and 22g', while the shutters 21 and 22 are closed, the contact portion 21g' of the first shutter 21 is located under the contact portion 22g' of the second shutter 22 in the thickness direction of the shutters 21 and 22. In the other pair of contact portions 21f' and 22f', while the shutters 21 and 22 are closed, the contact portion 21f' of the first shutter 21 is located over the contact portion 22f' of the second shutter 22 in the thickness direction of the shutters 21 and 22.

Also, the edge of the contact portion 21g' of the second shutter 22 includes a convex portion 38c that extends along the contact portion 21g'. On the other hand, the first shutter 21 includes a concave portion 37c that engages with the convex portion 38c while the shutters 21 and 22 are closed.

Furthermore, as shown in FIG. 147, where the disc holding portion 22a of the second shutter 22 contacts with the convex portion 27a of the first shutter 21, the convex portion 27a includes a protrusion 37a and the disc holding portion 22a includes a concave portion 38a that engages with the protrusion 37a. Another concave portion 37b is provided over the protrusion 37a. Another protrusion 38b, which engages with the concave portion 37b, is provided over the concave portion 38a. The protrusion 37a and the concave portion 37b define another contact portion 37e of the first shutter 21. On the other hand, the concave portion 38a and the protrusion 38b define another contact portion 38e of the second shutter 22. These contact portions 37e and 38e of the first and second shutters 21 and 22 will be herein referred to as a "third pair of contact portions".

As described above, in the disc cartridge 323 of the twenty-third preferred embodiment, two separate pairs of contact portions 21g', 22g' and 21f', 22f' are provided for the first and second shutters 21 and 22 and each pair of contact portions of the first and second shutters 21 and 22 overlaps with each other in the thickness direction of the shutters. Also, the order in which the contact portions 21g' and 22g' of the first pair overlap with each other is reverse to the order in which the contact portions 21f' and 22f' of the second pair overlap with each other. By utilizing such a structure, the first and second shutters 21 and 22 closed will not be raised unintentionally, and the contact portions thereof can have increased rigidity.

Also, by providing the concave portion 37c and the convex portion 38c for the contact portions 21g' and 22g' of the first and second shutters 21 and 22, respectively, the contact portions 21g' and 22g' of the shutters 21 and 22 closed will not be easily disengaged from each other due to the inconstant movement thereof, for example. In this manner, the first and second shutters 21 and 22 can contact with each other even more closely, thus increasing the dustproofness of the disc cartridge around these contact portions of the shutters.

Furthermore, by providing the third pair of contact portions 37e and 38e for the first and second shutters 21 and 22, respectively, the contact portions of the first and second shutters 21 and 22 closed can have increased rigidity. Also, the connecting portion 21g' and the protrusion 37b of the first shutter 21 are sandwiched between the protrusion 38b and the contact portion 22g' of the second shutter 22. As a result, the contact portions of the first and second shutters 21 and 22 closed can have further increased rigidity.

Next, the structure that is specially designed to selectively attach one of two types of stopper members to the disc cartridge 323 will be described. As shown in FIG. 144, the cartridge upper shell 12 of the disc cartridge 323 includes the rotation hole 12m and another hole 12m'. Either the stopper member 55 or a stopper member 55' can be fitted in the holes 12m and 12m' as a means for preventing the disc 100 from dropping down through the disc window 12w. The stopper member 55 of the disc cartridge 323 of this twenty-third preferred embodiment has the same structure as the stopper member 55 of the disc cartridge 321 of the twenty-first preferred embodiment described above. That is to say, by inserting the rotation shaft 55a into, and engaging it with, the rotation hole 12m of the cartridge upper shell 12, the stopper member 55 can rotate on the rotation shaft 55a. Then, as already described for the twenty-first preferred embodiment, a portion of the stopper member 55 may be protruded into the disc window 12w, thereby preventing the disc 100 from dropping accidentally. Alternatively, if the stopper member 55 is rotated to the position shown in FIG. 125, the disc 100 may be removed from the disc cartridge 323.

On the other hand, the stopper member 55' includes a rotation shaft 55'a and a protrusion 55'b. When the stopper member 55' is attached to the cartridge upper shell 12, the rotation shaft 55'a and protrusion 55'b of the stopper member 55' are inserted into, and engaged with, the rotation hole 12m and hole 12m', respectively. Since the stopper member 55' is fixed onto the cartridge upper shell 12 at these two points, the stopper member 55'9 is not rotatable but always protrudes partially into the disc window 12w. That is to say, while the stopper member 55' is attached to the cartridge upper shell 12, the disc 100 stored in the disc cartridge 323 is not removable.

In this manner, by providing the rotation hole 12m and the hole 12m', which may be engaged with either the stopper member 55 or the stopper member 55', as engaging means for the cartridge upper shell 12, one of these two stopper members 55 and 55' may be selectively attached to the cartridge body depending on the necessity. That is to say, by adopting one of these two stopper members 55 and 55' selectively, the resultant disc cartridge 323 may or may not allow the operator to remove the disc 100 that has been once stored in the disc cartridge 323.

The disc cartridge 323 shown in FIG. 144 is illustrated as not including the removal history hole 11n or the cap member 56 of the disc cartridge 321 of the twenty-first preferred embodiment. However, the removal history hole 11n and cap member 56 may be provided for the disc cartridge 323. If the removal history hole 11n, cap member 56 and stopper member 55 are provided for the disc cartridge 323, then the cap member 56 will drop off as already described for the twenty-first preferred embodiment as the stopper member 55 is rotated to remove the disc 100 from the disc cartridge 323. Then, the removal history hole 11n will be fully exposed. On the other hand, if the stopper member 55' is attached to the cartridge upper shell 12 instead of the stopper member 55, then the disc 100 cannot be removed by rotating the stopper member 55. Accordingly, in that case, the removal history hole 11n will be kept covered with the cap member 56.

Next, the structure of increasing the dustproofness of the disc cartridge 323 will be described with reference to FIGS. 144, 145, 148 and 149. As shown in FIG. 144, the chucking and head openings 11c and 11h of the cartridge lower shell 11 are surrounded with a rim 33a, which is indicated by the dashed lines in FIG. 145. FIG. 148 is a cross-sectional view of the disc cartridge 323 as viewed along the line M-M shown in FIG. 145. As shown in FIG. 148, the back surfaces of the first and second shutters 21 and 22 include concave portions 37d and 38d, respectively, which engage with the rim 33a.

The first and second shutters 21 and 22 rotate on the cartridge lower shell 11. Accordingly, as the first and second shutters 21 and 22 rotate, the dust that has been deposited on the back surfaces of the first and second shutters 21 and 22 would easily enter the cartridge body if there was a gap between the first and second shutters 21 and 22 and the cartridge lower shell 11. However, by filling the gap with this structure, almost no dust will enter the disc cartridge 323 from the chucking and head openings 11c and 11h.

Furthermore, as shown in FIG. 149, the contact portions of the first and second shutters 21 and 22 around the hole 20h, which is defined by the first and second shutters 21 and 22 closed, are provided with mutually engaging concave and convex portions 35a, 36a and 35b, 36b. That is to say, the first shutter 21 includes the concave portions 35a and 35b and the second shutter 22 includes the convex portions 36a and 36b. The convex portions 36a and 36b of the first shutter 21 protrude from the contact plane that is defined by the first and second shutters 21 and 22 closed. Thus, no dust will enter the disc cartridge 323 from the hole 20h and through the contact plane between the first and second shutters 21 and 22.

In the twenty-third preferred embodiment described above, the disc receiving portion for holding the disc 100 thereon is provided for the rotational member to define the space 69b shown in FIG. 138 under the disc 100. Alternatively, any other structure may be adopted to define the space 69b shown in FIG. 138 under the disc 100. For example, as shown in FIG. 150, a disc receiving portion 25a' for holding the outer edge of the disc 100 may be provided for an alternative cartridge upper shell 12'. Even so, by forming the disc receiving portion 25a' and first and second shutters 21 and 22 in such shapes as to define the space 69b shown in FIG. 138 under the disc 100, the signal recording area of the disc 100 will not contact with the shutters or disc receiving portion of the disc cartridge even if the disc 100 is pressed by the operator too strongly.

Embodiment 24

Hereinafter, a disc cartridge according to a twenty-fourth embodiment of the present invention will be described. Unlike the disc cartridge 323 of the twenty-third embodiment described above, the disc cartridge of this preferred embodiment provides a groove for the disc receiving portion 25a of the rotational member 25 in order to gather dust and other sorts of dirt therein and prevent the dust from being deposited on the information storage side 100A of the disc 100 and the disc holding portions have a structure for holding the disc 100 firmly even when the disc cartridge is mounted vertically, in particular. Thus, the following description will be focused on those differences from the disc cartridge 323 of the twenty-third embodiment. A member identical with the counterpart of the disc cartridge of the twenty-third embodiment or any other previous embodiment described above is identified by the same reference numeral.

FIG. 151 is a plan view illustrating a disc cartridge 324 according to this preferred embodiment with the cartridge upper shell 12 thereof removed. FIG. 152 is a cross-sectional view of the disc cartridge 324 including the cartridge upper shell 12, as taken along the line A-A shown in FIG. 151.

As shown in FIGS. 151 and 152, while the first and second shutters 21 and 22 are closed with the disc holding portions 21b, 22a and 22b holding the disc 100 thereon, a groove 25p is located on the upper surface 25k of the disc receiving portion 25a of the rotational member 25 outside of a region 25b that contacts with the disc 100. In FIG. 152, the groove 25p is illustrated as having a semi-circular cross section. However, as long as the groove 25p is at least recessed below the region 25b contacting with the disc 100, the groove 25p may also have a triangular, rectangular or any other cross section.

While the first and second shutters 21 and 22 are closed with the disc holding portions 21b, 22a and 22b holding the disc 100 thereon, the region where the grooved 25p is provided on the upper surface 25k of the disc receiving portion 25a is not located under the disc 100 but is exposed at the bottom of the disc storage portion. Accordingly, while the disc cartridge 324 is being used, dust and other sorts of dirt may be accumulated in this region. Thus, if no groove 25p were provided to keep the upper surface 25k flat, then the accumulated dust could be deposited on the second side 100A of the disc 100 or enter the space 69b under the disc 100.

In contrast, by providing the groove 25p on the upper surface 25k of the disc receiving portion 25a, the dust and other sorts of dirt can be gathered in the groove 25p. Thus, it is possible to prevent the dust from being deposited on the second side 100A of the disc 100 or entering the space 69b under the disc 100.

As already described in detail with reference to FIGS. 132 and 142, the disc 100 is held with its center aligned with the point C2, which is offset from the center C1 of the disc storage portion, such that the disc 100 contacts with the sidewall of the disc storage portion in the notch 25c of the rotational member 25 while the first and second shutters 21 and 22 are closed. Accordingly, while the disc 100 is being held, the exposed portion of the upper surface 25k of the disc receiving portion 25a is not defined by concentric circles centering around the point C1 but by a circle centering around the point C2 and the circular sidewall 12i of the disc storage portion centering around the point C1. The groove 25p includes at least a portion of this region. The shape and size of this region may change with the radius of the circle defining the sidewall 12i of the disc storage portion, the radius of the disc 100, and the distance between the points C1 and C2. However, this region has a crescent shape, which is discontinued at least in the notch 25c of the rotational member 25.

Next, the structure of the disc holding portions will be described. FIGS. 153 and 154 are plan views of the disc cartridge 324 in which the disc 100 is stored, illustrating a state where the shutters are opened and a state where the shutters have just started closing, respectively. In these drawings, the rotational member 25 is indicated by the dashed lines to make the shutters easily viewable. Also, to specify the locations of the convex portion 27a and disc holding portions 21b, 22a and 22b, which are provided for the first and second shutters 21 and 22, the first and second shutters 21 and 22 are all drawn in solid lines.

The first and second shutters 21 and 22 start closing in the state shown in FIG. 153. Then, as shown in FIG. 154, the disc holding portion 22a provided for the second shutter 22 contacts with the disc 100 earlier than any other disc holding portion 21b or 22b, thereby starting its gripping operation. At this point in time, part of the disc holding portion 22a is located under the stopper member 12s, which is provided so as to protrude into the disc window 12w, i.e., closer to the disc than the stopper member 12s is. No matter in what position the disc cartridge 324 is, the disc 100 stored therein is regulated by the stopper member 12s so as not to pop out of the disc storage portion through the stopper member 12s. Thus, the disc holding portion 22a can contact with, and grip, the disc 100 without fail. Such a structure is effective particularly when the disc cartridge 324 is supported vertically in a disc drive.

As described above, in this preferred embodiment, when a part of the disc holding portion 22a is located under the stopper member 12s, the disc holding portion 22a starts gripping the disc 100 thereon. However, as long as the stopper member 12s can regulate the location and position of the disc 100 in the disc storage portion so as to allow the disc holding portion 22a to contact with, and grip, the disc 100 no matter what position the disc cartridge 324 takes, the disc holding portion 22a does not have to be located under the stopper member 12s when starting to contact with the disc 100. Nevertheless, if the location of the stopper member 12s is distant from that of the disc holding portion 22a that is about to contact with the disc 100, the space allocated to the disc 100 needs to be reduced around the stopper member 12s such that the disc holding portion 22a never fails to contact with the disc 100 no matter what position the disc cartridge 324 may take. In that case, it could be difficult to remove the disc 100 from the disc cartridge 324. For that reason, the location of the disc holding portion 22a that is about to contact with the disc 100 is preferably close to that of the stopper member 12s. More preferably, the disc holding portion 22a starts to grip the disc 100 when a part of the disc holding portion 22a reaches a region under the stopper member 12s as described above.

The first and second shutters 21 and 22 are allowed to go on closing by further rotating the shutters from the state shown in FIG. 154. Then, the other disc holding portions 21b and 22b soon approach the disc 100 and start to grip the disc 100 thereon. In this case, depending on the position of the disc cartridge 324, the disc 100 could be so popped out that the disc holding portions 21b and 22b approaching the disc 100 cannot contact with the disc 100. To avoid such an inconvenience, additional stopper members may be provided where the disc holding portions 21b and 22b should contact with the disc 100. However, if those extra stopper members were provided, it could be difficult to remove the disc 100 from the disc cartridge 324. Thus, in this preferred embodiment, the disc holding portion 22a to contact with the disc 100 earlier than any other disc holding portion 21b or 22b is provided with a structure for changing the location and tilt of the disc 100 such that the disc holding portions 21b and 22b can contact with and grip the disc 100 after the disc holding portion 22a has contacted with the disc 100 first.

FIGS. 155 through 157 are perspective views illustrating the disc holding portion 22a on a larger scale. As shown in these drawings, the disc holding portion 22a has a first regulating surface 142a and a second regulating surface 142b as the structure for changing the location and tilt of the disc 100. Also, as already described in detail for the foregoing preferred embodiments, the disc holding portion 22a further has the slope 22a' to grip and fix the disc 100. As the second shutter 22 is closing, the disc holding portion 22a moves in the direction indicated by the arrow 140. The first regulating surface 142a is arranged so as not to be parallel to the arrowed direction 140 in which the disc holding portion 22a moves. As viewed from the second shutter 22, the first regulating surface 142a has a downwardly tapered slope (i.e., sloped toward the second shutter 22). As shown in FIG. 155, the first regulating surface 142a can contact with either the first side 100B of the disc 100 or the outer edge of the first side 100B. As shown in FIG. 156, the second regulating surface 142b is substantially parallel to the second shutter 22 and can contact with a portion of the disc 100 around the outer edge of the first side 100B thereof. The slope 22a' is continuous with the second regulating surface 142b and has a downwardly tapered shape (i.e., sloped toward the second shutter 22). As shown in FIG. 157, the slope 22a' can contact with the outer edge of the first side 100B of the disc 100.

FIGS. 158 and 160 are perspective views illustrating how a turntable and a clamper disengage themselves from the disc 100, the shutters close, and the disc holding portions get hold of the disc 100 when the disc cartridge 324 is mounted vertically in a disc drive. FIGS. 159 and 161 are cross-sectional views thereof as taken along the lines Q-Q shown in FIGS. 158 and 160, respectively. Hereinafter, it will be described with reference to these drawings and FIGS. 155 through 157 how the disc holding portion 22a regulates the position of the disc 100. It should be noted that no shutters are illustrated in FIGS. 158 and 160.

In a situation where the disc cartridge 324 is mounted vertically in a disc drive, when read and/or write operations on the disc 100 are finished, the turntable and clamper disengage themselves from the disc 100 and then the disc 100 gets released from the bottom of the disc storage portion and may be stored in the disc storage portion in a tilted position as shown in FIG. 158. In FIG. 158, the stopper members 12s and 55 are omitted and the tilt of the disc 100 is exaggerated just for convenience sake to make the position of the disc 100 easily understandable. Actually, however, the stopper members 12s and 55 are provided, and therefore, the disc 100 should be stored within the disc storage portion at least around the stopper members 12s and 55.

When the shutters start closing and the disc holding portion 22a moves in the direction indicated by the arrow 140 in such a situation, a part of the disc holding portion 22a reaches a region under the stopper member 12s (see FIG. 159) as described above. Then, as shown in FIG. 155, the first regulating surface 142a of the disc holding portion 22a makes contact with either the first side 100B of the disc 100 or the outer edge of the first side 100B. The first regulating surface 142a guides the disc 100 and changes the tilt of the disc such that the disc 100 is located between the second regulating surface 142b and the second shutter 22 (or the bottom of the disc storage portion). At this point in time, the other disc holding portions 21b and 22b have not yet reached their positions to contact with the disc 100 as shown in FIG. 158. However, as shown in FIG. 159, the disc 100 is so tilted that the slope 22b' of the disc holding portion 22b cannot contact with the outer edge of the first side 100B of the disc 100.

As the disc holding portion 22a further moves in the arrowed direction 140, the disc 100 is regulated by the second regulating surface 142b as shown in FIG. 156 and has its tilt corrected so as to take an upright position as indicated by the arrow 141 in FIG. 158. As a result, the disc 100 now becomes substantially parallel to the bottom of the disc storage portion as shown in FIGS. 160 and 161. Also, the disc 100 is brought closer to the bottom of the disc storage portion such that the slope 22b' of the disc holding portion 22b (and the slope 21b' of the disc holding portion 21b) can contact with the outer edge of the first side 100B of the disc 100.

As the shutters further rotate, the slope 22a' of the disc holding portion 22a soon contacts with the outer edge of the first side 100B of the disc 100 as shown in FIG. 157. At the same time, the slopes 21b' and 22b' of the disc holding portions 21b and 22b also contact with the outer edge of the first side 100B of the disc 100. As a result, the disc 100 gets held by the disc holding portions 21b, 22a and 22b. The gripping operation by the slopes 22a', 21b' and 22b' has already been described in detail for the foregoing preferred embodiments and the description thereof will be omitted herein.

As described above, according to this preferred embodiment, even when the disc cartridge 324 is mounted vertically, the disc 100 stored therein can get firmly held by the disc holding portions 21b, 22a and 22b without dropping through the disc window 12w.

In the disc holding operation described above, the disc cartridge 324 is supposed to be mounted vertically such that the side surface thereof near the disc holding portion 21b faces down. However, even if the disc cartridge 324 is mounted vertically such that the side surface thereof near the disc holding portion 22b faces down, the disc 100 can also be firmly held by performing similar operations.

On the other hand, if the disc cartridge 324 is mounted horizontally in the disc drive, the disc 100 makes contact with the slope 22a' first without contacting with the first and second regulating surfaces 142a and 142b of the disc holding portion 22a, and then contacts with, and gets held by, the slopes 21b' and 22b' of the disc holding portions 21b and 22b as already described for the foregoing preferred embodiments.

It should be noted that the structure provided for the disc holding portion 22a to change the location and tilt of the disc is not limited to the shape shown in FIG. 155 and other drawings. As long as the structure includes a first regulating surface to make contact with a disc, which is either significantly tilted or much spaced apart from the disc storage portion, guide the disc, and bring it into contact with the second regulating surface, and a second regulating surface for changing or controlling the location and tilt of the disc such that the disc contacts with the slopes 21b', 22a' and 22b' of the disc holding portions 21b, 22a and 22b and that the disc holding portions 21b, 22a and 22b can get hold of the disc, the structure for changing the location and tilt of the disc may include not only the first and second regulating surfaces but also other surfaces as well.

Embodiment 25

Hereinafter, a disc cartridge according to a twenty-fifth embodiment of the present invention will be described. The disc cartridge of this preferred embodiment has a structure that can contribute to improving its handiness by increasing the mechanical strength and operability thereof.

FIG. 162 is a perspective view illustrating an exploded state of the disc cartridge 325 of this preferred embodiment. In the disc cartridge 325, any member identical with the counterpart of the disc cartridge of the twenty-third embodiment described above is identified by the same reference numeral. As shown in FIG. 162, in this disc cartridge 325, the convex portion 25e of the rotational member 25 to engage with the guide groove 27e of the first shutter 21 has a claw portion 25q at the end thereof so as not to disengage itself from the guide groove 27e. In the same way, the convex portion 25f also has a similar claw portion 25r at the end thereof.

The second shutter 22 is provided with protrusions 36 and 48, which stick out into the center hole 100h of the disc 100 when the first and second shutters 21 and 22 are closed.

The cartridge lower shell 11 to make up the cartridge body includes a rotational member receiving portion 11z. When the first and second shutters 21 and 22 are opened, the rotational member receiving portion 11z contacts with a portion of the bottom of the rotational member 25, thereby holding the rotational member 25 thereon.

Also, a concave portion 11y is provided in an area of the cartridge lower shell 11 in which the disc receiving portion 25a of the rotational member 25 overlaps with the first shutter 21 as the first and second shutters 21 and 22 are going to open.

The cartridge lower shell 11 further includes a first convex portion 49a and a second convex portion 29b in the vicinity of the head opening 11h. The first shutter 21 and rotational member 25 include a first convex portion 63a and a second convex portion 63b, which respectively contact with the first and second convex portions 49a and 49b of the cartridge lower shell 11 when the first and second shutters 21 and 22 are closed.

Hereinafter, these features will be described one by one. FIG. 163 is a plan view illustrating the upside of the disc cartridge 325 with its cartridge upper shell 12 and stopper member 55 removed. FIG. 164 is a cross-sectional view thereof as taken along the line R-R shown in FIG. 163. Although not shown, the R'-R' cross section of the convex portion 25f with the claw portion 25r has a similar structure.

As shown in these drawings, the claw portion 25q is provided at the end of the convex portion 25e of the rotational member 25 and located between the cartridge lower shell 11 and the first shutter 21. Also, the claw portion 25q extends in the disc radial direction (i.e., toward the center of the cartridge), which is along the line R-R shown in FIG. 163. Alternatively, the claw portion 25q may extend in any other direction. However, if the claw portion 25q is formed to extend only in the radial direction toward the center of the disc, then the rotational member 25 can be easily formed by a die molding process.

As shown in FIG. 164, a sloped portion 25q' facing the disc window may be provided as a connecting portion between the claw portion 25q and the convex portion 25e. By providing the sloped portion 25q', the junction between the convex portion 25e and claw portion 25q can have an increased mechanical strength. When the sloped portion 25q' is provided, another sloped portion 21' should be provided in the vicinity of the guide groove 27e of the first shutter 21 so as to face the sloped portion 25q'.

A groove 11e' to receive the end of the convex portion 25e with the claw portion 25 is provided on the inner lower surface 11u of the cartridge lower shell 11. Since the claw portion 25 is provided, the end portion of the convex portion 25, facing the inner lower surface 11u, has an increased area. Thus, the width of the groove 11e' is broader than that of the groove 11e of the disc cartridge 323 of the twenty-third embodiment described above.

To insert the convex portion 25e with the claw portion 25q into the guide groove 27e more easily during the manufacturing process of the disc cartridge 325, an insertion port 27e' with an increased groove width is provided at one end of the guide groove 27e. The insertion port 27e' is provided somewhere except where the convex portion 25e of the rotational member 25 is located while the first and second shutters 21 and 22 are closed. The insertion port 27e' is preferably provided at one end of the guide groove 27e where the convex portion 25e is located when the first and second shutters 21 and 22 are opened.

By providing the claw portions 25q and 25r in this manner, it is possible to prevent the convex portions 25e and 25f of the rotational member 25 from disengaging themselves from the guide grooves 27e and 27f of the first and second shutters 21 and 22, respectively. Particularly while the first and second shutters 21 and 22 are closed and the disc 100 is held with the disc holding portions 21b, 22a and 22b, if some impact were applied to the disc cartridge 325 due to dropping, for example, then heavy load or impact would be placed on the first and second shutters 21 and 22 by way of the disc holding portions 21b, 22a and 22b. Even in such a situation, it is also possible to effectively prevent the convex portions 25e and 25f of the rotational member 25 from disengaging themselves from the guide grooves 27e and 27f. Thus, a very convenient disc cartridge 325, which can sufficiently resist impacts caused by dropping, for example, is provided.

In the preferred embodiment described above, both of the convex portions 25e and 25f are provided with the claw portions 25q and 25r. However, depending on the locations of the convex portions 25e and 25f on the rotational member 25 and the distances from the disc holding portions 21b, 22a and 22b, the convex portion 25e or 25f might be unlikely to disengage itself from the guide groove 27e or 27f even without the claw portion 25q or 25r. In that case, either the claw portion 25q or the claw portion 25r may be omitted. That is to say, just one of the two convex portions 25e and 25f may be provided with the claw portion in such a situation.

Next, the protrusions sticking out into the center hole 10h of the disc 100 will be described with reference to FIG. 165. Just like FIG. 163, FIG. 165 is a plan view illustrating the upside of the disc cartridge 325 with the cartridge upper shell 12 and stopper member 55 thereof removed and showing a situation where the first and second shutters 21 and 22 are opened.

As shown in FIG. 165, the first shutter is also provided with a protrusion 35 as in the twenty-first and twenty-third embodiments described above. On the other hand, the second shutter 22 includes not only the protrusion 36 but also another protrusion 48 as well. The protrusion 35 sticks out of the upper surface of the convex portion 21w of the first shutter 21, while the protrusions 36 and 48 stick out of the upper surface of the convex portion 22w. Also, these protrusions 35, 36 and 48 are all located within the hole 20h to be formed by the first and second shutters 21 and 22 in the closed position. While the first and second shutters 21 and 22 are closed, the hole 20h is located so as to overlap with the center hole 100h of the disc 100. Thus, while the first and second shutters 21 and 22 are closed, these protrusions 35, 36 and 48 all stick out into the center hole 100h of the disc 100 and the convex portions 21w and 22w support the disc 100 thereon in the vicinity of the center hole 100h thereof.

As the first and second shutters 21 and 22 are going to open, these protrusions 35, 36 and 48 move from inside the center hole 100h of the disc 100 toward the outer edge of the disc 100. As a result, the respective upper surfaces of the protrusions 35, 36 and 48 make contact with the disc 100, thereby lifting the disc 100 to, and holding it at, an elevated position. At this point in time, the protrusions 35, 36 and 48 contacts with the non-signal recording area 100e of the signal recording side 100A of the disc 100. The protrusions 35, 36 and 48 stick out of the convex portions 21w and 22w. Accordingly, when the protrusions 35, 36 and 48 contact with the signal recording side 100A, the convex portions 21w and 22w do not contact with the signal recording side 100A. Thus, it is possible to prevent these convex portions 21w and 22w and other convex portions 35d and 36d from making contact with the signal recording side 100A, or the signal recording area among other things.

In addition, since the three protrusions 35, 36 and 48 contact with the disc 100, the disc 100 can be held firmly without tilting at all. Thus, the signal recording area of the signal recording side 100A never contacts with the first and second shutters 21 and 22.

As shown in FIG. 165, when the first and second shutters 21 and 22 are fully opened, all of the protrusions 35, 36 and 48 remain within the non-signal recording area 100e of the signal recording side 100A. Thus, there is no concern about the contact of the protrusions 35, 36 and 48 with the signal recording area of the signal recording side 100A.

Likewise, the first and second shutters 21 and 22 being closed move with the disc 100 lifted by the protrusions 35, 36 and 48, thus preventing the convex portions 21w, 22w, 35d and 36d from contacting with the signal recording area of the signal recording side 100A.

In this manner, by using these three protrusions 35, 36 and 48 while the first and second shutters 21 and 22 are going to open or close, the disc 100 can be lifted while being held substantially parallel to the bottom of the disc storage portion and the first and second shutters 21 and 22. Consequently, it is possible to avoid the unwanted situation where the signal recording area of the signal recording side 100A contacts with the first and second shutters 21 and 22.

Next, the rotational member receiving portion 11z will be described with reference to FIGS. 166 through 171. Just like FIG. 163, FIGS. 166 and 168 are plan views illustrating the upside of the disc cartridge 325 with the cartridge upper shell 12 and stopper member 55 thereof removed. More specifically, FIG. 166 shows a situation where the first and second shutters 21 and 22 are closed, while FIG. 168 shows a situation where the first and second shutters 21 and 22 are opened. FIGS. 167 and 169 illustrate cross sections of the disc cartridge shown in FIGS. 166 and 168, respectively, as viewed on the plane S-S.

The rotational member receiving portion 11z is provided on the inner lower surface 11u of the cartridge lower shell 11 adjacent to the head opening 11h of the cartridge lower shell 11 and has a slope 11z' facing the disc window. The side surface 11a of the cartridge lower shell 11, having the head opening 11h, is arranged so as to slightly extend toward the chucking opening 11c along the head opening 11h and is continuous with the rotational member receiving portion 11z.

As shown in FIG. 166, while the first and second shutters 21 and 22 are closed, the convex portion 27a of the first shutter 21 is located near the rotational member receiving portion 11z. Accordingly, the rotational member receiving portion 11z contacts with the convex portion 27a of the first shutter 21 as shown in FIG. 167. The convex portion 27a of the first shutter 21 includes a slope 27a', which faces the slope 11z' of the rotational member receiving portion 11z. At this point in time, the rotational member 25 is located on the first shutter 21 and is out of contact with the rotational member receiving portion 11z.

On the other hand, when the first and second shutters 21 and 22 are opened, the first shutter 21 is located away from the head opening 11h as shown in FIG. 168. The first shutter 21 is not located near the rotational member receiving portion 11z, either. Accordingly, as shown in FIG. 169, the hatched space S1 is created between the inner lower surface 11u of the cartridge lower shell 11 and the bottom of the rotational member 25.

However, since the bottom edge 25i' of the sidewall 25i of the rotational member 25 contacts with the slope 11z' of the rotational member receiving portion 11z, the rotational member receiving portion 11z holds the rotational member 25 at a predetermined height although the space S1 has been created. Consequently, an appropriate distance L1 can be maintained between the lower surface of a bridge portion 25v, provided for the sidewall 25i to bridge the notch 25c of the rotational member 25, and the back surface of the cartridge lower shell 11.

This effect will be further described with reference to FIGS. 170 and 171. FIGS. 170 and 171 illustrate cross sections of the disc cartridges as viewed on the plane T-T shown in FIG. 168. More specifically, FIG. 170 illustrates a cross section of the disc cartridge of this preferred embodiment including the rotational member receiving portion 11z. On the other hand, FIG. 171 illustrates a cross section of a disc cartridge including no rotational member receiving portion 11z.

As described above, when the first and second shutters 21 and 22 are opened, the first shutter 21 is located far away from the head opening 11h, and therefore, the space S1 is created on a portion of the cartridge lower shell 11 near the head opening 11h on the first shutter (21) side. As shown in FIG. 171, if no rotational member receiving portion 11z were provided, then a deformed portion of the disc receiving portion 25a of the rotational member 25 might enter this space S1 due to warp of the rotational member 25. In that case, the bridge portion 25v of the sidewall 25i would be bent downward inside of the head opening 11h. Then, as shown in FIG. 171, an optical head accessing the disc 100 might be interfered with by the bridge portion 25v and could not operate properly, which is a problem.

In contrast, if the rotational member receiving portion 11z is provided as shown in FIG. 170, the rotational member receiving portion 11z holds the rotational member 25 as described above, thereby preventing that portion of the disc receiving portion 25a from entering the space S1. As a result, the bridge portion 25v is never bent downward within the head opening 11h and there is the reserved space for the optical head to access the disc 100 just as intended.

Next, the concave portion 11y provided for the cartridge lower shell 11 will be described. FIGS. 172 and 174 are plan views illustrating the upside of the disc cartridge 325 with the cartridge upper shell 12 and stopper member 55 thereof removed. More specifically, FIG. 172 shows a situation where the first and second shutters 21 and 22 are going to open, while FIG. 174 shows a situation where the first and second shutters 21 and 22 are fully opened. FIG. 173 illustrates a cross section of the disc cartridge as viewed on the plane U-U shown in FIG. 172.

As shown in FIGS. 172 and 174, the concave portion 11y is provided on the inner lower surface 11u of the cartridge lower shell 11. More specifically, the concave portion 11y is provided where the notch 25c of the rotational member 25 passes and where the disc receiving portion 25a overlaps with the first shutter 21 while the first and second shutters 21 and 22 are going to open and close. The concave portion 11y includes at least a portion that is located under the region where the first shutter 21 overlaps with the disc receiving portion 25a. The concave portion 11y is preferably wide and deep enough for the first shutter 21 to be bent toward the inner lower surface 11u. In the example illustrated in FIG. 172, the concave portion 11y has a trapezoidal planar shape with rounded corners. Alternatively, the concave portion 11y may also have a rectangular or any other planar shape.

A portion of the first shutter 21 near its end overlaps with the disc receiving portion 25a when the first and second shutters 21 and 22 are either opened or closed, but passes under the notch 25c of the disc receiving portion 25a while the first and second shutters 21 and 22 are going to open or close. In this case, if the first shutter 21 or rotational member 25 is warped or has a non-uniform thickness, then the disc receiving portion 25a will be once raised from the inner lower surface 11u of the cartridge lower shell 11. In that case, when overlapping with the disc receiving portion 25a again, the first shutter 21 contacts with the disc receiving portion 25a so strongly as to produce a significant friction. In contrast, if the concave portion 11y is provided, then the first shutter 21 may be deformed so as to partially enter the space S2 created by the concave portion 11y as indicated by the two-dot chain in FIG. 173. As a result, the contact of the first shutter 21 with the disc receiving portion 25a of the rotational member 25 or the friction caused by that contact can be reduced.

By adopting such a structure, the load resulting from the friction between the rotational member 25 and the first shutter 21 can be reduced while the shutters are going to open or close, the rotational member 25 can rotate smoothly, and the shutters can be opened and closed smoothly, too, by rotating the rotational member 25 that way. Consequently, the disc cartridge 325 can have increased operability.

In the preferred embodiment described above, the concave portion 11y is provided in the area of the inner lower surface 11u where the first shutter 21 passes. However, depending on the rotational direction of the rotational member 25, a portion of the second shutter 22 may pass the notch 25c of the rotational member 25 as the shutters are going to open or close. In that case, the concave portion 11y may be provided in the area of the inner lower surface 11u where the second shutter 22 passes.

Next, a structure for minimizing the inconstant movement of the first and second shutters 21 and 22 and the rotational member 25 while the shutters are closed will be described. Just like FIG. 163, FIG. 175 is a plan view illustrating the upside of the disc cartridge 325 with the cartridge upper shell 12 and stopper member 55 thereof removed. FIG. 176 is a plan view illustrating a portion of the disc cartridge 325 on a larger scale.

As shown in FIGS. 175 and 176, the cartridge lower shell 11 includes, adjacent to the head opening 11h, a first convex portion 49a and a second convex portion 49b protruding toward the center of the cartridge. The first and second convex portions 49a and 49b are continuous with the sidewall 11a of the cartridge lower shell 11. On the other hand, a first convex portion 63a and a second convex portion 63b, which engage with the first and second convex portions 49a and 49b, respectively, while the first and second shutters 21 and 22 are closed, are provided for the convex portion 27a of the first shutter 21 and the sidewall 25i of the rotational member 25, respectively.

As the first shutter 21 is going to move in the direction indicated by the arrow 22A, the first convex portion 63a of the first shutter 21 and the first convex portion 49a of the cartridge lower shell 11 contact with each other, thereby regulating the movement of the first shutter 21. On the other hand, as the rotational member 25 is going to move in the direction indicated by the arrow 21A, the second convex portion 63b of the rotational member 25 and the first convex portion 49b of the cartridge lower shell 11 contact with each other, thereby regulating the rotation of the rotational member 25. Since the rotation of the rotational member 25 toward the arrowed direction 21A is regulated, the movement of the second shutter 22 in the direction 21A is also regulated.

As already described for the twenty-third preferred embodiment with reference to FIG. 142, the ends of the guide grooves 27e and 28f provided for the first and second shutters 21 and 22 extend in the arrowed directions 27E and 28F, respectively, which are perpendicular to the directions 25E and 25F in which the convex portions 25e and 25f of the first and second shutters 21 and 22, engaging with the guide grooves 27e and 28f, move as the shutters are opening. Thus, the movement of the first shutter 21 in the arrowed direction 21A and that of the second shutter 22 in the arrowed direction 22A are both regulated.

Accordingly, the movement of the first and second shutters 21 and 22 is regulated by these structures in both of the arrowed directions 21A and 22A. As a result, the inconstant movement of the first and second shutters 21 and 22 in the closed position can be minimized. In addition, since the first and second shutters 21 and 22 can maintain their regular positions without moving inconstantly at all, the disc can be firmly held with the disc holding portion 21b of the first shutter 21 and the disc holding portions 22a and 22b of the second shutter 22.

In this case, the rotational member 25 is regulated so as not to rotate in the arrowed direction 21A but can rotate freely in the arrowed direction 22A. Accordingly, the shutters can be opened by rotating the rotational member 25 in the arrowed direction 22A.

In order not to start the operation of opening the shutters erroneously by rotating the rotational member 25 by mistake while the shutters are closed, not only the structures described above but also a lock 44 for locking the rotational member 25 may be provided as shown in FIG. 175. The lock 44 may include an elastic portion 44b, an arm portion 44c, a claw portion 44d provided at the end of the arm portion 44c, and an operating portion 44f, for example. The lock 44 is supported to the cartridge lower shell 11 via a rotation shaft 44a and swings on the rotation shaft 44a when the operating portion 44f is pressed. The operating portion 44f is allowed to stick out through an opening 11r' provided for the cartridge lower shell 11. The elastic portion 44b is allowed to contact with the sidewall 11a.

The rotational member 25 is provided with an opening 25s, which engages with the claw portion 44d of the arm portion 44c when the shutters are closed. The opening 25s engaging with the claw portion 44d may be replaced with a groove engaging with the claw portion 44d.

As shown in FIG. 175, while the shutters are closed, the claw portion 44d of the lock 44 engages with the opening 25s of the rotational member 25 so that the rotational member 25 is regulated so as to rotate in neither the arrowed direction 21A nor the arrowed direction 22A. To unlock the lock 44, the rotational member 25 is rotated toward the arrowed direction 22A with the operating portion 44f pressed. Then, the claw portion 44d of the lock will unlock from the opening 25s of the rotational member 25, thereby allowing the rotational member 25 to rotate.

By providing the lock 44 with such a structure, the rotational member 25 is regulated so as not to rotate in the arrowed direction 21A or 22A while the shutters are closed. As a result, in addition to the effects achieved by the structures described above, the inconstant movements of the first and second shutters 21 and 22 and rotational member 25 can be minimized and the disc can be held even more firmly while the shutters are closed.

Embodiment 26

Hereinafter, a disc cartridge according to a twenty-sixth embodiment of the present invention will be described. The disc cartridge of this preferred embodiment also has a structure that can contribute to improving its handiness by increasing the mechanical strength and dustproofness thereof.

FIG. 177 is a perspective view illustrating an exploded state of the disc cartridge 326 of this preferred embodiment. In the disc cartridge 326, any member identical with the counterpart of the twenty-fifth embodiment or any other previous embodiment is identified by the same reference numeral. As will be described in detail later, the stopper member 34 of this disc cartridge 325 can be easily attached to the upper surface of the cartridge body 10 but has such a structure as not to be easily removable from the cartridge body 10 once attached and to be firmly held by the cartridge body 10 without any inconstant movement.

The rotational member 25 is designed such that even if the disc 100 moves within the disc storage portion while the shutters are opened, the information storage area of the disc 100 will not get scratched easily. Also, a portion of the rotational member 25, which is exposed through the head opening in such a situation, is not deformed easily.

The disc holding portions 21b and 22b provided for the shutters 21 and 22 are designed such that even if the disc cartridge 326 storing the disc therein is dropped, the disc 100 will not pop out of the disc cartridge 326 easily due to the impact. Furthermore, the shutters 21 and 22 and rotational member 25 are also designed such that the information storage side of the disc 100 will not get scratched easily due to the impact of dropping.

Furthermore, the disc cartridge 326 also has such a structure as not to allow dust or dirt to enter the cartridge body 10 through the head opening 11h or chucking opening 11c and deposit on the information storage side 100A of the disc 100 so easily.

In the disc cartridge 326 of this preferred embodiment, the rotational member 25 includes an operating portion 25j consisting of a pair of concave portions and a gear portion interposed between the concave portions, which are all provided on its cylindrical side surface. To open and close the shutters 21 and 22 of the disc cartridge 326, the rotational member 25 is rotated with a shutter opening/closing mechanism, which includes a pair of convex portions and a gear portion that respectively engage with the pair of concave portions and gear portion of the rotational member 25. The disc cartridge 326 further includes a locking member 98, which has a convex portion that engages with one of the concave portions of the rotational member 325. While the shutters are closed, the convex portion of the locking member 98 engages with the associated concave portion of the rotational member 25, thereby preventing the rotational member 25 from rotating and the shutters from moving. Also, as shown in FIG. 177, the disc cartridge 326 may further include a sliding member 99 for recognizing the type of the disc, for example. By moving the sliding member 99, a hole (or a concave portion) provided at a predetermined position on the back surface of the cartridge body 12 can be closed. This position can be used for disc type recognition and write protect purposes.

Hereinafter, these structures for improving the handiness will be described in detail. First, the structures of the stopper member 34 and the cartridge upper shell 12, to which the stopper member 34 is attached, will be described. FIG. 178 is a perspective view illustrating the stopper member 34, a portion of the cartridge upper shell 12 to which the stopper member 34 is attached, and its surrounding region with the stopper member 34 removed. As shown in FIG. 178, the stopper member 34 includes a pair of engaging pins 34a and 34a' and a pair of positioning pins 34b and 34b'. The portion of the cartridge upper shell 12 to which the stopper member 34 is attached is a concave portion 12k. On the bottom of the concave portion 12k, a pair of engaging hole 64c and 64c', to which the engaging pins 34a and 34a are inserted, and positioning holes 64d and 64d', to which the positioning pins 34b and 34' are inserted, are provided. When the stopper member 34 is attached to the cartridge upper shell 12, a portion 34d of the stopper member 34 sticks out into the disc window 12w, thereby preventing the disc 100 from dropping through the disc window 12w.

FIG. 179 illustrates a cross section of the cartridge upper shell 12 as viewed on a plane that crosses the positioning hole 64d and engaging hole 64c thereof. Although only the positioning hole 64d and engaging hole 64c are illustrated in FIG. 179, the other positioning hole 64d' and the other engaging hole 64c' also have the same shapes as those shown in FIG. 179. As shown in FIG. 179, the positioning hole 64d and engaging hole 64*c* are defined by the inner side surfaces of bosses 64*a* and 64*b* extending in a first direction from the cartridge upper shell 12 toward the cartridge lower shell 11. Thus, the positioning hole 64*d* and engaging hole 64*c* also extend in the first direction. As shown in FIG. 179, the inside diameter of the positioning hole 64*d* is almost equal to the outside diameter of the positioning pin 34*b*. Accordingly, when the positioning pin 34*b* is inserted into the positioning hole 64*d*, there is almost no gap between the positioning pin 34*b* and positioning hole 64*d* and the positioning hole 64*d* holds the positioning pin 34*b* so tight as to prevent the positioning pin 34*b* from moving perpendicularly to the first direction.

The end of the engaging pin 34*a* of the stopper member 34 is provided with a first engaging portion 34*c*. In this preferred embodiment, the first engaging portion 34*c* has a claw shape that expands from the engaging pin 34*a* outward. The engaging pin 34*a* is made of an elastic material. However, the engaging hole 64*c* is slightly oversized than the protruding portion of the engaging pin 34*a* such that the outwardly expanded engaging portion 34*c* can be retracted inward and inserted into the engaging hole 64*c* smoothly.

When the engaging pin 34*a* is inserted into the engaging hole 64*c* that is defined by the boss 64*a*, the engaging portion 34*c* sticks out of the end of the boss 64*a*. As a result, the engaging portion 34*c* gets engaged with the boss 64*a* so that the engaging pin 34 does not move in the first direction. That is to say, the end of the boss 64*a* functions as a second engaging portion to engage with the first engaging portion. In this preferred embodiment, the claw-like first engaging portion 34*c* gets engaged with the second engaging portion that is defined by the end of the boss 64*a*. However, the first engaging portion 34*c* and second engaging portion may be defined by any other structures. For example, the first engaging portion 34*c* may be a concave portion provided on the side surface of the engaging pin 34*a* and the second engaging portion may be a convex portion that is provided on the inside surface defining the engaging hole 64*c*.

As described above, according to this preferred embodiment, the stopper member 34 can be positioned perpendicularly to the first direction with the positioning pins 34*b* and 34*b*' and positioning holes 64*d* and 64*d*', and can also be positioned in the first direction with the engaging pins 34*a* and 34*a*' and engaging holes 64*c* and 64*c*'. Thus, the stopper member 34 is unlikely to move in either direction and can be attached to the cartridge upper shell 12 without allowing the stopper member 34 to move inconstantly. The stopper member 34 attached is fixed too firmly to be raised or bent easily even if the user attempts to remove it forcibly.

Also, just an engaging structure needs to be provided to regulate the movement of the engaging pins 34*a* and 34*a* in the first direction. Thus, the engaging hole 64*c* may be somewhat bigger than the engaging pin 34*a*. On the other hand, the positioning pin 34*b* and positioning hole 64*d* for regulating the movement perpendicular to the first direction have no engaging portions. For that reason, it is easy to insert the positioning pin 34*b* into the positioning hole 64*d*. Consequently, by adopting this structure, the stopper member 34 can be easily attached to the cartridge upper shell 12.

As is clear from the foregoing description, if at least one pair of positioning pin and positioning hole and at least one pair of engaging pin and engaging hole are provided, the effects described above are achieved. Accordingly, the number of the positioning pins and engaging pins to be provided for the stopper member 34 may be arbitrarily selected according to the shape, size and material of the stopper member 34. If the stopper member 34 is longer than a half of one side of the cartridge body 10 (i.e., the cartridge upper shell 12 and cartridge lower shell 11) as in the preferred embodiment described above, then the stopper member 34 preferably includes at least two positioning pins and at least two positioning holes.

Next, a structure provided for the rotational member 25 to protect the data storage area of the disc 100 from scratches will be described. FIG. 180 illustrates the structure of the disc holding portion 22*b* and its surrounding members in a situation where the shutters 21 and 22 are closed. The disc receiving portion 25*a* of the rotational member 25 has the groove 25*p*, which has already been described for the twenty-third embodiment with reference to FIG. 152, outside of a portion 25*b* contacting with the disc 100. As shown in FIG. 180, the rotational member 25 includes a number of filling portions 66, which are provided so as to partially fill in the groove 25*p*.

FIG. 181 illustrates a cross section as viewed on a plane that crosses one of the filling portions 66 when the shutters 21 and 22 are closed. As shown in FIG. 181, the filling portion 66 completely fills in the groove 25*p* on this plane and its upper surface 66*a* tilts toward the center of the disc window. While the shutters 21 and 22 are closed, the disc holding portions 21*b*, 22*a* and 22*b* provided for the shutters 21 and 22 hold and fix the disc, and therefore, the disc 100 contacts with the portion 25*b* of the rotational member 25.

As shown in FIG. 182, when the shutters 21 and 22 are opened, the disc holding portions 21*b*, 22*a* and 22*b* release the disc 100 so that the disc 100 can move within the disc storage portion 10*d*. As the disc 100 moves and comes closer to the side surface 12*i* of the cartridge upper shell 12, the disc 100 soon lands on the filling portion 66 and the outer edge of the signal recording side 100A contacts with the slope 66*a* of the filling portion 66. Thus, it is possible to prevent the signal recording side 100A from contacting with other portions of the rotational member 25. Among other things, the signal recording area 100*d* never gets scratched through contact with the disc receiving portion 25*a*.

The filling portions 66 close the groove 25*p*. Accordingly, if the filling portion 66 were provided continuously all around the groove 25*p*, then the dustproof function of the groove 25*p* as already described for the twenty-third embodiment would be lost. For that reason, a number of filling portions 66 are preferably provided intermittently so as to leave the groove 25*p*. However, if the circumferential length of each filling portion 66 were 0.5 mm or less, then the disc 100, landing on the filling portions 66, would contact with the respective slopes 66*a* of the filling portions 66 in just small areas. In that case, pressure applied from the filling portions 66 onto the disc 100 would be concentrated toward those small areas. As a result, scratches or traces of contact might be left on the disc 100. This is why the filling portions 66 preferably have a circumferential length of at least 1 mm. The maximum circumferential length changes according to the size of the disc 100 to be stored in the disc cartridge 326. For example, if the given disc 100 has a diameter of 5 inches, the circumferential length is preferably 10 mm at most. A preferred circumferential length is 2 mm to 5 mm.

It should be noted that even the filling portions 66 with a length falling within this range should not be provided so as to overlap with the disc holding portions 21*b*, 22*a* and 22*b* or in the close vicinity of the disc holding portions 21*b*, 22*a* and 22*b*. The reason is as follows. Specifically, if a great external force is applied to the disc cartridge in which the filling portions 66 are provided near the disc holding portions 21*b*, 22*a* and 22*b* while the shutters are closed, then the force will be distributed on the label side 100B of the disc 100 due to the contact of the outer edge of the disc 100 with the disc holding portions 21b, 22a and 22b but will be concentrated toward the filling portions 66 on the information storage side 100A. As a result, scratches or traces of contact with the filling portion 66 may be left on the disc 100.

Next, the structure that is specially designed not to pop the disc 100 out of the disc cartridge 326 easily even under a significant impact applied to the disc cartridge 326 where the disc is stored will be described.

FIG. 183 is a perspective view illustrating the structure of a portion surrounding the disc holding portion 22b in a situation where the shutters are closed and the disc holding portions 21b, 22a and 22b are holding the disc 100. FIG. 184 illustrates a cross section as viewed on a plane including the disc holding portion 22b having the structure shown in FIG. 183. In the disc cartridge of the twenty-second embodiment described above, for example, each disc holding portion has a single slope to hold the disc thereon. In this preferred embodiment, each disc holding portion has a plurality of surfaces. The following description will be about the disc holding portion 22b. However, the disc holding portion 21b has a similar structure, too.

As shown in FIGS. 183 and 184, the disc holding portion 22b has a first slope 67a and a second slope 67c, which are stacked perpendicularly to the bottom of the disc storage portion and are tilted so as to face the bottom, and a horizontal plane 67b. The horizontal plane 67b is provided between the first and second slopes 67a and 67c and lies substantially parallel to the bottom. As already described in detail for the twenty-second embodiment, the bottom of the shutter 22 with the disc holding portion 22b has the taper 26c and the concave portion 11x is provided for the cartridge lower shell 11 so as to receive the disc holding portion 22b. The portion 26b of the shutter 22 with the taper 26c has a reduced thickness and can be deformed elastically.

As shown in FIG. 184, while the shutters are closed, the edge 100c of the disc 100 contacts with the second slope 67b of the disc holding portion 22b. In this manner, the disc 100 can be gripped and fixed while being pressed toward the bottom of the disc storage portion. The disc cartridge 326 can normally be carried in such a state.

If any significant external force were applied to the disc cartridge 326 in the state shown in FIG. 184 (e.g., if the disc cartridge 326 were dropped), then inertial force would be placed on the disc 100 and the force pressing the disc holding portion 22b outward from the center of the center 100 would be applied to the disc holding portion 22b as indicated by the arrow in FIG. 184. As a result, the portion 26b of the shutter 22 would be deformed and enter the concave portion 11x of the cartridge lower shell 11 as shown in FIG. 185. In this case, the disc holding portion 22b would tilt outward, and the second slope 67c of the disc holding portion 22b would be out of contact with the edge 100c of the disc 100, thereby releasing the disc 100.

The tilt of the disc holding portion 22b is regulated by the contact of the disc holding portion 22b with a stopper 25t provided for the rotational member 25, thereby preventing the disc holding portion 22b from tilting further outward.

Even after the disc 100 has been released from the disc holding portion 22b, force might be further applied to the disc 100 so as to allow the disc 100 to drop through the disc window 12w due to the impact of dropping. However, even if the disc holding portion 22b has tilted, the horizontal plane 67b of the disc holding portion is still located above the outer edge of the disc 100. Thus, by contacting with the horizontal plane 67b, the disc 100 will not drop through the disc window 12w.

As the shutters are going to close, the first slope of the disc holding portion 22b contacts with the edge 100c of the disc 100 at as high a position in the disc storage portion as possible, thereby guiding the disc 100 from a predetermined position to an appropriate disc holding position. This function has already been described in detail through the operation of the slope 22b' of the disc holding portion 22b before this twenty-fifth embodiment.

Thus, according to this preferred embodiment, even if such a significant external force is applied to the disc cartridge 326 storing the disc, the horizontal plane 67b of the disc holding portion 22b prevents the disc 100 from dropping through the disc window 12w.

Next, the structure for minimizing the deformation of the rotational member 25 will be described. FIG. 186 is a perspective view illustrating the disc cartridge 326 with its cartridge upper shell 12 removed to show a state where its shutters are opened. FIG. 187 is a perspective view illustrating a portion of the disc cartridge around the end of the head opening 11h on a larger scale. As shown in FIG. 186, to allow the optical head (not shown) to access the disc 100 (not shown) through the head opening 11h smoothly in a situation where the shutters 21 and 22 expose the head opening 11h, the disc receiving portion 25a of the rotational member 25 has a notch 25c. This notch 25c extends from the disc receiving portion 25a and reaches a portion of the side surface 25i of the rotational member 25.

However, by providing this notch 25c, the bridge portion 25v of the side surface 25i, which is located within the head opening 11h while the shutters are opened, has a reduced thickness and is easily flexible. Thus, to provide a sufficient space under the bridge portion 25v and prevent the optical head accessing the disc from contacting with the bridge portion 25v, a pair of supporting portions 11k is provided so as to sandwich the head opening 11h of the cartridge lower shell 11. The supporting portions 11k form integral parts of the sidewall of the cartridge lower shell 11. The supporting portions 11k contact with the bottom of the bridge portion 25v while the shutters are opened, thereby regulating the height of the bridge portion 25v. Also, the supporting portions 11k support the bridge portion 25v as close to the opening 11h as possible, thereby minimizing the deformation of the bridge portion 25v. As shown in FIG. 187, the bridge portion 25v sticks outward from the other portions of the sidewall 25i such that the supporting portions 25v contact with only the bridge portion 25v, not with any other portion of the sidewall 25i of the rotational member 25.

By adopting such a structure, while the shutters are opened, the position of the bridge portion 25v of the rotational member 25 can be regulated and a sufficient space can be provided for the optical head to access the disc.

Next, the structure to minimize scratches on the information storage side of the disc 100 will be described. FIG. 188 is a perspective view illustrating the disc cartridge 326 with its cartridge upper shell 12 removed to show a state where its shutters are closed. As indicated by hatching in FIG. 188, the surfaces of the shutters 21 and 22 that are opposed to the disc 100 (not shown) while the shutters are closed and a non-contact area of the upper surface 25k of the disc receiving portion 25a of the rotational member 25, which does not contact with the disc 100 while the shutters are closed, are subjected to a texturing (or graining) process. The texturing process preferably produces a level difference of 5 µm to 20 µm. In this preferred embodiment, a texturing process producing a level difference of 10 µm may be carried out, for example. A contact area, which contacts with the disc 100 while the shutters are closed, is located outside of the non-contact area but is preferably not subjected to the texturing process. This is because the contact area needs to make a close contact with the disc 100 and thereby prevent any dust or dirt from entering the disc cartridge.

Those textured portions do not contact with the disc 100 while the shutters are closed and the disc 100 is held therein. However, if a significant impact caused by dropping, for example, is applied to the disc cartridge 326 in which the disc 100 is stored, then the information storage side of the disc 100 might contact with those portions. In that case, even if the information storage side of the disc contacts with those portions, that contact should be a point contact due to the textured patterns. Thus, scratches to be created on the information storage side can be reduced significantly and deterioration in the signal quality of the data stored in the information storage side can be minimized.

Also, in the disc cartridge 326, the label side of the disc is exposed through the disc window 12w. Accordingly, when the user pushes the label side with his or her fingers, the disc may be bent to such a degree that those portions contact with the information storage side of the disc. Even so, that contact between the information storage side and those portions should be a point contact due to the textured patterns. Thus, scratches to be created on the information storage side can be reduced significantly as compared with non-textured surfaces or line contacts.

In the example illustrated in FIG. 188, the area between the convex portions 20w and 20d is not textured but may be subjected to the texturing process as well.

Next, the dustproof mechanism of the disc cartridge 326 will be described. The upper portion of FIG. 189 is a plan view of the shutters 21 and 22 as viewed on a plane facing the cartridge lower shell 11. On the other hand, the lower portion of FIG. 189 is a plan view of the cartridge lower shell 11 as viewed on its inside surface. FIG. 190 is a perspective view illustrating the disc cartridge 326 with its cartridge upper shell 12 and rotational member 25 removed to show a state where its shutters are closed. FIG. 191 is a cross-sectional view of the structure shown in FIG. 190 as viewed on the arrowed plane that crosses the head opening 11h thereof.

As shown in these drawings, a convex portion 74a is provided around the head opening 11h and chucking opening 11c on the inside surface 11u of the cartridge lower shell 11. The convex portion 74a extends from two sides, which are opposed to each other so as to sandwich the head opening 11h between them, along the head and chucking openings 11h and 11c. The two parts of the convex portion 74a extending from both sides are combined together in the vicinity of the center of the cartridge lower shell 11, and then extend along the rotation shaft 39' of the shutters 21 and 22.

Furthermore, on the surface of the shutters 21 and 22, which is opposed to the inside surface 11u, first and second convex portions 73a and 73b and first and second convex portions 73a' and 73b' are provided so as to sandwich the convex portion 74a of the cartridge lower shell 11 while the shutters are closed.

As shown in FIG. 191, while the shutters are closed, the convex portion 74a of the cartridge lower shell 11 engages with a concave portion to be defined by the first and second convex portions 73a and 73b of the shutters 21 and 22. As a result, the inside members of the disc cartridge 326 are sealed with the head and chucking openings 11c and 11h closed up, thereby preventing dust or dirt from entering the disc cartridge 326 through the head or chucking opening 11h or 11c.

Also, as shown in FIGS. 189 and 190, third convex portions 73c and 73c' may be further provided on the same surface of the shutters 21 and 22 as the first and second convex portions 73a and 73b so as to be almost as high as the first and second convex portions 73a and 73b and to extend like arcs around the rotation holes 37' and 38' of the shutters 21 and 22. The third convex portions 73c and 73c' regulate the positions of the shutters 21 and 22 in order to prevent the shutters 21 and 22 from being deformed so much as to contact with the inside surface 11u of the cartridge lower shell 11. As shown in FIG. 189, two or more third convex portions 73c or 73c' may be provided for each of the shutters 21 and 22.

Hereinafter, it will be described how to make the disc cartridge 326 in which the disc 100 is stored.

First, the cartridge upper shell 12, cartridge lower shell 11, rotational member 25, shutters 21 and 22 and stopper member 34 are made of a resin by injection molding processes, for example. The rotational member 25 and shutters 21 and 22 are supposed to be movable within the disc cartridge 326, and therefore, are preferably made of a material that has excellent mechanical properties in terms of tensile and flexural strengths, good abrasion resistance and a small friction coefficient. For example, the rotational member 25 and shutters 21, 22 are preferably made of polyacetal (POM). On the other hand, the cartridge upper shell 12 and cartridge lower shell 11 are preferably made of a material that resists impact sufficiently and that can be colored easily. For example, the cartridge upper shell 12 and cartridge lower shell 11 may be made of an ABS resin. The material of the cartridge upper shell 12 and cartridge lower shell 11 is preferably different from that of the rotational member 25 and shutters 21 and 22.

First, as shown in FIG. 192(a), the rotation holes 37' and 38' of the shutters 21 and 22 are inserted into the rotation shafts 39 on the inside surface 11u of the cartridge lower shell 11, thereby arranging the shutters 21 and 22 in an opened state on the inside surface 11u of the cartridge lower shell 11. Next, as shown in FIG. 192(b), the protrusions 25e and 25f of the rotational member 25 are inserted into the guide grooves 27e and 28f, respectively, thereby placing the rotational member 25 on the shutters 21 and 22. If necessary, the locking member 98 to lock the rotational member 25 and the sliding member 99 to recognize the disc type are further arranged.

Subsequently, the cartridge upper shell 12 is faced with the cartridge lower shell 11 as shown in FIG. 192(c). Specifically, the cartridge upper and lower shells 12 and 11 are fixed to a jig after having joined together and then subjected to an ultrasonic wave with a horn, thereby bonding the cartridge upper and lower shells 12 and 11 together by an ultrasonic welding process. By applying the ultrasonic wave, frictional heat is generated in the contact portions of the cartridge upper and lower shells 12 and 11, thereby fusing the contact portions and bonding them together. In this case, the material of the rotational member 25 and shutters 21 and 22 is different from that of the cartridge upper and lower shells 12 and 11, and therefore, the rotational member 25 and shutters 12 and 11 are never bonded to the cartridge upper shell 12 or cartridge lower shell 11. In this manner, the cartridge body 10 is formed by bonding the cartridge upper and lower shells 12 and 11 together. Optionally, the process of cleaning the debris produced by that bonding or a washing process may be carried out.

Next, as shown in FIG. 193(a), the disc 100 is inserted through the disc window 12w of the cartridge body 10 and stored in the disc storage portion. Subsequently, the stopper member 34 is attached to the cartridge body 10. By inserting the engaging pins 34a and 34a' into the engaging holes 64c and 64c' and the positioning pins 34b and 34b' into the positioning holes 64d and 64d', respectively, the engaging pins 34a and 34a' are fixed into the engaging holes 64c and 64c' as shown in FIG. 93(a). As a result, the disc cartridge 326 in which the disc 100 is stored is completed as shown in FIG. 193(b).

According to this method, the disc 100 is stored after the cartridge upper and lower shells 12 and 11 have been bonded together by the ultrasonic welding process. Accordingly, even if some debris were stirred up due to the ultrasonic welding process, no debris would be deposited on the disc 100 and the reliability of the disc 100 should be increased. In addition, the disc 100 can be stored after the cartridge body 10 is completed. Thus, after the cartridge body 10 and disc 100 have been separately manufactured and completed, the disc 100 may be stored in the cartridge body 100 somewhere else, where neither the cartridge body 100 nor the disc 100 was manufactured, and the stopper member 34 may be attached so as to obtain a disc cartridge 326' in which the disc 100 is stored. No special manufacturing equipment is needed to attach the stopper member 34, and therefore, the process of storing the disc 100 in the cartridge body 10 may also be carried out at any arbitrary place.

Embodiment 27

Hereinafter, a disc drive according to the present invention will be described.

FIG. 194 is perspective view schematically illustrating a main portion of a disc drive 900. Any of the disc cartridges 301 through 326 according to the first through twenty-sixth preferred embodiments of the present invention described above may be loaded into this disc drive 900. In the specific example illustrated in FIG. 194, the disc cartridge 326 according to the twenty-sixth preferred embodiment is loaded into this disc drive 900. In FIG. 194, the disc 100 is indicated by the dashed line.

The disc drive 900 includes: a driving means 902 for rotating the disc 100 that is stored in the disc cartridge 326; and a head 908 for reading and/or writing information from/on the disc 100.

The driving means 902 includes a spindle motor 904 and a turntable 906 that is fitted with the rotation shaft of the spindle motor 904. The spindle motor 904 is supported on a base 910. The head 908 is moved by an actuator (not shown) along a guide 912.

The disc drive 900 further includes a clamper 916 that is supported by an arm 914. Each of the turntable 906 and the clamper 916 includes a magnet and a magnetic body, for example. As will be described later, the disc 100 is sandwiched and held between the clamper 916 and the turntable 906 by utilizing the attraction between the magnets, and thereby mounted onto the turntable 906. In this manner, the driving force of the spindle motor 904 can be transmitted to the disc 100 just as intended and the disc 100 can be rotated without fluttering.

The disc cartridge 326 includes the operating portion 25j for opening and closing the first and second shutters 21 and 22 on its side surface 10r that is parallel to the direction 1A in which the disc cartridge 326 is inserted into this disc drive 900. To operate this operating portion 25j, the disc drive 900 includes a shutter opening/closing mechanism 918 that engages with the operating portion 25j to open and close the shutters. The shutter opening/closing mechanism 918 is provided near the side surface 10r of the disc cartridge 326 that has been loaded into the disc drive 900. In FIG. 194, to illustrate the operating portion 25j clearly, the shutter opening/closing mechanism 918 is illustrated as being separated from the operating portion 25j. An actuator for use to move the shutter opening/closing mechanism 918 is not illustrated in FIG. 194, either.

It should be noted that the shutter opening/closing mechanism 918 needs to be located beside the shutter opening/closing operating portion of the disc cartridge to be inserted into this disc drive 900. For example, if the disc cartridge to be loaded has a shutter opening/closing operating portion on the side surface 10p including the head opening 11h as in the first or tenth preferred embodiment described above, then the shutter opening/closing mechanism 918 should be provided near the side surface 10p. On the other hand, when the disc cartridge according to any of the sixteenth through eighteenth preferred embodiments described above is loaded into the disc drive 900, the shutter opening/closing mechanism 918 may be provided near the side surface 10q.

Optionally, two or more shutter opening/closing mechanisms 918 may be provided for the same disc drive 900. For example, a second shutter opening/closing mechanism 918 may be additionally provided near the side surface 10p of the disc cartridge 326 shown in FIG. 194 so that either the disc cartridge of the first preferred embodiment or the disc cartridge 326 of the twenty-third preferred embodiment may be loaded into this disc drive 900.

The shutter opening/closing mechanism 918 has such a structure as to engage with the operating portion 25j of the disc cartridge. In the disc cartridge 326, the first and second shutters 21 and 22 are opened or closed by sliding the operating portion 25j. Accordingly, the shutter opening/closing mechanism 918 should engage with the operating portion 25j and slide in the direction indicated by the arrow 1A. If the operating portion 25j includes nothing but a gear or if a disc cartridge having a geared operating portion is loaded as in the sixteenth preferred embodiment, then a geared and rotating shutter opening/closing mechanism 918 may be used.

Posts 920 are provided on the base 910 to define a vertical level at which the disc cartridge 326 is supported. That is to say, the disc cartridge 326 is supported on the top of the posts 920. Also, positioning pins 922 are further provided on the base 910 so as to engage with the positioning holes 11w of the disc cartridge 326.

These posts 920 and positioning pins 922 function as a supporting structure for supporting the disc cartridge 326 at a predetermined position with respect to the driving means 902. Optionally, instead of the posts 920 and the positioning pins 922, a tray may be provided as an alternative supporting structure for the disc drive 900. In that case, the tray may be drawn out to mount the disc cartridge 326 thereon and then inserted into the disc drive 900 to load the disc 100 into the disc drive 900 and to dispose the disc cartridge 326 at a predetermined position with respect to the driving means 902 and the head 908. As another alternative, the tray and the positioning pins 922 may be used in combination as the supporting structure.

Hereinafter, it will be described how this disc drive 900 operates.

First, the disc cartridge 326 that stores the disc 100 therein is loaded into the disc drive 900. The disc cartridge 326 may be loaded either manually by the operator or automatically by a loading mechanism (not shown). In the latter case, the loading mechanism may transport the disc cartridge 326 from a disc cartridge insert slot (not shown) of the disc drive 900 to the position illustrated in FIG. 194. Then, the concave portions 10c or 10e as described above for the first or sixteenth preferred embodiment may be provided at the positions indicated by the arrows 926 in FIG. 194 and may be engaged with the loading mechanism. Alternatively, the tray may also be used as described above. In one of these methods, the disc cartridge 326 is disposed at a predetermined position with respect to the driving means 902 and the head 908.

As another alternative, the concave portion 10g as described above for the first preferred embodiment or the slit 10b as described above for the sixteenth preferred embodiment may be provided at the position of the disc cartridge 326 as indicated by the arrow 928 or 930. In that case, the disc drive 900 may have a convex portion (not shown) that engages with the concave portion 10g or the slit 10b. Then, even if the user tries to insert the disc cartridge 326 upside down or the wrong way round into this disc drive 900, the disc cartridge 326 is ejected because interference should occur between the disc cartridge 326 and the disc drive 900. In this manner, it is possible to prevent the user from inserting the disc cartridge 326 into the disc drive 900 erroneously.

When the disc cartridge 326 is disposed at the position shown in FIG. 194, the shutter opening/closing mechanism 918 engages with the operating portion 25j, thereby sliding the operating portion 25j in the direction opposite to that indicated by the arrow 1A. As a result, the first and second shutters 21 and 22 start to open to expose the head and chucking openings 11h and 11c in the end. Also, as already described for the twentieth preferred embodiment, the shutter opening/closing mechanism 918 makes the disc holding portions 21b, 22a and 22b release the disc 100 by way of the first and second shutters 21 and 22. Thus, the disc 100 is released from the disc holding portions 21b, 22a and 22b. Subsequently, the arm 914 holding the clamper 916 thereon lowers, thereby sandwiching and holding the disc 100 between the clamper 916 and the turntable 906. Consequently, the disc 100 is mounted on the turntable 906 so as to be rotatable in the disc storage portion of the disc cartridge 326.

Next, the disc 100 starts being rotated by the spindle motor 904. Then, the head 908 accesses the information storage area of the disc 100 to read or write information from/on the disc 100.

To unload the disc cartridge 326 from the disc drive 900, first, the arm 914 is raised, thereby separating the clamper 916 from the disc 100. Next, the shutter opening/closing mechanism 918 is moved in the direction indicated by the arrow 1A to slide the operating portion 25j. As a result, the first and second shutters 21 and 22 are closed. As the first and second shutters 21 and 22 are going to be closed, the disc holding portion grip the disc 100 thereon. And when the first and second shutters 21 and 22 are completely closed, the disc holding portions will hold the disc 100 thereon. Thereafter, an unloading mechanism (not shown) ejects the disc cartridge 326 from the disc drive 900.

Into the disc drive 900 shown in FIG. 194, the disc cartridge 326 is loaded horizontally. Alternatively, as already described for the first or eighth preferred embodiment, the disc drive 900 may also be mounted vertically so that the disc cartridge is loaded thereto vertically. This is because even when the disc cartridge is loaded vertically into the disc drive 900, the stopper members can still prevent the disc 100 from dropping down from the disc storage portion.

In the first through nineteenth embodiments described above, a nonwoven fabric is ultrasonic welded or adhered to the shutters. However, if the disc has some anti-scratching structure (e.g., if the signal recording side of the disc is covered with a stiff hard coating), then the nonwoven fabric does not have to be attached thereto, but the shutters may contact with the disc directly. Also, not the entire surface of the shutters has to be in plane contact with the signal recording side of the disc, but the shutters may have such a structure that at least a portion of the shutters contacts with the signal recording side of the disc. That is to say, not the entire surface but just a portion of the surface of the shutters may be in plane contact with the disc. In that case, some anti-scratching structure (e.g., a nonwoven fabric) may be provided for only that portion being in plane contact with the disc.

In the first through twenty-seventh embodiments described above, the disc 100 to be stored in the disc cartridge has just one signal recording side. However, a single-sided disc like this is used for illustrative purposes only. This is because the disc cartridge of the present invention has such a structure as to expose one side of the disc and because a single-sided disc is best suited to a structure of that type. Thus, even a disc having two signal recording sides may be appropriately stored in the disc cartridge of the present invention and may be loaded into a disc drive to write or read a signal thereon/therefrom. It should be noted, however, that where a double-sided disc is stored and housed in the disc cartridge of the present invention, dust may be deposited on the exposed one of the two signal recording sides. Accordingly, in that case, some mechanism for preventing the unwanted dust deposition should preferably be provided.

Also, in the first through twenty-seventh embodiments described above, the size of the disc 100 is not particularly specified. However, the present invention may be implemented as a disc cartridge for accommodating a disc having a size of 12 cm or any of various other sizes.

Furthermore, in the first through twenty-seventh embodiments described above, the disc cartridge is illustrated as having an outer dimension that is slightly greater than the size of the disc. However, the size relationship between the disc and the disc cartridge is not limited to the illustrated one. For example, even when the disc cartridge has an outer dimension that is large enough to store a 12 cm disc therein, the disc storage portion and the disc holding portions of the disc cartridge may have their sizes and structures defined in such a manner as to store an 8 cm disc. Such a disc cartridge may be used as an adapter for getting write and read operations performed on an 8 cm disc by a disc drive for writing or reading a signal on/from a 12 cm disc.

The various features as described for the first through twenty-seventh embodiments may be combined appropriately. For example, the rotation stopper members as described for the nineteenth embodiment may be provided for the disc cartridge of the sixteenth embodiment. Also, the recesses for use to gather dust therein as described for the fifteenth embodiment may be provided for the disc cartridge of the sixteenth embodiment. As can be seen, the first through twenty-seventh embodiments may be combined in numerous other ways and not all of those possible combinations of embodiments have been described herein. However, it is quite possible for those skilled in the art to carry out those various possible combinations of embodiments by reference to the description of the present application. Thus, it is intended that all of those various possible combinations of embodiments fall within the scope of the present invention.

INDUSTRIAL APPLICABILITY

The disc cartridge of the present invention can be used particularly effectively to store a disc having only one recording side. The cartridge body thereof has such a structure as to cover only the signal recording side of the disc and expose the other side thereof. Thus, the cartridge can have a reduced thickness. Also, the shutters thereof are formed in such a shape as to cover just one side of the disc cartridge. Accordingly, the shutters can have a simplified structure and can be formed at a lower cost. In addition, the disc holding portions or disc holding members thereof hold a disc thereon by pressing the disc against the shutters or the cartridge body. Thus, the disc will not move inconstantly inside the cartridge body and no dust will be deposited on the signal recording side of the disc. Furthermore, since the label side of the disc is displayed inside the disc window, the disc cartridge can also have a good design.

Thus, the present invention provides a thinner and highly dustproof disc cartridge of a good design that is applicable for use in various types of disc drives.

The invention claimed is:

1. A disc cartridge comprising:
a cartridge body including a disc storage portion having a disc window, and a bottom and a sidewall along an outer periphery of the bottom, and storing a disc with first and second sides in a rotatable state so that the first side is exposed through the disc window, a chucking opening provided on the bottom of the disc storage portion so as to get the disc chucked externally and a head opening provided on the bottom of the disc storage portion so as to allow a signal read/write head to access the second side of the disc;
a first shutter and a second shutter, which are provided on the bottom of the disc storage portion so as to expose or cover the head opening;
a first disc holding portion and a second disc holding portion provided at the first shutter and the second shutter, respectively, and
a rotational member supported over, and engaging with, the first and second shutters in the disc storage portion so as to open or close the first and second shutters when rotating in the disc storage portion,
wherein the rotational member includes:
a disc receiving portion with a contact region that contacts with, and receives, the outer edge of the second side of the disc while the first and second shutters are closed;
a groove provided outside of the contact region;
a plurality of filling portions, which are provided to fill in parts of the groove, the upper surface of each said filling portion being tilted toward the center of the disc window; and
a notch, which is provided for the disc receiving portion to be located within the head opening while the first and second shutters are opened,
wherein the first disc holding portion and the second disc holding portion hold the disc thereon with the center of the disc offset from the center of the disc storage portion such that an outer side surface of the disc contacts with the sidewall of the disc storage portion at a position where the notch of the rotational member is located while the first and second shutters are closed.

2. The disc cartridge of claim 1, wherein the groove of the disc receiving portion is exposed in the disc storage portion while the first and second shutters are closed.

3. The disc cartridge of claim 2, wherein each said filling portion has a circumferential length of at least 1 mm.

4. The disc cartridge of claim 2, wherein each said filling portion has a circumferential length in the range of 2 mm to 5 mm.

5. The disc cartridge of claim 1, further comprising:
a stopper member, which protrudes toward the disc window,
wherein while the first and second shutters are closed, the first disc holding portion contacts with the disc in the vicinity of the stopper member before the second disc holding portion contacts with the disc,
wherein the first disc holding portion has a structure for changing the tilt and position of the disc in the disc storage portion so as to contact with the disc in the vicinity of the stopper member and then allow the second disc holding portion to contact with, and grip, the disc.

6. The disc cartridge of claim 5, wherein while the first and second shutters are closed, at least part of the first disc holding portion is located under the stopper member so as to contact with the disc.

7. The disc cartridge of claim 6, wherein each of the first and second disc holding portions has a downwardly tapered slope, grips and fixes the disc thereon by bringing the slope into contact with an outer edge of the disc, and holds the disc thereon by pressing the disc against the bottom of the disc storage portion.

8. The disc cartridge of claim 5, wherein the tilt and position changing structure of the first disc holding portion has a first regulating surface, which is provided so as to define a downwardly tapered slope that is not parallel to the direction in which the first disc holding portion moves as the first and second shutters are going to be closed, and a second regulating surface, which is provided parallel to the first or second shutter.

9. The disc cartridge of claim 1,
wherein each of the first and second disc holding portions includes: a first slope and a second slope, which are arranged perpendicularly to the bottom of the disc storage portion and are tilted so as to face the bottom; and a horizontal plane, which extends substantially parallel to the bottom between the first and second slopes,
wherein the first and second disc holding portions are adapted to tilt in a radial direction of the disc which is held by the first and second disc holding portions, and
wherein stoppers are provided at the disc rotational member to contact with the first and second disc holding portions, respectively, to prevent the first and second disc holding portions from tilting outward while the first and second shutters are closed.

* * * * *